United States Patent
Lee et al.

(10) Patent No.: US 9,712,864 B2
(45) Date of Patent: Jul. 18, 2017

(54) BROADCAST SERVICE RECEIVING METHOD AND BROADCAST SERVICE RECEIVING APPARATUS

(71) Applicant: LG ELECTRONICS INC., Seoul (KR)

(72) Inventors: Joonhui Lee, Seoul (KR); Sanghyun Kim, Seoul (KR); Gomer Thomas, Princeton Junction, NJ (US); Aettie Ji, Seoul (KR); Jinpil Kim, Seoul (KR); Kyungho Kim, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 282 days.

(21) Appl. No.: 14/352,990

(22) PCT Filed: Oct. 22, 2012

(86) PCT No.: PCT/KR2012/008687
§ 371 (c)(1),
(2) Date: Sep. 29, 2014

(87) PCT Pub. No.: WO2013/058633
PCT Pub. Date: Apr. 25, 2013

(65) Prior Publication Data
US 2015/0052570 A1 Feb. 19, 2015

Related U.S. Application Data

(60) Provisional application No. 61/549,725, filed on Oct. 20, 2011, provisional application No. 61/558,455, (Continued)

(51) Int. Cl.
*H04N 21/435* (2011.01)
*H04N 21/2187* (2011.01)
(Continued)

(52) U.S. Cl.
CPC ....... *H04N 21/435* (2013.01); *H04N 21/2187* (2013.01); *H04N 21/2393* (2013.01);
(Continued)

(58) Field of Classification Search
CPC .. H04N 21/435; H04N 21/437; H04N 21/438; H04N 21/4622; H04N 21/6125;
(Continued)

(56) References Cited

U.S. PATENT DOCUMENTS 7,646,828 B2    1/2010   Song et al.
2009/0006337 A1*  1/2009   Cheung ............ G06F 17/30802
(Continued)

FOREIGN PATENT DOCUMENTS

CN    101690197 A    3/2010
CN    102132560 A    7/2011
(Continued)

OTHER PUBLICATIONS

Samsung Electronics, Park et al., Jun. 25, 2009, Application No. 1020090057197, all.*

*Primary Examiner* — Nathan Flynn
*Assistant Examiner* — Caroline Somera
(74) *Attorney, Agent, or Firm* — Dentons US LLP

(57) ABSTRACT

Provided is a broadcast service receiving method of a broadcast receiving device. The method includes: receiving an video stream among a content transmitted as a broadcast service; generating a request message for at least one of signalling information on the broadcast service and signalling information on an adjunct service of the broadcast service on the basis of part of the received video stream; transmitting the generated request message to a server through an internet network; receiving a response message corresponding to the request message from the server; obtaining at least one of the broadcast service corresponding
(Continued)

| Syntax | No. of Bits | Format |
|---|---|---|
| DO_descriptor() { | | |
| descriptor_tag | 8 | TBD |
| descriptor_length | 8 | uimsbf |
| DO_identifier | TBD | uimsbf |
| DO_version | 8 | uimsbf |
| reserved | 4 | bslbf |
| test_DO | 1 | bslbf |
| visible_UI | 1 | bslbf |
| handles_configuration_changed | 1 | bslbf |
| handles_externally_controlled_video | 1 | bslbf |
| persistent_storage | 16 | uimsbf |
| } | | | to the video stream and the adjunct service of the broadcast service on the basis of the received response message; and providing the obtained broadcast service and adjunct service, wherein the request message comprises first query information for specifying a request time interval and second query information for specifying at least one signalling table to be requested.

8 Claims, 152 Drawing Sheets

Related U.S. Application Data filed on Nov. 11, 2011, provisional application No. 61/559,679, filed on Nov. 14, 2011, provisional application No. 61/568,633, filed on Dec. 8, 2011, provisional application No. 61/578,862, filed on Dec. 21, 2011, provisional application No. 61/595,146, filed on Feb. 5, 2012, provisional application No. 61/596,714, filed on Feb. 8, 2012, provisional application No. 61/606,460, filed on Mar. 4, 2012.

(51) Int. Cl.
*H04N 21/437* (2011.01)
*H04N 21/438* (2011.01)
*H04N 21/239* (2011.01)
*H04N 21/462* (2011.01)
*H04N 21/61* (2011.01)

(52) U.S. Cl.
CPC ......... *H04N 21/437* (2013.01); *H04N 21/438* (2013.01); *H04N 21/4622* (2013.01); *H04N 21/6125* (2013.01); *H04H 2201/30* (2013.01)

(58) Field of Classification Search
CPC .... H04N 21/2187; H04N 21/43; H04N 7/015; H04N 7/08; H04N 5/44; H04N 21/2393; H04H 2201/30

USPC ......................................................... 725/110
See application file for complete search history.

(56) References Cited

U.S. PATENT DOCUMENTS

| | | | |
|---|---|---|---|
| 2009/0210896 A1* | 8/2009 | Song ..................... | H04H 60/72 725/32 |
| 2009/0276819 A1 | 11/2009 | Kim et al. | |
| 2009/0327894 A1 | 12/2009 | Rakib et al. | |
| 2010/0046411 A1* | 2/2010 | Park ..................... | H04W 72/005 370/312 |
| 2010/0134701 A1* | 6/2010 | Eyer ..................... | H04N 21/235 348/731 |
| 2010/0242067 A1 | 9/2010 | Song et al. | |
| 2011/0001885 A1* | 1/2011 | Eyer ..................... | H04N 21/235 348/723 |
| 2011/0296469 A1* | 12/2011 | Yun ..................... | H04N 21/235 725/62 |
| 2013/0185398 A1* | 7/2013 | Thang ................. | H04N 21/6125 709/219 |
| 2013/0340007 A1* | 12/2013 | Eyer ................... | H04N 21/8133 725/40 |
| 2014/0137153 A1* | 5/2014 | Fay ..................... | H04N 21/6175 725/39 |
| 2015/0156546 A1* | 6/2015 | Moon ................... | H04H 60/13 725/110 |
| 2017/0026451 A1* | 1/2017 | Thang ................. | H04L 65/4084 |

FOREIGN PATENT DOCUMENTS

| | | |
|---|---|---|
| KR | 1020090057197 A | 6/2009 |
| KR | 1020100022912 A | 3/2010 |
| KR | 10-2010-0063666 A | 6/2010 |
| KR | 1020100105314 A | 9/2010 |
| KR | 1020110020791 A | 3/2011 |
| KR | 1020110102349 A | 9/2011 |
| KR | 1020110112806 A | 10/2011 |
| WO | 2009134105 A2 | 11/2009 |
| WO | 2010058962 A2 | 5/2010 |

\* cited by examiner

FIG.4

| Service protection OMA BCAST DRM | Signaling Channel Service-SMT | OMA BCAST Service Guide | NRT Content Items / Files |
|---|---|---|---|
| | | \multicolumn{2}{c}{FLUTE} | |
| | | \multicolumn{2}{c}{ALC / LCT} | |
| \multicolumn{4}{c}{UDP} |
| \multicolumn{4}{c}{IP} |
| \multicolumn{4}{c}{RS Frame} |
| \multicolumn{4}{c}{M/H Physical Layer} |
| \multicolumn{4}{c}{8VSB Physical Layer} |

FIG.5

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for)i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG.6

| service_type | Meaning |
|---|---|
| 0x00 | [Reserved] |
| 0x01 | analog_television – The virtual channel carries analog television programming |
| 0x02 | ATSC_digital_television – The virtual channel carries television programming (audio, video and optional associated data) conforming to ATSC standards |
| 0x03 | ATSC_audio – The virtual channel carries audio programming (audio service and optional associated data) conforming to ATSC standard s. |
| 0x04 | ATSC_data_only_service – The virtual channel carries a data service conforming to ATSC standards, but no video of stream_type 0x02 or audio of stream_type 0x81. |
| 0x05-0x3F | [Reserved for future ATSC use] |

FIG.7

| Value | Meaning |
|---|---|
| 0x00 | [ Reserved ] |
| 0x01 | Analog_television-The virtual channel carries analog television programming |
| 0x02 | ATSC_digital_television-The virtual channel carries television programming (audio, video and optional data) conforming to ATSC standards. |
| 0x03 | ATSC_audio-The virtual channel carries audio programming (audio service and optional data) conforming to ATSC standards. |
| 0x04 | ATSC_data_only_service-The virtual channel carries a data service conforming to ATSC standards, but no video of stream_type 0x02 or audio of stream_type 0x81. |
| 0x05 | Software Download Data Service see A/97 |
| 0x06 | Unassociated/small screen service see A/65C Amendment 1 |
| 0x07 | Parameterized Service New A/V CODEC |
| 0x08 | ATSC_nrt_service-The virtual channel carries a NRT service conforming to ATSC standards. |
| 0x09-0x7F | [ Reserved for future ] |
| 0x80-0xFF | [ User Private ] |

FIG.8

| Syntax | No. of bits | Format |
|---|---|---|
| data_service_table_section() { | | |
|     table_id | 8 | 0xCF |
|     section_syntax_indicator | 1 | bslbf |
|     private_indicator | 1 | bslbf |
|     reserved | 2 | '11' |
|     private_section_length | 12 | uimsbf |
|     table_id_extension | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     data_service_table_bytes() | | |
|     CRC_32 | 32 | rpchof |
| } | | |

| Syntax | No. of bits | Format |
|---|---|---|
| data_service_table_bytes() { | | |
|     sdf_protocol_version | 8 | uimsbf |
|     application_count_in_section | 8 | uimsbf |
|     if( application_count_in_section > 0) { | | |
|       for(j = 0; j <application_count_in_section; j++) { | | |
|         compatibility_descriptor() | | |
|         app_id_byte_length | 16 | uimsbf |
|         if(app_id_byte_length > 1) { | | |
|           app_id_description | 16 | uimsbf |
|           for(i=0;i< app_id_byte_length-2;i++) { | | |
|             app_id_byte | 8 | bslbf |
|           } | | |
|         } | | |
|         tap_count | 8 | uimsbf |
|         for( i = 0; i < tap_count; i++) { | | |
|           protocol_encapsulation | 8 | uimsbf |
|           action_type | 7 | uimsbf |
|           resource_location | 1 | bslbf |
|           Tap() | | |
|           tap_info_length | 16 | uimsbf |
|           for( k=0; k<N; k++) { | | |
|             descriptor() | | |
|           } | | |
|         } | | |
|         app_info_length | 16 | uimsbf |
|         for( i=0; i< M; i++) { | | |
|           descriptor() | | |
|         } | | |
|         app_data_length | 16 | uimsbf |
|         for( i = 0; i < app_data_length; i++) { | | |
|           app_data_byte | 8 | bslbf |
|         } | | |
|       } | | |
|     } | | |
|     service_info_length | 16 | uimsbf |
|     for(j=0; j<K; j++) { | | |
|       descriptor() | | |
|     } | | |
|     service_private_data_length | 16 | uimsbf |
|     for( j = 0; j < service_private_data_length; j++) { | | |
|       service_private_data_byte | 8 | bslbf |
|     } | | |
| } | | |

FIG.12

| Syntax | No. of Bits | Format |
|---|---|---|
| NRT_service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         NST_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     reserved | 4 | '1111' |
|     carrier_frequency | 32 | uimsbf |
|     channel_TSID | 16 | uimsbf |
|     program_number | 16 | uimsbf |
|     source_id | 16 | uimsbf |
|     num_NRT_services | 8 | uimsbf |
|     for (i=0; i<num_NRT_services; i++) | | |
|     { | | |
|         reserved | 4 | '1111' |
|         NRT_service_status | 2 | uimsbf |
|         SP_indicator | 1 | bslbf |
|         CP_indicator | 1 | bslbf |
|         NRT_service_id | 16 | uimsbf |
|         short_NRT_service_name | 8*8 | |
|         reserved | 2 | '11' |
|         NRT_service_category | 6 | uimsbf |
|         num_components | 5 | uimsbf |
|         IP_version_flag | 1 | bslbf |
|         source_IP_address_flag | 1 | bslbf |
|         NRT_service_destination_IP_address_flag | 1 | bslbf |
|         if (source_IP_address_flag) | | |
|             source_IP_address | 32 or 128 | uimsbf |
|         if (NRT_service_destination _IP_address_flag) | | |
|             NRT_service_destination_IP_address | 32 or 128 | uimsbf |
|         for (j=0; j<num_components; j++) | | |
|         { | | |
|             reserved | 1 | '1' |
|             essential_component_indicator | 1 | bsblf |
|             component_destination_IP_address _flag | 1 | bslbf |
|             port_num_count | 5 | uimsbf |
|             component_destination_UDP_port_num | 16 | uimsbf |
|             if (component_destination_IP_address _flag) | | |
|                 component_destination_IP_address | 32 or 128 | uimsbf |
|             Reserved | 4 | '1111' |

FIG.13

| Syntax | No. of Bits | Format |
|---|---|---|
| num_component_level_descriptors | 4 | uimsbf |
| for (k=0; k<num_component_level_descriptors; k++) | | |
| { | | |
|     component_level_descriptor() | var | |
| } | | |
| } | | |
| reserved | 4 | '1111' |
| num_NRT_service_level_descriptors | 4 | uimsbf |
| for (m=0; m<num_MH_service_level_descriptors; m++) | | |
| { | | |
|     NRT_service_level_descriptor() | var | |
| } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
|     virtual_channel_level_descriptor() | var | |
| } | | |
| } | | |

FIG.14

| Syntax | No. of Bits | Format |
|---|---|---|
| MH_component_descriptor() { | | |
|     descriptor_tag | 8 | 0x8D |
|     descriptor_length | 8 | uimsbf |
|     component_type | 7 | uimsbf |
|     component_encryption_flag | 1 | bsblf |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     MH_component_ data(component_type) | var | |
| } | | |

FIG.15

| Syntax | No. of Bits | Format |
|---|---|---|
| NRT_component_ data() { | | |
|     TSI | 16 | uimsbf |
|     session_start_time | 32 | uimsbf |
|     session_end_time | 32 | uimsbf |
|     reserved | 5 | '11111' |
|     tias_bandwidth_indicator | 1 | bslbf |
|     as_bandwidth_indicator | 1 | bslbf |
|     FEC_OTI_indicator | 1 | bslbf |
|     if (tias_bandwidth_indicator == '1'){ | | |
|         tias_bandwidth | 16 | uimsbf |
|     } | | |
|     if (as_bandwidth_indicator == '1'){ | | |
|         as_bandwidth | 16 | uimsbf |
|     } | | |
|     if (FEC_OTI_indicator == '1'){ | | |
|         FEC_encoding_id | 8 | uimsbf |
|         FEC_instance_id | 16 | uimsbf |
|     } | | |
| } | | |

FIG.16

| Syntax | No.of Bits | Format |
|---|---|---|
| NRT_information_table_section() { | | |
|   table_id | 8 | 0xTBD |
|   section_syntax_indicator | 1 | '1' |
|   private_indicator | 1 | '1' |
|   reserved | 2 | '11' |
|   section_length | 12 | uimsbf |
|   service_id | 16 | uimsbf |
|   reserved | 2 | '11' |
|   NRT_IT_version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   time_span_start | 32 | uimsbf |
|   reserved | 5 | '11111' |
|   time_span_length | 11 | uimsbf |
|   num_items_in_section | 8 | uimsbf |
|   for(j=0; j<num_items_in_section; j++) { | | |
|     content_linkage | 32 | uimsbf |
|     updates_available | 1 | bslbf |
|     reserved | 1 | '1' |
|     TF_available | 1 | bslbf |
|     low_latency | 1 | bslbf |
|     playback_length_in_seconds | 20 | uimsbf |
|     content_length_included | 1 | bslbf |
|     playback_delay_included | 1 | bslbf |
|     expiration_included | 1 | bslbf |
|     reserved | 1 | '1' |
|     duration | 12 | uimsbf |
|     if(content_length_included=1) { | 40 | uimsbf |
|       content_length | | |
|     } | | |
|     if(playback_delay_included=1) { | | |
|       reserved | 4 | '1111' |
|       playback_delay | 20 | uimsbf |
|     } | | |
|     if(expiration_included=1) { | | |
|       expiration | | |
|     } | 32 | uimsbf |
|     content_name_lingth | | |
|     content_name_text() | 8 | uimsbf |
|     reserved | var | |
|     content_descriptors_length | 4 | '1111' |
|     for(i=-;i<N; i++) { | 12 | uimsbf |
|       content_descriptor() | | |
|     } | | |
|   } | | |
|   reserved | 6 | '111111' |
|   descriptors_length | 10 | uimsbf |
|   for(i=0; i<M; i++) { | | |
|     descriptor() | | |
|   } | | |
| } | | |

FIG.17

| Syntax | No. of bits | Format |
|---|---|---|
| NRT_content_table_section ( ) { | | |
|     table_id | 8 | uimsbf |
|     section_syntax_indicator | 1 | '1' |
|     private_indicator | 1 | '1' |
|     reserved | 2 | bslbf |
|     section_length | 12 | uimsbf |
|     NRT_Channel_ID | 16 | uimsbf |
|     reserved | 2 | bslbf |
|     version_number | 5 | uimsbf |
|     current_next_indicator | 1 | 1 |
|     section_number | 8 | uimsbf |
|     last_section_number | 8 | uimsbf |
|     protocol_version | 8 | uimsbf |
|     num_contents_in_section | 8 | uimsbf |
|     for (j=0; j < num_contents_in_section; j++) { | | |
|         content_version | 32 | uimsbf |
|         content_id | 32 | uimsbf |
|         content_available_start_time | 32 | uimsbf |
|         content_available_end_time | 32 | uimsbf |
|         ETM_location | 2 | uimsbf |
|         content_length_in_seconds | 30 | uimsbf |
|         content_size | 48 | uimsbf |
|         content_delivery_bit_rate | 32 | uimsbf |
|         content_title_length | 8 | uimsbf |
|         content_title_text ( ) | var | |
|         descriptors_length | 16 | uimsbf |
|         for (i=0; i < N; i++) { | | |
|             descriptor ( ) | | |
|         } | | |
|     } | | |
| } | | |

| Syntax | No. of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_services | 8 | uimsbf |
|   for (j=0;j< num_services; j++) { | | |
|     service_id | 16 | uimsbf |
|     multi_ensemble_service | 2 | uimsbf |
|     service_status | 2 | uimsbf |
|     SP_indicator | 1 | bslbf |
|     short_service_name_length | 3 | uimsbf |
|     short_service_name | 16*m | |
|     reserved | 2 | '11' |
|     service_category | 6 | uimsbf |
|     num_components | 5 | uimsbf |
|     IP_version_flag | 1 | bslbf |
|     source_IP_address_flag | 1 | bslbf |
|     service_destination_IP_address_flag | 1 | bslbf |
|     if(source_IP_address_flag) | | |
|       source_IP_address | 32 or 128 | uimsbf |
|     if(service_destination_IP_address_flag) | | |
|       service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if(component_destination_IP_address_flag) | | |
|         component_destination_IP_address | 32 or 128 | uimsbf |
|       reserved | 4 | '1111' |
|       num_component_level_descriptors | 4 | uimsbf |
|       for (k=0;k< num_components_level_descriptors; k++) | | |
|       { | | |
|         component_level_descriptor() | var | |
|       } | | |
|     } | | |
|     reserved | 4 | '1111' |
|     num_service_level_descriptors | 4 | uimsbf |
|     for (m=0; m<num_service_level_descriptors; m++) | | |
|     { | | |
|       service_level_descriptor() | var | |
|     } | | |
|   } | | |
|   reserved | 4 | '1111' |
|   num_ensemble_level_descriptors | 4 | uimsbf |
|   for (n=0; n<num_ensemble_level_descriptors; n++) { | | |
|     ensemble_level_descriptor() | var | |
|   } | | |
| } | | |

```xml
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault ="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs ="unbounded"/>
      <xs:element name="FDT-Content-ID" type="xs:usignedShort" minOccurs="0" maxOccurs='unbounded'/>  ①
      <xs:anynamespace="##other" processContents="skip" minOccurs="0"maxOccurs ="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use='optional"/>
    <xs:attribute name="FEC-OTI-FEC-Instance-ID" type="xs:unsignedLong" use='optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attributename="FEC-OTI-Max-Number-of-Encoding-Symbols" type="-xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence >
      <xs:element name="File-Content-ID" type="Content-ID-Type" minOccurs="0" maxOccurs ="unbounded"/>  ②
      <xs:any namespace="##other"processContents="skip"minOccurs ="0"maxOccurs ="unbounded"/>
    </xs:sequence >
    <xs:attribute name="Content-Location" type="xs:anyURI" use="required"/>
    <xs:attributename="TOI" type="xs:positiveInteger" use="required"/>
    <xs:attributename="Content-Length" type=' xs:unsignedLong" use="required'/>
    <xs:attributename="Transfer-Length" type="xs:unsignedLong" use="optional"/>
    <xs:attributename="Content-Type" type="xs:string" use="optional"/>
    <xs:attributename="Content-Encoding" type="xs:string" use="optional"/>
    <xs:attributename="Content-MD5" type="xs:base64Binary" use="optional"/>
    <xs:attributename="FEC-OTI-FEC-Encoding-ID" type="xs:unsignedLong" use="optional"/>
    <xs:attributename="FEC-OTI-FEC-Instance-ID" type="xs:unsignedLong" use="optional"/>
    <xs:attributename="FEC-OTI-Maximum-Source-Block-Length" type="xs:unsignedLong" use="optional"/>
    <xs:attributename="FEC-OTI-Encoding-Symbol-Length" type="xs:unsignedLong" use="optional"/>
    <xs:attributename="FEC-OTI-Max-Number-of-Encoding-Symbols" type="xs:unsignedLong" use="optional"/>
    <xs:attributename="FEC-OTI-Scheme-Specific-Info" type="xs:base64Binary" use="optional"/>
    <xs:anyAttribute processContents ="skip"/>
  </xs:complexType >
  <xs:complexType name="Content-ID-Type">
    <xs:attribute name="Content-ID" type="xs:unsingedShort" use="required"/>
    <xs:attribute name="entry" type="xs:boolean " default="false" use="optional"/>  ③
    <xs:anyAttribute processContents="skip"/>
  </xs:complexType >
</xs:schema >
```

```xml
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType ">
    <xs:sequence >
      <xs:element name="File" type="File-Type" maxOccurs ="unbounded"/>
      <xs:element name="FDT-Content-ID" type="FDT-Content-ID-Type" minOccurs="0" maxOccurs="unbounded"/>
      <xs:any namespace="##other" processContents ="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type=" xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents ="skip"/>
  </xs:complexType>
  <xs:complexType name="File-Type">
    <xs:sequence>
      <xs:element name="File-Content-ID" type="Content-ID-Type" minOccurs="0" maxOccurs ="unbounded"/>
      <xs:any namespace="##other" processContents="skip" minOccurs="0" maxOccurs="unbounded"/>
    </xs:sequence >
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type=" xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type=" xs:unsignedLong" use="optional"/>
    <xs:attribute name="FEC-OTI-Scheme-Specific-Info" type="xs:base64Binary" use="optional"/>
    <xs:anyAttribute processContents ="skip"/>
  </xs:complexType >
  <xs:complexTypename="FDT-Content-ID-Type">
    <xs:sequence>
      <xs:elementname="Entry-Content-Location" type=xs:anyURI "minOccurs="0" maxOccurs="unbounded"/>
    </xs:sequence>
    <xs:attribute name="Content-ID" type="xs:unsingedShort" use="required"/>
    <xs:anyAttribute processContents="skip"/>
  <xs:complexType>
  <xs:complexType name="Content-ID-Type">
    <xs:attribute name="Content-ID" type="xs:ursingedShort" use="required"/>
    <xs:attribute name="entry" type="xs:boolean" default="false" use="optional"/>
    <xs:anyAttribute processContents ="skip"/>
  </xs:complexType >
</xs:schema >
```

| Syntax | No. of Bits | Format |
|---|---|---|
| tdo_trigger_table_section() { | | |
|     table_id | 8 | 0xTBD |
|     section_syntax_indicator | 1 | 0 |
|     private_indicator | 1 | 1 |
|     reserved | 2 | 11 |
|     section_length | 12 | uimsbf |
|     source_id | 16 | uimsbf |
|     reserved | 2 | 11 |
|     TTT_version_number | 5 | uimsbf |
|     current_next_indicator | 1 | 1 |
|     section_number | 8 | uimsbf |
|     last_section_number | 8 | uimsbf |
|     num_triggers_in_section | 8 | uimsbf |
|     for (i=0; i< num_triggers_in_section; i++) { | | uimsbf |
|         trigger_id | 32 | uimsbf |
|         trigger_time | 32 | uimsbf |
|         trigger_action | 16 | uimsbf |
|         trigger_description_length | 8 | uimsbf |
|         trigger_description_text | var | |
|         service_id_ref | 16 | uimsbf |
|         content_linkage | 32 | uimsbf |
|         num_trigger_descriptors | 8 | uimsbf |
|         for (j=0; j<num_bundle_descriptors; j++) { | | |
|             trigger_descriptor   () | var | |
|         } | | |
|     } | | |
| } | | |

FIG.27

| Syntax | No. of bits | Format |
|---|---|---|
| synchronized_data_packet(){ | | |
|     data_identifier | 8 | uimsbf |
|     sub_stream_id | 8 | uimsbf |
|     PTS_extension_flag | 1 | bslbf |
|     output_data_rate_flag | 1 | bslbf |
|     reserved | 2 | '11' |
|     synchronized_data_packet_header_length | 4 | uimsbf |
|     if (PTS_extension_flag=='1'){ | | |
|         reserved | 7 | '1111111' |
|         PTS_extension | 9 | uimsbf |
|     } | | |
|     for (i=0;i<N1;i++){ | | |
|         synchronized_data_private_data_byte | 8 | bslbf |
|     } | | |
|     for (i=0;i<N2;i++){ | | |
|         synchronized_data_byte | 8 | bslbf |
|     } | | |
| } | | |

FIG.28

| Syntax | No. of bits | Format |
|---|---|---|
| contentTypeDescriptor(){ | | |
|     descriptorTag | 8 | 0x72 |
|     descriptorLength | 8 | uimsbf |
|     for(i=0;i<descriptorLength;i++){ | | |
|         contentTypeByte | 8 | bslbf |
|     } | | |
| } | | |

FIG.29

| Syntax | No. Of bits |
|---|---|
| TS_program_map_section(){ | |
| table_id | 8 |
| section_syntax_indicator | 1 |
| '0' | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| reserved | 3 |
| PCR_PID | 13 |
| reserved | 4 |
| program_info_length | 12 |
| for(i=0;i<N;i++){ | |
|    descriptor() | |
| } | |
| for(i=0;i<N1;i++){ | |
|    steam_type | 8 |
|    reserved | 3 |
|    elementary_PID | 13 |
|    reserved | 4 |
|    ES_info_length | 12 |
|    for(i=0;i<N2;i++){ | |
|      descriptor() | |
|    } | |
| } | |
| CRC_32 | 32 |
| } | |

| Syntax | No. of Bits | Format |
|---|---|---|
| service_id_descriptor() { | | |
|    descriptor_tag | 8 | 0xC2 |
|    descriptor_length | 8 | uimsbf |
|    service_count | 8 | uimsbf |
|    for (i=0; i<service_count; i++) | | |
|      service_id | 16 | bslbf |
|      for (j=0; j< N, j++) { | | |
|         reserved | 8 | bslbf |
|      } | | |
| } | | |

FIG.30

| Syntax | No. Of bits |
|---|---|
| TS_program_map_section(){ | |
| table_id | 8 |
| section_syntax_indicator | 1 |
| '0' | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| reserved | 3 |
| PCR_PID | 13 |
| reserved | 4 |
| program_info_length | 12 |
| for(i=0;i<N;i++){ | |
|    descriptor() | |
| } | |
| for(i=0;i<N1;i++){ | |
|    steam_type | 8 |
|    reserved | 3 |
|    elementary_PID | 13 |
|    reserved | 4 |
|    ES_info_length | 12 |
|    for(i=0;i<N2;i++){ | |
|       descriptor() | |
|    } | |
| } | |
| CRC_32 | 32 |
| } | |

| Syntax | No. of Bits | Format |
|---|---|---|
| Trigger_stream_descriptor() { | | |
|    descriptor_tag | 8 | 0xC2 |
|    descriptor_length | 8 | uimsbf |
|    target_service_count | 8 | uimsbf |
|    for (i=0; i<service_count; i++) { | | |
|       target_service_id | 16 | bslbf |
|       target_content_item_count | 8 | uimsbf |
|       for(k=0; k<target_content_item_count; k++) | | |
|          target_content_linkage | 32 | bslbf |
|    } | | |
|    for (j=0; j< N; j++) { | | |
|       reserved | 8 | bslbf |
|    } | | |
| } | | |

FIG.31

| | No. of bits | Identifier |
|---|---|---|
| application_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     test_application_flag | 1 | bslbf |
|     application_type | 15 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptors_length | 12 | uimsbf |
|     for(i=0;i<N;i++){ | | |
|         descriptor() | | |
|     } | | |
|     reserved_future_use | 4 | bslbf |
|     application_loop_length | 12 | uimsbf |
|     for(i=0;i<N;i++){ | | |
|         application_identifier() | | |
|         application_control_code | 8 | uimsbf |
|         reserved_future_use | 4 | bslbf |
|         application_descriptors_loop_length | 12 | uimsbf |
|         for(j=0;j<N;j++){ | | |
|             descriptor() | | |
|         } | | |
|     } | | |
|     CRC_32 | 32 | rpchof |
| } | | |

FIG.32

| Syntax | No. of Bits | Format |
|---|---|---|
| System_time_table_section(){ | | |
|     table_id | 8 | uimsbf |
|     section_syntax_indicator | 1 | '1' |
|     private_indicator | 1 | '1' |
|     reserved | 2 | '11' |
|     section_length | 12 | uimsbf |
|     table_id_extension | 16 | 0x0000 |
|     reserved | 2 | '11' |
|     version_number | 5 | '00000' |
|     current_next_indicator | 1 | '1' |
|     section_number | 8 | 0x00 |
|     last_section_number | 8 | 0x00 |
|     protocol_version | 8 | uimsbf |
|     system_time | 32 | uimsbf |
|     GPS_UTC_offset | 8 | uimsbf |
|     daylight_savings | 16 | uimsbf |
|     for (i=0;i<N;i++){ | | |
|       descriptor() | | |
|     } | | |
|     CRC_32 | 32 | rpchof |
| } | | |

FIG.51

| Syntax | No. Bits | Format |
|---|---|---|
| tdo_trigger_table_section() { | | |
|    table_id | 8 | 0xTBD |
|    section_syntax_indicator | 1 | '0' |
|    private_indicator | 1 | '1' |
|    reserved | 2 | '11' |
|    section_length | 12 | uimsbf |
|    source_id | 16 | uimsbf |
|    reserved | 2 | '11' |
|    TTT_version_number | 5 | uimsbf |
|    current_next_indicator | 1 | '1' |
|    section_number | 8 | uimsbf |
|    last_section_number | 8 | uimsbf |
|    num_triggers_in_section | 8 | uimsbf |
|    for (i=0; i< num_triggers_in_section; i++) { | | uimsbf |
|       trigger_id | 32 | uimsbf |
|       trigger_time | 32 | uimsbf |
|       trigger_type | 8 | uimsbf |
|       trigger_action | 16 | uimsbf |
|       trigger_description_length | 8 | uimsbf |
|       trigger_description_text | var | |
|       service_id_ref | 16 | uimsbf |
|       content_linkage | 32 | uimsbf |
|       target_trigger_id_ref | 32 | uimsbf |
|       num_trigger_descriptors | 8 | uimsbf |
|       for (j=0; j<num_trigger_descriptors; j++) { | | |
|          trigger_descriptor() | var | |
|       } | | |
|    } | | |
| } | | |

FIG.52

| Syntax | No. of Bits | Format |
|---|---|---|
| Content_Items_descriptor() { | | |
|     descriptor_tag | 8 | 0xC2 |
|     descriptor_length | 8 | uimsbf |
|     service_count | 8 | uimsbf |
|     for (i=0; i<service_count; i++) { | | |
|         service_id_ref | 16 | bslbf |
|         content_item_count | 8 | uimsbf |
|         for(k=0; k<content_item_count; k++) | | |
|             content_linkage | 32 | bslbf |
|     } | | |
|     for (j=0; j< N; j++) { | | |
|         reserved | 8 | bslbf |
|     } | | |
| } | | |

FIG.53

| Syntax | No. of Bits | Format |
|---|---|---|
| internet_location_descriptor() { | | |
|     descriptor_tag | 8 | 0xC9 |
|     descriptor_length | 8 | uimsbf |
|     reserved | 3 | '111' |
|     URL_count | 5 | uimsbf |
|     for (i=0; i<URL_count; i++) { | | |
|         URL_length | 8 | uimsbf |
|         URL() | var | |
|     } | | |
|     for (j=0; j< N; j++) { | | |
|     reserved | 8 | bslbf |
|     } | | |
| } | | |

FIG.58

```
link_descriptor() {
descriptor_tag                          8 0xe8
descriptor_length                       8 uimsbf
number_of_links                         8 uimsbf
for (i=0; i<number_of_links; i++) {
    link_type                           8 uimsbf
    link_media                          8 uimsbf
    mime_type_length                    8 uimsbf
    mime_type                           var
    description_length                  8 uimsbf
    description                         var
    link_length                         uimsbf
    link_byte                           var
  }
}
```

FIG.59

|  | link_type |
|---|---|
| Html Portal | 0x01 |
| Thumbnail | 0x02 |
| Preview Clip | 0x03 |
| EPG | 0x04 |
| Highlight | 0x05 |
| MultiView | 0x06 |
| TDO | 0x07 |

FIG.60

|  | link_media | link_byte |
|---|---|---|
| NRT service | 0x02 | service_id<br>content_linkage |
| Internet service | 0x03 | URI |

FIG.67

| Syntax | No. of Bits | Format |
|---|---|---|
| NRT_service_descriptor() { | | |
|     descriptor_tag | 8 | 0xC4 |
|     descriptor_length | 8 | uimsbf |
|     reserved | 2 | '11' |
|     consumption_model | 6 | uimsbf |
|     auto-update | 1 | bslbf |
|     storage_reservation_present | 1 | bslbf |
|     default_content_length_present | 1 | bslbf |
|     reserved | 5 | '11111' |
|     if (storage_reservation_present==1) { | | |
|         storage_reservation | 24 | uimsbf |
|     if (default_content_length_present==1) { | | |
|         default_content_length | 32 | uimsbf |
|     } | | |
|     for (j=0; j< N; j++) { | | bslbf |
|     reserved | 8 | |
|     } | | |
| } | | |

FIG.68

| Consumption_model | Meaning |
|---|---|
| 0x00 | Forbidden. |
| 0x01 | Browse & Download - The NRT service describes content that can be selected for later download. |
| 0x02 | Portal - The NRT service provides an experience similar to a web browser access. Files needed to support text/graphics rendering are available in the associated FLUTE session. |
| 0x03 | Push - The NRT service offers request-based content. Receivers are expected to offer the user a choice whether or not to automatically update content associated with the service. For such services, if the user selects the auto-update option, the receiver caches and service-related content and automatically updates files as new versions are made available. When the user returns to a requested Push service, content that had been pre-loaded is displayed. |
| 0x04 | TDO - The NRT service offers TDO(Triggered Declarative Object). |
| 0x05 - 0x3F | Reserved for use by ATSC or other SDOs who register the use with ATSC. |

FIG.71

| Syntax | No. of Bits | Format |
|---|---|---|
| TDO_metadata_descriptor() { | | |
| descriptor_tag | 8 | 0xTBD |
| descriptor_length | 8 | Uimsbf |
| scheduled_activation_start_time | 32 | uimsbf |
| scheduled_activation_end_time | 32 | uimsbf |
| priority | 8 | uimsbf |
| activation_repeat_flag | 1 | bslbf |
| reserved | 7 | '11111' |
| if (repeating==1) { | | |
| repeat_interval | 8 | uimsbf |
| } | | |
| for (j=0; j< N; j++) { | | |
| reserved | 8 | bslbf |
| } | | |
| } | | |

FIG.75

| Syntax | No. of Bits | Format |
|---|---|---|
| internet_location_descriptor() { | | |
| descriptor_tag | 8 | 0xC9 |
| descriptor_length | 8 | uimsbf |
| reserved | 3 | '111' |
| URL_count | 5 | uimsbf |
| for (i=0; i<URL_count; i++) { | | |
| URL_length | 8 | uimsbf |
| URL() | var | |
| } | | |
| for (j=0; j< N; j++) { | | |
| reserved | 8 | bslbf |
| } | | |
| } | | |

FIG.80

| Syntax | No. Bits | Format |
|---|---|---|
| NRT_information_table_section() { | | |
| table_id | 8 | 0xDF |
| section_syntax_indicator | 1 | '0' |
| private_indicator | 1 | '1' |
| reserved | 2 | '11' |
| section_length | 12 | uimsbf |
| table_id_extension { | | |
|    protocol_version | 8 | uimsbf |
|    subnet_id | 8 | uimsbf |
| } | | |
| reserved | 2 | '11' |
| NRT_IT_version_number | 5 | uimsbf |
| current_next_indicator | 1 | '1' |
| section_number | 8 | uimsbf |
| last_section_number | 8 | uimsbf |
| service_id | 16 | uimsbf |
| time_span_start | 32 | uimsbf |
| reserved | 5 | '11111' |
| time_span_length | 11 | uimsbf |
| num_content_items_in_section | 8 | uimsbf |
| for (j=0; j< num_content_items_in_section; j++) { | | |
|    content_linkage | 32 | uimsbf |
|    updates_available | 1 | bslbf |
|    TF_available | 1 | bslbf |
|    content_security_conditions_indicator | 1 | bslbf |
|    available_on_internet | 1 | bslbf |
|    playback_length_included | 1 | bslbf |
|    playback_delay_included | 1 | bslbf |
|    expiration_included | 1 | bslbf |
|    content_length_included | 1 | bslbf |
|    no_entry_flag | 1 | bslbf |
|    reserved | 3 | '111' |

FIG.81

| | | |
|---|---|---|
| acquisition_time | 12 | uimsbf |
| if (playback_length_included==1) { | | |
|     reserved | 4 | '1111' |
|     playback_length_in_seconds | 20 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| if (content_length_included==1) { | | |
|     content_length | 40 | uimsbf |
| } | | |
| content_name_length | 8 | uimsbf |
| content_name_text() | var | |
| num_content_descriptors_length | 8 | uimsbf |
| for (i=0; i<num_content_descriptors; i++) { | | |
|     content_descriptor() | var | |
| } | | |
| } | | |
| num_descriptors | 8 | uimsbf |
| for (i=0; i<num_descriptors; i++) { | | |
|     descriptor() | var | |
| } | | |
| } | | |

FIG.84

| Syntax | No. of Bits | Format |
|---|---|---|
| NRT_service_descriptor() { | | |
| descriptor_tag | 8 | 0xC4 |
| descriptor_length | 8 | uimsbf |
| reserved | 2 | '11' |
| consumption_model | 6 | uimsbf |
| auto-update | 1 | bslbf |
| storage_reservation_present | 1 | bslbf |
| default_content_length_present | 1 | bslbf |
| equivalent_service_not_present | 1 | bslbf |
| reserved | 4 | '1111' |
| if (storage_reservation_present==1) { | | |
| storage_reservation | 24 | uimsbf |
| if (default_content_length_present==1) { | | |
| default_content_length | 32 | uimsbf |
| } | | |
| if (equivalent_service_not_present==0) { | | |
| num_equivalent_services | 8 | uimsbf |
| for (i=0; i< num_equivalent_services ; i++) { | | |
| equivalent_service_id | 16 | uimsbf |
| } | | |
| } | | |
| for (j=0; j< N; j++) { | | |
| reserved | 8 | bslbf |
| } | | |
| } | | |

FIG.85

| Syntax | No. Bits | Format |
|---|---|---|
| NRT_information_table_section() { | | |
| table_id | 8 | 0xDF |
| section_syntax_indicator | 1 | '0' |
| private_indicator | 1 | '1' |
| reserved | 2 | '11' |
| section_length | 12 | uimsbf |
| table_id_extension { | | |
|    protocol_version | 8 | uimsbf |
|    subnet_id | 8 | uimsbf |
| } | | |
| reserved | 2 | '11' |
| NRT_IT_version_number | 5 | uimsbf |
| current_next_indicator | 1 | '1' |
| section_number | 8 | uimsbf |
| last_section_number | 8 | uimsbf |
| service_id | 16 | uimsbf |
| time_span_start | 32 | uimsbf |
| reserved | 5 | '11111' |
| time_span_length | 11 | uimsbf |
| num_content_items_in_section | 8 | uimsbf |
| for (j=0; j< num_content_items_in_section; j++) { | | |
|    content_linkage | 32 | uimsbf |
| updates_available | 1 | bslbf |
| TF_available | 1 | bslbf |
| content_security_conditions_indicator | 1 | bslbf |
| available_on_internet | 1 | bslbf |
| playback_length_included | 1 | bslbf |
| playback_delay_included | 1 | bslbf |
| expiration_included | 1 | bslbf |
| content_length_included | 1 | bslbf |
| no_entry_flag | 1 | bslbf |
| available_on_currrent_service | 1 | bslbf |
| reserved | 3 | '111' |

FIG.86

| | | |
|---|---|---|
| reserved | 3 | '111' |
| acquisition_time | 12 | uimsbf |
| if (playback_length_included==1) { | | |
|     reserved | 4 | '1111' |
|     playback_length_in_seconds | 20 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| if (content_length_included==1) { | | |
|     content_length | 40 | uimsbf |
| } | | |
| content_name_length | 8 | uimsbf |
| content_name_text() | var | |
| num_content_descriptors_length | 8 | uimsbf |
| for (i=0; i<num_content_descriptors; i++) { | | |
|     content_descriptor() | var | |
| } | | |
| } | | |
| num_descriptors | 8 | uimsbf |
| for (i=0; i<num_descriptors; i++) { | | |
|     descriptor() | var | |
| } | | |
| } | | |

FIG.87

| Syntax | No. Bits | Format |
|---|---|---|
| Other_NRT_location_descriptor() { | | |
| descriptor_tag | 8 | TBD |
| descriptor_length | 8 | uimsbf |
| reserved | 2 | '11' |
| num_other_NRT_locations | 6 | uimsbf |
| for (i=0; i< num_other_NRT_locations ; i++) { | | |
| other_service_id | 16 | uimsbf |
| } | | |
| } | | |

FIG. 99

```xml
<?xml version= "1.0" encoding= "UTF-8" ?>
<xs:schema xmlns="urn:atsc:nrt:trigger:2011" xmlns:xs="http://www.w3.org/2001/XMLSchema"
targetNamespace="urn:atsc:nrt:trigger:2011" elementFormDefault="qualified">
  <xs:element name= "TDO-Triggers" type= "TDO-TriggersType"/>
  <xs:complexType name= "TDO-TriggersType">
    <xs:sequence>
      <xs:element name= "TDO-Trigger" type= "TDO-TriggerType" maxOccurs="unbounded"/>
      <xs:any namespace="##other" processContents="skip" minOccurs="0" maxOccurs="unbounded"/>
    </xs:sequence>
    <xs:anyAttribute processContents="skip"/>
  </xs:complexType>
  <xs:element name= "TDO-Trigger" type= "TDO-TriggerType"/>
  <xs:complexType name= "TDO-TriggerType">
    <xs:sequence>
      <xs:element name= "Trigger" type= "TriggerType" maxOccurs="unbounded"/>
      <xs:any namespace="##other" processContents="skip" minOccurs="0" maxOccurs="unbounded"/>
    </xs:sequence>
    <xs:attribute name= "Source-ID" type="xs:unsignedShort" use="required"/>
    <xs:attribute name= "version" type="xs:unsignedShort" use= "optional"/>
    <xs:anyAttribute processContents="skip"/>
  </xs:complexType>
  <xs:complexType name= "TriggerType">
    <xs:sequence>
      <xs:any namespace="##other" processContents="skip" minOccurs="0" maxOccurs="unbounded"/>
    </xs:sequence>
    <xs:attribute name= "Trigger-ID" type="xs:unsignedShort" use="required"/>
    <xs:attribute name= "Trigger-Time" type="xs:date" use= "optional"/>
    <xs:attribute name= "Trigger-Type" type="xs:unsignedShort" use= "required"/>
    <xs:attribute name= "Trigger-Action" type="xs:unsignedShort" use="required"/>
    <xs:attribute name= "Trigger-Description" type="xs:string" use="optional"/>
    <xs:attribute name= "Service-IDRef" type="xs:unsignedShort" use= "required"/>
    <xs:attribute name="Content-Linkage" type="xs:unsignedShort" use= "required"/>
    <xs:attribute name= "Target-Trigger-IDRef" type="xs:unsignedShort" use= "optional"/>
    <xs:anyAttribute processContents="skip"/>
  </xs:complexType>
</xs:schema>
```

FIG. 100

```xml
<?xml version="1.0" encoding="UTF-8" ?>
<xs:schema xmlns="urn:atsc:nrt:trigger:2011" xmlns:xs="http://www.w3.org/2001/XMLSchema" targetNamespace="urn:atsc:nrt:trigger:2011" elementFormDefault="qualified">
  <xs:element name="TDO-Triggers" type="TDO-TriggersType"/>
  <xs:complexType name="TDO-TriggersType">
    <xs:sequence>
      <xs:element name="TDO-Trigger" type="TDO-TriggerType" maxOccurs="unbounded"/>
      <xs:any namespace="##other" processContents="skip" minOccurs="0" maxOccurs="unbounded"/>
    </xs:sequence>
    <xs:anyAttribute processContents="skip"/>
  </xs:complexType>
  <xs:element name="TDO-Trigger" type="TDO-TriggerType"/>
  <xs:complexType name="TDO-TriggerType">
    <xs:sequence>
      <xs:element name="Trigger" type="TriggerType" maxOccurs="unbounded"/>
      <xs:any namespace="##other" processContents="skip" minOccurs="0" maxOccurs="unbounded"/>
    </xs:sequence>
    <xs:attribute name="Source-ID" type="xs:unsignedShort" use="required"/>
    <xs:attribute name="version" type="xs:unsignedShort" use="optional"/>
    <xs:anyAttribute processContents="skip"/>
  </xs:complexType>
  <xs:complexType name="TriggerType">
    <xs:sequence>
      <xs:element name="Content-Items" type="Content-ItemsType" maxOccurs="unbounded"/>
      <xs:any namespace="##other" processContents="skip" minOccurs="0" maxOccurs="unbounded"/>
    </xs:sequence>
    <xs:attribute name="Trigger-ID" type="xs:unsignedShort" use="required"/>
    <xs:attribute name="Trigger-Time" type="xs:date" use="optional"/>
    <xs:attribute name="Trigger-Type" type="xs:unsignedShort" use="required"/>
    <xs:attribute name="Trigger-Action" type="xs:unsignedShort" use="required"/>
    <xs:attribute name="Trigger-Description" type="xs:string" use="optional"/>
    <xs:attribute name="Service-IDRef" type="xs:unsignedShort" use="required"/>
    <xs:attribute name="Content-Linkage" type="xs:unsignedShort" use="required"/>
    <xs:attribute name="Target-Trigger-IDRef" type="xs:unsignedShort" use="optional"/>
    <xs:anyAttribute processContents="skip"/>
  </xs:complexType>
  <xs:complexType name="Content-ItemsType">
    <xs:sequence>
      <xs:element name="Content-Item" type="Content-ItemType" maxOccurs="unbounded"/>
      <xs:any namespace="##other" processContents="skip" minOccurs="0" maxOccurs="unbounded"/>
    </xs:sequence>
    <xs:attribute name="Service-IDRef" type="xs:unsignedShort" use="optional"/>
    <xs:anyAttribute processContents="skip"/>
  </xs:complexType>
```

FIG. 101

```
<xs:complexType name= "Content-ItemType">
  <xs:sequence>
    <xs:element name= "Content-URL"  type= "xs:string" minOccurs= "0"  maxOccurs="unbounded"/>
    <xs:any namespace="##other" processContents="skip" minOccurs="0" maxOccurs="unbounded"/>
  </xs:sequence>
  <xs:attribute name= "Content-Linkage" type="xs:unsignedShort" use= "optional"/>
  <xs:anyAttribute processContents="skip"/>
</xs:complexType>
</xs:schema>
```

FIG. 102

| Syntax | No. Bits | Format |
|---|---|---|
| trigger_URL_descriptor() { | | |
| descriptor_tag | 8 | 0xTBD |
| descriptor_length | 8 | uimsbf |
|     num_triggers_URL | 8 | uimsbf |
|     for(i=0; I < num_triggers_URL; i++) { | | |
|         trigger_URL_length | 8 | uimsbf |
|         trigger_URL_text | var | |
|     } | | |

FIG. 103

| Syntax | No. Bits | Format |
|---|---|---|
| tdo_trigger_table_section() { | | |
|     table_id | 8 | 0xTBD |
|     section_syntax_indicator | 1 | 0 |
|     private_indicator | 1 | 1 |
|     trigger_url_exist | 1 | uimsbf |
|     reserved | 1 | 1 |
|     section_length | 12 | uimsbf |
|     source_id | 16 | uimsbf |
|     reserved | 2 | 11 |
|     TTT_version_number | 5 | uimsbf |
|     current_next_indicator | 1 | 1 |
|     section_number | 8 | uimsbf |
|     last_section_number | 8 | uimsbf |
|     if(trigger_url_exist) { | | |
|         num_triggers_URL | 8 | uimsbf |
|         for(i=0; I < num_triggers_URL; i++) { | | |
|             trigger_URL_length | 8 | uimsbf |
|             trigger_URL_text | var | |
|         } | | |
|     } else { | | |
|         num_triggers_in _section | 8 | uimsbf |
|         for (i=0; i< num_triggers_in_section; i++) { | | uimsbf |
|             trigger_id | 32 | uimsbf |
|             trigger_time | 32 | uimsbf |
|             trigger_type | 8 | uimsbf |
|             trigger_action | 16 | uimsbf |
|     trigger_description_length | 8 | uimsbf |
|     trigger_description_text | var | |
|         service_id_ref | 16 | uimsbf |
|         content_linkage | 32 | uimsbf |
|     target_trigger_id_ref | 32 | uimsbf |
|         num_trigger_descriptors | 8 | uimsbf |
|         for (j=0; j<num_bundle_descriptors; j++) { | | |
|             trigger_descriptor() | var | |
|     } | | |
|      } | | |
|    } | | |
| } | | |

FIG. 107

GET http://www.atsc2com/content1/
trigger?timestamp=2011%2F06%2F28T18%3A00%3A00 &duration=600 HTTP/1.1
    Host: 111.11.53.101
    Accept: */*
    Connection: Close

FIG. 108

```
POST http://www.atsc2com/content1/trigger HTTP/1.1
    Host: 111.11.53.101
    Accept: */*
    Connection: Close
    Content-Type: application/x-www-form-urlencoded
    Content-Length: 49 timestamp=2011%2F06%2F28T18%3A00%3A00&duration=600
```

FIG. 109

```xml
<?xml version="1.0" encoding="UTF-8"?>
<xs:schema xmlns="urn:atsc:nrt:trigger:2011" xmlns:xs="http://www.w3.org/2001/XMLSchema"
targetNamespace="urn:atsc:nrt:trigger:2011" elementFormDefault="qualified">
<xs:element name="TDO-Triggers" type="TDO-TriggersType"/>
<xs:complexType name="TDO-TriggersType">
    <xs:sequence>
        <xs:element name="TDO-Trigger" type="TDO-TriggerType" maxOccurs="unbounded"/>
        <xs:any namespace="##other" processContents="skip" minOccurs="0" maxOccurs="unbounded"/>
    </xs:sequence>
    <xs:attribute name="from" type="xs:date" use="optional"/>
    <xs:attribute name="to" type="xs:date" use="optional"/>
    <xs:attribute name="timeOffset" type="xs:duration" use="optional"/>
    <xs:anyAttribute processContents="skip"/>
</xs:complexType>

<xs:element name="TDO-Trigger" type="TDO-TriggerType"/>
<xs:complexType name="TDO-TriggerType">
    <xs:sequence>
      <xs:element name="Trigger" type="TriggerType" maxOccurs="unbounded"/>
      <xs:any namespace="##other" processContents="skip" minOccurs="0" maxOccurs="unbounded"/>
    </xs:sequence>
    <xs:attribute name="Source-ID" type='xs:unsignedShort" use="required"/>
    <xs:attribute name="version" type="xs:unsignedShort" use="optional"/>
    <xs:attribute name="from" type="xs:date" use="optional"/>
    <xs:attribute name="to" type="xs:date" use="optional"/>
    <xs:anyAttribute processContents="skip"/>
</xs:complexType>
```

FIG. 110

| Syntax | No. of Bits | Format |
|---|---|---|
| DO_descriptor() { | | |
|   descriptor_tag | 8 | TBD |
|   descriptor_length | 8 | uimsbf |
|   DO_identifier | TBD | uimsbf |
|   DO_version | 8 | uimsbf |
|   reserved | 4 | bslbf |
|   test_DO | 1 | bslbf |
|   visible_UI | 1 | bslbf |
|   handles_configuration_changed | 1 | bslbf |
|   handles_externally_controlled_video | 1 | bslbf |
|   persistent_storage | 16 | uimsbf |
| } | | |

FIG.111

| Syntax | No. of Bits | Format |
|---|---|---|
| DO_descriptor() { | | |
|   descriptor_tag | 8 | TBD |
|   descriptor_length | 8 | uimsbf |
|   DO_identifier | TBD | uimsbf |
|   DO_version | 8 | uimsbf |
|   reserved | 4 | bslbf |
|   test_DO | 1 | bslbf |
|   visible_UI | 1 | bslbf |
|   handles_configuration_changed | 1 | bslbf |
|   handles_externally_controlled_video | 1 | bslbf |
|   persistent_storage | 16 | uimsbf |
| } | | |

FIG.112

| Syntax | No. of Bits | Format |
|---|---|---|
| time_slot_descriptor() { | | |
|   descriptor_tag | 8 | 0xC8 |
|   descriptor_length | 8 | uimsbf |
|   time_slot_start | 32 | uimsbf |
|   time_slot_length | 16 | uimsbf |
|   time_slot_type | 3 | uimsbf |
|   time_slot_params_length | 3 | uimsbf |
|   repeating | 1 | bslbf |
|   reserved | 1 | '111' |
|   time_slot_params | var | var |
|   if (repeating=='1') { | | |
|     repeat_period | 16 | uimsbf |
|     slot_count | 8 | uimsbf |
|   } | | |
|   for (i=0; i<N; i++) { | | |
|     reserved | 8 | bslbf |
|   } | | |
| } | | |

FIG.113

| Time Slot Type | time_slot_type value | time_slot_params_length value | time_slot_params ||||
|---|---|---|---|---|---|
| | | | Syntax | No. of Bits | Format |
| Acquisition Slot | 0 | 2 | acquisition_time | 12 | uimsbf |
| | | | reserved | 4 | '1111' |
| Presentation Window | 1 | 1 | playable_flag | 1 | uimsbf |
| | | | reserved | 7 | '1111111' |
| TOO Enabled Slot | 2 | 0 | N/A | N/A | N/A |
| ATSC Reserved | 2-7 | | | | |

FIG.114

| | No. of Bits | Identifier | Value |
|---|---|---|---|
| simple_application_boundary_descriptor{ | | | |
|   descriptor_tag | 8 | uimsbf | 0x17 |
|   descriptor_length | 8 | uimsbf | |
|   boundary_extension_count | 8 | uimsbf | |
|   for(j=0; j<boundary_extension_count; j++){ | | | |
|     boundary_extension_length | 8 | uimsbf | |
|     for(k=0; k<boundary_extension_length; k++){ | | | |
|       boundary_extension_byte | 8 | uimsbf | |
|     } | | | |
| } | | | |

FIG.115

| Syntax | No. of Bits | Format |
|---|---|---|
| DO_descriptor() { | | |
|   descriptor_tag | 8 | TBD |
|   descriptor_length | 8 | uimsbf |
|   DO_identifier | TBD | uimsbf |
|   DO_version | 8 | uimsbf |
|   reserved | 4 | bslbf |
|   test_DO | 1 | bslbf |
|   visible_UI | 1 | bslbf |
|   handles_configuration_changed | 1 | bslbf |
|   handles_externally_controlled_video | 1 | bslbf |
|   persistent_storage | 16 | uimsbf |
|   num_of_application_domain | 8 | uimsbf |
|     for (i=0; i<num_of_application_domain;i++){ | | |
|   application_domain_length | 8 | uimsbf |
|     for (k=0; k<application_domain_length;k++){ | | |
|   applicaion_domain_byte | | |
|     } | | |
|   } | | |
| } | | |

FIG.116

| Syntax | No. of bits | Format |
|---|---|---|
| internet_locations_table_section() { | | |
|     table_id | 8 | 0xnn |
|     section_syntax_indicator | 1 | '1' |
|     private_indicator | 1 | '1' |
|     reserved | 2 | '11' |
|     section_length | 12 | uimsbf |
|     table_id_extension? | 16 | ? |
|     application_type | 2 | '11' |
|     version_number | 5 | uimsbf |
|     current_next_indicator | 1 | '1' |
|     section_number | 8 | 0x00 |
|     last_section_number | 8 | 0x00 |
|     protocol_version | 8 | uimsbf |
|     locations_defined | 8 | uimsbf |
|     for (i=0; i< locations_defined;i++) { | | |
|     service_id | 16 | uimsbf |
|     URL_function_code | 3 | uimsbf |
|     reserved | 5 | '1111 1' |
|     URL_length | 5 | uimsbf |
|     for (k=0; k<N;k++) { | | |
|     URL | N | uimsbf |
|     } | | |
|     } | | |
|     reserved | 4 | '1111' |
|     descriptors_length | 12 | uimsbf |
|     for (i=0; i<N;I++) { | | |
|     descriptor() | | |
|     } | | |
|     CRC_32 | 32 | rpchof |
| } | | |

FIG.117

| Table to be Retrieved | Query Term |
|---|---|
| Basic Set | ? chan=<chan_id>&table=BASIC-SET |
| SMT | ? chan=<chan_id>&table=SMT |
| Current NRT-IT | ? chan=<chan_id>&svc=<svc_id>&table=NRT-IT-C |
| Next NRT-IT | ? chan=<chan_id>&svc=<svc_id>&table=NRT-IT-N |
| Current TFT | ? chan=<chan_id>&svc=<svc_id>&table=TFT-C |
| Next TFT | ? chan=<chan_id>&svc=<svc_id>&table=TFT-N |
| ILT/Usage | ? chan=<chan_id>&table=ILT-U |
| ILT/Trig | ? chan=<chan_id>&table=ILT-T |
| PIT | ? chan=<chan_id>&table=PIT |
| PTCT | ? chan=<chan_id>&table=PTCT |

RR1 = Time of Request/Response #1
ST1 = Start Time 1          D1 = Duration 1
RR2 = Time of Request/Response #2
ST2 = Start Time 2          D2 = Duration 2
Tn= Triggers, showing where they appear in broadcast stream

FIG.120

| Syntax | No. of bits | Format |
|---|---|---|
| trigger_data_byte() { | | |
|   protocol_version { | | |
|     major_version | 4 | uimsbf |
|     minor_version | 4 | uimsbf |
|   } | | |
|   trigger_id | 16 | uimsbf |
|     trigger_version | 8 | uimsbf |
|     trigger_target { | | |
|     service_id | 16 | uimsbf |
|     content_linkage | 32 | uimsbf |
| } | | |
|   safe_area_flag | 1 | bslbf |
|   reserved | 3 | bslbf |
|   trigger_action | 4 | uimsbf |
|     If (safe_area_flag)=='1') { | | |
|     reserved | 1 | bslbf |
|     left_x_coord | 7 | uimsbf |
|     reserved | 1 | bslbf |
|     right_x_coord | 7 | uimsbf |
|     reserved | 1 | bslbf |
|     lower_y_coord | 7 | uimsbf |
|     reserved | 1 | bslbf |
|     upper_y_coord | 7 | uimsbf |
| } | | |
|   data_length | 16 | uimsbf |
|   data_bytes | var | |
| } | | |

FIG.121

| Syntax | No. of bits | Format |
|---|---|---|
| trigger_stream_descriptor() { | | |
|    descriptor_tag | 8 | TBD |
|    descriptor_length | 8 | uimsbf |
|    trigger_stream_id | 8 | uimsbf |
|    trigger_stream_profile | 8 | uimsbf |
|    target_service_count | 8 | uimsbf |
|    for (i=0; i<target_service_count; i++) { | | |
|       target_service_id | 16 | bslbf |
|    } | | |
|    for (j=0; j< N; j++) { | | |
|       reserved | 8 | bslbf |
|    } | | |
| } | | |

FIG.122

```
<!doctype html>
<html>
<head>
<script language="javascript">
var gTrigger;
function init()
{
   gTrigger = document.getElementById("triggerObject");
   if(gTrigger){
      gTrigger.onTriggerReceived = onTriggerRecv;
   }
} function onTriggerRecv(trigger)
{
   alert('we got a trigger : major_version=' + trigger.protocol_version
.major_version +  ', ' minor_version=' + trigger.protocol_version
.minor_version + ', trigger_id="+trigger.trigger_id + ', trigger_version='
+ trigger.trigger_version + ', service_id=' +
trigger.trigger_target.service_id + ', content_linkage=' +
trigger.trigger_target.content_linkage + ', trigger_action=' +
trigger.trigger_action + ', trigger_version=' + trigger.trigger_version);
}
</script>
</head>
<body onload="init();">
<object id="triggerObject" width="0" height="0"
type="application/atsc-trigger"/>
</body>
</html>
```

FIG.123

| Syntax | No. of bits | Format |
|---|---|---|
| trigger_stream_association_descriptor() { | | |
|    descriptor_tag | 8 | TBD |
|    descriptor_length | 8 | uimsbf |
|    trigger_stream_count | 8 | uimsbf |
|    for (i=0; i<trigger_stream_count; i++) { | | |
|    trigger_stream_id | 8 | bslbf |
|    } | | |
|    for (j=0; j< N; j++) { | | |
|    reserved | 8 | bslbf |
|    } | | |
| } | | |

FIG.124

| Syntax | No. of bits | Format |
|---|---|---|
| internet_locations_table_section() { | | |
|     table_id | 8 | TBD |
|     section_syntax_indicator | 1 | '1' |
|     private_indicator | 1 | '1' |
|     reserved | 2 | '11' |
|     section_length | 12 | uimsbf |
|     table_id_extension { | | |
|       protocol_version | 8 | uimsbf |
|       subnet_id | 8 | uimsbf |
|     } | | |
|     reserved | 2 | '11' |
|     version_number | 5 | uimsbf |
|     current_next_indicator | 1 | '1' |
|     section_number | 8 | 0x00 |
|     last_section_number | 8 | 0x00 |
|     locations_defined | 8 | uimsbf |
|     for (i=0; i< locations_defined;i++) { | | |
|       URL_function_code | 4 | uimsbf |
|       reserved | 4 | '1111 1' |
|       If (URL_function_code == 0) { | | |
|         service_id | 16 | uimsbf |
|       } | | |
|       else If (URL_function_code == 1) { | | |
|         trigger_stream_id | 8 | |
|         reserved | 8 | |
|       } | | |
|       else { | | |
|         reserved | 16 | |
|       } | | |
|       URL_length | 8 | uimsbf |
|       for (k=0; k<URL_length; k++) { | | |
|         URL_byte | 8 | uimsbf |
|       } | | |
|     } | | |
|     reserved | 4 | '1111' |
|     number_of_descriptors | 4 | uimsbf |
|     for (i=0; i<N;I++) { | | |
|       descriptor() | variable | |
|     } | | |
| } | | |

FIG.125

| URL_function_code value | Meaning |
|---|---|
| 0 | URL for Usage Reporting |
| 1 | URL for Trigger Stream retrieval via Internet |
| 2~15 | Reserved |

FIG.126

| Table to be Retrieved | Query Term |
|---|---|
| Basic Set | &table=BASIC-SET |
| Extended Set | &table=EXT-SET |
| Full Set | &table=FULL-SET |
| SMT | &table=SMT |
| Current NRT-IT | &table=NRT-IT-C[&svc=<svc_id>] |
| Next NRT-IT | &table=NRT-IT-N[&svc=<svc_id>] |
| Future NRT-IT | &table=NRT-IT-F[&svc=<svc_id>] |
| Current TFT | &table=TFT-C[&svc=<svc_id>] |
| Next TFT | &table=TFT-N[&svc=<svc_id>] |
| Future NRT-IT | &table=TFT-F[&svc=<svc_id>] |
| ILT | &table=ILT |
| PIT and PTCT | &table=PIT+PTCT |

FIG.127

| Table to be Retrieved | Query Term |
|---|---|
| Basic Set | &table=BASIC-SET |
| Extended Set | &table=EXT-SET |
| SMT | &table=SMT |
| NRT-IT | &table=NRT-IT[&svc=<svc_id>] |
| TFT | &table=TFT[&svc=<svc_id>] |
| ILT | &table=ILT |
| PIT and PTCT | &table=PIT+PTCT |

FIG.128

| Syntax | No. of bits | Format |
|---|---|---|
| internet_locations_table_section() { | | |
|   table_id | 8 | TBD |
|   section_syntax_indicator | 1 | '1' |
|   private_indicator | 1 | '1' |
|   reserved | 2 | '11' |
|   section_length | 12 | uimsbf |
|   table_id_extension { | | |
|     protocol_version | 8 | uimsbf |
|     subnet_id | 8 | uimsbf |
|   } | | |
|   reserved | 2 | '11' |
|   version_number | 5 | uimsbf |
|   current_next_indicator | 1 | '1' |
|   section_number | 8 | 0x00 |
|   last_section_number | 8 | 0x00 |
|   locations_defined | 8 | uimsbf |
|   for (i=0; i< locations_defined;i++) { | | |
|     URL_function_code | 4 | uimsbf |
|     reserved | 4 | '1111 1' |
|     If (URL_function_code == 0) { | | |
|       major_channel_number | 10 | uimsbf |
|       minor_channel_number | 10 | uimsbf |
|       reserved | 4 | '1111' |
|     } | | |
|     else If (URL_function_code == 1) { | | |
|       trigger_stream_id | 8 | uimsbf |
|       reserved | 16 | 0xFFFF |
|     } | | |
|     else If (URL_function_code == 2) { | | |
|       major_channel_number | 10 | uimsbf |
|       minor_channel_number | 10 | uimsbf |
|       reserved | 4 | '1111' |
|     } | | |
|     else { | | |
|       reserved | 24 | 0xFFFFFF |
|     } | | |
|     URL_length | 8 | uimsbf |
|     for (k=0; k<URL_length; k++) { | | |
|       URL_byte | 8 | uimsbf |
|     } | | |
|   } | | |
|   reserved | 4 | '1111' |
|   number_of_descriptors | 4 | uimsbf |
|   for (i=0; i<N;I++) { | | |
|     descriptor() | variable | |
|   } | | |
| } | | |

FIG.129

| URL_function_code value | Purpose of URL |
|---|---|
| 0 | Usage Reporting for the virtual channel identified by the major_channel_number and minor_channel_number fields |
| 1 | Retrieval of the Trigger Stream identified by the trigger_id_stream field |
| 2 | Retrieval of signaling tables for the virtual channel identified by the major_channel_number and minor_channel_number fields |
| 3~15 | Reserved |

FIG.130

| Consumption_model | Meaning |
|---|---|
| 0x00 | Forbidden. |
| 0x01 | Browse & Download – The NRT service describes content that can be selected for later download. |
| 0x02 | Portal – The NRT service provides an experience similar to a web browser access. Files needed to support text/graphics rendering are available in the associated FLUTE session. |
| 0x03 | Push – The NRT service offers request-based content. Receivers are expected to offer the user a choice whether or not to automatically update content associated with the service. For such services, if the user selects the auto-update option, the receiver caches and service-related content and automatically updates files as new versions are made available. When the user returns to a requested Push service, content that had been pre-loaded is displayed. |
| 0x04 | TDO – The NRT service offers TDO(Triggered Downloadable Object). |
| 0x05 | Data stream – The NRT service offers one or more streams of files would be downloaded and delivered to a DO only if the DO requests such delivery via an API provided as part of the execution environment. |
| 0x06-0x03F | Reserved for use by ATSC or other SDOs who register the use with ATSC. |

FIG.132

```xml
<?xml version="1.0" encoding="UTF-8"?>
<schema  xmlns="http://www.w3.org/2001/XMLSchema"
    xmlns:atsc2="http://www.atsc.org/XMLSchemas/atsc2/2012/1"
    targetNamespace =
"http://www.atsc.org/XMLSchemas/atsc2/2012/1"
    elementFormDefault="qualified"version="1.1">
  <element  name ="MultiFileRequest">
    <complexType>
      <sequence>
        <element  name ="InitialFiles"type="atsc2:URLList" minOccurs="0" />
        <element  name ="FileUpdates" type="atsc2:URLList" minOccurs="0" />
      </sequence>
    </complexType>
  </element>
  <complexType  name ="URLList">
    <sequence>
      <element  name ="URL"  type="anyURI"  maxOccurs = "unbounded" />
    </sequence>
  </complexType>
</schema>
```

FIG.133

| Syntax | No. of bits | Format |
|---|---|---|
| internet_locations_table_section() { | | |
|     table_id | 8 | TBD |
|     ... | | |
|     locations_defined | 8 | uimsbf |
|     for (i=0; i< locations_defined;i++) { | | |
|     URL_function_code | 4 | uimsbf |
|     reserved | 4 | '1111 1' |
|     If (URL_function_code == 0) { | | |
|     major_channel_number | 10 | uimsbf |
|     minor_channel_number | 10 | uimsbf |
|     reserved | 4 | '1111' |
| } | | |
|     else If (URL_function_code == 1) { | | |
|     trigger_stream_id | 8 | uimsbf |
|     reserved | 16 | 0xFFFF |
| } | | |
|     else If (URL_function_code == 2) { | | |
|     major_channel_number | 10 | uimsbf |
|     minor_channel_number | 10 | uimsbf |
|     reserved | 4 | '1111' |
| } | | |
|     else If (URL_function_code == 3) { | | |
|     major_channel_number | 10 | uimsbf |
|     minor_channel_number | 10 | uimsbf |
|     reserved | 4 | '1111' |
| } | | |
|     URL_length | | |
|     for (k=0; k<URL_length; k++) { | | |
|     URL_byte | | |
| } | | |
|     ... | | |

FIG.134

| URL_function_code value | Meaning |
|---|---|
| 0 | Usage Reporting for the virtual channel identified by the major_channel_number and minor_channel_number fields |
| 1 | Retrieval of the Trigger Stream identified by the trigger_id_stream field |
| 2 | Retrieval of signaling tables for the virtual channel identified by the major_channel_number and minor_channel_number fields |
| 3 | Retrieval of files and update notification of files for the virtual channel identified by the major_channel_number and minor_channel_number fields |
| 4~15 | Reserved |

FIG.135

```html
<!doctype html>
<html>
<head>
<script language="javascript">
var gRealTimeData;
function init()
{
   gRealTimeData = document.getElementById("rtdataObject");
   gRealTimeData) {
      gRealTimeDataregisterRealTimeData('nrt_service_1', true);
      gRealTimeDataonRealTimeFileReceived  = onRTFileRecv ;
   }
} function onRTFileRecv (rtfile)
{
   alert('we got a real-time data file : content_location=' +
rtfile.content_location +  ', ' content_type=' + rtfile.content_type + ',
content_encoding="+rtfile.content_encoding);
}
</script>
</head>
<body onload=" init();">
<object id="rtdataObject" width="0" height="0" type="
application/atsc-realtimedata "/>
</body>
</html>
```

FIG.136

| Table(s) Requested | Query Term |
|---|---|
| Basic PSIP set | &table=PSIP |
| VCT | &table=VCT |
| EIT | &table=EIT[&chan=<chan_id>] |
| ETT | &table=ETT[&chan=<chan_id>][&etmid=<ETM_id>] |
| Basic NRT Set | &table=BASIC-SET[&chan=<chan_id>] |
| Extended NRT Set | &table=EXT-SET[&chan=<chan_id>] |
| SMT | &table=SMT[&chan=<chan_id>] |
| NRT-IT | &table=NRT-IT[&chan=<chan_id>] [&svc=<svc_id>] |
| TFT | &table=TFT[&chan=<chan_id>] [&svc=<svc_id>] |
| ILT | &table=ILT[&chan=<chan_id>] |
| PIT and PTCT | &table=PIT+PTCT[&chan=<chan_id>] |

FIG.137

| Syntax | No. of bits | Format |
|---|---|---|
| Enhanced_EPG_descriptor() { | | |
|   descriptor_tag | 8 | TBD |
|   descriptor_length | 8 | uimsbf |
|   reserved | 4 | '1111' |
|   num_of_NRT_services | 4 | uimsbf |
|   for (i=0; i < num_of_NRT_services; i++) { | | |
|     service_id_ref | 16 | uimsbf |
|     consumption_model | 6 | uimsbf |
|     access_controlled | 1 | bslbf |
|     reserved | 1 | '1' |
|     reserved | 5 | '11111' |
|     short_service_name_length | 3 | uimsbf |
|     short_service_name | variable | bslbf |
|   } | | |
| } | | |

FIG.138

| Syntax | No. of bits | Format |
|---|---|---|
| service_enhancements_descriptor() { | | |
|   descriptor_tag | 8 | TBD |
|   descriptor_length | 8 | uimsbf |
|     num_of_enhancements | 1 | '1' |
|     for (i=0; i < num_of_enhancements; i++) { | 3 | uimsbf |
|       service_id_ref | 16 | uimsbf |
|       consumption_model | 6 | uimsbf |
|       reserved | 2 | '11' |
|       num_of_linked_content_items | 16 | uimsbf |
|         for (j=0; j<num_of_linked_content_items;j++) { | 16 | uimsbf |
|         content_linkage | 32 | uimsbf |
| } | 16 | uimsbf |
|     capability_code_count | 8 | uimsbf |
|     for (i=0; i<capability_code_count; i++) { | | |
|       essential_indicator | 1 | bslbf |
|       capability_code | 7 | uimsbf |
|       if (capability_code > 0x6F) { | | |
|       format_identifier | 32 | |
| } | | |
| } | | |
| } | | |
| } | | |

FIG.139

| Consumption_model | Meaning |
|---|---|
| 0x00 | Forbidden. |
| 0x01 | Browse & Download – The NRT service describes content that can be selected for later download. |
| 0x02 | Portal – The NRT service provides an experience similar to a web browser access. Files needed to support text/graphics rendering are available in the associated FLUTE session. |
| 0x03 | Push – The NRT service offers request-based content. Receivers are expected to offer the user a choice whether or not to automatically update content associated with the service. For such services, if the user selects the auto-update option, the receiver caches and service-related content and automatically updates files as new versions are made available. When the user returns to a requested Push service, content that had been pre-loaded is displayed. |
| 0x04 | Triggered ? The NRT service offers Triggered content items including TDO(Triggered Downloadable Object). |
| 0x05 | EPG – The NRT service offers content item provides information about a TV service (virtual channel), a TV event, and NRT service, or an NRT content item. |
| 0x06-0x03F | Reserved for use by ATSC or other SDOs who register the use with ATSC. |

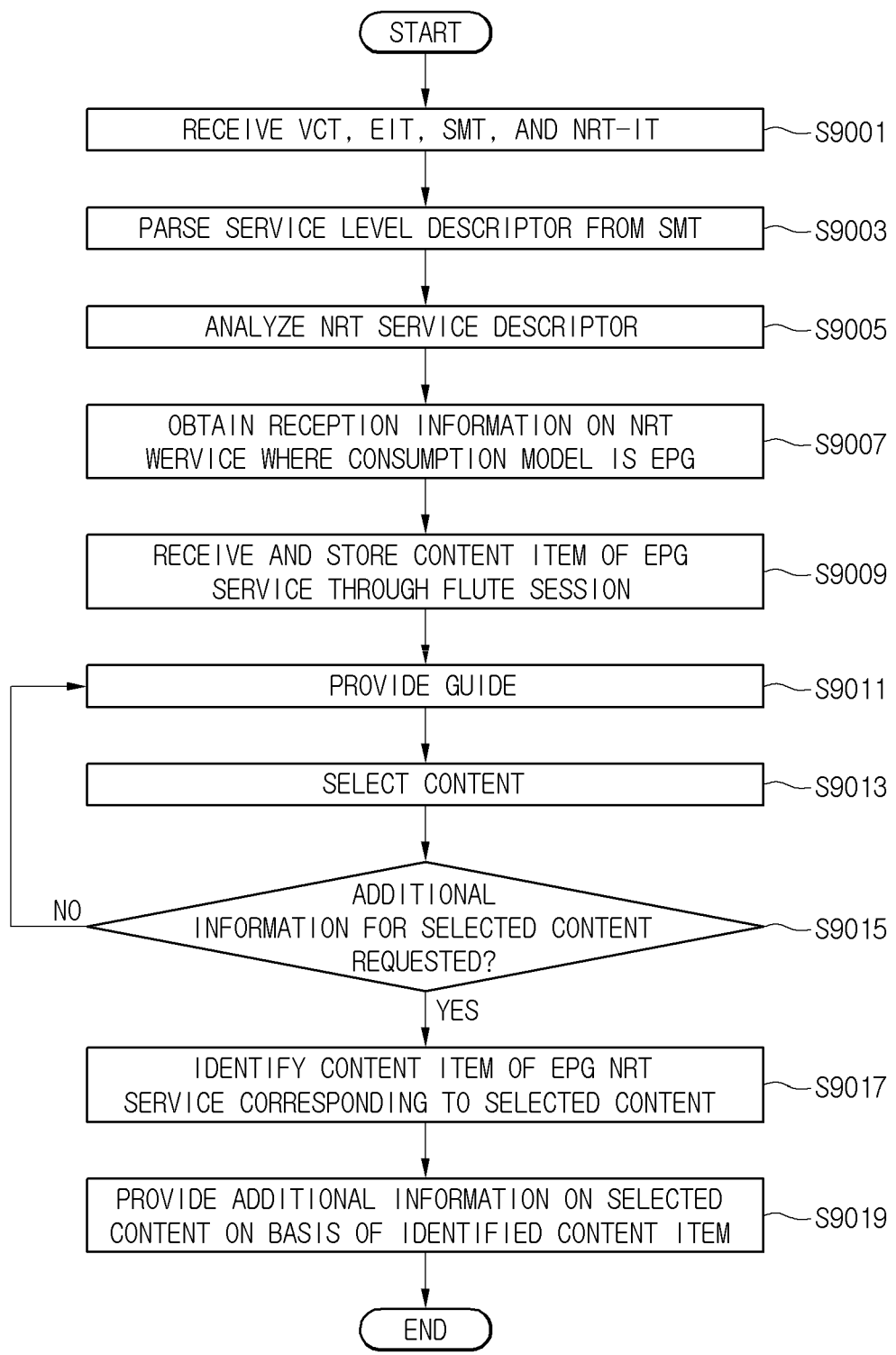

FIG.146

| Syntax | No. of bits | Format |
|---|---|---|
| linkage_descriptor() { | | |
|    descriptor_tag | 8 | TBD |
|    descriptor_length | 8 | uimsbf |
|    reserved | 1 | '1' |
|    target_type | 3 | uimsbf |
|    major_channel_number | 10 | uimsbf |
|    minor_channel_number | 10 | uimsbf |
|    channel_TSID | 16 | uimsbf |
|    source_id | 16 | uimsbf |
|    if (target_type = 0x02) { | | |
|    event_id | 16 | uimsbf |
|    } else if (target_type= 0x03) { | | |
|    MH_service_id | 16 | uimsbf |
|    } else if (target_type = 0x04) { | | |
|    MH_service_id | 16 | uimsbf |
|    content_linkage | 16 | uimsbf |
|    } | | |
| } | | |

FIG.147

| target_type | Meaning |
|---|---|
| 0x00 | Reserved. |
| 0x01 | TV service (virtual channel) |
| 0x02 | TV event |
| 0x03 | NRT service |
| 0x04 | NRT Content Item |
| 0x05-0x07 | Reserved for use by ATSC or other SDOs who register the use with ATSC. |

FIG.148

| Syntax | No. of bits | Format |
|---|---|---|
| linkage_descriptor() { | | |
|    descriptor_tag | 8 | TBD |
|    descriptor_length | 8 | uimsbf |
|    reserved | 2 | '11' |
|    num_of_linked_content_items | 6 | uimsbf |
|    for (j=0; j<num_of_linked_content_items;j++) { | | |
|    service_id_ref | 16 | |
|    content_linkage_ref | 32 | uimsbf |
|    reserved | 4 | '1111' |
|    role | 4 | uimsbf |
|    } | | |
| } | | |

BROADCAST SERVICE RECEIVING METHOD AND BROADCAST SERVICE RECEIVING APPARATUS

This application is a National Stage Application of International Patent Application No. PCT/KR2012/008687, filed Oct. 22, 2012, and claims the benefit of U.S. Provisional Application Nos. 61/549,725 filed on Oct. 20, 2011, 61/558,455 filed Nov. 11, 2011, 61/559,679 filed Nov. 14, 2011, 61/568,633 filed Dec. 8, 2011, 61/578,862 filed Dec. 21, 2011, 61/595,146 filed Feb. 5, 2012, 61/596,714 filed Feb. 8, 2012, and 61/606,460 filed Mar. 4, 2012, all of which are incorporated herein by reference.

TECHNICAL FIELD

The present disclosure relates to a method of receiving the broadcast service and an apparatus for receiving broadcast service.

BACKGROUND ART

A digital television (DTV) is now presented to offer various services in addition to a television (TV)'s original function such as playing video and audio. For example, broadcasting information such as Electronic Program Guide (EPG) may be provided to a user, and also, broadcasting services from at least two channels may be simultaneously provided to a user. Especially, since a receiving system of the DTV includes a large capacity of a storage device, and is connected to a data communication channel and the internet (through which two-way communication is available), more services become accessible through broadcast signals. Additionally, since services offered through broadcast signals become more diversified, needs for utilizing the diversified services accurately are increased and needs for providing broadcast information such adjunct services to a user through an EPG are increased also.

DISCLOSURE OF THE INVENTION

Technical Problem

Embodiments provide a method of receiving the broadcast service and an apparatus for receiving broadcast service, which effectively deliver an adjunct service for content.

Embodiments also provide a method of receiving the broadcast service and an apparatus for receiving broadcast service, which efficiently provide a broadcast service through an internet network.

Embodiments also provide a method of receiving broadcast service and an apparatus for receiving broadcast service, which provide an improved broadcast service and its adjunct service without affecting a general receiver, and an adjunct service processing method of the apparatus.

Technical Solution

In one embodiment, provided is a broadcast service receiving method of a broadcast receiving device. The method includes: receiving an video stream among a content transmitted as a broadcast service; generating a request message for at least one of signalling information on the broadcast service and signalling information on an adjunct service of the broadcast service on the basis of part of the received video stream; transmitting the generated request message to a server through an internet network; receiving a response message corresponding to the request message from the server; obtaining at least one of the broadcast service corresponding to the video stream and the adjunct service of the broadcast service on the basis of the received response message; and providing the obtained broadcast service and adjunct service, wherein the request message comprises first query information for specifying a request time interval and second query information for specifying at least one signalling table to be requested.

In another embodiment, provided is a broadcast service providing method of a broadcast receiving device. The method includes: receiving service signalling data of an adjunct service for a broadcast service; receiving an adjunct service on the basis of the received service signalling data; obtaining a guide object for the broadcast service and the adjunct service from the received adjunct service; and displaying the guide object, wherein the guide object includes a program guide and an NRT service guide displayed in a partial area in an entire screen area and the partial area is changed according to a state of the broadcast service and the adjunct service.

In further another embodiment, a broadcast service receiving device includes: an video stream receiving unit receiving an video stream among a content transmitted as a broadcast service; a control unit generating a request message for at least one of signalling information on the broadcast service and signalling information on an adjunct service of the broadcast service on the basis of part of the received video stream; a network interface unit transmitting the generated request message to a server through an internet network and receiving a response message corresponding to the request message from the server; wherein the request message includes first query information for specifying a request time interval and second query information for specifying at least one signalling table to be requested; and the control unit obtains at least one of the broadcast service corresponding to the video stream and an adjunct service of the broadcast service on the basis of the received response message.

In further another embodiment, a broadcast receiving device includes: a receiving unit receiving service signalling data of an adjunct service for a broadcast service and receiving an adjunct service on the basis of the received service signalling data; a service manager obtaining a guide object for the broadcast service and the adjunct service from the received adjunct service; and a display unit displaying the obtained guide object, wherein the guide object includes a program guide and an NRT service guide displayed in a partial area in an entire screen area of the display unit and the service manager changes the partial area according to a state of the broadcast service and the adjunct service.

Advantageous Effects

According to an embodiment of the present invention, signaling information on broadcast service and adjunct service may be received efficiently and improved broadcast service may be provided by using an object for adjunct service.

Additionally, according to an embodiment of the present invention, since effective signaling tables are specified and received at a specific time table, the load of a transmitting and receiving system and a network may be reduced and an efficient broadcast service may be provided.

Furthermore, according to an embodiment of the present invention, by using an XML and HTTP format, efficient service transmission through an IP network becomes possible.

Moreover, according to another embodiment of the present invention, since broadcast service and NRT service guides where a display area is changeable according to a situation are provided, rich guide for broadcast service and adjunct service may be provided to a user.

BRIEF DESCRIPTION OF THE DRAWINGS

FIG. 4 is view illustrating one example of the protocol stack for mobile NRT service.

FIG. 5 is a view illustrating a bit stream section of a TVCT table section (VCT) according to an embodiment.

FIGS. 6 and 7 are views illustrating how to define a value of a service_type field according to an embodiment.

FIG. 8 is view of data_service_table_section) for identifying an application of NRT service and bit stream syntax of data_service_table_bytes in a DST section.

FIGS. 12 and 13 are views illustrating a bit stream syntax of NST according to an embodiment.

FIG. 14 is a view illustrating a bit stream syntax of NRT_component_descriptor (MH_component_descriptor) according to an embodiment.

FIG. 15 is a view illustrating a bit stream syntax of NRT component descriptor including NRT_component_data according to an embodiment.

FIG. 16 is a view illustrating a bit stream syntax of NRT-IT section for signaling NRT application according to an embodiment.

FIG. 17 is a view illustrating a syntax structure of bit stream for NRT section (NRT_content_table_section) according to an embodiment.

FIG. 18 is a view illustrating a bit stream syntax structure of an SMT session providing signaling information on NRT service data according to an embodiment.

FIG. 19 is a view illustrating an FDT schema for mapping a file and content_id according to an embodiment.

FIG. 20 is a view illustrating an FDT schema for mapping a file and content_id according to another embodiment.

FIG. 25 is a view illustrating a bit stream syntax of a trigger according to an embodiment.

FIG. 27 is a view illustrating a synchronized data packet structure of PES payload for transmitting trigger as bit stream syntax according to an embodiment.

FIG. 28 is a view illustrating a content type descriptor structure in tap( ) on DST according to an embodiment FIG. 29 is a view illustrating a syntax of PMT and service identifier descriptor according to an embodiment.

FIG. 30 is a view illustrating a trigger stream descriptor according to an embodiment.

FIG. 31 is a view of AIT according to an embodiment.

FIG. 32 is a view of STT according to an embodiment.

FIG. 51 is a view illustrating a bitstream syntax of a trigger configured according to another embodiment of the present invention.

FIG. 52 is a view illustrating a syntax of a content item descriptor according to an embodiment of the present invention.

FIG. 53 is a view illustrating a syntax of an internet location descriptor according to an embodiment of the present invention.

FIG. 58 is a view illustrating a syntax of a link_descriptor according to an embodiment of the present invention.

FIGS. 59 and 60 are views illustrating contents of fields included in a link descriptor.

FIG. 67 is a view illustrating a syntax of an NRT service descriptor (NRT_service_descriptor), that is, a service level descriptor according to an embodiment of the present invention.

FIG. 68 is a view illustrating a meaning according to each value of a consumption_model field in an NRT service descriptor according to an embodiment of the present invention.

FIG. 71 is a view illustrating a TDO metadata descriptor according to an embodiment of the present invention.

FIG. 75 is a view illustrating a syntax of an internet location descriptor according to an embodiment of the present invention.

FIGS. 80 and 81 are views illustrating an NRT-IT to transmit information on an entry content item according to an embodiment of the present invention.

FIG. 84 is a view illustrating a syntax of an NRT service descriptor included in an SMT according to an embodiment of the present invention.

FIGS. 85 and 86 are views illustrating a syntax of another NRT-IT according to another embodiment of the present invention.

FIG. 87 is a view illustrating a syntax of an Other NRT location descriptor (Other_NRT_location_descriptor) according to another embodiment of the present invention.

FIG. 99 is a view illustrating an XML format of a trigger according to an embodiment of the present invention.

FIGS. 100 and 101 are views illustrating an XML format of a Trigger according to another embodiment of the present invention.

FIG. 102 is a view illustrating a syntax of a trigger URL descriptor according to an embodiment of the present invention.

FIG. 103 is a view illustrating a syntax of a TDO trigger table according to an embodiment of the present invention.

FIG. 107 is a view illustrating an HTTP GET instruction format based trigger request message according to an embodiment of the present invention.

FIG. 108 is a view illustrating an HTTP POST command format based trigger request message according to an embodiment of the present invention.

FIGS. 109 and 110 are views illustrating an XML schema diagram of a trigger request result message according to an embodiment of the present invention.

FIG. 111 is a view illustrating a DO descriptor according to an embodiment of the present invention.

FIG. 112 is a view illustrating a bit stream syntax of a time slot descriptor configured according to an embodiment of the present invention.

FIG. 113 is a view illustrating the contents of sub fields in a time slot descriptor.

FIG. 114 is a view illustrating an application boundary descriptor according to an embodiment of the present invention.

FIG. 115 is a view illustrating a DO descriptor extended according to another embodiment of the present invention.

FIG. 116 is a view illustrating an ILT according to an embodiment of the present invention.

FIG. 117 is a view illustrating a query table (Query terms for Signaling Table Requests) of a signalling table according to an embodiment of the present invention.

FIG. 120 is a view illustrating a trigger structure according to another embodiment of the present invention.

FIG. 121 is a view illustrating a trigger stream descriptor according to an embodiment of the present invention.

FIG. 122 is a view illustrating a usage example of a trigger and a TDO API according to an embodiment of the present invention.

FIG. 123 is a view illustrating a Trigger stream association descriptor according to another embodiment of the present invention.

FIG. 124 is a view illustrating an ILT according to another embodiment of the present invention.

FIG. 125 is a view illustrating a URL function code value table used in an ILT according to another embodiment of the present invention.

FIGS. 126 and 127 are views illustrating a second query information and response relationship of a signalling table request message according to an embodiment of the present invention.

FIG. 128 is a view illustrating an ILT according to another embodiment of the present invention.

FIG. 129 is a view illustrating a URL_function_code value table used in FIG. 128.

FIG. 130 is a view illustrating a consumption model field including a data stream consumption model according to an embodiment of the present invention.

FIG. 132 is a view illustrating an XML format of a multi-file HTTP streaming request message according to an embodiment of the present invention.

FIG. 133 is a view illustrating an ILT syntax according to another embodiment of the present invention.

FIG. 134 is a table illustrating a URL function code used in the ILT shown in FIG. 133.

FIG. 135 is a view illustrating an XML format of a trigger API receiving real-time data for a TDO according to an embodiment of the present invention.

FIG. 136 is a view illustrating a second query information table according to another embodiment of the present invention.

FIG. 137 is a view illustrating a syntax of an adjunct EPG descriptor according to an embodiment of the present invention.

FIG. 138 is a view illustrating a syntax of an adjunct EPG descriptor according to another embodiment of the present invention.

FIG. 139 is a view illustrating a meaning according to each value of a consumption_model field in an NRT service descriptor when an EPG consumption model is allocated according to an embodiment of the present invention.

FIG. 140 is a flowchart illustrating a method of providing EPG on the basis of an NRT service of an EPG consumption model, as a method of receiving broadcasting service according to an embodiment of the present invention.

FIG. 141 is a view illustrating a linkage between EPG and each table according to an embodiment of the present invention.

FIG. 142 is a view illustrating an EPG provided according to an embodiment of the present invention.

FIGS. 143 and 144 are views illustrating an EPG screen when a user requests additional information according to an embodiment of the present invention.

FIG. 145 is a view illustrating linkage information linked with other tables according to another embodiment of the present invention.

FIG. 146 is a view illustrating a syntax of a linkage descriptor according to an embodiment of the present invention.

FIG. 147 is a view illustrating a target type field of a linkage descriptor according to an embodiment of the present invention.

FIG. 148 is a view illustrating a linkage descriptor according to another embodiment of the present invention.

FIG. 149 is a view illustrating a DO operating in a partial area of a screen according to an embodiment of the present invention.

FIG. 150 is a view illustrating partial areas where an EPG is to be displayed according to an embodiment of the present invention.

FIG. 151 is a view when an index is allocated according to the area and size of an adjunct service object to be displayed FIG. 152 is a view when an unavailable area of an object is designated.

MODE FOR CARRYING OUT THE INVENTION

Preferred embodiments of the present invention will be described below in more detail with reference to the accompanying drawings. The configurations and operations of the present invention shown in and described with the accompanying drawings are explained as at least one example, and the technical idea of the present invention and its core configurations and operations are not limited thereby.

The terms used in the present invention are selected as currently used general terms if possible in the consideration of functions of the present invention but could vary according to intentions or conventions of those in the art or the advent of new technology. In certain cases, there are terms that are selected by an applicant arbitrarily, and in such a case, their meanings will be described in more detail in the specification. Accordingly, the terms used in the present invention should be defined on the basis of the meanings of the terms and contents over the present invention not the simple names of the terms.

Moreover, among the terms in the present invention, a real time (RT) service literally means a service in real time. That is, the service is time-restricted. In contrast, a non-real time (NRT) service is a service in NRT other than the RT service. That is, the NRT service is not restricted by time. Furthermore, data for NRT service is called NRT service data.

A broadcast receiver according to the present invention may receive NRT service through a medium such as a terrestrial wave, a cable, and the internet.

The NRT service may be stored in a storage medium of the broadcast receiver, and then may be displayed on a display device according to a predetermined time or at the user's request. The NRT service is received in a file format, and is stored in a storage medium according an embodiment. The storage medium may be an HDD embedded in the broadcast receiver according to an embodiment. As another example, the storage medium may be a Universal Serial Bus (USB) memory or an external HDD, which is connected to the broadcast receiving system.

Signaling information is necessary to receive files constituting the NRT service, store them in a storage medium, and provide a service to a user. The present invention may designate the above signaling information as NRT service signaling information or NRT service signaling data.

The NRT service includes Fixed NRT service and Mobile NRT service according to a method of obtaining IP datagram including NRT service signaling data. Especially, the Fixed NRT service is provided to a fixed broadcast receiver, and the Mobile NRT service is provided to a mobile broadcast receiver.

Figure 1:
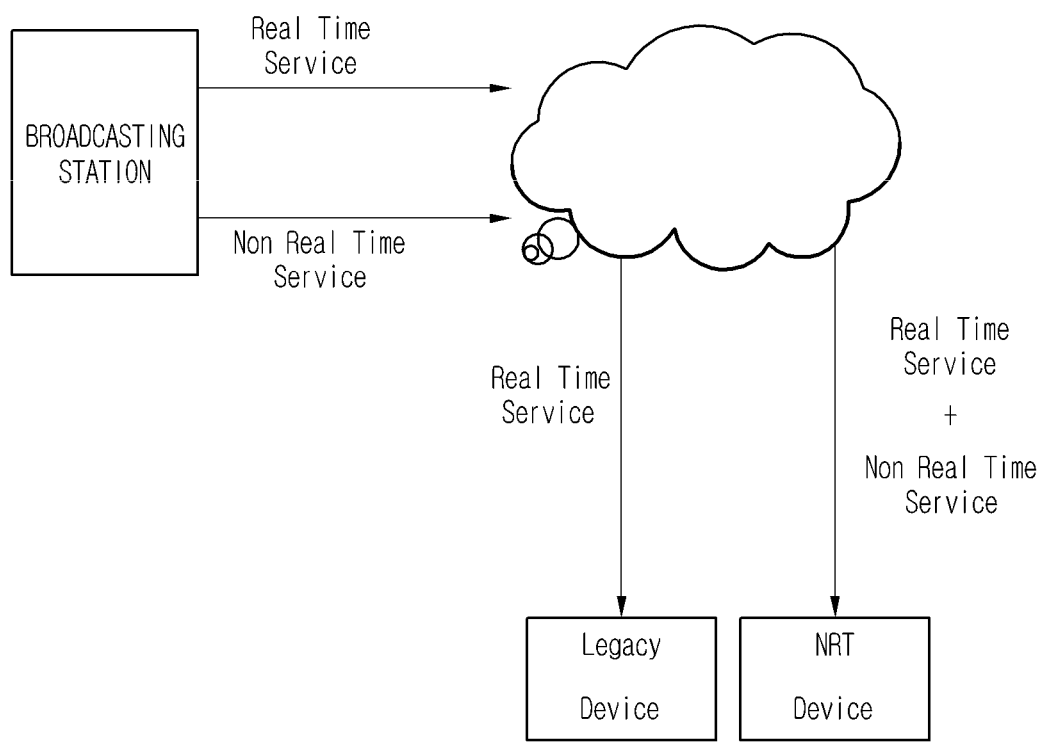
FIG. 1 is a conceptual diagram illustrating how RT service and NRT service are provided.

FIG. 1 is a conceptual diagram illustrating how RT service and NRT service are provided.

A broadcasting station transmits the RT service according to a traditional way, that is, like current terrestrial broadcasting (or mobile broadcasting). At this point, the broadcasting station transmits the RT service, and then, by using a remaining bandwidth during the transmission or an exclusive bandwidth, may provide the NRT service. That is, the RT service and NRT service are transmitted through the same or different channel. Accordingly, in order for a broadcast receiver to separate the RT service and the NRT service and store the separated NRT service in order to provide it to a user if necessary, service signaling information (or NRT service signaling data) is required. The NRT service signaling information (or NRT service signaling data) will be described in more detail later.

For example, a broadcasting station transmits broadcasting service data in real time and transmits news clip, weather information, advertisements, and Push VOD in non-real time. Additionally, the NRT service may be specific scenes, detail information of a specific program, and preview in real-time broadcasting stream in addition to news clip, weather information, advertisements, and Push VOD.

A typical broadcast receiver (i.e., a legacy device) may receive and process the RT service but may not receive and process the NRT service. That is, the typical broadcast receiver (i.e., a legacy device) is not influenced, in principle, by an NRT stream in a channel broadcasting RT service. That is, even when receiving NRT service, the typical broadcast receiver cannot process the received NRT service because it does not include a unit for processing it properly.

On the contrary, the broadcast receiver (i.e., an NRT device) of the present invention receives NRT service combined with RT service and properly processes the NRT service, so that it provides more various functions to a viewer than a typical broadcast receiver.

Figure 2:
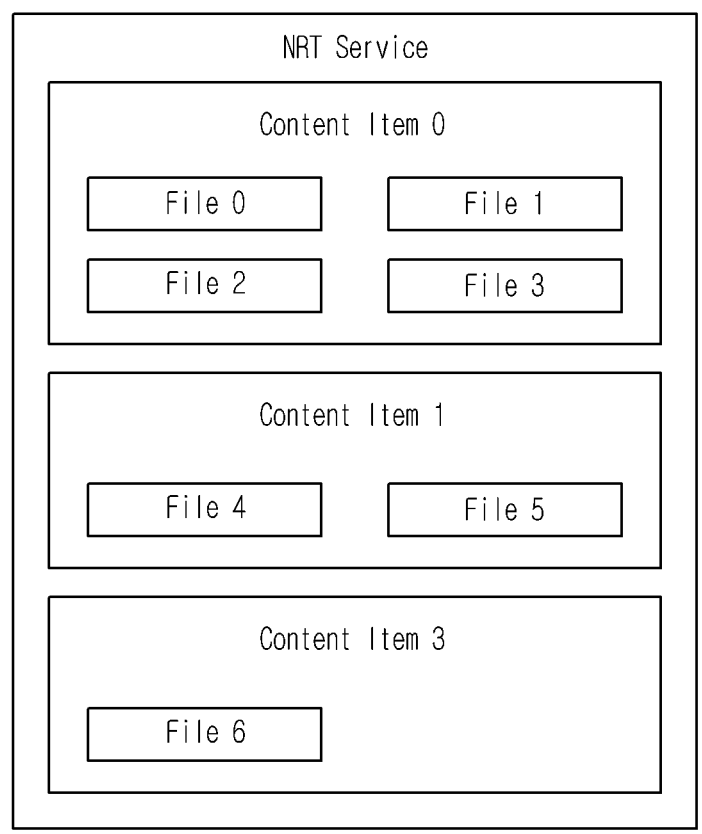
FIG. 2 is a view illustrating a structure of NRT service according to an embodiment.

FIG. 2 is a view illustrating a structure of NRT service according to an embodiment.

The NRT service includes at least one content item (or content or NRT content) as shown in FIG. 2, and the content item includes at least one file according to an embodiment. A file and object have the same meaning in the present invention.

The content item is a minimum unit playable independently. For example, news is provided in NRT. If the news includes business news, political news, and lift news, it may be NRT service, and each may be designated as a content item. Moreover, each of the business news, political news, and life news may include at least one file.

At this point, the NRT service may be transmitted in an MPEG-2 transport stream (TS) packet format through the same broadcasting channel as the RT service or an exclusive broadcasting channel. In this case, in order to identify the NRT service, a unique PID may be allocated to the TS packet of the NRT service data and then transmitted. According to an embodiment of the present invention, IP based NRT service data is packetized into an MPEG-2 TS packet and then transmitted.

At this point, NRT service signaling data necessary for receiving the NRT service data is transmitted through an NRT service signaling channel. The NRT service signaling channel is transmitted through a specific IP stream on an IP layer, and at this point, this specific IP stream may be packetized into an MPEG-2 TS packet and then transmitted. The NRT service signaling data transmitted through the NRT service signaling channel may include at least one of a Service Map Table (SMT), an NRT Service Table (NST), an NRT Content Table (NCT), an NRT Information Table (NRT-IT), and a Text Fragment Table (TFT). The NST or SMT provides access information on at least one NRT service operating on an IP layer, or the content items or files constituting the NRT service. The NRT-IT or NCT provides access information on the content items or files constituting the NRT service.

Additionally, NRT service signaling data including SMT (or NST) and NRT-IT (or NCT) may be included in a PSIP table on MPEG-2 TS or may be transmitted through an NRT service signaling channel on an IP layer in a virtual channel. Moreover, a plurality of NRT service data may be provided through one virtual channel.

The NRT-IT includes information describing a content downloadable to be stored in a receiving device. Information provided to the NRT-IT may include a content title (for example, the name of a downloadable program), available time for downloading content, content recommendation, availability of caption service, content identification, and other metadata.

Additionally, the TFT provides detailed description on a content item or service. The TFT may include a data structure supporting multi languages and, as a result, may represent detailed descriptions (e.g., each string corresponds to one language) in different languages. The text fragment table may be included in private sections having a table_id value (TBD) and may be identified by TFT_id. A TFT section may be included IP packets in a service signaling channel, and a multicast IP address (224.0.23.60) and a port (4937) may be allocated to the service signaling channel by IANA.

First, a receiver may identify whether a corresponding service is the NRT service with reference to a service_category field in the SMT, for example. Additionally, the receiver may uniquely identify the NRT service from the SMT through an NRT_service_id field.

Additionally, the NRT service may include a plurality of content items. The receiver may identify an NRT content item through a content_id field in the NCT or NRT-IT. In addition, the NRT content item and NRT service may be connected to each other by matching the NRT_channel_id field of the NCT to the NRT_service_id field.

Moreover, the NRT service may be transmitted through a FLUTE session and the receiver may extract FDT information from the FLUTE session. Then, content_id in the extracted FDT information is mapped into content_id of NCT or OMA-BCAST SG in order to confirm and receive the NRT service content that a user selects. If the mapping method is described briefly, for example, the receiver identifies each file constituting the NRT content item through the TOI and Content-Location fields in the FDT in the FLUTE session. Each TOI or the Content-Location and content item maps the content_ID of the FDT into the content_id field of the NCT or the content_id field of the OMA BCAST SG, so as to confirm and receive the NRT service content.

Figure 3:
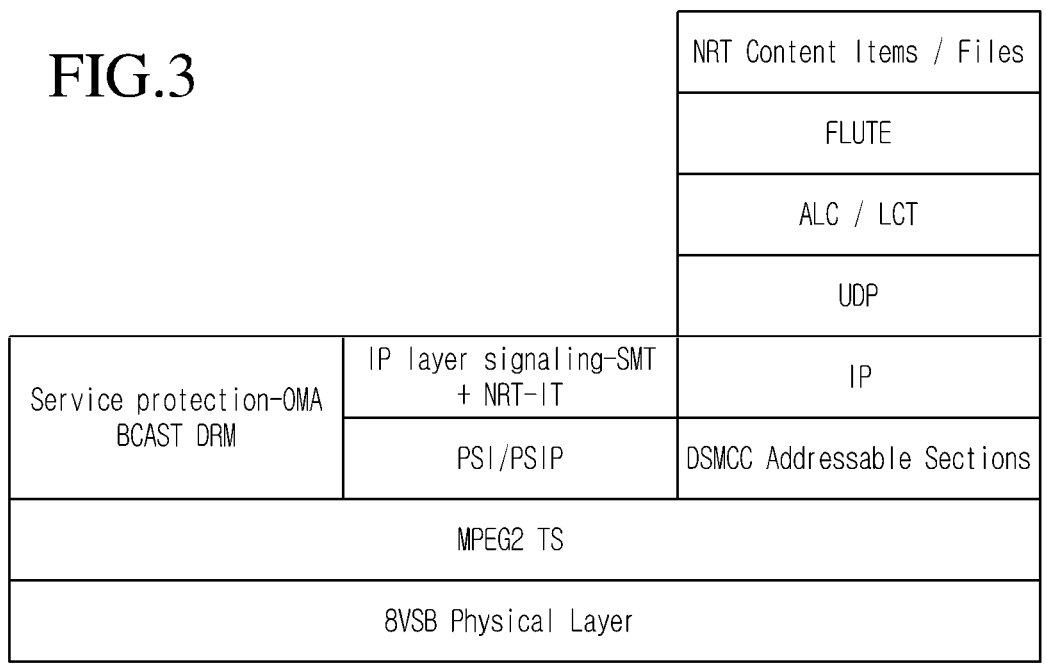
FIG. 3 is a view illustrating a protocol stack for NRT service according to an embodiment.

FIG. 3 is a view illustrating a protocol stack for NRT service according to an embodiment.

For Fixed NRT service, the NRT service of a file format is IP-packetized in an IP layer, and then, is transmitted in an MPEG-2 TS format through a specific channel.

Through an MPEG-2 based Program Specific Information (PSI) or Program and System Information Protocol (PSIP) table, for example, a VCT, it is determined whether there is NRT service in a virtual channel and identification information of NRT service is signaled.

According to an embodiment, the NRT service signaling channel, which transmits NRT service signaling data signaling the access information of the IP based NRT service, is IP packetized into a specific IP stream in the IP layer, and then, is transmitted in an MEPG-2 TS format.

That is, a broadcasting station packetizes the NRT content item or files according to a file transfer protocol method as shown in FIG. 3, and then, packetizes the packetized NRT content item or files in an Asynchronous Layered Coding (ALC) or Layered Coding Transport (LCT) method. Then, the packetized ALC or LCT data are packetized according to a UDP method. Then, the packetized UDP data is packetized according to the IP method again, and then, becomes IP data. Here, the IP data may include a File Description Table (FDT) having information on a File Delivery over Unidirectional Transport (FLUTE) session. The packetized IP data may be designated as IP datagram for convenience of description in the present invention.

Additionally, the IP datagram of NRT service is encapsulated in an addressable section structure and is packetized again in an MPET-2 TS format. That is, one addressable section structure has a section header and CRC checksum, which are added to one IP datagram. The format of the addressable section structure is matched to a Digital Storage Media Command and Control (DSM-CC) section format for private data transmission in terms of a structure. Accordingly, the addressable section may be designated as a DSM-CC addressable section.

Moreover, NRT service signaling data including at least one of SMT (or NST) and NRT-IT (or NCT) necessary for receiving NRT content/files may be transmitted through an NRT service signaling channel on an IP layer. Accordingly, the NRT service signaling data may be packetized according to an IP method in order to transmit it through the NRT service signaling channel on an IP layer. The NRT service signaling channel is encapsulated in the IP datagram having a well-known IP address and is multi-casted according to an embodiment.

Additionally, the NRT service signaling data may be included in Program Specific Information (PSI) or Program and System Information Protocol (PSIP) table section data and then transmitted. Moreover, the PSI table may include a Program Map Table (PMT) and a Program Association Table (PAT). The PSIP table may include a Virtual Channel Table (VCT), a Terrestrial Virtual Channel Table (TVCT), a Cable Virtual Channel Table (CVCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

Furthermore, as data for digital rights management and encryption of broadcasting service to protect the NRT service from illegal distribution and reproduction, BroadCast Services Enabler Suite Digital Rights Management (BCAST DRM) suggested by Open Mobile Alliance (OMA) may be used.

Moreover, the above mentioned Program Specific Information (PSI), Program and System Information Protocol (PSIP) table section data, DSM-CC addressable section data, and OMA BCAST DRM data are divided by a 184 byte unit, and then, a 4 byte MPEG header is added to each 184 bytes in order to obtain a 188 byte MPEG-2 TS packet. At this point, a value allocated to the PID of the MPEG header is a unique value identifying a TS packet for transmitting the NRT service and NRT service signaling channel.

MPEG-2 TS packets may be modulated in a predetermined transmission method in a physical layer, for example, an 8-VSB transmission method, and then, may be transmitted to a receiving system.

Moreover, FIG. 4 is a view illustrating a protocol stack for NRT service according to another embodiment.

FIG. 4 is view illustrating one example of the protocol stack for mobile NRT service. As shown in FIG. 4, an adaption layer is included between an IP layer and a physical layer. As a result, without using an MPEG-2 TS format, the IP datagram of mobile service data and IP datagram of signaling information may be transmitted.

That is, a broadcasting station packetizes the NRT content/files according to a file transfer protocol method as shown in FIG. 4, and then, packetizes them according to an Asynchronous Layered Coding (ALC)/Layered Coding Transport (LCT) method. Then, the packetized ALC/LCT data are packetized according to a UDP method. Then, the packetized ALC/LCT/UDP data is packetized again according to the IP method and becomes ALC/LCT/UDP/IP data. The packetized ALC/LCT/UDP/IP data may be designated as IP datagram for convenience of description in the present invention. At this point, OMA BCAST SG information undergoes the same process as the NRT content/file to constitute IP datagram.

Additionally, when NRT service signaling information (for example, SMT) necessary for receiving the NRT content/files is transmitted through a service signaling channel, the service signaling channel is packetized according to a User Datagram protocol (UDP) method, and the packetized UDP data is packetized again according to the IP method to become UDP/IP data. The UDP/IP data may be designated as IP datagram for convenience of description in the present invention. At the time, the service signaling channel is encapsulated in the IP datagram including Well-known IP destination address and well-known destination UDP port number, and is multi-casted according to an embodiment.

In addition, in relation to OMA BCAST DRM for service protection, a UDP header and an IP header are sequentially added to constitute one IP datagram.

The IP datagram of the NRT service, NRT service signaling channel, and mobile service data are collected in an adaption layer to generate a RS frame. The RS frame may include IP datagram of OMA BCAST SG.

The length (i.e., the number of rows) of a column in the RS frame is set by 187 bytes, and the length (i.e., the number of columns) of a row is N bytes (N may vary according to signaling information such as a transmission parameter (or TPC data).

The RS frame is modulated in a predetermined transmission method in a mobile physical layer (for example, VSB transmission method) and then is transmitted to a receiving system.

Moreover, whether the NRT service is transmitted is signaled through a PSI/PSIP table. As one example, whether the NRT service is transmitted is signaled to the VCT or TVCT.

FIG. 5 is a view illustrating a bit stream section of a TVCT table section (VCT) according to an embodiment.

Referring to FIG. 5, the TVCT table section has a table form of an MPEG-2 private section as one example, but is not limited thereto.

When the VCT and PID of the audio/video are parsed and then transmitted through the TVCT, the packet identification (PID) information may be obtained.

Accordingly, the TVCT table section includes a header, a body, and a trailer. A header part ranges from a table_id field to a protocol_version field. A transport_stream_id field is a 16 bit field and represents an MPEG-2 TS ID in a program association table (PAT) defined by a PID value of 0 for multiplexing. In a body part, a num_channels_in_section field is an 8 bit field and represents the number of virtual channels in a VCT section. Lastly, a trailer part includes a CRC_32 field.

A service_type field (6 bits) represents a type of service transmitted from a virtual channel. FIGS. 6 and 7 are views illustrating how to define a value of a service_type field according to an embodiment. According to an embodiment, a service_type value (i.e., '0x04') shown in FIG. 6 means that service_type is ATSC_data_only_service and NRT service is transmitted through a virtual channel. According to another embodiment, a service_type value (i.e., '0x08') shown in FIG. 7 means that service_type is ATSC_nrt_service and a virtual channel provides NRT service satisfying the ATSC standard.

FIG. 8 is view of data_service_table_section) for identifying an application of NRT service and bit stream syntax of data_service_table_bytes in a DST section. A broadcasting station NRT service data or NRT service signaling data, satisfying ASTC standard, may be transmitted through the DST table section of FIG. 8.

Hereinafter, semantic of fields including a data_service_table_section structure is as follows.

A table_id field (8 bits) as a field for type identification of a corresponding table section is a table section in which a corresponding table section constitutes DST through this field. For example, a receiver identifies that a corresponding table section is a table section constituting DST if a value of the field is 0XCF.

A section_syntax_indicator field (1 bit) is an indicator defining a section format of DST, and the section format may be short-form syntax (0) of MPEG, for example.

A private_indicator field (1 bit) represents whether the format of a corresponding section follows a private section format and may be set with 1.

A private_section_length field (12 bits) represents a remaining table section length after a corresponding field. Additionally, a value of this field does not exceed '0xFFD'.

A table_id_extension field (16 bits) is dependent on a table, and may be a logical part of a table_id field providing a range of the remaining fields.

A version_number field (5 bits) represents the version number of DST.

A current_next_indicator field (1 bit) indicates whether a transmitted DST table section is applicable currently. If the field value is 0, it means that there is no table yet and the next table is valid.

A section_number field (8 bits) represents a section number in sections in which a corresponding table section constitutes a DST table. section_number of the first section in DST is set with '0x00'. The section_number is increased by one as the section of DST is increased.

A last_section_number field (8 bits) represents the last section number constituting a DST table, i.e., the highest section_number.

data_service_table_bytes represents a data block constituting DST, and its detailed structure will be described below.

A CRC_32 field is a 32 bit field and includes a cyclic redundancy check (CRC) value, which ensures zero output from registers of a decoder defined in an MPEG-2 system after processing an entire DST section.

Hereinafter, semantic of fields including a data_service_table_bytes structure is as follows.

An sdf_protocol_version field (8 bits) describes the version of a Service Description Framework protocol.

An application_count_in_section field (8 bits) represents the number of applications listed in a DST section.

A compatibility_descriptor( ) field represents that a corresponding structure includes a DSM-CC compatible descriptor. Its purpose is to signal compatible requirements of an application in a receiving platform in order to use a corresponding data service after determining its ability.

An app_id_byte_length field (16 bits) describes the number of bytes used for identifying an application.

An app_id_description field (16 bits) describes the format and semantic of the following application identification bytes. For example, a value of an app_id_description may be defined as Table 1.

TABLE 1

| Value | Application Identifier Format |
|---|---|
| 0x0000 | DASE application |
| 0x0001-0x7FFF | ATSC reserved |
| 0x8000-0xFFFF | User private |

An app_id_byte field (8 bits) represents a byte of an application identifier.

A tap_count field (8 bits) describes the number of Tap( ) structures used for corresponding application.

A protocol_encapsulation field (8 bits) describes a protocol encapsulation type used for transmitting a specific data element referenced by a Tap( ) field. A value of the protocol_encapsulation field is defined as Table 2.

TABLE 2

| Value | Encapsulated Protocol |
| --- | --- |
| 0x00 | Not in a MPEG-2 Transport Stream |
| 0x01 | Asynchronous non-flow controlled scenario of the DSM-CC Download protocol encapsulated in DSM-CC sections |
| 0x02 | Non-streaming Synchronized Download protocol encapsulated in DSM-CC sections |
| 0x03 | Asynchronous multiprotocol datagrams in Addressable Sections using LLC/SNAP header |
| 0x04 | Asynchronous IP datagrams in Addressable Sections |
| 0x05 | Synchronized streaming data encapsulated in PES |
| 0x06 | Synchronous streaming data encapsulated in PES |
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |
| 0x0D | Asynchronous carousel scenario of the DSM-CC Download protocol encapsulated in DSM-CC sections |
| 0x0E | Reserved for harmonization with another standard body |
| 0x0F-0x7F | ATSC reserved |
| 0x80-0xFF | User defined |

An action_type field (7 bits) represents attribute of data referenced by a Tap( ).

A resource_location field (1 bit) describes a position of an association_tag field matching to an association_tag value listed in the next Tap structure. When a corresponding field is set with 0, association_tag exists in PMT of a current MPEG-2 program. Like this, when the corresponding field is set with 1, a matching association_tag exits in DSM-CC Resource Descriptor in a Network Resources Table of a corresponding data service.

A Tap( ) field may include information on searching a data element of an application state in a communication channel of a lower layer. An association_tag field in a Tap( ) field may include correspondence information between data elements of an application state. A value of an association_tag field in one Tap structure corresponds to a value of an association_tag field of one association tag descriptor in a current PMT. For example, a Tap( ) field may have a specific structure including fields of Table 3.

TABLE 3

| Syntax | No. of bits | Format |
| --- | --- | --- |
| Tap ( ) { | | |
| tap_id | 16 | uimsbf |
| use | 16 | uimsbf |
| association_tag | 16 | uimsbf |
| selector( ) | | |
| } | | |

A tap_id field (16 bits) is used by an application to identify data elements. A value of tap_id has a range defined by values of app_id_byte fields related to Tap( ) in DST. A tap_id value is selected by a data service provider. Additionally, the tap_id value may be used for application to deal with a data element.

A Use field (16 bits) is used to specify a communication channel referenced by association_tag.

An association_tag field (16 bits) uniquely identifies one of a DSM-CC resource descriptor listed in a Network Resource Table or data elementary stream listed in PMT. A value of a corresponding field may be identical to an association_tag value of association_tag_descriptor.

A Selector( ) field describes a specific data element available in a communication channel or data elementary stream referenced by the association_tag field. Additionally, the selector structure may indicate a protocol required for a corresponding data element.

A tap_info_length field (16 bits) describes the number of bytes of descriptors in the next of a corresponding field.

A descriptor( ) field may include descriptor information according to a corresponding descriptor format.

An app_info_length field (8 bits) describes the number of bytes of the next descriptors of a corresponding field.

A descriptor( ) field may include descriptor information according to a corresponding descriptor format.

An app_data_length field (16 bits) describes the length of a byte unit of app_data_byte fields.

An app_data_byte (8 bits) field represents input parameters related to application and other private data fields in 1 byte.

A service_info_length field (8 bits) describes the number of byte units of the next descriptor.

A descriptor( ) field may include descriptor information according to a corresponding descriptor format.

A service_private_data_length field (16 bits) describes the length of a byte unit in private fields.

A service_private_data_byte field (8 bits) represents a private field in 1 byte.

Figure 9:
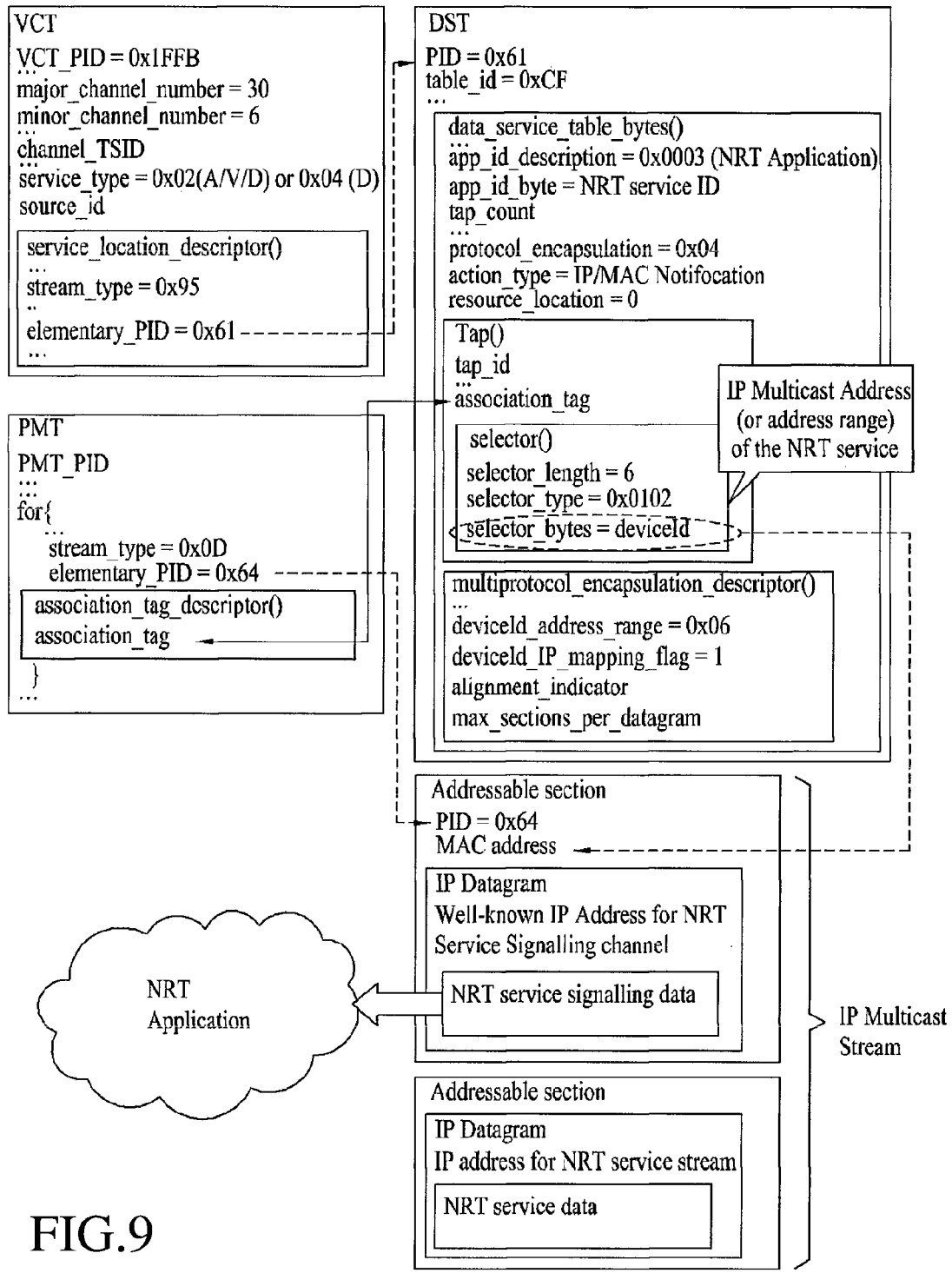
FIG. 9 is a view illustrating a method of receiving and providing NRT service in a receiving system by using ATSC A/90 standard for transmitting data broadcasting stream and ATSC A/92 standard for transmitting IP multicast stream.

FIG. 9 is a view illustrating a method of receiving and providing NRT service in a receiving system by using ATSC A/90 standard for transmitting data broadcasting stream and ATSC A/92 standard for transmitting IP multicast stream.

That is, information on stream constituting each virtual channel is signaled to service location descriptor of VCT or ES_loop of PMT. For example, as shown in FIG. 7 or 8, if VCT service type is 0x02 (i.e., digital A/V/Data), 0x04 (i.e., Data only), or 0x08 (i.e., NRT Only service), NRT service stream may be transmitted to the virtual channel. At this point, if 0x95 (i.e., DST transmission) is allocated to a stream_type field value in a service location descriptor (or ES loop of PMT), it means that broadcast is transmitted. If the stream_type field value has no value or is not 0x95, only typical A/V is transmitted. That is, if the stream_type field value in service location descriptor has 0x95, an Elementary_PID field value at this point is a PID value of a Data Service Table (DST). Accordingly, DST may be received through the Elementary_PID.

Through the DST, types of application and detailed information on data broadcasting stream transmitted through the channel may be obtained. The DST is used to identify NRT application (i.e., NRT service).

That is, the App_id_description field of DST defines the format and interpretation of the following application identification bytes. According to an embodiment, '0x0003' is allocated to the App_id_description field to identify NRT application. The above numerical value is just one example, and does not restrict the range of the rights of the present invention.

If the App_id_description field value is '0x0003', the next following Application_id_byte value becomes a Service ID value of the NRT application. A service ID for the NRT application may have a URI value uniquely identifying a corresponding service around the world.

After the NRT application is identified, PID of an MPEG-2 TS packet divided from the IP datagram of an NRT service signaling channel is searched through Tap information. Then, IP datagram transmitting a NRT service signaling channel may be obtained from MPEG-2 TS packets having PID obtained through the tap information, and NRT service signaling data may be obtained from the obtained IP datagram. At this point, the IP access information of the NRT service signaling channel may be well-known IP access information, i.e., well-known IP address and well-known UDP port number.

That is, if the Protocol_encapsulation field value in the DST is 0x04, asynchronous IP stream is transmitted, and if the Selector_type field value is 0x0102, a device_id value indicating destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses the Multicast address (or address range) to receive IP stream, i.e., IP packet, and then, extracts NRT service signaling data from the received IP packet.

Then, the receiver receives NRT service data, i.e., NRT content item/files to store them in a storage medium or display them on a display device, on the basis of the extracted NRT service signaling data.

According to another embodiment, a Stream Type field value of DST may have new 0x96 instead of 0x95 to signal NRT service. This is because NRT service, i.e., new application, may malfunction when a typical receiver determines whether there is data broadcasting stream only on the basis of whether there is stream having a stream type of 0x95. In this case, with designating a stream newly, a typical receiver may disregard it to guarantee backwards compatibility.

Figure 10:
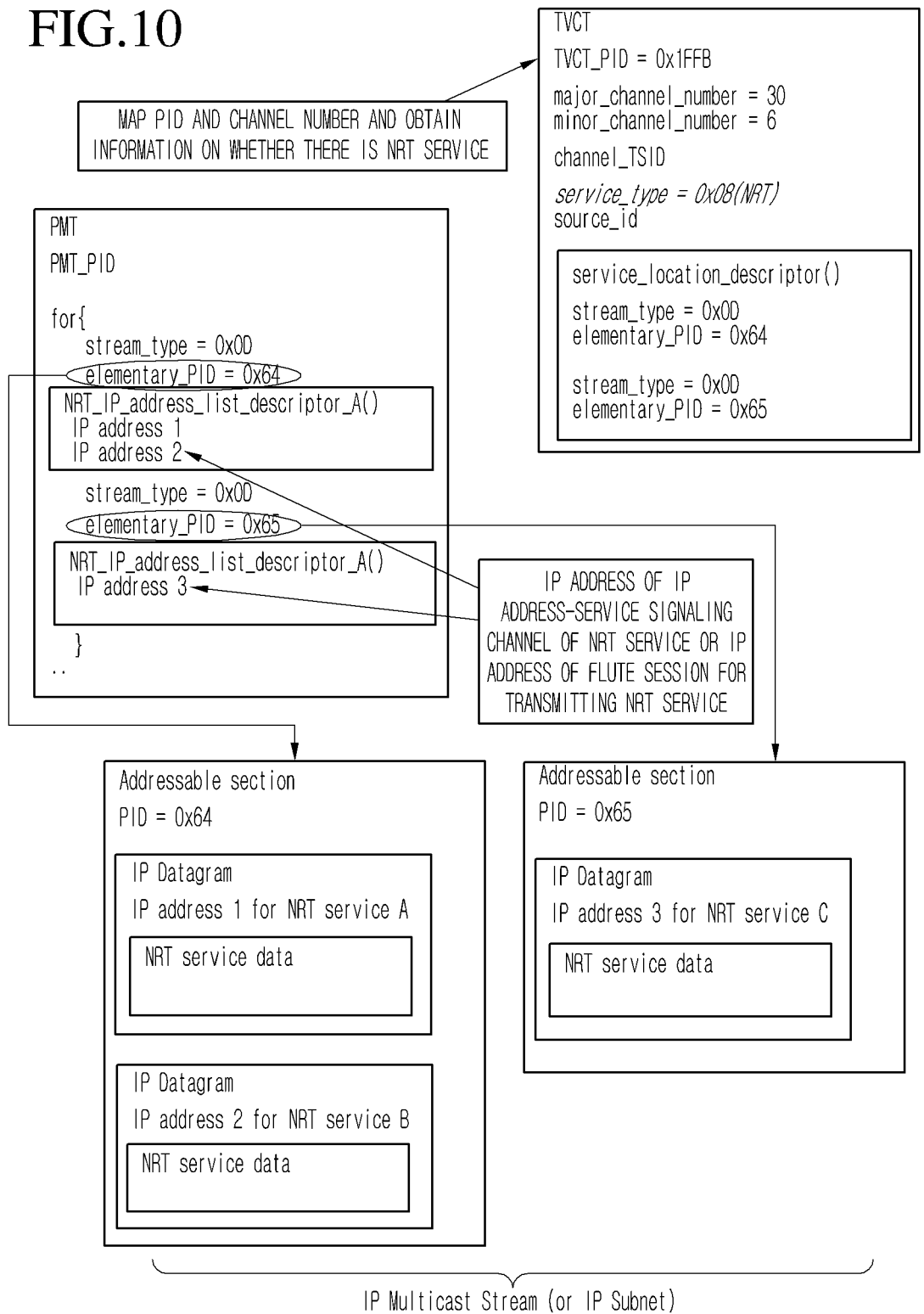
FIG. 10 is a view illustrating a method of signaling a DSM-CC addressable section data by using VCT according to another embodiment.
Figure 11:
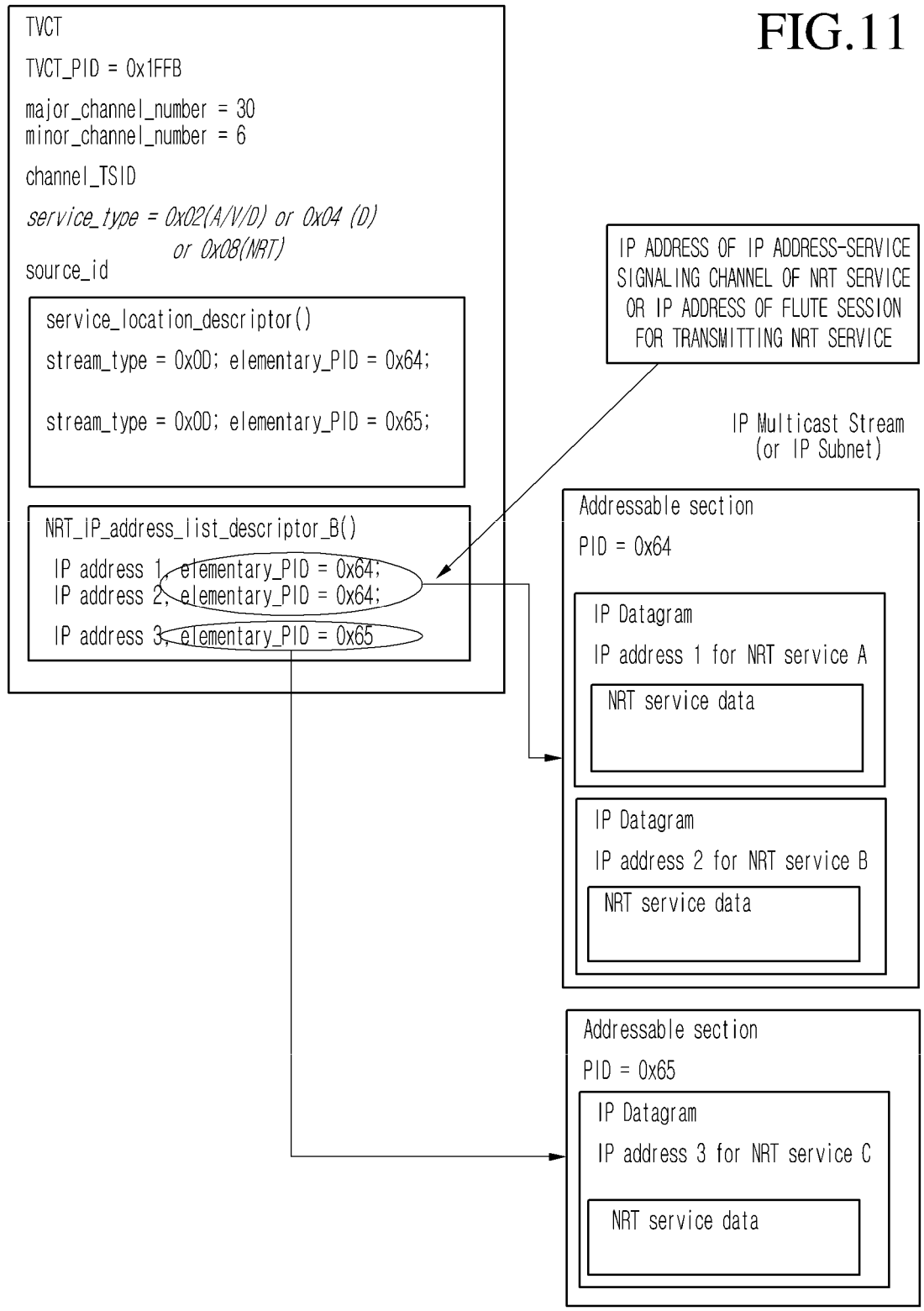
FIG. 11 is a view illustrating a method of signaling DSM-CC addressable section data by using VCT according to another embodiment of the present invention.

FIGS. 10 and 11 are views illustrating a method of receiving NRT service by using DSM-CC addressable section data according to another embodiment.

A data transmission method using DST is a standard for transmitting all kinds of IP datagram through digital broadcasting stream, and may be inefficient for the NRT service. Accordingly, FIGS. 10 and 11 illustrate a method of receiving the NRT service by signaling the PID of a specific stream including IP address information and section data of the IP datagram with respect to the NRT service through the data of the DSM-CC addressable section.

As shown in FIG. 10, the receiver may obtain information that NRT service stream is transmitted through the virtual channel when a service type of VCT (or TVCT) is 0x08 (i.e., NRT Only service). That is, the receiver may obtain information on whether there is NRT service according to service_type information by mapping the PID of a virtual channel into a channel number.

At this point, if 0x0D is allocated to a stream_type field value in service location descriptor of VCT (or ES loop of PMT), it means that DSM-CC stream is transmitted. An Elementary_PID field value at this point may be the PID value of a DSM-CC addressable section. Accordingly, the receiver receives a DSM-CC addressable section including NRT service data through Elementary_PID.

That is, the receiver may obtain the PID of the DSM-CC addressable section through VCT or PMT. Here, the receiver may obtain an NRT_IP_address_list_descriptor_A( ) field including an IP address of an NRT service signaling channel or an IP address of the FLUTE session for transmitting NRT service data, which corresponds to the PID obtained from PMT of the corresponding stream.

Moreover, the receiver may receive DSM-CC addressable section data from IP multicast stream or IP subnet on the basis of the IP address obtained from an NRT_IP_address_list_descriptor_A( ) field. The receiver may obtain a corresponding IP datagram including a specific NRT service (for example, A, B, or C) data by searching a DSM-CC addressable section having PID corresponding to the obtained elementary_PID from the received DSM-CC addressable section data.

FIG. 11 is a view illustrating a method of signaling a DSM-CC addressable section data by using VCT according to another embodiment.

As mentioned above, the receiver may obtain information that NRT service stream may be transmitted when a service_type in VCT is 0X02, 0X04 of 0X08. Also, the receiver may obtain elementary_PID having a stream type of 0X0D from the service_location_descriptor( ) field to receive the DSM-CC stream. Here, the receiver may obtain an NRT_IP_address_list_descriptor_B( ) field including an IP address of an NRT service signaling channel or an IP address of the FLUTE session for transmitting NRT service data, which corresponds to the obtained elementary_PID.

Moreover, the receiver may receive DSM-CC addressable section data from IP multicast stream or IP subnet on the basis of the IP address obtained from an NRT_IP_address_list_descriptor_B( ) field. The receiver may obtain the IP datagram including specific NRT service (for example, A, B, or C) that it wants to receive from the received DSM-CC addressable section data by parsing the DSM-CC addressable section having PID corresponding to the obtained elementary_PID.

The processes for extracting NRT service signaling data and NRT service data are described as follows. Here, 0x08 is allocated to the service_type field value in VCT, and indicates that at least one NRT service is transmitted to a corresponding virtual channel.

That is, when the receiver is turned on and a channel is selected by default or a user through a tuner, the PSI/PSIP section handler obtains VCT and PMT from a broadcast signal received through the selected channel. Also, the PSI/PSIP section handler parses the obtained VCT to confirm whether there is NRT service. This is confirmed by checking the service_type field value in a virtual loop of the VCT. For example, when the service_type field value is not 0x08, the corresponding virtual channel does not transmit NRT service. At this point, since the virtual channel transmits existing service (i.e., legacy ATSC service), the receiver operates properly according to information in the virtual channel.

Additionally, in relation to a demultiplexing unit, if a service_type field value is 0x08 according to a control of a service manager, a corresponding virtual channel transmits NRT service. In this case, PID of DST is extracted by parsing a service location descriptor in a virtual channel loop of the VCT. Moreover, DST is received by using the extracted PID.

Moreover, the receiver confirms whether a corresponding service provided through a channel selected from the received DST is NRT service.

The NRT service is confirmed by an App_id_description field value.

According to an embodiment, '0x0003' is allocated to the App_id_description field to identify NRT application. The above numerical value is just one example, and does not restrict the range of the rights of the present invention.

If the App_id_description field value in the DST is '0x0003', the next following Application_id_byte value becomes a Service ID value of the NRT application (i.e., NRT service). Therefore, the service manager or PSI/PSIP section handler extracts Tap( ) to PID of an MEGP-2 TS packet separated from the IP datagram of the NRT service signaling channel after identifying the NRT application (i.e., NRT service). Then, stream PID including association_tag of the extracted Tap is extracted from PMT.

Also, the addressable section handler may recover the DSM-CC addressable section by removing decapsulation, i.e., an MPEG-2 header, after receiving MPEG-2 TS packets corresponding to the extracted stream PID.

Then, the receiver recovers the IP datagram transmitting an NRT service signaling channel by removing a section header and CRC checksum from the DSM-CC addressable section and obtains NRT service signaling data from the recovered IP datagram. Here, access information on the IP datagram transmitting the NRT service signaling channel is a well-known destination IP address and a well-known destination UDP port number.

That is, if the Protocol_encapsulation field value in the DST is 0x04, asynchronous IP stream is transmitted, and if the Selector_type field value is 0x0102, a device_id value indicating a destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses the Multicast address (or address range) to receive IP stream, i.e., IP packet, and then, extracts NRT service signaling data from the received IP packet.

The receiver receives NRT service data, i.e., NRT content item/files to store them in a storage medium or display them on a display device, on the basis of the extracted NRT service signaling data.

Moreover, the NRT service may be provided Dynamic Content Delivery (DCD) service according to an embodiment. The DCD service is service for transmitting content to a receiver periodically or at the user request, and the content is selected from a server according to receiver information. The DCD service supports a point-to-point method and a broadcast method in a communication means for content delivery, and the above NRT service is transmitted through an OMA BCAST method and one of the broadcast methods of the DCD service.

NRT service data may be transmitted through the DCD service of the OMA BCAST method. In this case, the receiver may obtain the DCD channel information to receive NRT service and may receive the NRT service through a corresponding DCD channel on the basis of the DCD channel information.

Moreover, the DCD channel information may be included in the NST and transmitted. For example, the receiver receives NST, and obtains DCD channel information through DCD bootstrap.

Additionally, the NST may include DCD channel metadata, received through a DCD administrative channel, for signaling of the DCD channel information. Accordingly, the receiver may obtain information on a channel for receiving NRT service and metadata through NST.

Accordingly, when NST including DCD channel information is transmitted, the receiver accesses the DCD channel through NST without transmission of the NRT service signal data, and then receives the NRT service.

Like this, if NST includes metadata of a channel for receiving NRT service, there are several advantages.

First, without receiving the NRT service signaling data on the basis of the service type of a virtual channel, service access speed may be increased by receiving channel metadata that directly receives NRT service from NST.

Additionally, update signaling for a channel change item may be performed in real time in a broadcast environment.

Moreover, access information in OMA BCAST SG may be obtained by referring to NST. For example, the receiver receives DCD channel meta data on the basis of the DCD channel information in NST, and obtains access information to receive NRT service on the basis of the NRT service signaling data and DCD channel metadata obtained from NST.

Lastly, NST including a list of NRT service related to another virtual channel may be transmitted. Accordingly, list information of the NRT service may be transmitted through a specific NRT service signaling channel on an IP layer not on a PSI or PSIP layer. Accordingly, in this case, backwards compatibility to PSI or PSIP may be reserved.

In addition, as mentioned above, the DCD channel information including the DCD channel metadata may be included in the access information of SG in OMA BCAST, and the access information corresponds to the NRT service information in NST. In more detail, the receiver may obtain NRT service information in NST from an access fragment of OMA BCAST SG. Accordingly, the receiver may obtain information on receiving NRT service by receiving NST corresponding to the obtained NRT service information.

Moreover, the NRT service transmitted through the DCD channel may be divided by a service category allocated. For example, the service category of the NRT service transmitted through the DCD channel may be identified by 0X0F.

FIGS. 12 and 13 are views illustrating a bit stream syntax of NST according to an embodiment.

Here, the corresponding syntax is created in an MPEG-2 private section format to help understanding, but the format of the corresponding data may vary. For example, the corresponding data may be expressed in a Session Description Protocol (SDP) format and signaled through a Session Announcement Protocol (SAP) according to another method.

NST describes service information and IP access information in a virtual channel for transmitting NST, and provides NRT broadcast stream information of a corresponding service by using an identifier of the NRT broadcast stream, i.e., NRT_service_id, in each service. Furthermore, the NST describes description information of each fixed NRT service in one virtual channel, and a descriptor area may include other additional information.

A num_NRT_services field (8 bits) represents the number of NRT services in an NST section.

Additionally, NST provides information on a plurality of fixed NRT services by using a 'for' loop. Hereinafter, the same field information may be provided to each fixed NRT service.

An NRT_service_id field (16 bits) is an indicator that uniquely identifies a corresponding NRT service in a range of a corresponding NRT broadcast. The NRT_service_id is not changed during the corresponding service. Here, if the service is terminated, in order to evade confusion, NRT_service_id for the service may not be used for another service until an appropriate time elapses.

Additionally, NST provides information on a plurality of components by using a 'for' loop. An essential_component_indicator field (1 bit) indicates when a value of a corresponding value is set with 1 that a corresponding component is a necessary component for NRT service. If not, the corresponding component is a selected component.

A port_num_count field (6 bits) indicates numbers of UDP ports related to a corresponding UDP/IP stream component. Values of the destination UDP port numbers are increased by one, starting from a component_destination_UDP_port_num field value.

A component_destination_IP_address_flag field (1 bit) is a flag representing that there is a component_destination_IP_address field for corresponding component if set with 1.

In relation to component_destination_IP_address field (128 bits), if component_destination_IP_address_flag is set with 1, there is corresponding field, but if component_destination_IP_address_flag is set with 0, there is no corresponding field. If there is a corresponding field, the corresponding field includes a source IP address of all IP datagram transmitting components of the corresponding NRT service. A restricted use of a 128 bit long address of a corresponding field is for future use of IPv6, which is not currently used though.

A component_destination_UDP_port_num field (16 bits) represents a destination UDP port number for corresponding UDP/IP stream component.

A num_component_level_descriptors field (4 bits) provides the number of descriptors providing additional information on corresponding IP stream component.

A component_level_descriptors field identifies at least one descriptor providing additional information on a corresponding IP stream component.

A num_NRT_service_level_descriptors field (4 bits) represents the number of NRT service level descriptors for corresponding service.

NRT_service_level_descriptor( ) identifies no or at least one descriptor providing additional information on corresponding NRT service. Here, a specific service type for NRT service may be provided. The specific service type includes a portal service providing web content, push VOD, and A/V download.

A num_virtual_channel_level_descriptors field (4 bits) describes the number of virtual channel level descriptors for a corresponding virtual channel.

virtual_channel_level_descriptor( ) represents a descriptor providing additional information on a virtual channel that a corresponding NST describes.

Moreover, NRT service is transmitted through FLUTE, and access information on the NST table is connected to FLUTE session information as follows.

Source_IP_address is a source IP address of the same server transmitting all channels of the FLUTE session.

NRT_service_destination_IP_Address is signaled if there is a destination IP address of a session level of the FLUTE session.

A component may be mapped into a channel in the FLUTE session, and an additional destination IP address (which is different from an IP address signaled by session) is signaled through component_destination_IP_address at each channel.

Additionally, a destination port number is signaled through component_destination_UDP_port_num and the number of destination ports starting from component_destination_UDP_port_num may be additionally designated through port_num_count.

A plurality of channels may be configured for one destination IP address by designating a port in plurality. Here, one component designates a plurality of channels. However, it is desired to identify a channel through a destination IP address in general. Here, one channel is typically mapped into one component.

Content items/files for NRT service are transmitted through FLUTE, and corresponding FLUTE session information is signaled using access information on the NST table.

FIG. 14 is a view illustrating a bit stream syntax of NRT_component_descriptor (MH_component_descriptor) according to an embodiment.

NRT_component_descriptor( ) is shown in a component descriptor loop in each component of each NRT service in NST. Then, all parameters in a corresponding descriptor correspond to parameters used for components of NRT service.

Hereinafter, each field information transmitted through the NRT_component_descriptor of FIG. 14 will be described as follows.

A component_type field (7 bits) identifies an encoding format of a component. The identification value may be one of values allocated for payload_type of a RTP/AVP stream. Additionally, the identification value may be a dynamic value ranging from 96 to 127. Values of the field for components constituting media transmitted through RTP are identical to those in payload_type in an RTP header of IP stream transmitting a corresponding component.

An adding value of a component_type field in a range of 43 to 71 will be defined in the future version of the standard. When NRT service stream is transmitted based on FLUTE, in order to additionally signal parameters (described below) necessary for FLUTE session, 38 (which is component_type defined for a FLUTE component in ATSC) may be used, or 43 (i.e., an unallocated value) may be defined as component_type for new NRT transmission, and used.

A num_STKM_streams field (8 bits) identifies numbers of STKM streams related to a corresponding component.

A STKM_stream_id field (8 bits) identifies STKM stream having keys in order to decrypt the obtained corresponding protected component. Here, the STKM_stream_id field in the component descriptor for the STKM stream is referred.

An NRT_component_data (component_type) field provides at least one of encoding parameters necessary for expressing a corresponding component and other parameters. Here, a structure of an NRT_component_data element is determined by a value of a component_type field.

A File Delivery Table (FDT) of FLUTE sessions is used for delivering item lists of all content items, and provides sizes, data types, and other information of items related to obtain the items.

Accordingly, the present invention obtains information for accessing the FLUTE session transmitting a corresponding content by using NST, in order to receive a selected content from SG obtained by using NRT-IT. Moreover, the present invention maps information in a file transmitted through a corresponding FLUTE session into information on a content item of NRT-IT. In this case, identification of service including the selected content item is resolved through NRT_service_id of the NST.

NRT service is transmitted through FLUTE, and access information on the NST table is connected to FLUTE session information as follows.

A component may be mapped into a channel in the FLUTE session, and an additional destination IP address (which is different from an IP address signaled by session) is signaled through component_destination_IP_address at each channel. Additionally, a destination port number is signaled through component_destination_UDP_port_num and the number of destination ports starting from component_destination_UDP_port_num may be additionally designated through port_num_count.

A plurality of channels may be provided to one destination IP address by designating a plurality of ports, and in such a case, one component designates a plurality of channels. However, it is recommended that a channel be distinguished through a destination IP address, and in such a case, one channel is mapped into one component.

component_attribute_byte may be used to signal an additional attribute of a component constituting a session. Additional parameters necessary for signaling a FLUTE session may be signaled through this.

In this regard, parameters for signaling the FLUTE session are required, and include definitely necessary required parameters and optional necessary parameters related to a corresponding FLUTE session.

FIG. 15 is a view illustrating a bit stream syntax of NRT component descriptor including NRT_component_data according to an embodiment.

One NRT service may be included in multiple FLUTE sessions. Each session may be signaled using at least one NRT component descriptors depending on IP addresses and ports used for the session.

This FLUTE component descriptor may be delivered through a Component_level_descriptor loop of NST. If the FLUTE channel is in plurality, since TSI and session_start_time, session_end_Time, i.e., parameters of a session level, should be signaled once, a FLUTE component descriptor may be transmitted only in one of components in several channels through a Component_level_descriptor loop.

FIG. 16 is a view illustrating a bit stream syntax of NRT-IT section for signaling NRT application according to an embodiment.

Information provided from NRT-IT includes a title of content (for example, a name of downloadable program), download available time and information, content advisories, caption service availability, content identification, and other metadata. One item of content may include at least one file. For example, an audio/video clip may be played in a JPEG thumbnail image used for displaying a screen.

An instance of NRT-IT may include data corresponding to an arbitrarily predetermined period, or may describe a NRT content starting at a predetermined time and ends at the indefinite future. Each NRT-IT represents a start time and a duration period that may be indefinite. Each NRT-IT instance may be divided into 256 sections. Each section includes information on a plurality of content items. Information of a specific content item cannot be divided and stored in at least two sections.

The downloadable content item, which is more extended than a period that at least one NRT-IT instance takes, is the first of NRT-IT. The content item description is stored in NRT_information_table_section ( ) in an availability order. Accordingly, when a value of last_section_number is greater than 0 (it means that NRT-IT is transmitted to a plurality of sections), all content item description in a specific section not the first section may have the same as or higher availability than the content item description of the next section.

Each NRT-IT identifies an NRT service related to a specific value of a valid service_id in a specific virtual channel during the period.

A num_items_in_section field (8 bits) represents the number of content items described in an NRT-IT section.

A content_linkage field (16 bits) represents an identification number within a range from 0x0001 to 0xFFFF. 0x0000 is not used. content_linkage is a linkage function for two: this links at least one file of FLUTE FDT related to NRT service with metadata of NRT-IT and forms TF_id (identifier for Text Fragement in Text FragmentTable). A value of a content_linkage field corresponds to a value of an FDT-Cotent-Linkage element or a value of a File-Content-Linkage element in FLUTE FDT of each file related to a content item. A priority rule is applied when each content linkage value including a corresponding content linkage element in FLUTE FDT is matched.

content_descriptor is a descriptor that is additionally applied to each content item.

FIG. 17 is a view illustrating a syntax structure of bit stream for NRT section (NRT_content_table_section) according to an embodiment. Detailed description of each field in the NCT section is as follows.

In FIG. 17, a table_id field (8 bits) as the identifier of a table includes an identifier identifying NCT.

A content_id field (16 bits) indicates an identifier uniquely identifying the content (or file).

That is, the receiver uses the NCT to obtain configuration information on NRT content/file, and provides a guide for the NRT/file on the basis of the obtained configuration information on NRT content/file. Moreover, the receiver obtains access information of FLUTE session, which transmits the content/file selected by the guide, from NST, and receives the selected content by using the obtained FLUTE session access information.

Moreover, the present invention may include container information, encoding information, and decoding parameters of media objects, necessary for rendering of the content/files constituting NRT service, in the NCT, and then transmit it. Accordingly, a receiving system extracts the container information, the encoding information, and the decoding parameters of media objects by each content, necessary for rendering of the corresponding content/files, and uses them in rendering.

FIG. 18 is a view illustrating a bit stream syntax structure of an SMT session providing signaling information on NRT service data according to an embodiment.

Here, the corresponding syntax is created in an MPEG-2 private section format to help understanding, but the format of the corresponding data may vary.

The SMT describes signaling information (or signaling information of NRT service) and IP access information of a mobile service in Ensemble in which SMT is transmitted. The SMT uses Transport_Stream_ID, i.e., an identifier of broadcast stream including each service, and provides broadcasting stream information of a corresponding service. Furthermore, SMT includes description information of each mobile service (or NRT service) in one Ensemble, and includes other additional information in a descriptor area.

As mentioned above, the SMT session may be included as the IP stream format in the RS frame, and then, transmitted. In this case, RS frame decoders of a receiver describe later decode inputted RS frames, and outputs the decoded RS frames as a corresponding RS frame handler. Moreover, each RS frame handler divides the inputted RS frame by a row unit to constitute M/H TP, and outputs it as an M/H TP handler.

In addition, examples of fields transmitted through SMT are as follows.

A table_id field (8 bits) is a field indicating a table type, and through this, it is confirmed that this table section is a table section in SMT.

A num_services field (8 bits) indicates the number of services in an SMT session. At least one mobile service, at least one NRT service, or mobile and NRT services may be received through Ensemble having the SMT. If only NRT services are transmitted through the Ensemble having SMT, it may indicate the number of NRT services in the SMT.

Later, a 'for' loop (or a service loop) is performed as many times as the number of services corresponding to the num_service field value, to provide signaling information on a plurality of services. That is, signaling information of a corresponding service is displayed by each service in the SMT session. Here, the service may be mobile or NRT service. At this point, the following field information may be provided to each service.

A service_id field (16 bits) represents a value uniquely identifying a corresponding service (A 16-bit unsigned integer number that shall uniquely identify this service within the scope of this SMT section.). The service_id of a service shall not change throughout the life of the service.

If a service is terminated, then the service_id for the service should not be used for another service until after a suitable interval of time has elapsed. Here, if the service is NRT service, the service_id may identify the NRT service.

A short_service_name_length field (3 bits) represents the length of a short service name in a short_service_name field in byte unit.

A short_service_name field represents a short name of a corresponding service. For example, if the service is mobile service, a short name of the mobile service is displayed, and if it is NRT service, a short name of the NRT service is displayed.

A service_category field (6 bits) identifies a type category of a corresponding service. If a value of a corresponding field is set with a value indicating "informative only", it is dealt as an informative description for the category of the service. And, a receiver is required to test a component_level_descriptors( ) field of SMT in order to identify an actual category of the received service. The service_category field has an NTP time based component for services having video and/or audio component.

Especially, in regards to the present invention, if a service_category field value has '0x0E', a corresponding service indicates NRT service. In this case, it is indicated that signaling information of service currently described in an SMT session is signaling information of NRT service.

If the service is NRT service, the Source_IP_address field becomes a source IP address of the same server transmitting all channels of the FLUTE session.

Additionally, SMT provides information on a plurality of components by using a 'for' loop.

Later, a 'for' loop (or a component loop) is performed as many times as the number of components corresponding to the num_components field value, to provide access information on a plurality of components. That is, access information on each component in a corresponding service is provided. At this point, the following field information on each component may be provided. Here, one component corresponds to one FLUTE session according to an embodiment.

A num_component_level_descriptors field (4 bits) indicates the number of descriptors providing additional information on a component level.

component_level_descriptor( ) fields are included in the component loop as many as a number corresponding to the num_component_level_descriptors field value, so that additional information on the component is provided.

A num_service_level_descriptors field (4 bits) indicates the number of descriptors providing additional information on a corresponding service level.

service_level_descriptor( ) fields are included in the service loop as many as a number corresponding to the num_service_level_descriptors field value, so that additional information on the service is provided. If the service is mobile service, additional information on the mobile service is provided, and if it is NRT service, additional information on the NRT service is provided.

A num_ensemble_level_descriptors field (4 bits) indicates the number of descriptors providing additional information on an ensemble level.

ensemble_level_descriptor( ) fields are included in the ensemble loop as many as a number corresponding to the num_ensemble_level_descriptors field value, so that additional information on the ensemble is provided.

Moreover, component_descriptor( ) as component_level_descriptors( ) may be provided to SMT of FIG. 18.

The component_descriptor( ) is used as one of component_level_descriptors( ) of SMT, and describes additional signaling information of a corresponding component.

Accordingly, in relation to mobile NRT service, signaling information necessary for receiving a corresponding FLUTE session may be provided using the component descriptor of FIG. 14.

For example, if a component_type field value of the component descriptor of FIG. 14 is 38, a component_data (component_type) field provides data for FLUTE file delivery as shown in FIG. 15. Since each field description of FIGS. 14 and 15 is made above, overlapping descriptions will be omitted.

FIG. 19 is a view illustrating an FDT schema for mapping a file and content_id according to an embodiment. FIG. 20 is a view illustrating an FDT schema for mapping a file and content_id according to another embodiment. They represent an FDT instant level entry file designating method. NRT content includes a plurality of files. However, since each file has no mark, it is difficult to search a file related to NRT content. Accordingly, as shown in FIGS. 19 and 20, content_id is inserted into FDT in each file.

Hereinafter, an FDT instance level means, if a common attribute of all files declared in FDT needs to be defined, a level including a definition portion for the common attribute. An FDT file level may mean a level including definition for an individual attribute of each file.

A receiver identifies whether a service transmitted through a corresponding channel is an SMT based NRT service. Additionally, the receiver identifies a content item and file of the corresponding NRT service.

As mentioned above, although the receiver may identify a file and content item in the NRT service, it does not have information on files of the content item and thus cannot match them. Accordingly, the receiver may not process the NRT service.

Accordingly, the present invention provides a method of identifying whether a content item is related. That is, a corresponding method shows what kinds of files are included in a content item. In this case, the receiver may properly process the received NRT service. Accordingly, the corresponding method may be designated on the basis of FDT information in FLUTE session transmitting NRT service. For example, each file constituting a content item is identified on the basis of a content-location and TOI field designated in the FLUTE session. content_id in FDT is matched to a content identifier (content_id) of NCT or a content identifier of content fragment in OMB BCAST SG.

Referring to FIGS. 19 and 20, a portion indicated with 1 declares a content identifier in an FDT-Instance level, and this declared content identifier is assigned to all files declared in a corresponding FDT-Instance. Of course, this information may be overridden by assigning a new content identifier in a file level. Or, if a specific file belongs to another content item not a content item defined in the FDT-Instance level, this may be notified through assigning a file level content_id described below. This embodiment expresses content_id in 16 bits.

In relation to a portion indicated with 2, when a file in the FDT Instance is included different content items with content_id declaration in a file level, this method signals which file, all files of a content item and content, belongs to which entry.

A portion 3 is a method of notifying whether a corresponding file for each file is an entry file. That is, a file corresponding to a root file, which is played first among several files constituting a content item or is necessarily executed first to access a content item is called an entry file, and represents a method of notifying this information. An entry attribute may be omitted, and its default value is false. When it is omitted, it means that a corresponding file is not an entry file. "Entry" is a head of a file that needs to be processed to execute the file. For example, "index.html" may be an "entry". Accordingly, an entry file may be set with 'true" and other files are set with "false". Through the entry file, transmitting the same file repeatedly may be effectively controlled. Once a file is downloaded, the entry file indicates a file of content for another reference, so that there is no need to download it in another or an additional instance.

A specific file functions as an entry in a specific group as a group related to a file level signals whether entry is possible, but its corresponding role may fail in another group. When a content identifier is assigned in an FDT-instance level, a method of notifying an entry file may be considered as the following two methods.

1) A method of additionally assigning a file level content identifier to a file corresponding to an entry file and setting its entry attribute with true: in this case, a content identifier is duplicated in an FDT-Instance level and a file level, but has the most flexible structure. That is, although one of the File-level and FDT-instance level may designate content_id, if another content_id is designated together in the File-level and FDT-instance, the content_id of the File level has priority to that of the FDT-instance level.

2) like another embodiment of the FDT schema of FIG. 20, files functioning as an entry file may be directly referenced in content identifier definition in the FDT-instance level. For this, according to the embodiment of FIG. 20, FDT-Content-ID-Type is additionally defined for an FDT-instance level content identifier, and as shown in the portion 2, extends to include a content location of an entry file. In the case of the portion 2, an entry level is defined with its content_id. For example, each content_id shows which entry file exists.

In this method, content-location is duplicated so signaling may be problematic, but entry file configuration information may be immediately obtained by each content item.

Figure 21:
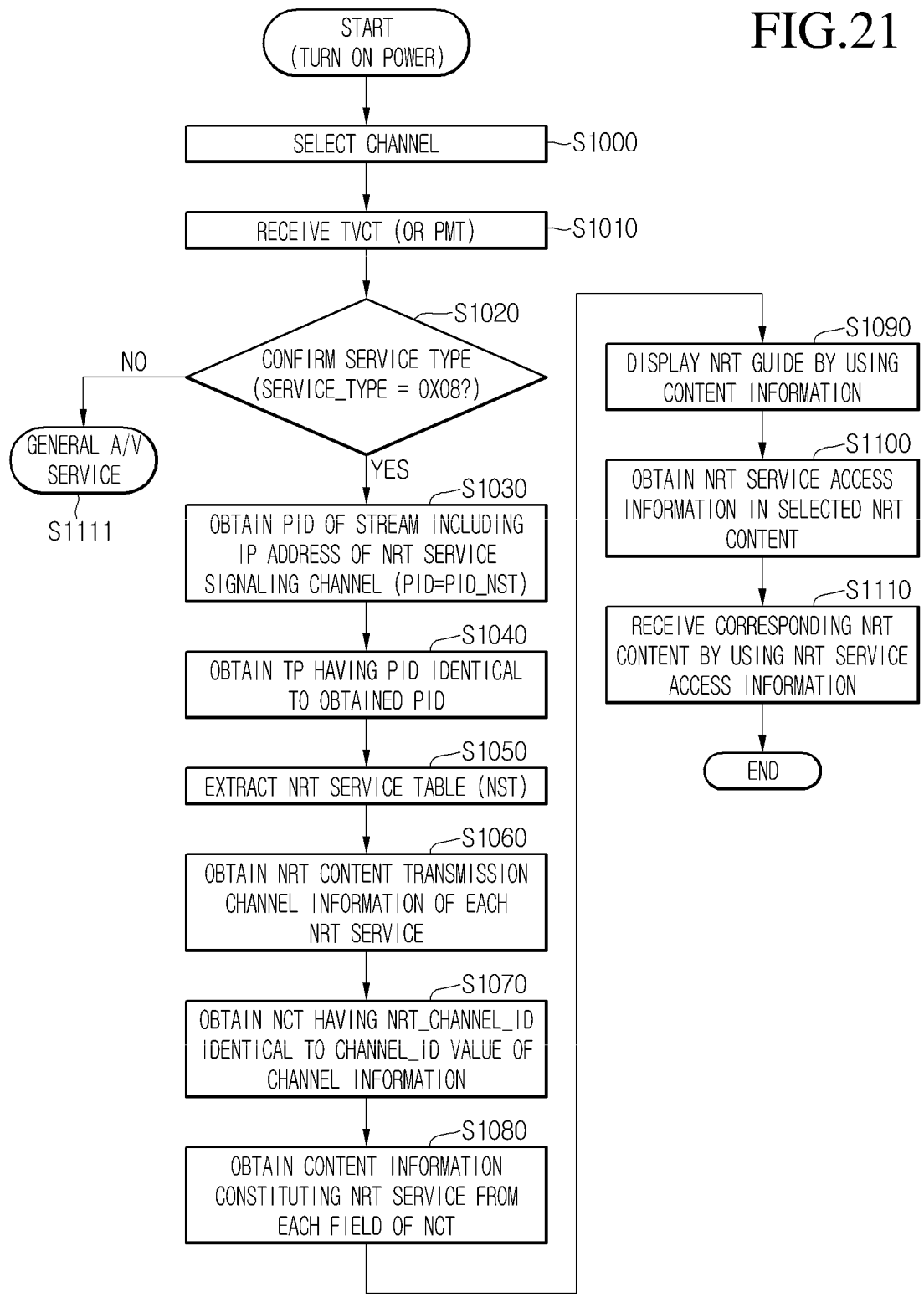
FIG. 21 is a flowchart illustrating an operation of a receiver according to an embodiment.

FIG. 21 is a flowchart illustrating an operation of a receiver according to an embodiment.

Referring to FIG. 21, according to an embodiment, a receiver receives NRT service signaling data through an NRT service signaling channel, displays NRT guide information on the basis of the received NRT service signaling data, and receives NRT service data for the selected NRT content, in order to provide NRT service.

First, once the receiver is turned on, a user selects a channel in operation S1000. Then, a physical transmission channel is turned according to the selected channel.

Then, VCT and PMT are obtained from a broadcast signal received through the tuned physical transmission channel in operation S1010. Then, it is confirmed in operation S1020 whether there is NRT service by parsing the obtained TVCT (VCT). This is confirmed by checking the service_type field value in a virtual loop of the VCT. For example, if a service_type field has 0x08, there is NRT service. Moreover, if not 0x08, since a corresponding virtual channel does not transmit the NRT service, a proper operation such as general A/V service may be performed according to information in the virtual channel in operation S1111.

Moreover, if it is determined that there is NRT service, since a corresponding virtual channel transmits NRT service, PID(PID=PID_NST) matching to a specific PID (PID_NST) of stream including a well known IP address for NRT service signaling channel address is obtained in operation S1030.

Moreover, the receiver receives a Transport Packet (TP) having the same PID as the obtained PID value (PID_NST) in operation S1040.

Then, the receiver extracts NRT service signaling data including a NRT service table (NST) from the received TP, or extracts an IP address for the NRT service signaling channel access from the received TP, in order to receive NRT service signaling data transmitted in another format through an IP layer in operation S1050.

Then, the receiver obtains channel information on NRT service data transmission by each NRT service from NST in operation S1060.

Then, the receiver obtains an NRT content table (NCT) including an NRT_channel_id field value identical to a value of Channel_id, an identifier of the obtained channel information, from the NRT service signaling data in operation S1070.

Then, the receiver obtains content information on NRT content constituting each NRT service from each field of the obtained NCT in operation S1080. For example, the content information may include at least one of content_delevery_bit_rate, content_available_start_time, content_available_end_time and content_title_text( ) fields according to an embodiment of the NCT.

Then, the receiver displays NRT guide information by using content information in operation S1090. A user may select NRT content to use or be received, from the displayed NRT guide information.

Then, the receiver obtains NRT service access information having the selected NRT content from NST in operation S1100. The NRT service access information may include channel information or IP address information for receiving NRT service data, for example.

Moreover, the receiver receives a corresponding NRT content in operation S1110 by using the obtained NRT service access information after accessing a channel or server for transmitting NRT service, and performs a proper operation according to the NRT content.

Figure 22:
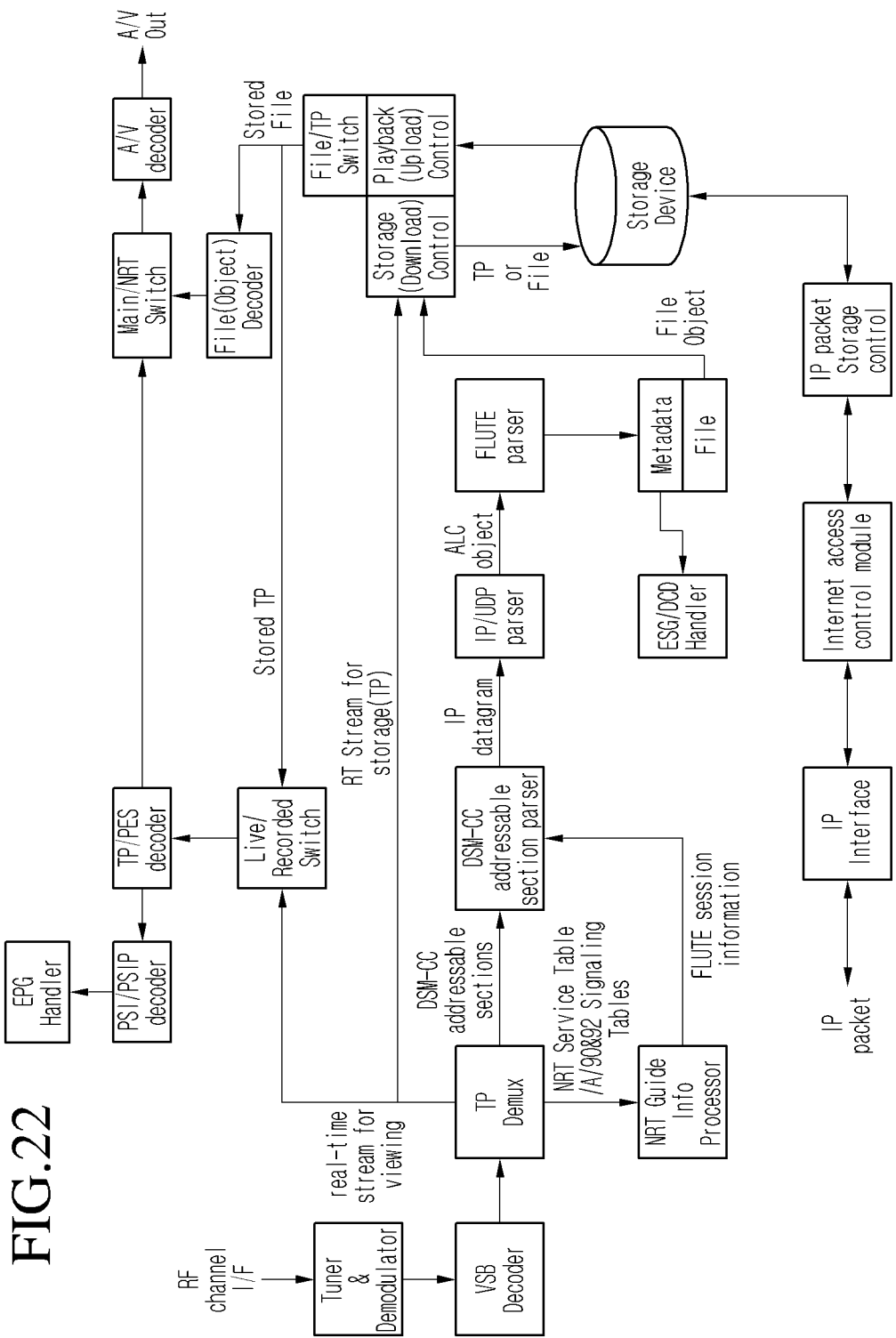
FIGS. 22 and 23 are views illustrating a receiving system receiving, storing, and playing an NRT content for NRT service according to another embodiment.
Figure 23:
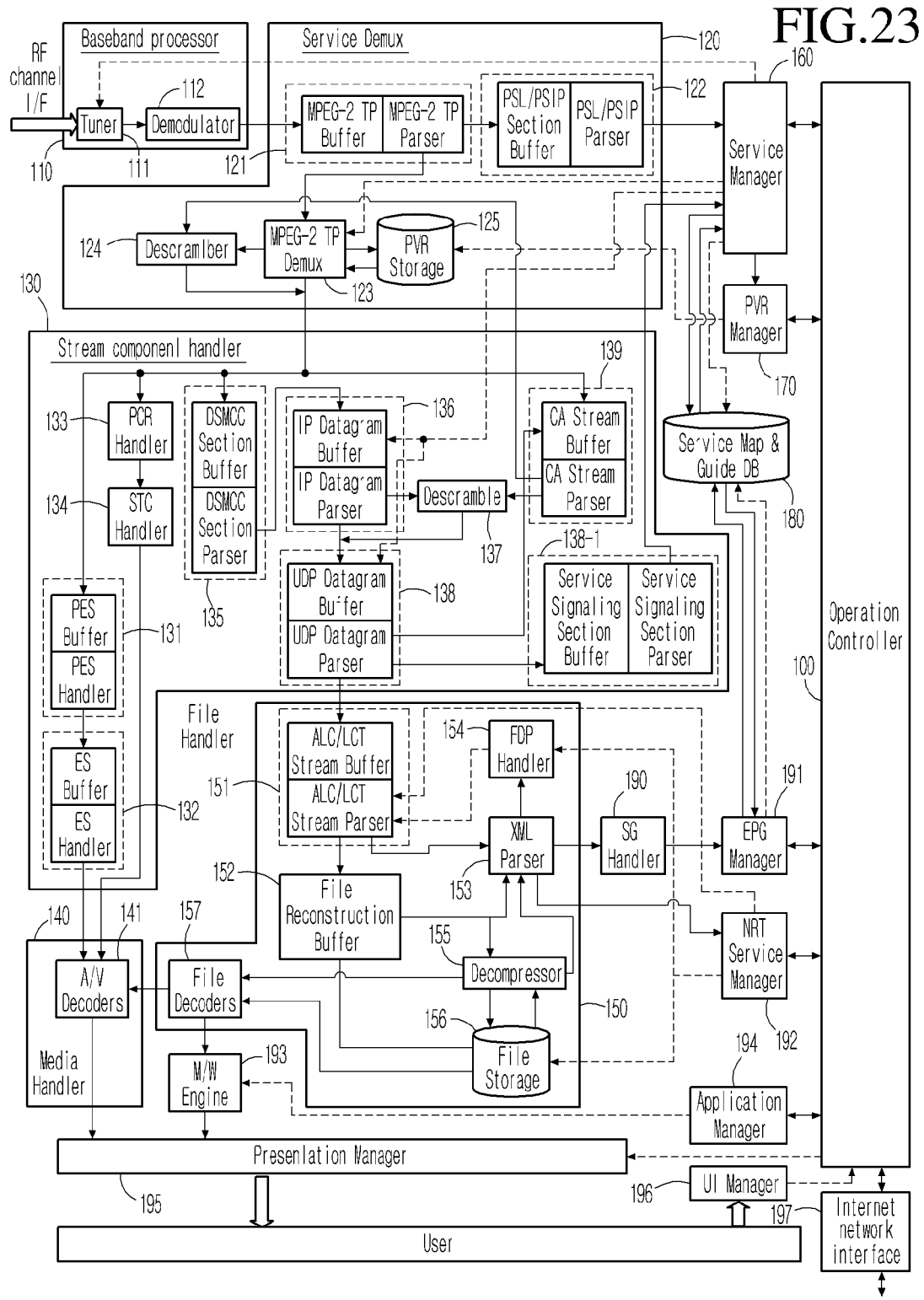

FIGS. 22 and 23 are views illustrating a receiving system receiving, storing, and playing an NRT content for NRT service according to another embodiment.

The receiver of FIG. 23 may include an operation controlling unit 100, a baseband processing unit 110, a service demultiplexer 120, a stream component handler 130, a media handler 140, a file handler 150, a service manager 160, a PVR manager 170, a first storage unit 180, an SG handler 190, an EPG manager 191, an NRT service manager 192, an application manager 194, a middleware engine 193, a presentation manager 195, and a User Interface (UI) manager 196.

The baseband processing unit 110 may include a tuner 111 and a demodulator. The service demultiplexer 120 may include an MPEG-2 TP handler 121, a PSI/PSIP handler 122, an MPEG-2 TP demultiplexer 123, a descrambler 124, and a second storage unit 125.

The stream component handler 130 may include a Packetized Elementary Stream (PES) demodulator 131, an Elementary Stream (ES) demodulator 132, a PCR handler 133, a STC handler 134, a DSM-CC addressable section handler 135, an IP datagram handler 136, a descrambler 137, a UDP handler 138, a service signaling section handler 138-1, and a Conditional Access System (CAS) 139.

The media handler 140 may include an A/V demodulator 141. The file handler 150 may include an ALC/LCT stream handler 151, a file reconstruction buffer 152, an XML parser 153, an FDT handler 154, a decompressor 155, a third storage unit 156, and a file decoder 157.

In FIG. 23, the tuner 111 tunes a broadcast signal of a desired channel among broadcast signals received through a terrestrial wave according to a control of the service manager 160, and then down-converts the tuned broadcast signal into an Intermediate Frequency (IF) signal to output it to the demodulator 112. The tuner 111 may receive real-time stream and non-real-time stream. The non-real-time stream is called an NRT stream in the present invention.

The demodulator 112 performs automatic gain control, carrier recovery, and timing recovery on a digital IF signal of a pass band inputted from the tuner 111, converts the digital IF signal into a baseband signal, and performs channel equalization. For example, when the broadcast signal is a VSB modulation signal, a VSB demodulation process is performed for automatic gain control, carrier recovery, and timing recovery.

The demodulated and channel-equalized data in the demodulator 112 is outputted to the MPEG-2 TP handler 121 in an MPEG-2 Transport Stream (TS) packet format.

The MPEG-2 TP handler 121 includes an MPEG-2 TP buffer and an MPEG-2 TP parser, and analyzes a TS header after temporarily storing an output of the demodulator 112. Then, if an output of the demodulator 112 is an A/V TS packet for real time or an NRT TS packet, it is outputted to the demultiplexer 123, and if it is a TS packet for PSI/PSIP table, it is outputted to the PSI/PSIP handler 122.

The PSI/PSIP handler 122 includes a PSI/PSIP section buffer and a PSI/PSIP parser, and after temporarily storing a TS packet outputted from the MPEG-2 TP handler 121, restores and parses a corresponding table from PSI/PSIP section data in a payload of the TS packet, with reference to a table identifier. At this point, it is determined whether one table includes one section or a plurality of sections through a table_id field, a section_number field, and a last_section_number field in a corresponding section. Also, sections having the same table identifier are collected to complete a corresponding table. For example, sections having a table identifier allocated to VCT are collected to complete VCT. Moreover, the parsed information of each table is collected by the service manager 160 to be stored in the first storage unit 180. Table information such as VCT, PAT, PMT, and DST are stored in the first storage unit through the above processes. The service manager 160 stores the table information in the first storage unit 180 in a service map and guide data format.

The demultiplexer 123, if the inputted TS packet is an A/V TS packet in real time, divides the TS packet into an audio TS packet and a video TS packet, and then outputs them into the PES decoder 131. If the inputted TS packet is an NRT TS packet, it is outputted to the DSM-CC handler 135. Additionally, the demultiplexer 123, if the TS packet includes a Program Clock Reference (PCR), outputs it to the PCR handler 133, and if it includes Conditional Access (CA) information, outputs it to the CAS 139. An NRT TS packet includes a TS packet having NRT service data and a TS packet having NRT service signaling channel. A unique PID for identifying the NRT service is allocated to a TS packet of the NRT service data, and PID of a TS packet including the NRT service signaling channel is extracted using DST and PMT.

The demultiplexer 123, if a payload of the inputted TS packet is scrambled, outputs it to the descrambler 124, and then, the descrambler 124 receives information (control words used for scramble) necessary for descramble from the CAS 139, and performs descramble on the TS packet.

The demultiplexer 123 stores an A/V packet in real time, inputted at the one request of temporary recording, scheduled recording, and time shift, in the second storage unit 125. The second storage unit 125 is a mass storage medium and may include HDD, for example. The second storage unit 125 performs downloading (i.e., storing) and updating (i.e., playing) according to a control of the PVR manager 170.

The demultiplexer 123 separates an audio TS packet and a video TS packet from the A/V TS packet updated from the second storage unit and then outputs them to the PES decoder 131 at the playing request.

The demultiplexer 123 is controlled by the service manager 160 and/or the PVR manager 170 to perform the above processes.

That is, if a service_type field value in VCT indicates that NRT service is transmitted, the service manger 160 extracts identification information of each NRT service from NRT_service_descriptor( ) received from a virtual channel loop of the VCT and stores it, and then extracts DST PID from a service location descriptor (or an ES loop of PMT) of the VCT to receive DST.

Then, NRT service is identified from the received DST, and PID of an MPEG-2 TS packet including the NRT service signaling channel is extracted to receive the identified NRT service by using DST and PMT. The extracted PID is outputted to the demultiplexer 123. The demultiplexer 123 outputs MPEG-2 TS packets corresponding to PID, outputted from the service manager 160, to the addressable section handler 135.

The PCR is a time reference value used for time synchronization of audio ES and video ES in the A/V decoder 141. The PCR handler 133 restores PCR in the payload of the inputted TS packet and outputs it to the STC handler 134. The STC handler 134 restores System Time Clock (STC), i.e., a reference clock of a system, from the PCR, and outputs it to the A/V decoder 141.

The PES decoder 131 includes a PES buffer and a PES handler, and after temporarily storing an audio TS packet and a video TS packet, removes a TS header from the TS packet to restore audio PES and video PES. The restored audio PES and video PES are outputted to the ES decoder 132. The ES decoder 132 includes an ES buffer and an ES handler, and removes each PES header from audio PES and video PES to restore audio ES and video ES, i.e., pure data. The restored audio ES and video ES are outputted to the A/V decoder 141.

The A/V decoder 141 decodes the audio ES and video ES through each decoding algorithm to restore a previous state of compression, and then outputs it to the presentation manager 195. At this point, time synchronization is performed when audio ES and video ES are decoded according to the STC. As one example, an audio decoding algorithm includes at least one an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm. A video decoding algorithm includes at least one of an MPEG 2 video decoding algorithm, an MPEG 4 video decoding algorithm, an H.264 decoding algorithm, an SVC decoding algorithm, and a VC-1 decoding algorithm.

The CAS 139 includes a CA stream buffer and a CA stream handler, and after temporarily storing a TS packet outputted from the MPEG-2 TP handler or service protection data restored and outputted from a UDP datagram handler 138, restores information (for example, control words used for scramble) necessary for descramble from the stored TS packet or service protection data. That is, Entitlement Management Message (EMM) and Entitlement Control Message (ECM) in the payload of the TS packet are extracted and information necessary for descramble is obtained by analyzing the extracted EMM and ECM. The ECM may include a control word (CW) used in scramble. At this point, the control word may be encrypted using an encryption key. The EMM may include an encryption key and qualification information of corresponding data. Information necessary for descramble obtained from the CAS 139 is outputted to the descrambler 124 and 137.

The DSM-CC section handler 135 includes a DSM-CC section buffer and a DSM-CC section parser, and after temporarily storing a TS packet outputted from the demultiplexer 123, restores an addressable section in the payload of the TS packet. After restoring IP datagram by removing a header and CRC checksum of the addressable section, the restored IP datagram is outputted to the IP datagram handler 136.

The IP datagram handler 136 includes an IP datagram buffer and an IP datagram parser. After buffering IP datagram delivered from the DSM-CC section handler 135, the IP datagram handler 136 extracts and analyzes a header of the buffered IP datagram to restore UDP datagram from the payload of the IP datagram, and then, outputs it to the UDP datagram handler 138.

At this point, if the IP datagram is scrambled, the scrambled UDP datagram is descrambled in the descrambler 137 and then is outputted to the UDP datagram handler 138. As one example, the descrambler 137 receives information (e.g., a control word used for scramble) necessary for descramble from the CAS 138 and performs descramble on the UDP datagram to output it to the UDP datagram handler 138.

The UDP datagram handler 138 includes an UDP datagram buffer and a UDP datagram parser. After buffering IP datagram delivered from the IP datagram handler 136 or the descrambler 137, the UDP datagram handler 138 extracts and analyzes a header of the buffered UDP datagram to restore the data included in the payload of the UDP datagram. At this point, if the restored data is service protection data, it is outputted to the CAS 139; if the restored data is NRT service signaling data, it is outputted to the service signaling section handler 138-1; and if the restored data is NRT service data, it is outputted to the ALC/LCT stream handler 151.

That is, access information on the IP datagram transmitting the NRT service signaling channel is a well-known destination IP address and a well-known destination UDP port number.

Accordingly, the IP datagram handler 136 and the UDP datagram handler 138 include a well-known destination IP multicast address and a well-known destination UDP port number, and extracts an IP multicast stream transmitting an NRT service signaling channel, i.e., NRT service signaling data, to output it to the service signaling section handler 138-1.

Moreover, the service signaling section handler 138-1 includes a service signaling section buffer and a service signaling section parser, and restores and parses NST from the NRT service signaling data to output it to the service manager 160. When the NST is parsed, access information of the FLUTE session that transmits content/files constituting NRT service and signaling information necessary for rendering the NRT service may be extracted. For example, information necessary for rendering content/files of the NRT service, transmitted from the NST to each FLUTE session, may be extracted. Information necessary for rendering the content/files of the NRT service may include container information, encoding information, or decoding parameters of a media object.

The parsed information from the NST is collected by the service manager 160, and then, stored in the first storage unit 180. The service manager 160 stores the extracted information from the NST in the first storage unit 180 in a service map and guide data format. As another example, the NRT service manager 182 may serve as the service manager 160. That is, the parsed information from the NST is collected by the NRT service manager 192, and then, stored in the first storage unit 180.

The ALC/LCT stream hander 151 includes an ALC/LCT stream buffer and an ALC/LCT stream parser, and after buffering data having an ALC/LCT structure outputted fro the UDP datagram handler 138, analyzes a header and header extension of an ALC/LCT session from the buffer data. On the basis of the analysis result of the header and header extension of the ALC/LCT session, if data transmitted to the ALC/LCT session has an XML structure, it is outputted to the XML parser 153. If the data has a file structure, after being temporarily stored in the file reconstruction buffer 152, it is outputted to the file decoder 157 or stored in the third storage unit 156. The ALC/LCT stream handler 151 is controlled by the NRT service manager 192 if data transmitted to the ALC/LCT session is data for NRT service. At this point, if data transmitted to the ALC/LCT session is compressed, after decompressed in the decompressor 155, it is outputted to at least one of the XML parser 153, the file decoder 157, and the third storage unit 156.

The XML parser 153 analyzes XML data transmitted through the ALC/LCT session, and if the analyzed data is for a file based service, it is outputted to the FDT handler 154. If the analyzed data is for service guide, it is outputted to the SG handler 190.

The FDT handler 154 analyzes and processes a file description table of the FLUTE protocol through an ALC/LCT session. The FDT handler 154 is controlled by the NRT service manager 192 if the received file is for NRT service.

The SG handler 190 collects and analyzes data for service guide transmitted in the XML structure and then output it to the EPG manager 191.

The file decoder 157 decodes a file outputted from the file reconstruction buffer 152, a file outputted from the decompressor 155, or a file uploaded from the third storage unit 156 through a predetermined algorithm, thereby outputting it to the middleware engine 193 or the A/V decoder 141.

The middleware engine 193 interprets and executes data having a file structure, i.e., application. Moreover, the application may be outputted to a screen or speaker through the presentation manager 195. The middleware engine 193 is a JAVA based middleware engine according to an embodiment.

The EPG manager 191 receives service guide data from the SG handler 190 according to a user input, and then, converts the received service guide data into a display format to output it to the presentation manager 195. The application manager 194 performs general managements on processing application data received in the format such as a file.

The service manager 160 collects and analyzes PSI/PSIP table data or NRT service signaling data transmitted to an NRT service signaling channel to create a service map, and then stores it in the first storage unit 125. Additionally, the service manager 160 controls access information on NRT service that a user wants, and also controls the tuner 111, the demodulator 112, and the IP datagram handler 136.

The operation controller 100 controls at least one of the service manager 160, the PVR manger 170, the EPG manager 191, the NRT service manager 192, the application manager 194, and the presentation manager 195 according to a user command, and thus, performs a function that a user wants.

The NRT service manager 192 performs general management on NRT service transmitted in a content/file format through the FLUTE session on an IP layer.

The UI manager 196 delivers a user input to the operation controller 100 through UI.

The presentation manager 195 provides to a user through at least one of a speaker and a screen at least one of audio/video data outputted from the A/V decoder 141, file data outputted from the middleware engine 193, and service guide data outputted from the EPG manager 191.

Moreover, one of the service signaling section handler 138-1, the service manager 160, and the NRT service manager 192 obtains content constituting the NRT service or IP access information on the FLUTE session transmitting a file, from a FLUTE session loop of NST (or an a component loop of NST). Additionally, the one obtains FLUTE level access information from component_descriptor( ) received in the component loop of the NST.

Then, the ALC/LCT stream handler and the file decoder 157 access the FLUTE file delivery session by using the obtained FLUTE level access information to collect files in the session. Once the files are collected, they constitute one NRT service. This NRT service may be stored in the third storage unit 156, or outputted to the middleware engine 193 or the A/V decoder 141 to be displayed on a display device.

The third storage unit 158, i.e., a storage medium storing a file such as NRT service data, may be shared with the second storage unit 125, or may be separately used.

Figure 24:
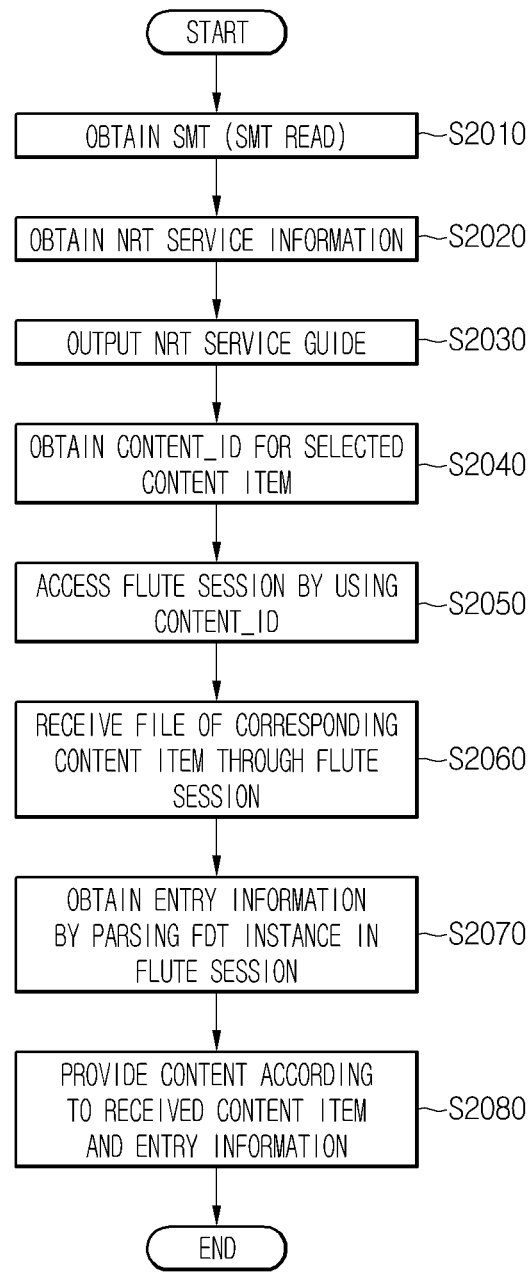
FIG. 24 is a flowchart illustrating a method of a receiver to receive and provide NRT service according to an embodiment.

FIG. 24 is a flowchart illustrating a method of a receiver to receive and provide NRT service according to an embodiment.

The receiver may obtain NRT service signaling information through an NRT service signaling channel or by receiving IP datagram in the case of mobile NRT service, and obtains SMT from the NRT service signaling information in operation S2010.

Then, the receiver obtains NRT service information from SMT in operation S2020. The NRT service information may be obtained by parsing NRT_service_info_descriptor in a service level descriptor loop. The obtained NRT service information may include requirement information on an application type for each NRT service or other NRT services.

Later, the receiver outputs NRT service guide on the basis of the obtained NRT service information in operation S2030. The NRT service guide may include application and service category information on each service. Additionally, detailed information may be further displayed on the basis of each field of NRT service info descriptor. The detailed information may include capacity information on corresponding NRT service according to a storage requirement field or audio or video codec information on corresponding NRT service according to an audio_codec_type or video_codec_type field. A user may select NRT service to receive and use it on the basis of the information in the service guide.

Then, the receiver obtains identifier (content_id) for content items constituting the selected NRT service from NCT in operation S2040. The receiver obtains NRT_service_id corresponding to the selected NRT service from SMT, obtains NCT having the same NRT_channel_id value as the obtained NRT_service_id, and obtains an identifier (content_id) for content items constituting a corresponding NRT service through the obtained NCT.

Then, the receiver accesses the FLUTE session to receive a file constituting the corresponding content item by using the obtained content item identifier (content_id) in operation S2050. Since each file constituting the content item is matched to TOI or a content location field of FDT in the FLUTE session, the receiver receives a file of a corresponding content item by using the FLUTE session in operation S2060. The receiving of the file may include receiving a corresponding file or object when a Content-ID attribute field for a corresponding file is identical to the obtained content_id after reading FDT in a corresponding FLUTE session.

Additionally, the receiver parses FDT instances in a corresponding FLUTE session to obtain a list of files corresponding to the content item. Moreover, the receiver obtains entry information including a list of files serving as an entry among lists of files.

Lastly, the receiver provides NRT service to a user on the basis of the receiver content item and the list of files corresponding thereto or entry information in operation S2080.

The content downloaded through the NRT service may be used at the timing that a user wants, being separated from real-time broadcasting.

Additionally, after transmitting NRT service in advance and storing it in a receiver, a broadcasting station may designate a content item of the corresponding NRT service, which is executed at the timing of when a specific real-time broadcasting is transmitted or the NRT service is displayed. According to an embodiment of the present invention, the NRT service may include content, which is downloaded in advance linking with real-time broadcasting and executed at the specific timing. Additionally, according to an embodiment of the present invention, the NRT service may include content, which is prepared in advance to execute specific NRT service at the specific timing. An NRT service content triggered at the specific timing linked with real-time broadcasting to execute a specific action for a specific NRT service is called a Triggered Declarative Object (TDO). Accordingly, an NRT service application is classified as a non-real time declarative object (NDO) or a triggered declarative object (TDO) according to whether it is executed at the specific timing.

According to an embodiment of the present invention, a broadcasting station may transmit trigger information on trigging the TDO. The trigger information may include information on performing a specific action for a specific TDO at the specific timing.

Additionally, the trigger information may include trigger signaling data (trigger signaling information) for signaling a trigger, and trigger data constituting a trigger. Additionally, data stream transmitting trigger data may be designated as trigger stream. Also, the trigger data may mean itself.

Such a trigger may include at least one of a trigger identifier for identifying a trigger, a TDO identifier for identifying NRT service for trigger, and action information and trigger time on TDO.

The trigger identifier may be an identifier uniquely identifying a trigger. For example, a broadcasting station may include at least one trigger in broadcasting program information of a predetermined time provided through EIT. In this case, the receiver may perform an action on the trigger target TDO at the timing designated for each trigger on the basis of at least one trigger. At this point, the receiver may identify each trigger by using a trigger identifier.

A TDO identifier may be an identifier for identifying an NRT service content, i.e., a target of trigger. Accordingly, the TDO identifier may include at least one of a trigger NRT service identifier (NRT_service_id), content linkage (content_linkage), and URI or URL of an NRT content item entry. Moreover, the TDO identifier may include a target identifier (target_service_id) for identifying a trigger target TDO described later.

Additionally, TDO action information may include information on action for TDO of a trigger target. The action information may be at least one of execution, termination, and extension commands of the target TDO. Additionally, the action information may include commands for generating a specific function or event in the target TDO. For example, if the action information includes the execution command of the target TDO, a trigger may request the activation of the target TDO to the receiver.

Additionally, if the action information includes the extension command of the target TDO, a trigger may notify the receiver that the target TDO would extend. Additionally, if the action information includes the termination command of the target TDO, a trigger may notify the receiver that the target TDO would terminate. Thus, the broadcasting station may control a TDO operation in the receiver according to a real-time content through trigger.

Moreover, a trigger time may mean a time designated for performing (trigging) an action designated for the target TDO. Additionally, the trigger time may be synchronized with video stream in a specific virtual channel in order to link NRT service with real-time broadcasting. Accordingly, the broadcasting station may designate a trigger time with reference to PCR that video stream refers. Accordingly, the receiver may trigger TDO at the timing that the broadcasting station designates with reference to PCR that video stream refers. Moreover, the broadcasting station may signal a trigger with a trigger identifier in a header of video stream in order to transmit accurate trigger time.

Additionally, the trigger time may be designated with UTC time. In the case of UTC time, the trigger time is not a relative time but an absolute time.

The trigger time may be accurate trigger timing or may include an approximate start time. Moreover, the receiver may prepare an action for target TDO in advance before accurate trigger timing by receiving approximate time. For example, the receiver may prepare TDO execution in advance so that TDO operates smoothly at the trigger time.

FIG. 25 is a view illustrating a bit stream syntax of a trigger according to an embodiment.

Here, trigger or trigger data is in a trigger table form, and a corresponding syntax is in an MPEG-2 private section form to help understanding. However, the format of corresponding data may vary. For example, the corresponding data may be expressed in a Session Description Protocol (SDP) format and signaled through a Session Announcement Protocol (SAP) according to another method.

A table_id field is set with 0XTBD arbitrarily, and identifies that a corresponding table section is a table section constituting a trigger.

A section_syntax_indicator field is set with 1 and indicates that the section follows a general section syntax.

A private_indicator field is set with 1.

A section_length field describes that the number of bits remaining in the section to the last of the section from immediately after the section_length field.

A source_id field represents the source of a program related to a virtual channel.

A TTT_version_number field represents version information of a trigger. Additionally, the version information of a trigger represents the version of a trigger protocol. The trigger version information may be used for determining where there is change in a trigger structure or a trigger itself. For example, the receiver determines that there is no trigger change if the trigger version information is identical. Additionally, the receiver determines that there a trigger change if the trigger version information is different. For example, the trigger version information may include a plurality of version numbers, and the receiver may determine whether there is a trigger change on the basis of some of the plurality of version numbers.

A current_next_indicator field represents that a corresponding table section is applicable currently if set with 1.

A section_number field indicates a number of a corresponding table section.

A last_section_number field means a table section of the last and highest number among sections.

A num_triggers_in_section field means the number of triggers in a corresponding table section. The number of triggers in one session may be one or in plurality. Additionally, the next 'for' loop is performed as many times as the number of triggers.

A trigger_id field represents an identifier uniquely identifying a trigger.

A trigger_time field represents a time for which a trigger is performed. Moreover, this field may not be included in the session, and in this case, the trigger time may be a time designated from broadcasting stream as mentioned above.

A trigger_action field represents action information of a trigger performed at the trigger time. A trigger action may include at least one of a preparation command for target TDO, a target TDO execution command, a target TDO extension command, and a target TDO termination command. The trigger action may further include a command generating a specific command or event.

A trigger_description_length field represents the length of trigger_description_text.

A trigger_description_text field represents description for a corresponding trigger in a text format.

A service_id_ref field represents an identifier identifying a target TDO of a trigger. Accordingly, for example, a service_id_ref field may indicate an NRT_service_id field of SMT or NST to identify NRT service of a trigger target TDO.

A content_linkage field represents an identifier identifying a target TDO content item of a trigger. For example, a content_linkage field may indicate a content_linkage field of NRT-IT or NCT to identify a target TDO content item of a trigger. Additionally, a service_id_ref field and a content_linkage field may be included in a class for indicating one target TDO.

A num_trigger_descriptors field represents the number of trigger descriptors.

A trigger_descriptor( ) field represents a descriptor including information on a trigger.

When a trigger is in a table format of the MPEG-2 private section, a broadcasting station may transmit one trigger according to a virtual channel.

A first method of a broadcasting station to transmit a trigger may include transmitting 0X1FF stream including the trigger table, i.e., PSIP basic PID. The first method may distinguish the trigger table from other tables by allocating table_id of the trigger table.

Moreover, a second method of transmitting a trigger includes allocating PID corresponding to a trigger table to a Master Guide Table (MGT) and transmitting a corresponding PID stream having the trigger table. The second method processes all tables in a corresponding PID stream by using the trigger table.

Moreover, according to an embodiment, at least one of trigger and trigger signaling information is transmitted through an MPEG-2 Packetized Elementary Stream (PES) in order to designate the accurate timing synchronized with video and audio as a trigger time.

Here, the video and audio synchronization of MPEG-2 PES will be described as follows. A receiver decoder operates in synchronization with a time stamp of a transmitter encoder. The encoder has a main oscillator, called a System Time Clock (STC), and a counter. The STC is included in a specific program and a main clock of program for video and audio encoders.

Moreover, if a video frame or an audio block occurs in an encoder input, STC is sampled. A sampling value and a constant value as much as delay of the encoder and decoder buffers are added to generate display time information, i.e., Presentation Time Stamp (PTS) and then are inserted into the first portion of a picture or audio block. When frame reordering occurs, Decode Time Stamp (DTS) representing a time at which data needs to be decoded in a decoder is inserted. Except for the frame reordering of the B picture, DTS and PTS are same. DTS is additionally required in the case of the frame reordering. When DTS is used, there is PTS always. They may be inserted at an interval of less than about 700 msec. Additionally, it is defined in ATSC that PTS and DTS are inserted at the starting portion of each picture.

Moreover, an output of an encoder buffer includes a time stamp such as Program Clock Reference (PCR) in a transport packet level. Moreover, a PCT time stamp occurs at an interval of less than 100 msec, and is used for synchronizing STC of a decoder and STC of an encoder.

Moreover, video stream and audio stream may have each PTS or DTS corresponding to a common STC, for synchronization of audio stream and the decoder. Accordingly, PTS and DTS indicate when audio stream and video stream are played at each decoding unit, and are used to synchronize audio and video.

For example, a decoder of receiver outputs a PES packet in the received TS stream as a video PES depacketizer, and outputs a PCR value inserted in a TS packet header to a PCR counter. The PCR counter counts 100 of the PCR value and outputs it to a comparison unit. Moreover, the video PES depacketizer outputs a header of a PES packet to a DTS/PTS extractor, buffers Elementary Stream, i.e., image data to be displayed, in an Elementary Stream Buffer&Decoder. The DTS/PTS extraction unit extracts DTS and PTS values from the PES packet header and outputs them to the comparison unit. The comparison unit, if the PCR value inputted from the PCR counter becomes a DTS value or the PCR value of 100 becomes a PTS value, outputs each signal for that to a decoding/display control unit. The decoding/display control unit receives a signal that the PCR value becomes the DTS value from the comparison unit, and decodes the image data buffered in the elementary stream buffer & decoder to store them in a decoded stream memory. Additionally, the decoding/display control unit displays the decoded image data stored in the decoded stream memory through a display unit when receiving the signal that the PCR value becomes the PTS value from the comparison unit Accordingly, MPEG-2 PES includes PTS and DTS in its header, which synchronize data transmitted during data transmission with one elementary stream (ES) or presentation time between a plurality of ES. This is called a synchronized data stream method.

That is, according to an embodiment, a broadcasting station includes trigger data or trigger stream in the payload of PES and designates trigger time as a PTS value of the PES packet header by using the above synchronized data stream method. In this case, the receiver may trigger a target TDO at the accurate timing according to the PCR value that PTS of PES including a trigger refers. Accordingly, a broadcasting station may synchronize a trigger at the accurate timing of audio and video presentation that the broadcasting station is to trigger by using the PTS of the PES packet header designated as a trigger time and the PTS of the audio and video PES packet header.

Moreover, in relation to the header of the PES stream packet including a trigger, a stream_type value may be 0x06 to indicate a synchronized data stream method, stream_id may indicate a identifier of a predetermined stream, and PES_packet_length may indicate the length of PES stream including the payload of PES stream.

Figure 26:
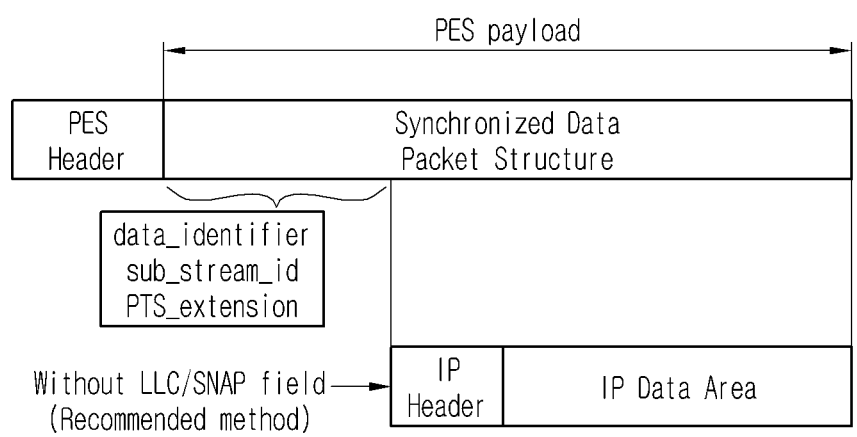
FIG. 26 is a view illustrating a PES structure according to a synchronized data stream method including a trigger according to an embodiment.

FIG. 26 is a view illustrating a PES structure according to a synchronized data stream method including a trigger according to an embodiment.

As shown in FIG. 26, PES of the synchronized data stream method may include a PES header and PES payload. The PES payload may include a synchronized data packet structure. As mentioned above, the trigger including a trigger table or another type of data may be included in the PES payload of FIG. 26 and then transmitted. Additionally, a broadcasting station may packetize the trigger in an IP datagram format, and may include and transmit the packetized trigger in an IP data area.

FIG. 27 is a view illustrating a synchronized data packet structure of PES payload for transmitting trigger as bit stream syntax according to an embodiment.

As shown in FIGS. 26 and 27, the trigger may be included in the synchronized data packet structure and then transmitted. Detailed description of each field in the structure is as follows.

A data_identifier field is an identifier identifying a type of data included in a PES data packet. This may be set with 0X22 according to a type.

A sub_stream_id field is an identifier (user private) settable by a user.

A PTS_extention_flag field indicates whether there is a PTS_extention field. If this field value is 1, the PTS_extension field may be in the PES_data_packet field. Additionally, this field may be 0 when there is no PTS_extension field.

An output_data_rate_flag field may be set with 0.

A syncnronized_data_packet_header_length field represents the length of an optical field in the PES packet header. This field may be included If the PTS_extention_flag field is 1, and represents the length including synchroziced_data_privete_data_byte(s).

A PTS_extension field extends PTS delivered from the header of a corresponding PES packet. This field may include 9 bit Program Clock Reference (PCR) extension information. Additionally, a receiver may extend the PTS resolution of synchronized data from 11.1 µs (90 kHz), i.e., the MPEG-2 standard, to 37 ns (27 MHz).

A synchronized_data_private_data_byte field represents a payload byte of a synchronized PES packet. If the protocol_encapsulation of DST represents one of synchronized datagram, IP datagram not including LLC/SNAP, and multiprotocol including LLS/SNAP, the synchronized_data_byte field may include one unique datagram. Accordingly, when LLC/SNAP is used, an 8 byte LLC/SNAP header may be shown in only the first 8 byte synchronized_data_byte of the PES packet.

Accordingly, if a broadcasting station includes a trigger in a synchronized data stream (stream_type) of PES and transmits it, a receiver may extract trigger stream from the payload of PES. Additionally, the receiver may perform an action on a target TDO by using the PTS value of the PES header as a trigger time. Accordingly, TDO may be trigged at the accurate timing of a frame unit by synchronizing a trigger on the basis of PTS, i.e., a reference time for presentation synchronization of video and audio. Additionally, when a trigger time is designated with PTS, video and audio synchronization may be easily obtained.

Moreover, trigger signaling information on obtaining trigger stream is transmitted according to an embodiment. A receiver receives trigger signaling information and obtains trigger stream in the synchronized data stream of PES on the basis of the received trigger signaling information.

A method of transmitting trigger signaling information to obtain trigger stream transmitted using synchronized data streaming may vary. One of the following methods is used to transmit trigger signaling information: 1. a transmission method through DST; 2. a transmission method through a service id descriptor; 3. a transmission method through a trigger stream descriptor; and 4. a transmission method by defining a stream type of trigger stream.

According to an embodiment, trigger signaling information may be transmitted through DST for NRT service. DST is a table session for transmitting data service. Since its description and description for its data_service_bytes( ) are identical to those of FIG. 8, overlapping description will be omitted.

The DST may include signaling data for receiving each Elementary Stream (ES) constituting data service. Accordingly, trigger signaling data for receiving trigger stream may be included in DST.

Moreover, each data service may include at least one application, and each application may in an application identification structure including an application identifier such as app_id. Moreover, each application may include at least one data element constituting a corresponding application or data stream.

Accordingly, in order to transmit trigger stream through data service, a broadcasting station includes one trigger stream in a specific virtual channel and transmits it. Moreover, the broadcasting station may include one trigger stream in each application and transmit it. Accordingly, embodiments for transmitting trigger signaling information will be described according to two methods.

When one trigger stream is included a virtual channel, a data service for transmitting trigger stream is called a trigger service. In this case, a broadcasting station may allocate a fixed service identifier (service ID) to a trigger service.

Accordingly, a receiver may identify that one trigger stream is transmitted to a virtual channel when the service identifier has 0X01 as a fixed value.

Here, the broadcasting station may include trigger signaling information in an application identification structure in DST and transmit it.

For example, the broadcasting station adds 0x0001 as an App_id_description field value of DST to set a value that means interactive application for linking NT service such as TDO with a real-time broadcast Additionally, app_id_byte_length may use 3 bytes (0x0003) and app_id_byte may be allocated with 0x01 to indicate that corresponding data service includes trigger stream signaling information.

Accordingly, the receiver receives DST through the above method, and may identify tap( ) including trigger signaling information when app_id_byte_length is 0x0003, app_id_description is 0x0001, and app_id_byte is 0x01. The receiver extracts trigger signaling information including an association_tag value from the identified tap( ) structure, and association_tag_descriptor receives stream having the same PID as the extracted association_tag from data elementary stream (ES) listed in PMT extracted from broadcasting stream in order to receive trigger stream.

As mentioned above, NRT service is signaled through SMR or NST, and may be uniquely identified through 16 bit service identifier (sevice_id). Additionally, content items constituting NRT service may be identified through conent_lengate or a content identifier in NCT or NRT-IT. Accordingly, trigger service may be transmitted like NRT service by extending app_id_byte through DST. For example, app_id_byte may include data combining a service identifier (service id) field of trigger service and a content_linkage field. Accordingly, the first 16 bits of app_id_byte correspond to a service id field in SMT or NST, and the later 32 bits correspond to a content linkage field in NCT or NRT-IT.

As above, the broadcasting station may include trigger signaling information in tap( ) and transmits it through an application identification structure of DST when one stream is included in each channel.

Moreover, according to an embodiment, trigger signaling information may be transmitted through a protocol_encapsulation field of DST. For example, if app_id_byte_length in DST is set with 0x0000, app id is not allocated. If protocol_encapsulation has 0x0F, it indicates that trigger signaling information is included in a corresponding tap( ) structure. Accordingly, a receiver may receive trigger signaling information from the corresponding tap( ) structure if app_id_byte_length is 0x0000 and protocol_encapsulation is 0x0F. Through this, a PID value on PMT indicating trigger stream is obtained and trigger stream is received as mentioned above.

Moreover, according to another embodiment, trigger signaling information may be transmitted through a content type descriptor field of DST.

As shown in FIG. 28, a content type descriptor structure in tap( ) on DST according to an embodiment is as follows.

A descriptorTag may have 0x72 to represent contentTypeDescriptor.

A descriptorLenth field represents the total length of a descriptor in a byte unit.

A contentTypeByte field represents a MIME media type value of data referenced by tap connected to the descriptor. The MIME media type is defined in 5 of RFC2045 section [8].

Accordingly, a content type descriptor may be added to a tap( ) structure including trigger signaling information according to an embodiment. Accordingly, a receiver may receive trigger signaling information from the corresponding tap( ) structure if app_id_byte_length is 0x0000 and content type descriptor of the tap( ) structure corresponds to the predetermined content. Through this, a PID value on PMT indicating trigger stream is obtained and trigger stream is received as mentioned above. The MIME media type may be designated with a specific type to identify that there is trigger service signaling information through a content type descriptor.

As mentioned above, one NRT service may be a trigger service for transmitting trigger stream and may transmit respectively different stream to content items in the trigger service. In this case, each application may include one trigger stream.

Accordingly, an embodiment may include trigger stream in each content item of NRT service and may transmit it. In this case, the above-mentioned application identification structure may be used. For example, if app_id_byte_length is 0x0003, it indicates that trigger stream is transmitted through one NRT service by using one service identifier. If app_id_byte_length is 0x0007, it indicates that trigger stream is transmitted by each content item by using a service identifier and content linkage. If defined as above, each trigger stream may be transmitted in correspondence to each NRT service or content item. Since the next stage of a method of transmitting and receiving trigger stream is identical to that of transmitting one trigger stream for each virtual channel, overlapping description will be omitted.

FIG. 29 is a view illustrating a syntax of PMT and service identifier descriptor according to an embodiment.

As shown in FIG. 29, a Program Map Table (PMT) represents information of a program broadcasted in each channel. A Program AssociationTable (PAT), in which 'packet ID' is defined as '0x00' and transmitted, may receive PMT by parsing 'packet ID' of PMT.

Moreover, a service identifier descriptor may be included in a descriptor loop for each ES of PMT. Then, it may include list information of services in each program element.

A structure of the service identifier descriptor will be described as follows.

A descriptor_tag field indicates that the descriptor is service_id_descriptor( ) and may have 0xC2.

A descriptor_length field represents a byte unit length from this field to the termination of the descriptor.

A service_count field indicates the number of services in a program element having the descriptor.

A service_id field indicates a service identifier in a program element having the descriptor.

According to an embodiment, trigger stream may be transmitted through a well-known IP address. Moreover, in order to signal a trigger, a broadcasting station may include a specific service identifier (service id, for example, 0x01) corresponding trigger stream in a service identifier descriptor and may transmit it. That is, trigger signaling information on receiving trigger stream may be transmitted through a service identifier descriptor. Accordingly, if a service identifier of service_id_descriptor in an ES descriptor loop in an ES loop of PMT is 0x01, the receiver determines that elementray_PID in the ES loop is PID indicating trigger stream and receives the trigger stream through the PID.

FIG. 30 is a view illustrating a trigger stream descriptor according to an embodiment. According to an embodiment, a trigger may be signaled using a trigger stream descriptor. Like the above service identifier descriptor, the trigger stream descriptor may be included in an ES descriptor loop in an ES loop of PMT. Accordingly, if there is trigger stream, a trigger stream descriptor may exist in an ES descriptor loop. If identifying a trigger stream descriptor, a receiver may receive trigger stream by obtaining PID of the trigger stream from elementary_PID in a corresponding ES loop.

Like this, a trigger stream descriptor for transmitting trigger signaling information may include at least one of a service identifier (target service id) of TDO, a trigger target in trigger stream, and an IP address list transmitting trigger stream. The trigger stream descriptor of FIG. 30 is provided according to an embodiment and its structure will be described as follows.

A descriptor_tag field indicates a trigger_stream_descriptor if set with a predetermined value.

A descriptor_length field represents a byte unit length from this field to the termination of the descriptor.

A target_service_count field represents the number of target NRT service (TOD) of at least one trigger in trigger stream.

A target_service_id field represents a service identifier (service_id) of target NRT service (TOD) of at least one trigger in trigger stream. A receiver may identify a service identifier (service_id) before receiving trigger stream by using the target_service_id field.

A target_content_item_count field represents the number of target NRT service content items of at least one trigger in trigger stream.

A target_content_linkage field represents a target NRT service content item linkage (content_linkage) of at least one trigger in trigger stream.

Moreover, a trigger stream descriptor is provided according to an embodiment, and thus, it is apparent that it may include additional information or have another configuration. For example, when one trigger stream is transmitted for each channel, a content item field may be omitted. Additionally, at least one of a trigger stream identification information field and a profile information field may be added to identify trigger stream.

A broadcasting station may transmit list information of trigger target NRT service such as TDO by using the trigger stream descriptor. Additionally, the broadcasting station may transmit trigger signaling information by using the target_service_id and target_content_linkage fields if there is another trigger according to a content item. Additionally, a trigger stream descriptor may further include a list of IP address information or port numbers transmitting trigger stream.

According to an embodiment, a broadcasting station designates a stream type and transmits trigger signaling information. A receiver extracts trigger signaling information by using a stream type from PMT and receives trigger stream through the trigger signaling information. For example, 0x96, one of stream types set preliminarily at the present, may be designated as trigger stream. In this case, a typical receiver has no information that a stream type is 0x96 and thus may not process trigger stream and disregard it. Accordingly, backwards compatibility for sub model receiver is guaranteed.

According to an embodiment, a trigger may be included in an Application information Table (AIT) for transmitting application information in data broadcasting such as Multimedia Home Platform (MHP) or Advanced Common application platform (ACAP), and may be transmitted. FIG. 31 is a view of AIT according to an embodiment.

Moreover, according to another embodiment a trigger may be included in a descriptor of STT to refer to a System Time Table (STT) as a trigger time, and then transmitted. FIG. 32 is a view of STT according to an embodiment.

Figure 33:
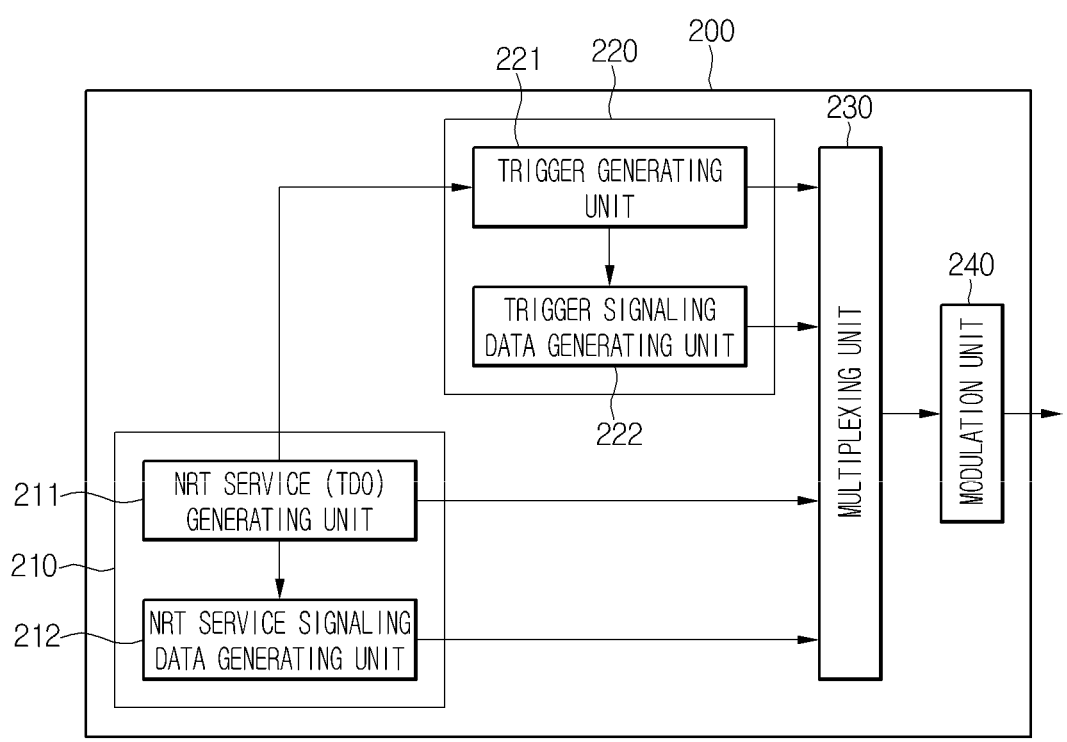
FIG. 33 is a block diagram illustrating a transmitter for transmitting TDO and a trigger according to an embodiment.

FIG. 33 is a block diagram illustrating a transmitter for transmitting TDO and a trigger according to an embodiment.

Referring to FIG. 33, the transmitter 200 includes an NRT service transmitting unit 210, a trigger transmitting unit 220, a multiplexing unit 230, and a demodulation unit 240. The NRT service transmitting unit 210 includes an NRT service (TDO) generating unit 211 and an NRT service signaling data generating unit 212. The trigger transmitting unit 220 includes a trigger generating unit 221 and a trigger signaling data generating unit 222.

The NRT service (TDO) generating unit 211 receives data for NRT service generation from a service provider to generate the NRT service, packetizes the generated NRT service into IP datagram, and then packetized the packetized IP datagram into a transmission packet (TP). The packetized NRT service data is transmitted to the multiplexing unit 230.

The NRT service generating unit 211 transmits metadata including channel information about NRT service in transmission and service_id, to the NRT service signaling data generating unit 212. Additionally, if the generated NRT service is TDO, the NRT service generating unit 211 extracts trigger information including a trigger time for triggering TDO, identification information, and trigger action information of a target TDO, and then transmits it to the trigger generating unit 221.

The NRT service signaling data generating unit 212 generates NRT service signaling data for receiving NRT service by using the NRT service metadata, and packetizes the generated NRT service signaling data to the transmission packet (TP) to transmit it to the multiplexing unit 230.

Additionally, the trigger generating unit 221 generates trigger data by using trigger information of the TDO received from the NRT service (TDO) generating unit. The generated trigger data is packetized into a transmission packet to transmit it to the multiplexing unit 230. Moreover, the trigger generating unit 221 transmits metadata for receiving a trigger such as the packet identifier (PID) of the transmitted trigger data to the trigger signaling data generating unit 222.

The trigger signaling data generating unit 22 generates trigger signaling data on the basis of the received metadata, and packetizes the trigger signal in data into a transmission packet to transmit it to the multiplexing unit 230.

The multiplexing unit 230 multiplexes the received transmission packets by each channel, and then transmits the multiplexed signal to the modulation unit 240.

The modulation unit 240 modulates the multiplexed signal and transmits it to the external. The modulation method may vary, and the present invention is not limited thereto.

Figure 34:
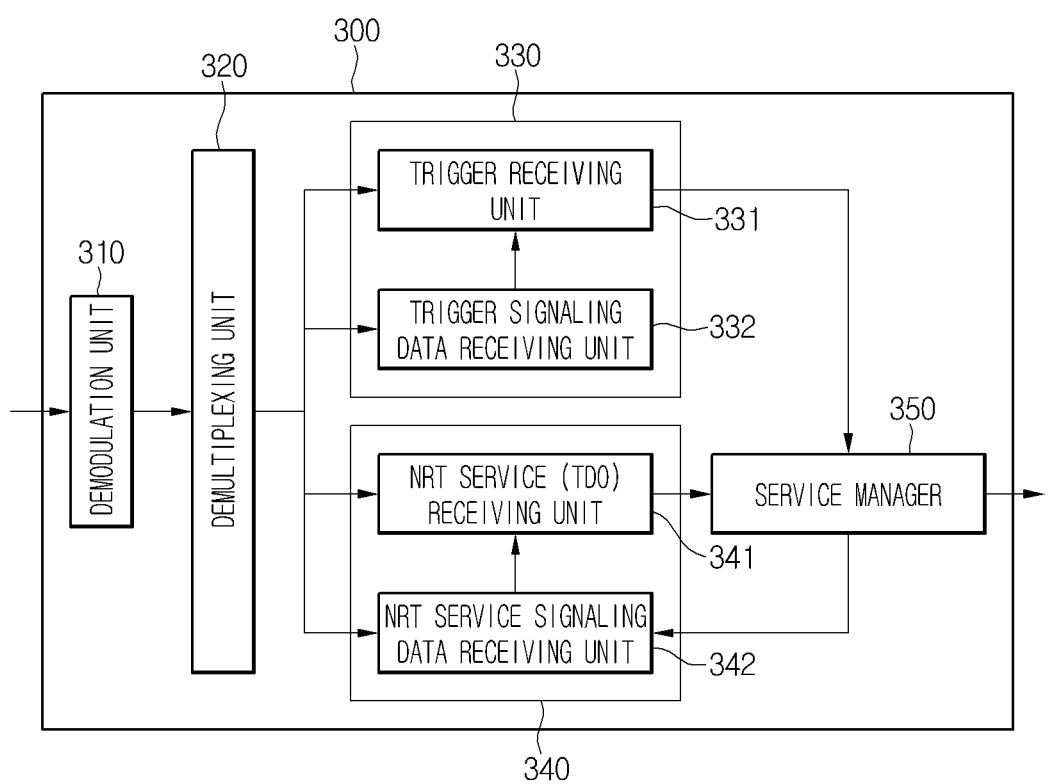
FIG. 34 is a block diagram illustrating a receiver for receiving TDO and a trigger according to an embodiment.

FIG. 34 is a block diagram illustrating a receiver for receiving TDO and a trigger according to an embodiment.

Referring to FIG. 34, the receiver 300 includes a demodulation unit 310, a demultiplexing unit 320, a trigger processing unit 330, an NRT service processing unit 340, and a service manager 350. The trigger processing unit 330 includes a trigger receiving unit 331 and a trigger signaling data receiving unit 332. The NRT service processing unit 340 includes an NRT service (TDO) receiving unit 341 and an NRT service signaling data receiving unit 342.

The demodulation unit 310 receives a modulated signal from the transmitter 200, and demodulates the received signal according to a predetermined demodulation method to transmit it to the demultiplexing unit 320.

The demultiplexing unit 320 demultiplexes the demodulated signal to restore an original transmission packet for each channel to transmit them to each receiving unit of the trigger processing unit 330 or the NRT service processing unit 340.

The NRT service signaling data receiving unit 342 receives and restores the packetized NRT service signaling data from the multiplexing unit 320 to extract information on NRT service, and then transmits it to the NRT service (TDO) receiving unit 341. The NRT service (TDO) receiving unit 341 receives transmission packets of NRT service from the multiplexing unit 320 by using information on receiving NRT service, and restores it as service data to transmit it to the service manager 350.

Moreover, the NRT service signaling data receiving unit 332 receives and restores the packetized trigger signaling data from the multiplexing unit 320, extract information on receiving a trigger, and then, transmits it to the trigger receiving unit 331. The trigger receiving unit 331 receives transmission packets including a trigger from the multiplexing unit 32 by using information on receiving a trigger, and restores trigger data to transmit it to the service manager 350.

The service manager 350 receives at least one of trigger data or NRT service (TDO) data from the trigger processing unit 330 or the NRT processing unit 340. Moreover, the service manager 350 performs and applies a trigger action on a trigger target TDO at the trigger timing, so that a trigger action on TDO is performed.

Figure 35:
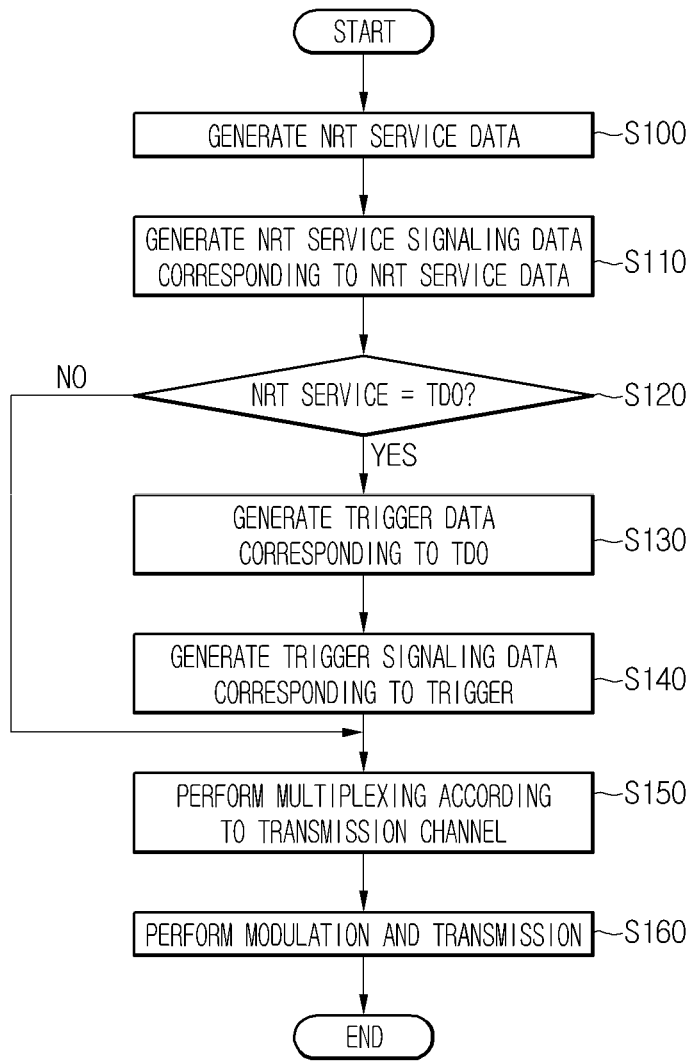
FIG. 35 is a flowchart illustrating a trigger transmitting method according to an embodiment.

FIG. 35 is a flowchart illustrating a trigger transmitting method according to an embodiment.

Referring to FIG. 35, the NRT service generating unit 211 generates NRT service data by receiving NRT service data from external or on the basis of data received from the NRT service provider in operation S100. Moreover, the NRT service generating unit 211 packets the generated data into a transmission packet. Additionally, the NRT service generating unit 211 transmits information on receiving transmission packets including NRT service to the NRT service signaling data generating unit 212.

Then, the NRT service signaling data generating unit 212 generates the above described NRT service signaling data and packetizes it into a transmission packet in operation S110.

Moreover, the NRT service generating unit 211 determines whether the generated NRT service is a trigger declarative object, i.e., TDO in operation S120.

Additionally, if the generated NRT service is TDO, the NRT service generating unit 211 transmits trigger information including a trigger time for triggering TDO, trigger action, target TDO identification information, to the trigger generating unit 221, and the trigger generating unit 211 generates trigger data by using the received triggered information in operation S130. The generated trigger data is packetized into a transmission packet and transmitted to the multiplexing unit. For example, a target service identifier for target TDO and trigger action information applied to a target service may be inserted into a packetized stream, i.e., the payload of PES, and then transmitted. Additionally, trigger time information is designated into a PTS or DTS format, inserted into the payload or header of PES, and then is transmitted. When the synchronized data streaming method is used, PTS of trigger stream and PTS of video and audio stream are synchronized to set the accurate play timing.

Moreover, the trigger signaling data generating unit 222 generates trigger signaling data for identifying and receiving a trigger transmitted from the trigger generating unit 221 and packetized the generated trigger signaling data into a transmission packet to transmit it to the multiplexing unit in operation S140. Here, the trigger signaling data may include a trigger stream descriptor or a service identifier descriptor, inserted in a program map table, and may include a packet identifier of trigger stream corresponding to each descriptor. Additionally, trigger signaling data may include a packet identifier of trigger stream in a TAP structure of DST.

Later, the multiplexing unit 230 multiplexes at least one of transmission-packetized NRT service data, NRT service signaling data, trigger data, and trigger signaling data by each transmission channel and then transmits it to the modulation unit 240.

Moreover, the modulation unit 240 performs modulation to transmit the multiplexed signal and transmits it to external receiver or a broadcasting network in operation S160.

Figure 36:
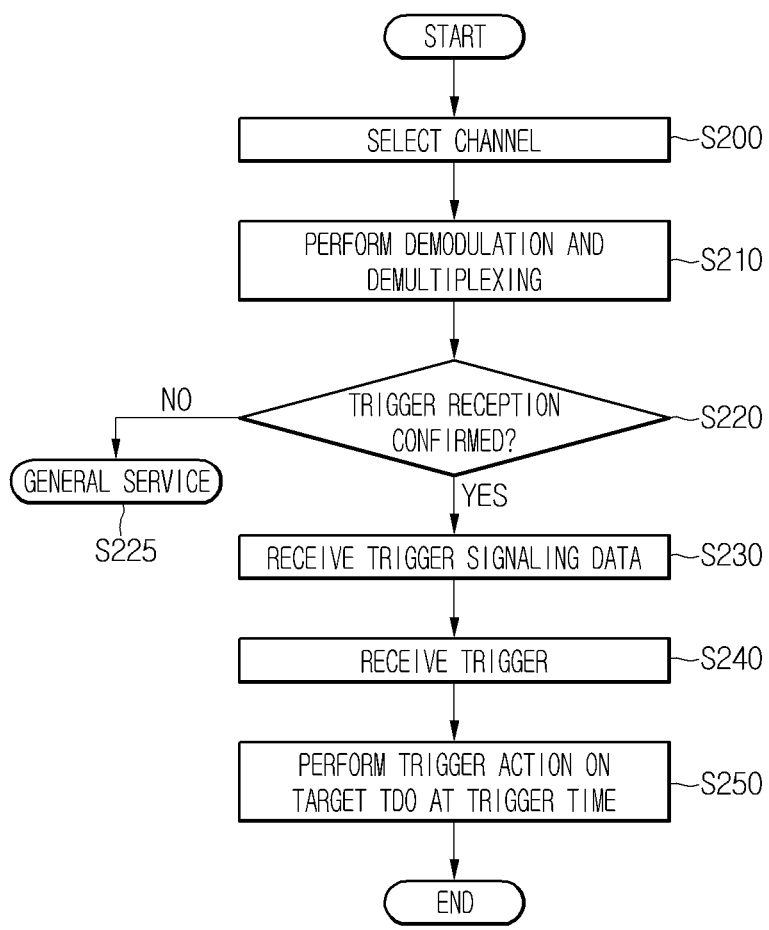
FIG. 36 is a flowchart illustrating an operation of a receiver 300 according to an embodiment.

FIG. 36 is a flowchart illustrating an operation of a receiver 300 according to an embodiment.

First, when the receiver 300 is turned on, a channel is selected by a user or a predetermined channel is selected in operation S200. The demodulation unit 310 demodulates the received signal from the selected channel, and the demultiplexing unit 320 demultiplexes the demodulated signal by each transmission channel. Also, the NRT service receiving unit 341 and the NRT service signaling data receiving unit 342 receive NRT service data and transmit it to the service manager 350 as described above.

Then, the trigger signaling data receiving unit 332 or the NRT service signaling data receiving unit 342 confirms whether trigger reception is possible in operation s220. The trigger reception confirmation may use one of the above-mentioned methods. That is, the trigger signaling data receiving unit 332 or the NRT service signaling data receiving unit 342 uses one of a method of confirming PID corresponding to a trigger in MGT or PSIP based PID, a method of using a tap structure of DST, a method of using a service identifier descriptor or a trigger stream descriptor, a method of using a trigger stream type, and a method of using AIT or STT, in order to confirm whether trigger reception is possible.

Moreover, when it is confirmed that trigger reception is possible, the trigger signaling data receiving unit 332 receives a transmission packet including trigger signaling data to restore the trigger signaling data, and then transmits it to the trigger receiving unit 331 in operation S230.

Later, the trigger receiving unit 331 extracts trigger data from the received transmission packet by using the trigger signaling data, and transmits it to the service manager 350 in operation S240. For example, the trigger receiving unit 331 may receive trigger stream by using a packet identifier corresponding to the trigger stream descriptor. Additionally, the trigger receiving unit 331 extracts trigger information from trigger stream and transmits it to the service manager 350. Additionally, if the received trigger stream is PES, PTS in the header of PES is extracted as a trigger time, and a target service identifier and trigger action in the payload of PES are extracted, in order to transmit them to the service manager 350.j Moreover, the service manager 350 performs a trigger action on a target TDO at the trigger timing, so that a trigger action on TDO is performed in operation S250. Especially, if the PTS of PES is a trigger time, the PTS of trigger stream is synchronized with the PTS in the header of audio and video stream, to satisfy the accurate play timing.

Figure 37:
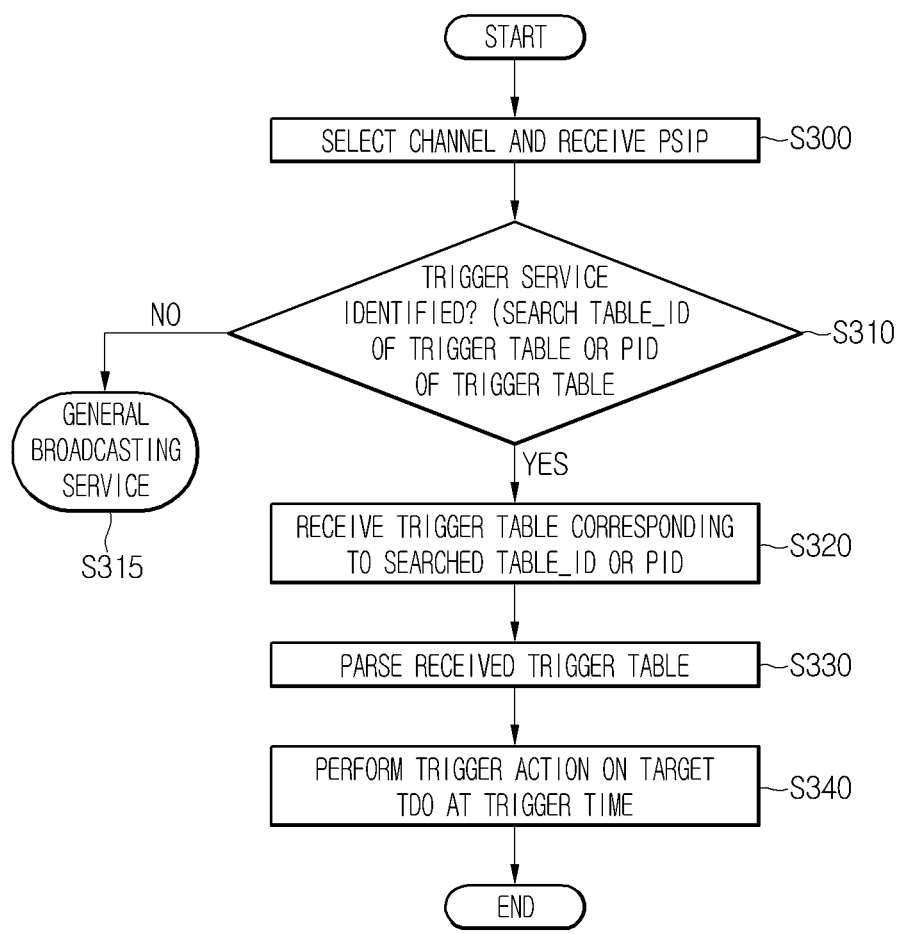
FIG. 37 is a flowchart illustrating a trigger receiving method by using a trigger table according to an embodiment.

FIG. 37 is a flowchart illustrating a trigger receiving method by using a trigger table according to an embodiment.

The demodulation unit 310 receives and demodulates a broadcast signal for selected channel. Moreover, the trigger signaling data receiving unit 332 receives a PSIP table through the demultiplexing unit 320 and determines whether there is a trigger table in the received table to identify a trigger service in operation S310. The trigger signaling data receiving unit 332 searches PID allocated to a trigger table from an MGT or PSIP based table, or searches a table corresponding to Table_id allocated to a trigger table to identify a trigger service.

If the trigger service is not identified, the receiver 300 provides general broadcasting services.

Moreover, if the trigger service is identified, the trigger receiving unit 331 receives the searched trigger table and parses it in operations S320 and S330.

Then, the service manger 350 receives trigger information including trigger time, trigger action, and target TDO identification information parsed in the trigger table, and performs a corresponding trigger action on a corresponding TDO at the corresponding trigger timing in operation S340.

Figure 38:
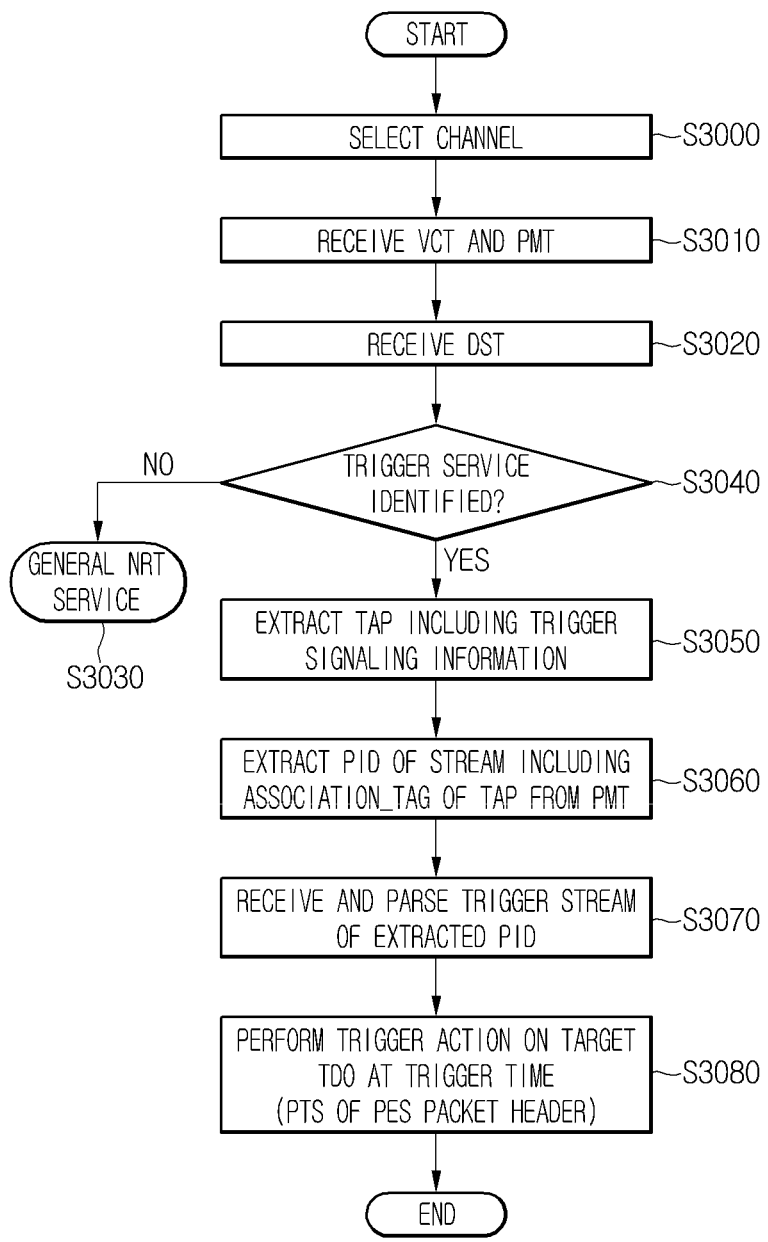
FIG. 38 is a flowchart illustrating an operation of a receiver when trigger signaling information and trigger are transmitted using DST according to an embodiment.

FIG. 38 is a flowchart illustrating an operation of a receiver 300 when trigger signaling information and trigger are transmitted using DST according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310 and the demultiplexing unit 320 in operation S3010. Then, the PSI/PSIP section handler or the trigger signaling data receiving unit 332 or the NRT service signaling data receiving unit 342 parses the obtained VCT and PMT to confirm whether there is NRT service.

For example, when the service_type field value of VCT is not 0x04 or 0x08, since the corresponding virtual channel does not transmit NRT only service, the receiver 300 operates properly according to information in the virtual channel. However, even though the service_type field value does not mean NRT only service, the corresponding virtual channel may include NRT service. This case is called adjunct NRT service included in the corresponding virtual channel, and the receiver 300 may perform the same process as the case of receiving NRT service.

Then, the NRT service signaling data receiving unit 342 or the trigger signaling data receiving unit 332 determines that NRT service is received through a corresponding virtual channel if a service_type field value is 0x04 or 0x08. In this case, if a stream_type field value in a service location descriptor of VCT (or an ES loop of PMT) is 0x95 (i.e., DST transmission), DST is received using an Elementary_PID field value in operation S3020. This may be performed in the demultiplexing unit 320 according to a control of the service manager 350.

Also, the trigger signaling data receiving unit 342 identifies a trigger service from the received DST in operation S3040. A method of identifying a trigger service uses one of a method of identifying a specific value allocated to app_id_description and app_id_byte by using an application identification structure, a method of identifying a specific value allocated to a protocol_encapsulation field, and a method of identifying tap including a content type descriptor.

If the trigger service is not identified from the received DST, since trigger data transmits general NRT service through a corresponding virtual channel, the receiver 300 operates properly according to NRT service in the corresponding virtual channel in operation S3030.

Moreover, when the trigger service is identified from DST, the trigger signaling data receiving unit 332 extracts tap from DST including trigger signaling information (PID of trigger stream) in operation S3060.

Then, the trigger signaling data receiving unit 332 extracts stream PID from PMT including association_tag of the extracted Tap in operation S3070.

The trigger receiving unit 331 receives MPEG-2 TS packets corresponding to the extracted stream PID, and removes decapsulation, i.e., TS header, to restore PES stream including trigger stream. The stream_type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S3070.

Then, the service manager 350 performs an action on the target TDO at the trigger timing by using the PTS of the PES packet header including a trigger as the trigger timing in operation S3080. Here, the target TDO may be NRT service indicated by the parsed target TDO identifier. Additionally, the action may be one of preparation, execution, extension, and termination commands provided from the parsed trigger action information.

Figure 39:
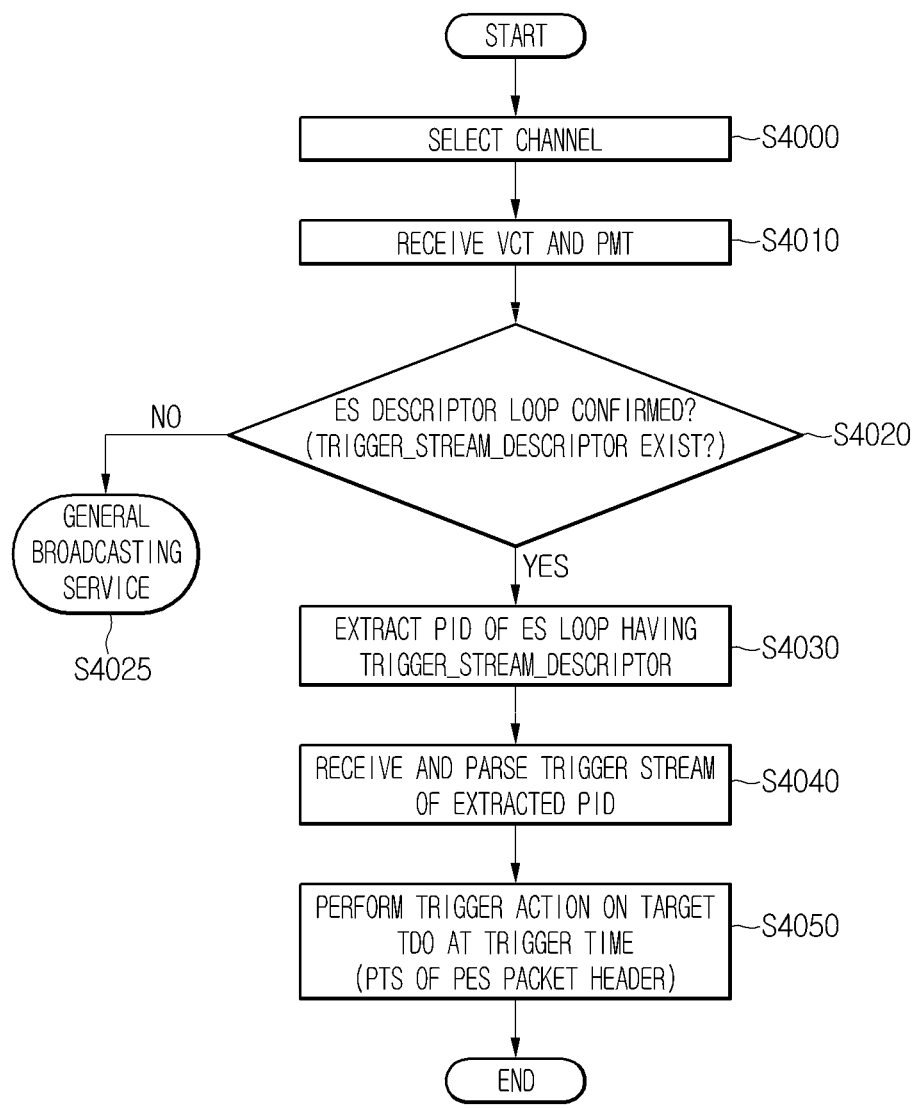
FIG. 39 is a flowchart illustrating an operation of a receiver when a trigger is transmitted using a trigger stream descriptor according to an embodiment.

FIG. 39 is a flowchart illustrating an operation of a receiver 300 when a trigger is transmitted using a trigger stream descriptor according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310 and the demultiplexing unit 320 in operation S4000. The broadcast signal includes VCT and PMT, and the trigger signaling data receiving unit 332 or the PSI/PSIP section handler parses the obtained VCT and PMT.

Also, the trigger signaling data receiving unit 332 confirms whether a trigger is transmitted from the VCT and PMT to a corresponding virtual channel. For this, the trigger signaling data receiving unit 332 determines whether there is the Trigger_stream_descriptor in the ES descriptor loop corresponding to a corresponding virtual channel in operation S4020. Whether there is Trigger_stream_descriptor is determined by using whether a stream_type value is 0x06 (synchronized data streaming) and a descriptor_tag field of a corresponding descriptor is identical to a value set to correspond to a trigger stream descriptor after searching descriptors in an ES descriptor loop.

If it is determined that Trigger_stream_descriptor is not identified from PMT and thus there is no Trigger_stream_descriptor, since a corresponding virtual channel does no transmit a trigger, the receiver 300 operates properly according to broadcast service in the corresponding virtual channel in operation S4025.

Then, if there is Trigger_stream_descriptor, the trigger signaling data receiving unit 332 extracts Elementary_PID in the corresponding ES loop of PMT in operation S4030. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The stream_type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S4040.

Then, the service manager 350 performs an action on the target TDO at the trigger timing by using the PTS of the PES packet header including a trigger as the trigger timing in operation S4050. Here, the target TDO may be NRT service indicated by the parsed target TDO identifier. Additionally, the action may be one of preparation, execution, extension, and termination commands provided from the parsed trigger action information.

Figure 40:
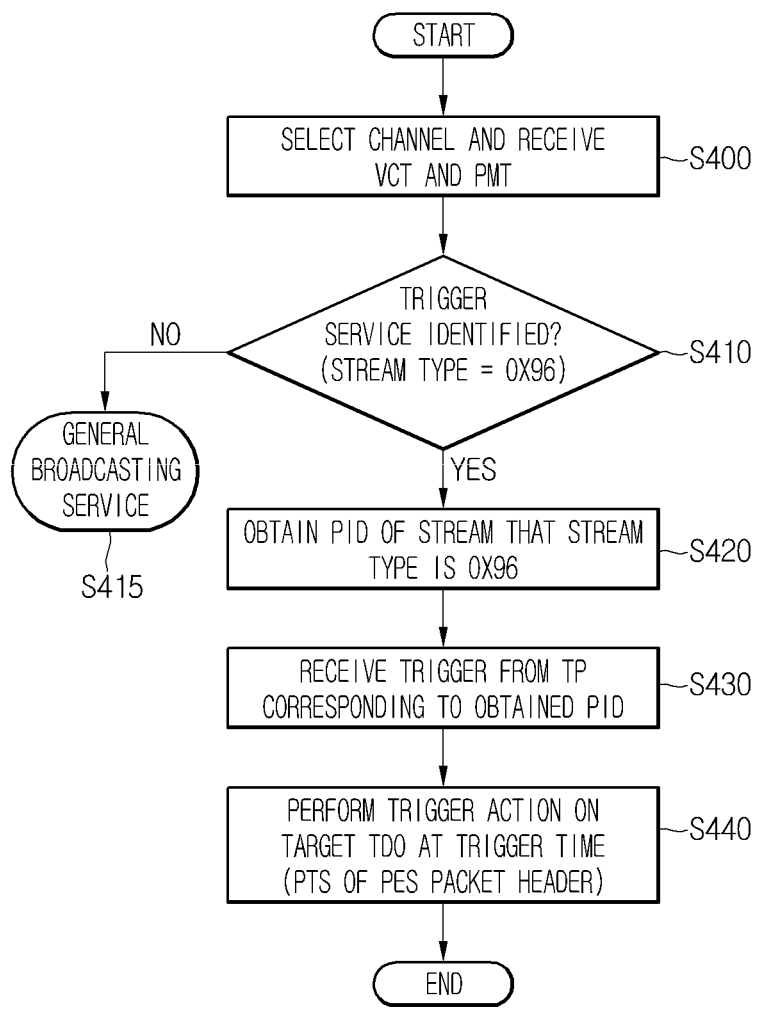
FIG. 40 is a flowchart illustrating an operation of a receiver when a trigger is transmitted using a stream type according to an embodiment.

FIG. 40 is a flowchart illustrating an operation of a receiver when a trigger is transmitted using a stream type according to an embodiment.

When a physical transmission channel is selected and a channel selected by a tuner is tuned, the receiver 300 obtains VCT and PMT from a broadcast signal received through the tuned physical transmission channel by using the demodulation unit 310 and the demultiplexing unit 320. The broadcast signal includes VCT and PMT, and the trigger signaling data receiving unit 332 or the PSI/PSIP section handler parses the obtained VCT and PMT in operation S400.

Also, the trigger signaling data receiving unit 332 confirms whether a trigger is transmitted from the VCT and PMT to a corresponding virtual channel. For this, the trigger signaling data receiving unit 332 determines whether there is 0x96, i.e., the specific stream type in the ES descriptor loop corresponding to a corresponding virtual channel in operation S410.

If it is determined that 0x96 is not identified from stream type and thus there is no stream type, since a corresponding virtual channel does no transmit a trigger, the receiver 300 operates properly according to broadcast service in the corresponding virtual channel in operation S415.

Then, if the stream type is 0x96, the trigger signaling data receiving unit 332 extracts Elementary_PID in the corresponding ES loop of PMT in operation S420. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The trigger receiving unit 331 parses at least one of PTS of a PES packet header from the restored PES stream, a target TDO identifier in trigger stream, a trigger identifier, or trigger action information in operation S430.

Then, the service manager 350 performs an action on the target TDO at the trigger timing by using the PTS of the PES packet header including a trigger as the trigger timing in operation S440. Here, the target TDO may be NRT service indicated by the parsed target TDO identifier. Additionally, the action may be one of preparation, execution, extension, and termination commands provided from the parsed trigger action information.

Figure 41:
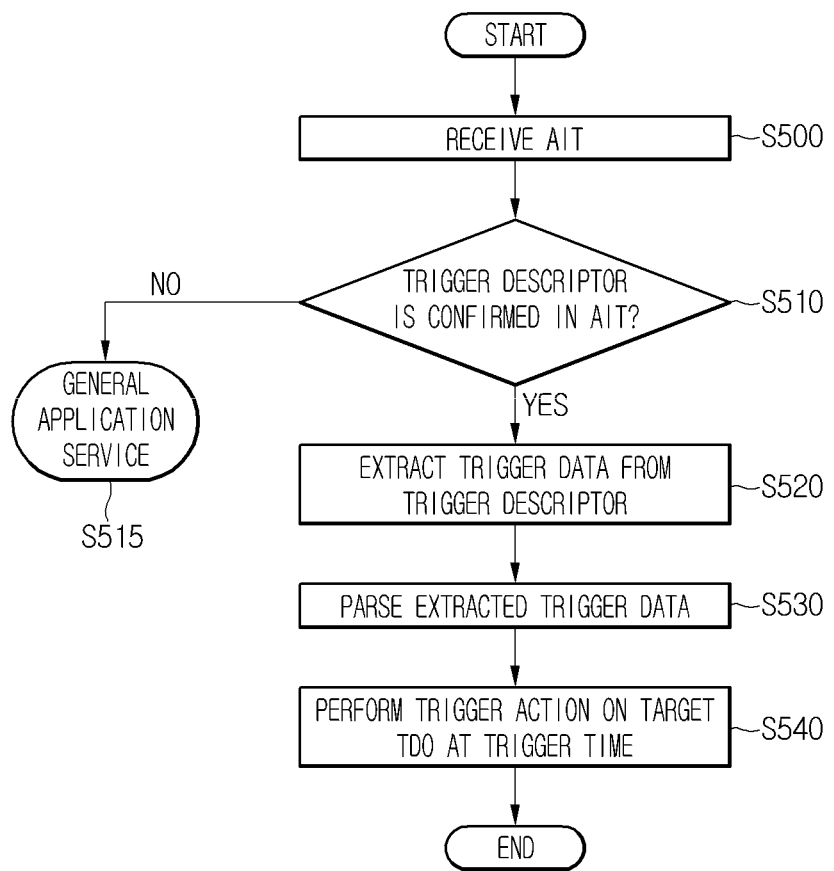
FIG. 41 is a flowchart illustrating an operation of a receiver when a trigger is transmitted using AIT according to an embodiment.

FIG. 41 is a flowchart illustrating an operation of a receiver when a trigger is transmitted using AIT according to an embodiment.

The trigger signaling data receiving unit 332 receives AIT by using the demodulation unit 310 and the demultiplexing unit 320 in operation S500.

Also, the trigger signaling data receiving unit 332 confirms whether a trigger is transmitted from AIT. For this, the trigger signaling data receiving unit 332 confirms whether there is a trigger descriptor in AIT in operation S510.

If it is determined that there is no trigger descriptor, since a corresponding application does not include a trigger, the receiver 300 operates properly according to corresponding application service in operation S515.

Also, if there is a trigger descriptor, the trigger receiving unit 332 extracts trigger data from the trigger descriptor and parses the extracted trigger data to transmit it to the service manager 350 in operation S530.

Then, the service manager 350 performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

Figure 42:
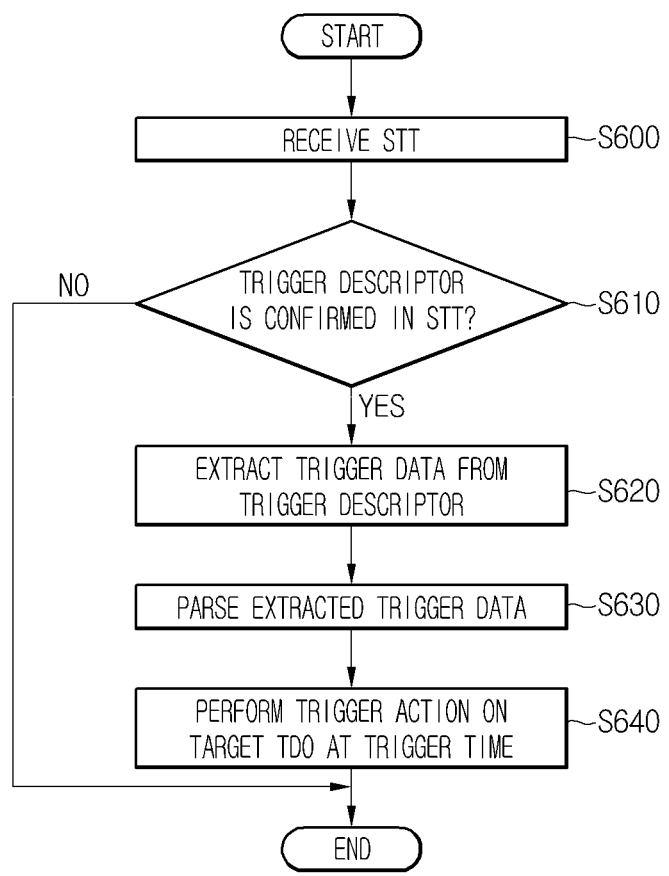
FIG. 42 is a flowchart illustrating an operation of a receiver when a trigger is transmitted using STT according to an embodiment.

FIG. 42 is a flowchart illustrating an operation of a receiver when a trigger is transmitted using STT according to an embodiment.

The trigger signaling data receiving unit 332 receives STT by using the demodulation unit 310 and the demultiplexing unit 320 in operation S600.

Also, the trigger signaling data receiving unit 332 confirms whether a trigger is transmitted from STT. For this, the trigger signaling data receiving unit 332 confirms whether there is a trigger descriptor in STT in operation S610.

If it is determined that there is no trigger descriptor, since a corresponding STT does not include a trigger, the receiver 300 operates properly according to a broadcast signal in operation S615.

Also, if there is a trigger descriptor, the trigger receiving unit 332 extracts trigger data from the trigger descriptor and parses the extracted trigger data to transmit it to the service manager 350 in operation S630.

Then, the service manager 350 performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

Figure 43:
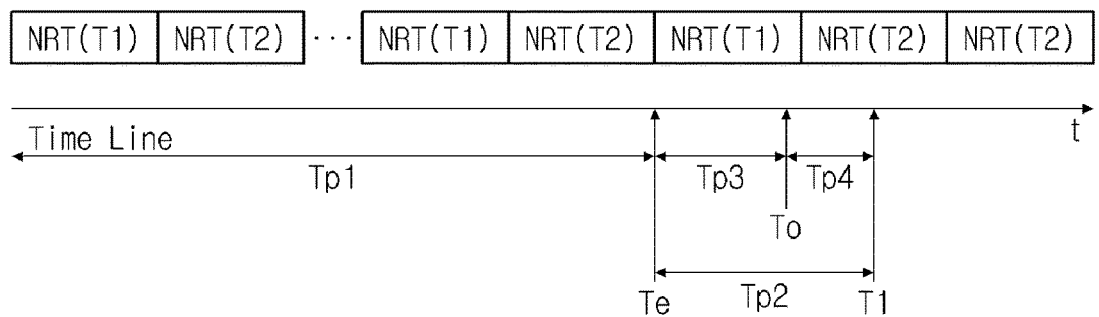
FIG. 43 is a timing diagram according to an embodiment of the present invention.

FIG. 43 is a timing diagram according to an embodiment of the present invention.

As shown in FIG. 43, since the transmitter 200 does not know when the receiver 300 changes a channel, when the receiver 300 is power on, and when the receiver 300 selects a channel where a corresponding NRT service exists, the transmitter 200 may transmit download contents transmitted in an NRT way through terrestrial broadcasting periodically and repeatedly.

Referring to FIG. 43, an activation time T1 indicates a time at which the activation of an NRT(T1) service is triggered. An effective time Te indicates a time at which the NRT(T1) starts to be transmitted lastly before an activation time T1. A transmission period change time To indicates a time at which a period of transmitting activation triggering data is changed. The transmission period change time To is a time parameter that the transmitter 200 determines. A time window Tp1 indicates a time prior to the effective time Te. A time window Tp2 indicates a time between the effective time Te and the activation time T1. A time window Tp3 indicates a time between the effective time Te and the transmission period change time To. A time window Tp4 indicates a time between the transmission period change time To and the activation time T1.

Figure 44:
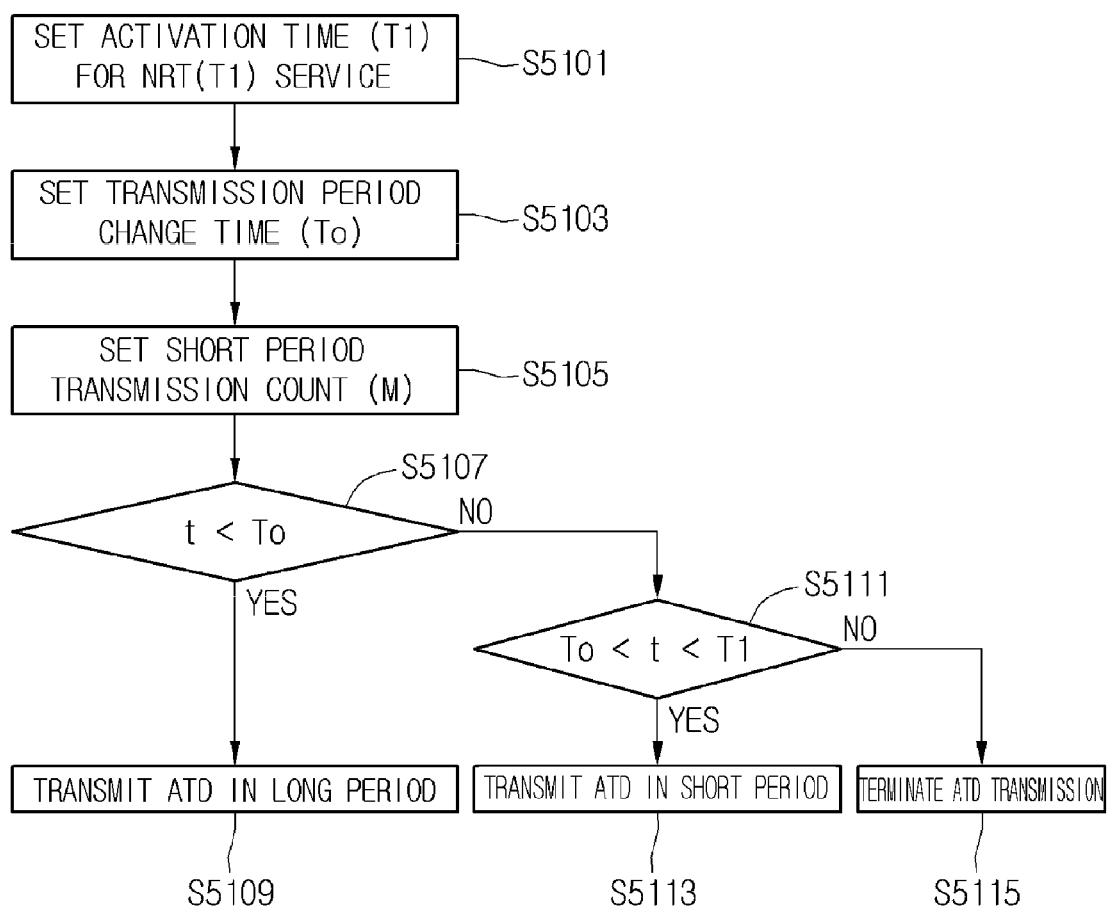
FIG. 44 is a flowchart illustrating an activation trigger data transmitting method according to an embodiment of the present invention.

FIG. 44 is a flowchart illustrating an activation triggering data transmitting method according to an embodiment of the present invention.

First, the trigger transmission unit 220 sets an activation time T1 of an NRT(T1) service, i.e., a target object, in operation S5101, sets a transmission period change time To in operation S5103, and sets a short period transmission count M in operation S5105.

When a current system time t is prior to the transmission period change time To in operation S5107, the trigger transmission unit 220 transmits activation triggering data for the NRT(T1) service in a long period in operation S5109. At this point, the trigger transmission unit 220 may transmit activation triggering data in a period of n*Tp4.

Hereinafter, referring FIGS. 45 to 47, a triggering data transmission pattern is described according to another embodiment of the present invention. Especially, a transmission pattern of maintenance triggering data (MTD) is described.

According to an embodiment, triggering data including a trigger action set to a value corresponding to maintenance may be maintenance triggering data.

Figure 45:
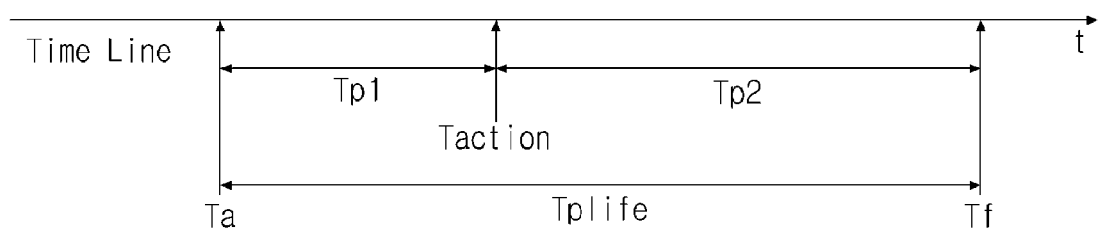
FIG. 45 is a timing diagram according to another embodiment of the present invention.

FIG. 45 is a timing diagram according to another embodiment of the present invention.

In FIG. 45, an activation time Ta indicates an activation time of a TDO and a termination time Tf indicates a termination time of a TDO. An additional action time Taction indicates a time at which another additional action for TDO is triggered (activated) after the activation time Ta and before the termination time Tf. A time window Tplife indicates a time between the activation time Ta and the termination time Tf, especially, the lifetime of a TDO. A time window Tp1 indicates a time between the activation time Ta and the additional action time Taction. A time window Tp2 indicates a time between the additional action time Taction and the termination time Tf.

Moreover, FIG. 45 illustrates a case of when a TDO action occurs one time at a Taction time in the time window Tplife.

Figure 46:
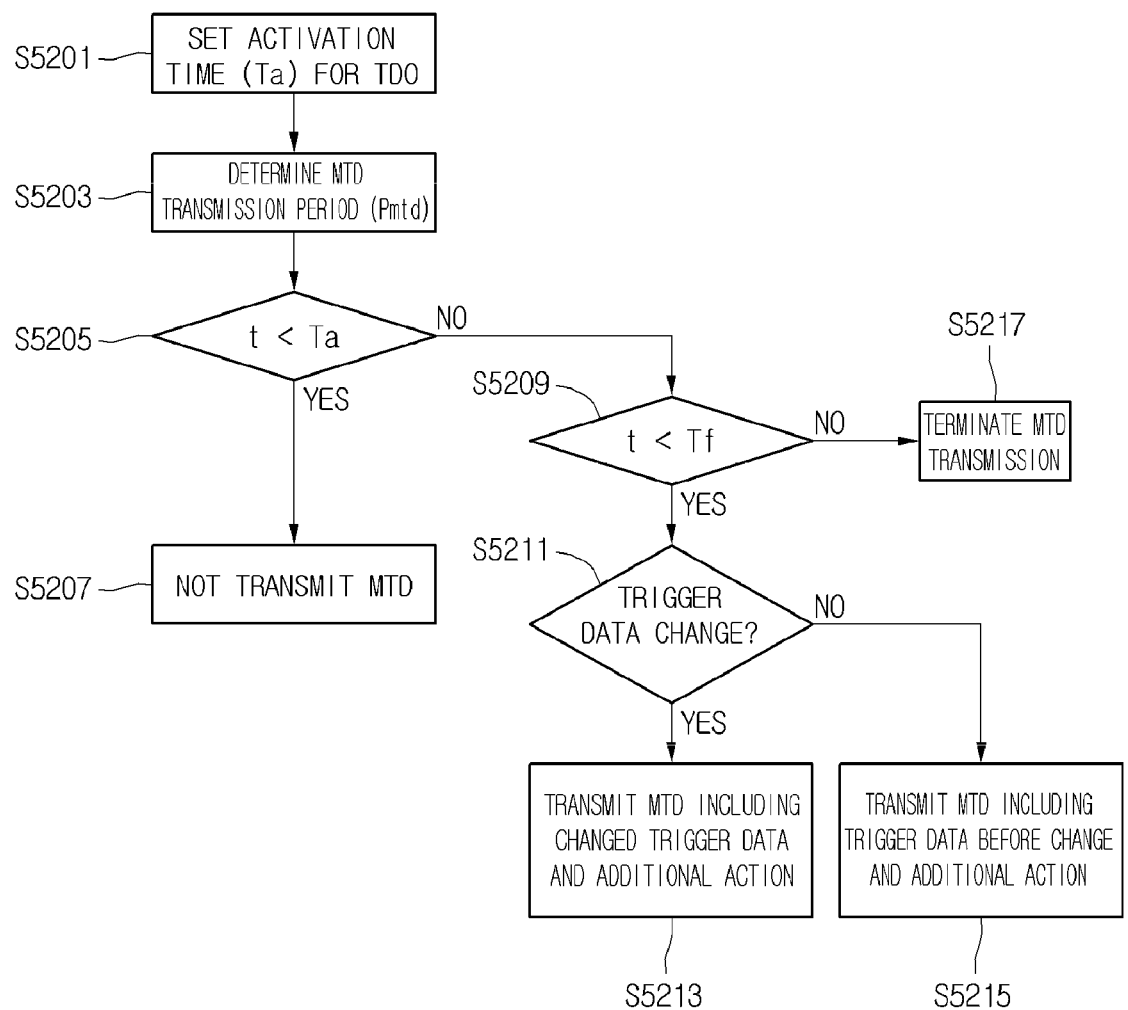
FIG. 46 is a flowchart illustrating a maintenance triggering data transmitting method according to an embodiment of the present invention.

FIG. 46 is a flowchart illustrating a maintenance triggering data transmitting method according to an embodiment of the present invention.

A trigger transmission unit 220 sets an activation time Ta for TDO, i.e., a target object, in operation S5201.

The trigger transmission unit 220 determines a transmission period Pmtd of MTD for a target object in operation S5203. The transmission period Pmtd of MTD may be set to a predetermined value. Additionally, the transmission period Pmtd of MTD may be set in consideration of a channel change time of the receiver 300 or a time for power on/off of the receiver 300.

When the current system time t is prior to the activation time Ta of a target object in operation S5205, the trigger transmission unit 220 does not transmit MTD for the target object in operation S5207.

Moreover, when the current system time t is subsequent to the activation time Ta of the target object in operation S5205 and is prior to the termination time Tf of the target object in operation S5209, the trigger transmission unit 220 confirms a change of triggering data in operation S5211.

If the triggering data is changed, the trigger transmission unit 220 transmits the changed triggering data and maintenance triggering data including an additional action in operation S5213.

If the triggering data is not changed, the trigger transmission unit 220 transmits the triggering data prior to the change and maintenance triggering data including an additional action in operation S5215.

Moreover, when the current system time t is subsequent to the termination time Tf of the target object in operation S5209, the trigger transmission unit 220 terminates the transmission of the maintenance triggering data in operation S5217.

Figure 47:
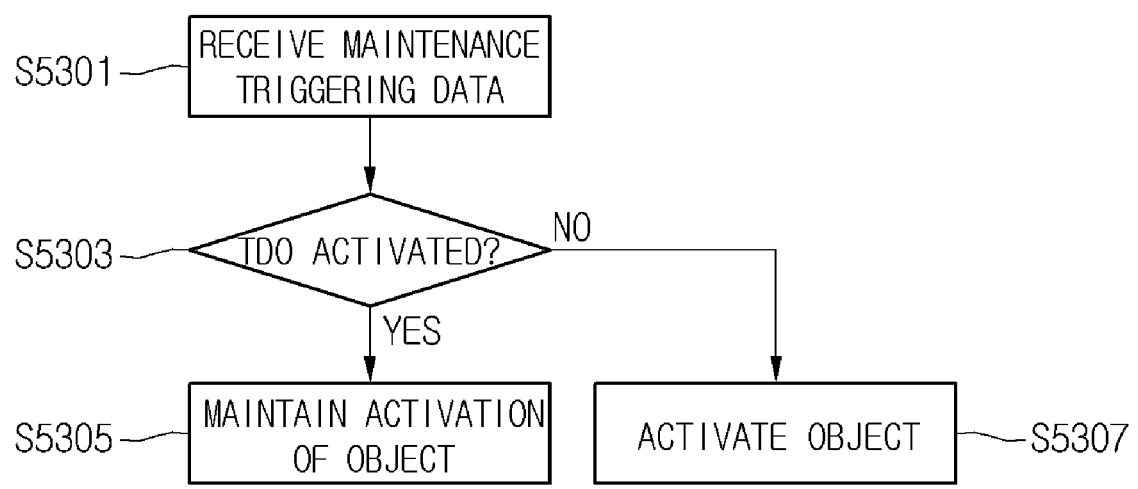
FIG. 47 is a view illustrating a maintenance trigger receiving method according to an embodiment of the present invention.

FIG. 47 is a view illustrating a maintenance trigger receiving method according to an embodiment of the present invention.

First, the trigger receiving unit 331 of the receiver 300 receives maintenance triggering data in operation S5301. The reception of maintenance triggering data may be performed according to the above-mentioned various embodiments.

If an object corresponding to a target service identifier of maintenance triggering data is activated already in operation S5303, the service manager 350 of the receiver 300 maintains the activation of the object in operation S5305.

If the object corresponding to a target service identifier of maintenance triggering data is not activated yet in operation S5303, the service manager 350 of the receiver 300 activates the object in operation S5307.

Hereinafter, referring FIGS. 48 to 50, a triggering data reception timing is described according to an embodiment of the present invention. Especially, a reception timing of preparation triggering data (PTD) is described.

Figure 48:
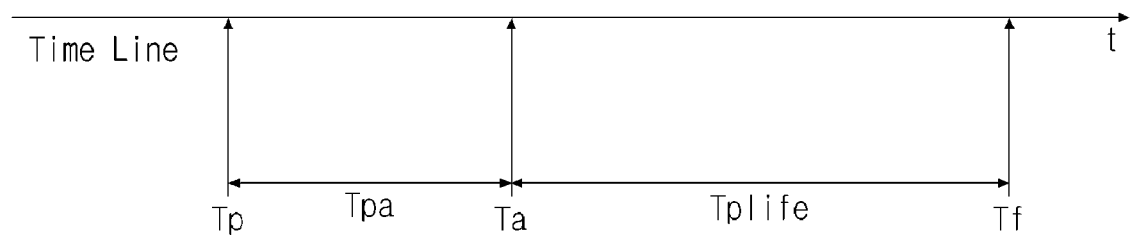
FIG. 48 is a timing diagram according to an embodiment of the present invention.

FIG. 48 is a timing diagram according to an embodiment of the present invention.

In FIG. 48, a preparation trigger time Tp indicates a time at which the preparation of a TDO is triggered by PTD. An activation time Ta indicates an activation time of a TDO and a termination time Tf indicates a termination time of a TDO.

A time window Tpa indicates a time between a preparation trigger time Tp and the activation time Ta and a time window Tplife indicates a time between the activation time Ta and the termination time Tf.

The time window Tpa may vary according to an advance task or a corresponding advance task.

Figure 49:
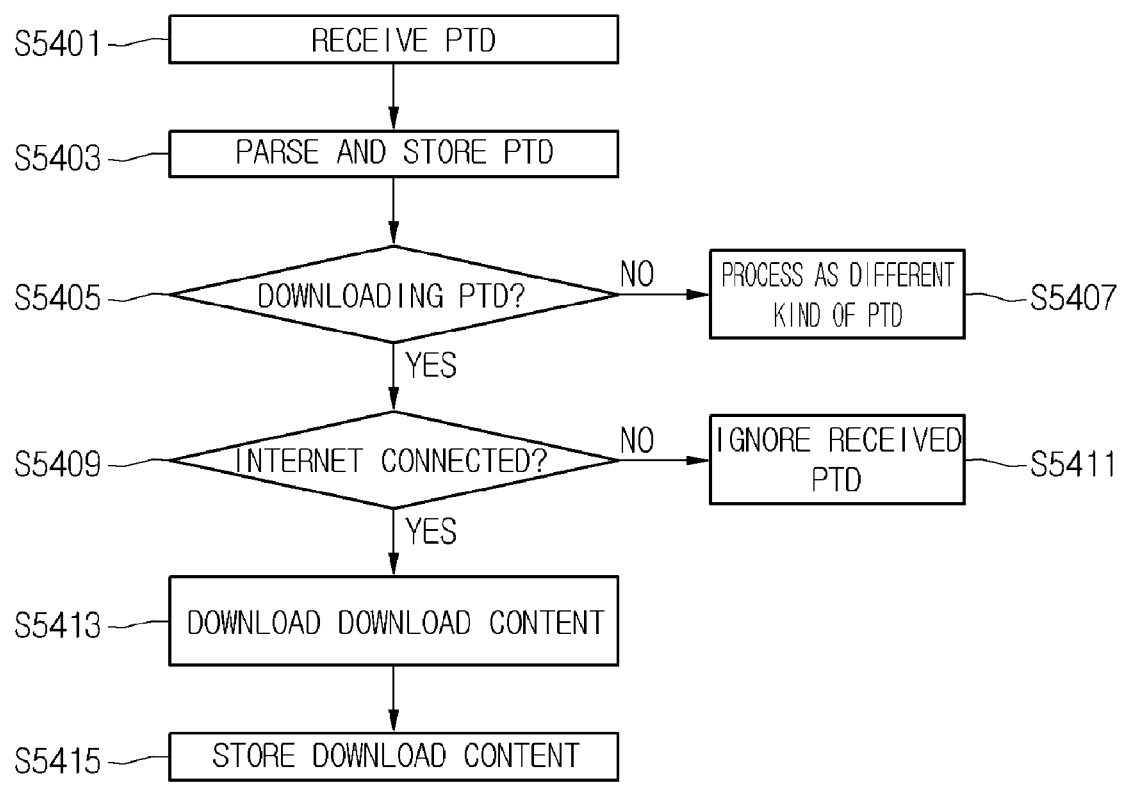
FIG. 49 is a flowchart illustrating a preparation trigger receiving method according to an embodiment of the present invention.

FIG. 49 is a flowchart illustrating a preparation trigger receiving method according to an embodiment of the present invention.

Especially, FIG. 49 illustrates a method of processing downloading preparation triggering data.

Figure 50:
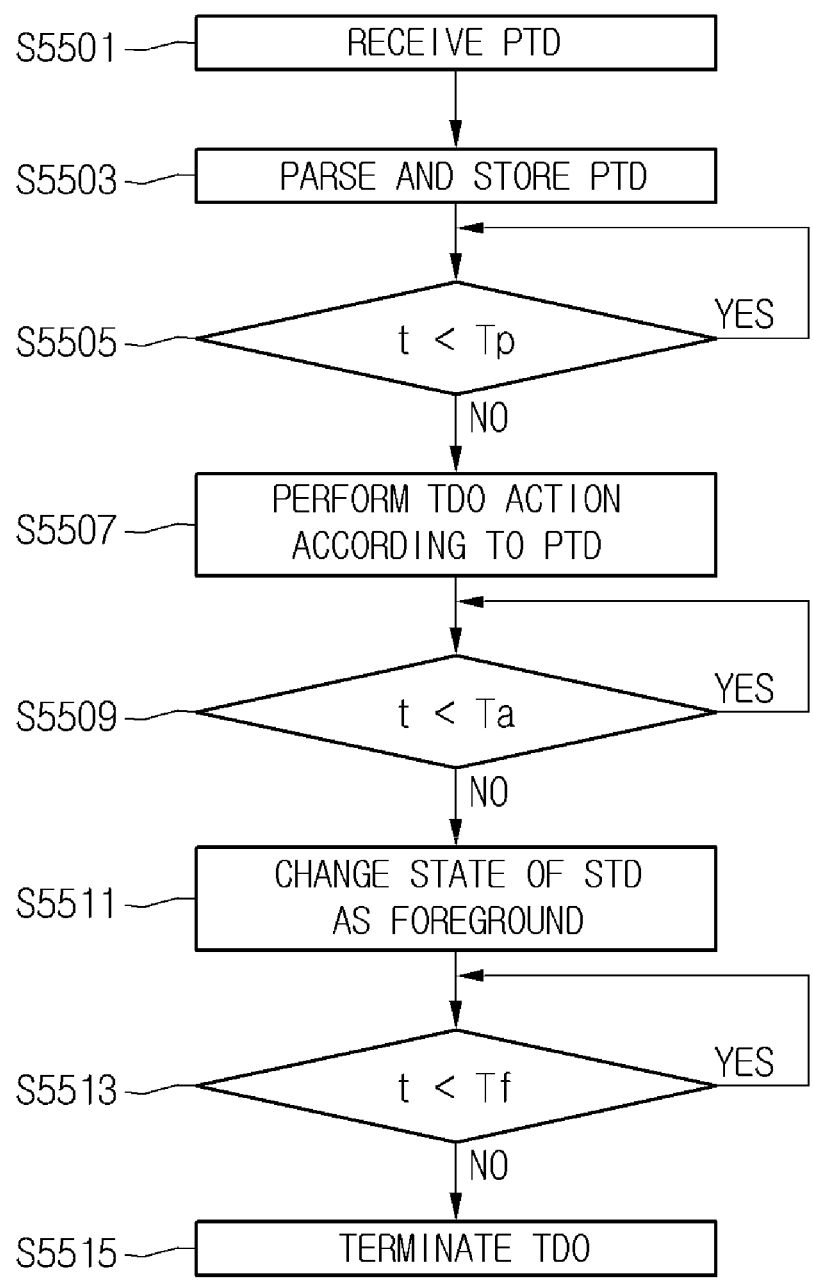
FIG. 50 is a flowchart illustrating a preparation trigger receiving method according to another embodiment of the present invention.

FIG. 50 is a flowchart illustrating a preparation trigger receiving method according to another embodiment of the present invention.

Especially, FIG. 50 illustrates a processing method of PTD requiring the background activation of a TDO to prepare the TDO.

Thus, trigger may be classified as a preparation trigger, an activation trigger, and a maintenance trigger according to its characteristic.

A method of identifying such three triggers and a cross-reference method between three triggers will be described later.

FIG. 51 is a flowchart illustrating a bitstream syntax of a trigger configured according to another embodiment of the present invention.

The trigger according to the syntax shown in FIG. 51 further includes a trigger type field trigger_type and a reference target trigger identifier field target_trigger_id_ref, compared to the trigger according to the syntax shown in FIG. 25.

FIG. 53 is a view illustrating a syntax of an internet location descriptor according to an embodiment of the present invention.

As shown in FIG. 53, the internet location descriptor includes a descriptor tag field descriptor_tag, a descriptor length field descriptor_length, a URL count field URL_count, a URL length field URL_length, and a URL( ) field.

Figure 54:
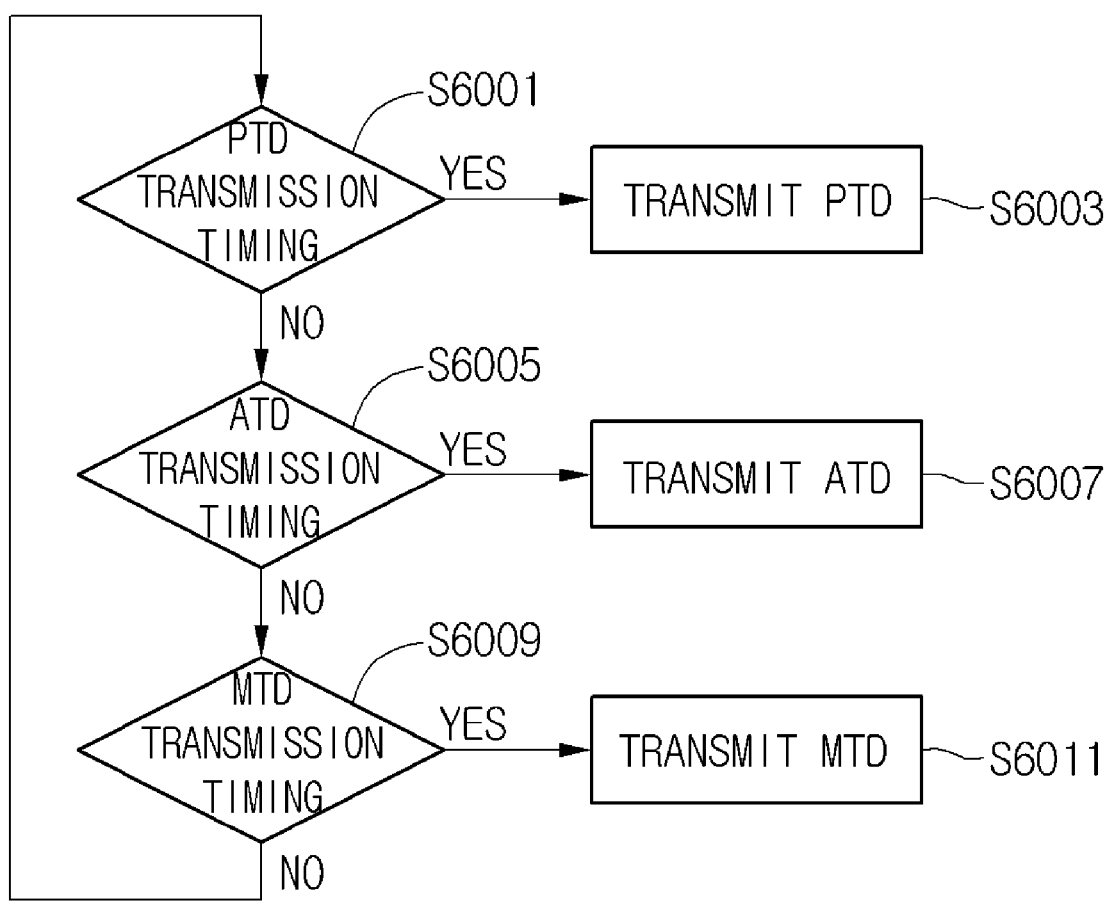
FIG. 54 is a flowchart illustrating a trigger transmitting method according to another embodiment of the present invention.

FIG. 54 is a flowchart illustrating a trigger transmitting method according to an embodiment of the present invention.

The transmitter 200 transmits a preparation trigger in operation S6003 at the transmission timing of the preparation trigger in operation S6001, transmits an activation trigger in operation S6007 at the transmission timing in operation S6005, and transmits a maintenance trigger S6011 at the transmission timing of the maintenance trigger in operation S6009.

In relation to the transmission of a preparation trigger, an activation trigger, and a maintenance trigger, according to an embodiment, a preparation trigger, an activation trigger, and a maintenance trigger may be included in one stream and transmitted.

Then, an operating method of a receiver 300 according to an embodiment of the present invention will be described with reference to FIGS. 55 to 57.

Figure 55:
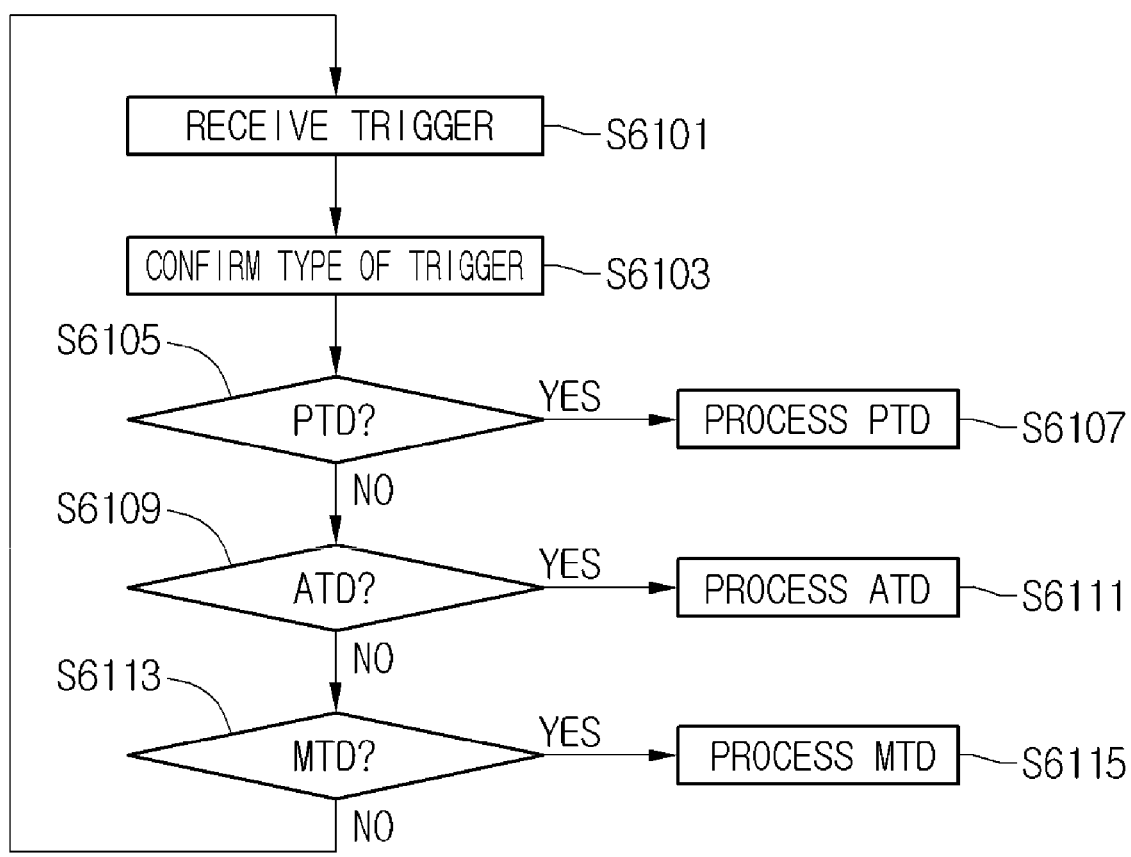
FIG. 55 is a flowchart illustrating an operating method of a receiver according to an embodiment of the present invention.
Figure 56:
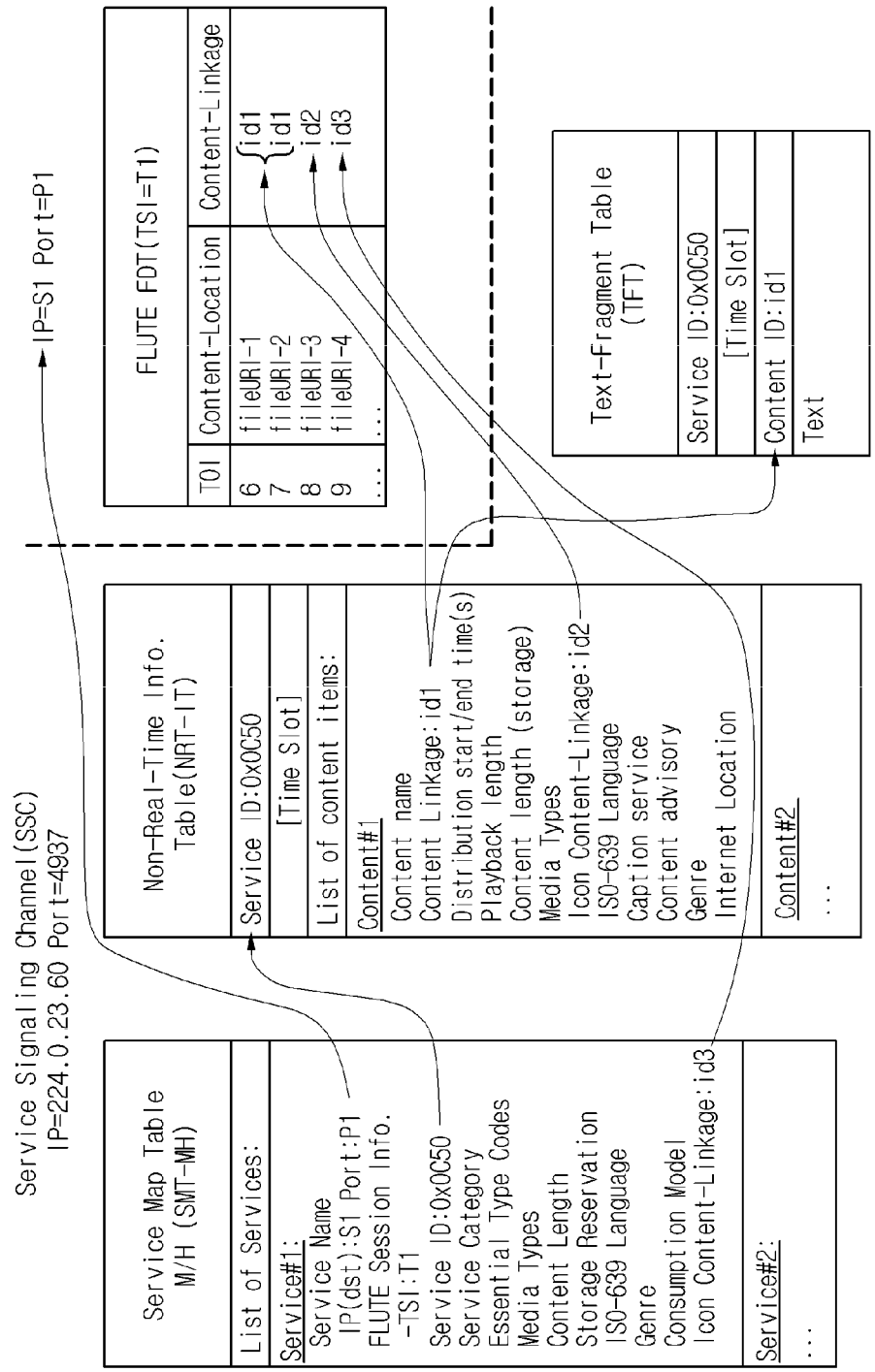
FIG. 56 is a view illustrating a method of a receiver to recognize location information of a content item according to an embodiment of the present invention.

FIG. 55 is a flowchart illustrating an operating method of a receiver according to an embodiment of the present invention.

The receiver 300 receives a trigger in operation S6101. Especially, receiver 300 may receive a trigger in the same manner as shown in FIGS. 36 to 42.

The receiver 300 confirms a type of the received trigger in operation S6103. The receiver 300 may confirm a type of the received trigger in a manner described above. For example, the receiver 300 may confirm a type of a trigger through at least one of a trigger type field trigger_type and a trigger action field trigger_action in the trigger. Additionally, the receiver 300 may confirm a type of a trigger on the basis of whether a target TDO is activated or whether a trigger time elapses.

If the received trigger is a preparation trigger in operation S6105, the receiver 300 processes the received preparation trigger in operation S6107. The processing of the preparation trigger by the receiver 300 was described in relation to a trigger action field of a preparation trigger. A state of a TDO may be changed through such processing of a preparation trigger.

According to another embodiment, when a preparation trigger triggers downloading of a content item, the receiver 300 may recognize the location information of a content item to be downloaded from an internet location descriptor in the preparation trigger, and may download the content item through the recognized location.

Again, FIG. 55 will be described.

If the received trigger is an activation trigger in operation S6109, the receiver 300 processes the received activation trigger in operation S6111. The processing of the activation trigger by the receiver 300 was described in relation to a trigger action field of an activation trigger. A state of a TDO may be changed through such processing of an activation trigger.

If the received trigger is a maintenance trigger in operation S6113, the receiver 300 processes the received maintenance trigger in operation S6115.

Figure 57:
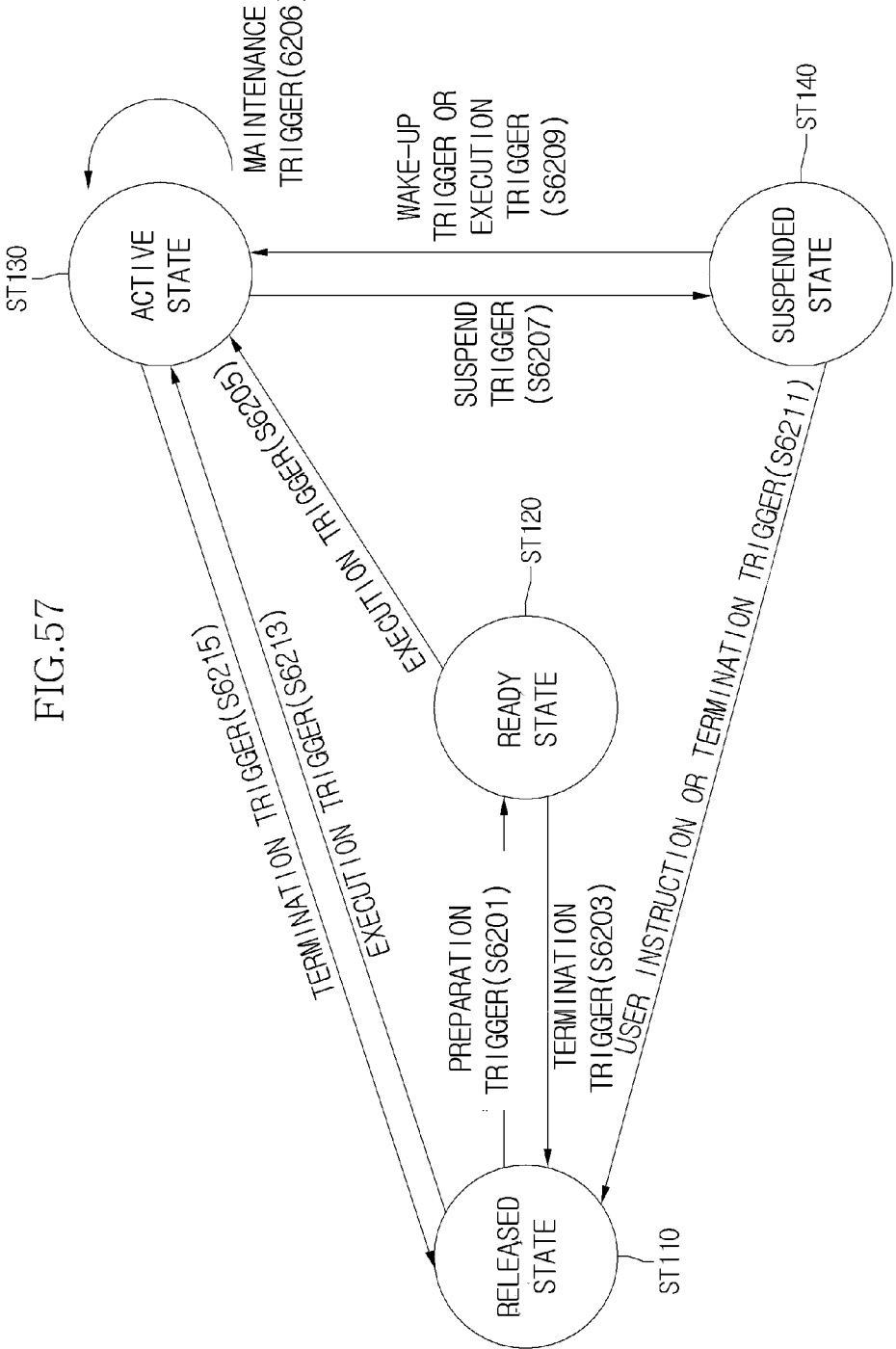
FIG. 57 is a TDO state transition diagram illustrating a method of processing a trigger by a receiver according to an embodiment of the present invention.

FIG. 57 is a TDO state transition diagram illustrating a method of processing a trigger by a receiver according to an embodiment of the present invention.

As shown in FIG. 57, a target TDO is in one of a released state ST110 such as a non-ready state, a ready state ST120, an active state ST130, and a suspended state ST140.

Hereinafter, according to an embodiment of the present invention, a method of providing information on NRT service in linkage with an NRT service, a real time broadcast, and an internet network will be described.

As mentioned above, in an actual broadcast system, one broadcast program may include at least one application executed in linkage with a corresponding program, and such an application may be stored in the receiver 300 and executed through the above-mentioned NRT service receiving method.

However, since a PSIP table does not include information on an NRT service linked with a broadcast program, when the receiver 300 is to receive an NRT service linked with a broadcast program, an NRT-IT of a channel that a specific broadcast program belongs all needs to be parsed. Also, even when the receiver 300 receives the NRT-IT first to receive a content item of NRT service, it is difficult to identify a broadcast program linked with the content item. Additionally, since the PISP table does not include information on an internet network, the receiver 300 receives only a real time broadcast program, so that it is difficult to recognize related service transmitted through an internet network. Additionally, for the same reason as above, it is difficult for the receiver 300 to receive extended EPG on a specific real time broadcast program, which is transmitted through an internet network. Accordingly, a systematic linkage between a real time broadcast program, NRT service, and an internet network is required.

According to an embodiment of the present invention, the transmitter 200 may include NRT service information such as an NRT or a TDO or information used for linking with an internet network in a PSIP table corresponding to a specific channel or program, and then may transmit the PSIP table. Moreover, PSIP table information corresponding to specific real time broadcast channel information or program information may be included in an NRT service, and then transmitted.

Accordingly, the receiver 300 may receive a real time broadcast channel or program, and parses the PSIP table, so that it may selectively receive an NRT service linked with a specific broadcast program. Furthermore, the receiver 300 receives a real time broadcast channel or program, and parses the PSIP table, so that it may receive an NRT service linked with a specific broadcast channel or program, through an internet network. Then, the receiver 300 may receive NRT service to obtain PSIP table information on a broadcast program linkable with the NRT service and then, may provide it to a user.

According to an embodiment of the present invention, a descriptor providing information linked with a real time broadcast, for example, one of NRT service, preview information, extended EPG information, highlight information, and related internet portal information, may be included in one of PSIP tables and then, transmitted. According to an embodiment of the present invention, such a descriptor may be referred to as a link descriptor.

Additionally, according to an embodiment of the present invention, information on a broadcast program linkable with NRT service, for example, broadcast channel information or program information, may be included in one of an SMT and an NRT such as an NRT-IT and then, transmitted. According to an embodiment of the present invention, such a descriptor may be referred to as an event descriptor.

FIG. 58 is a view illustrating a syntax of a link descriptor link_descriptor according to an embodiment of the present invention. FIGS. 59 and 60 are views illustrating contents of fields included in a link descriptor.

As shown in FIG. 58, the link descriptor includes a descriptor tag field descriptor_tag, a descriptor length field descriptor_length, a link count field number_of_links, and a plurality of link data items. Each of the plurality of link data items includes a link type field link_type, a link media field link_media, an MIME type length field mime_type_length, an MIME type field mime_type, a descriptor length field description_length, a description field description, a link length field link_length, and a link byte field link_byte.

The link number field number_of_links may be an 8-bit unsigned integer to indicate the number of a plurality of link data items.

The link type field link_type indicates a type of a receivable related service on the basis of a link byte field in a link data item. For example, as shown in FIG. 44, the link type field may indicate type information of receivable specific service on the basis of a link byte field included in a link data item.

The link media field link_media may be an 8-bit unsigned integer indicating a transmission medium to receive related service on the basis of a link data item. For example, as shown in FIG. 60, when the link media field is 0x02, it indicates that related service receivable based on a link data item is receivable through NRT service. Additionally, when the link media field is 0x03, it indicates that related service is receivable through internet service.

The link byte field link_byte may be a field indicating data to receive the above-mentioned broadcast program related service. The link byte field may include identification information of contents receivable through a link medium. For example, as shown in FIG. 60, if the link medium is NRT service, the link byte field may include a service identifier and a content identifier service_id and content_linkage to receive NRT service. Additionally, if the link medium is internet service, the link byte field may include a uniform resource identifier (URL), i.e., internet address information, or URL information.

Figure 61:
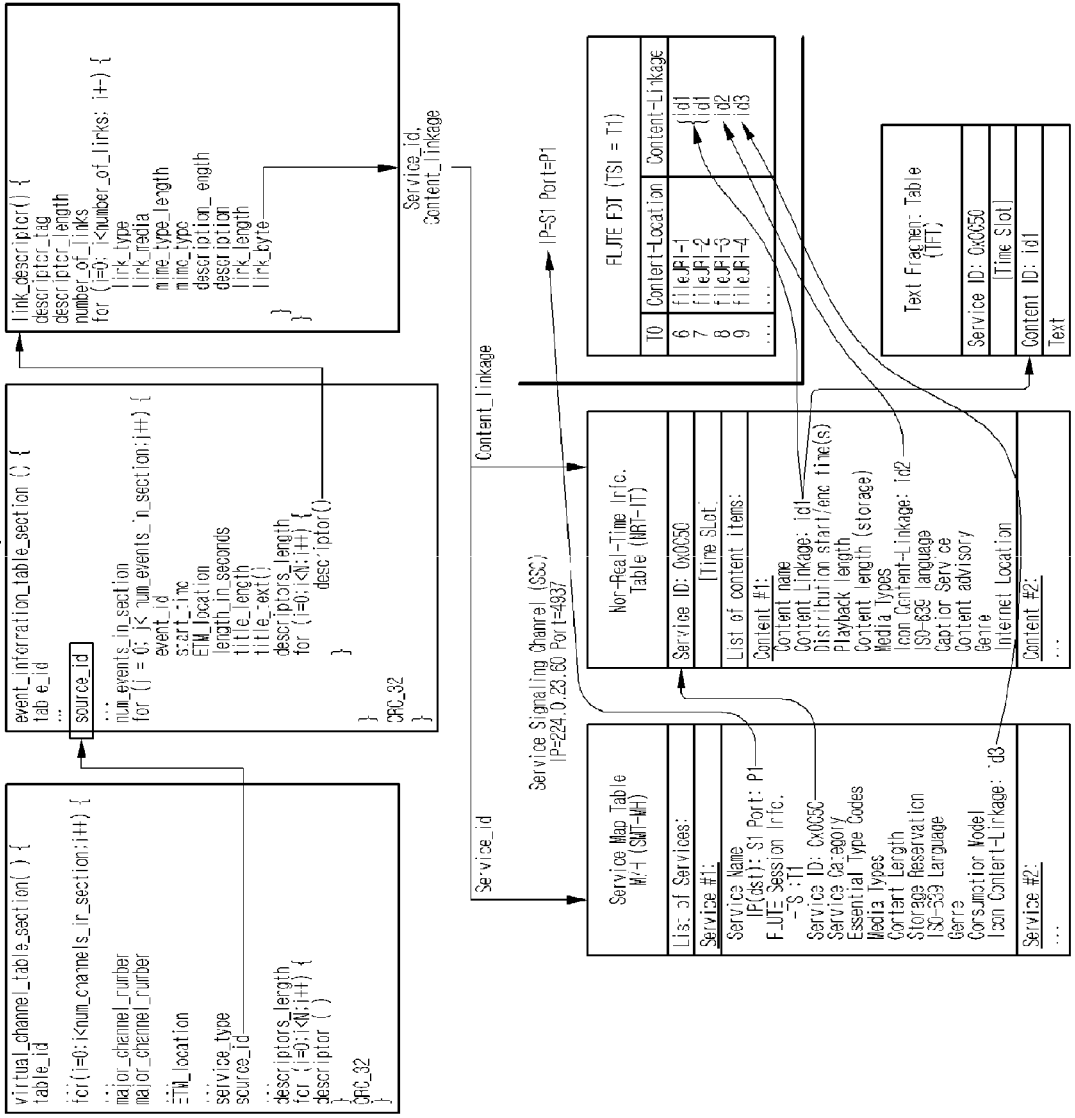
FIGS. 61 and 62 are views illustrating a linkage between each table when the link descriptor of FIG. 58 is included in a descriptor of an event information table (EIT) among PSIP tables according to an embodiment of the present invention.
Figure 62:
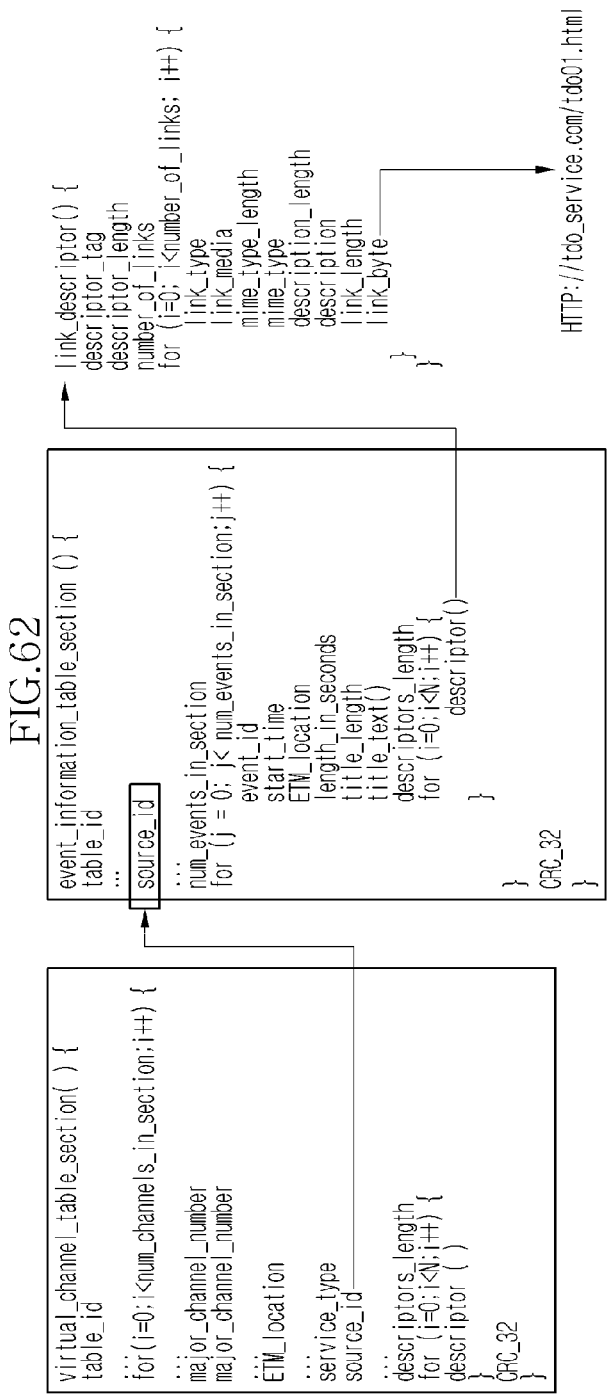

FIGS. 61 and 62 are views illustrating a linkage between each table when the link descriptor of FIG. 43 is included in a descriptor of an event information table (EIT) among PSIP tables according to an embodiment of the present invention.

As shown in FIG. 61, the link descriptor may be included in a descriptor loop of an EIT indicating broadcast program information and then, transmitted.

The EIT in addition to a VCT is included in a PSIP and then, transmitted. Since the VCT includes source_id corresponding to selected virtual channel number channel_number, the receiver 300 parses an EIT including the same source_id as the VCT to obtain information on each broadcast program provided from a corresponding virtual channel. Each broadcast program is identified by event_id Accordingly, the receiver 300 may extract a link descriptor from a loop including event_id of a specific broadcast program in an event loop in the parsed EIT, and may receive information linked to the specific broadcast program by using the extracted link descriptor through NRT service or an internet network.

For example, as shown in FIG. 61, if the link descriptor may include a service identifier service_id and a content identifier content_linkage of an NRT service linked to the specific broadcast program. In this case, the receiver 300 may recognize content item location information of the linked NRT service through an SMT, an NRT-IT, and an FDT, and downloads a content item through the recognized location information.

In more detail, the receiver 300 may obtain service signaling channel information corresponding to a service identifier included in a link byte field of a link descriptor, from an SMT. At this point, the service signaling channel information may include an IP address and a port number. Moreover, the receiver 300 may obtain a list of content indenters content linkage in a service corresponding to a service identifier included in a link byte field of a link descriptor, from an NRT_IT. The receiver 300 may recognize the identifier of a content item to be downloaded, which corresponds to a service identifier in an NRT_IT, through a content linkage field in a link byte field of a link descriptor. Then, the receiver 300 may recognize the locations of content item files corresponding to a content identifier in an NRT_IT from a FLUTE FDT received through the IP address and port number of an SMT. Accordingly, the receiver 300 may receive files configuring a content item of NRT service linked with a corresponding broadcast program by using a FLUTE FDT through a FLUTE session. Moreover, the receiver 300 may extract URL information of content items, for example, a URL list of files, linked with a broadcast program from an internet location descriptor described later in an NRT_IT, and based on the extracted list, may receive files configuring a content item of NRT service linked with a broadcast program through a network.

Furthermore, a link descriptor may include at least one of portal HTML page access information relating to a broadcast, Thumbnail reception information, Preview Clip reception information, Extended EPG reception information, highlight reception information, Multiview reception information, and linkable TDO reception information, in addition to NRT service linked to a broadcast program. A link descriptor may include information to receive such reception information through NRT service or an internet network.

In more detail, the receiver 300 may obtain an EIT corresponding to a selected virtual channel, obtain a link descriptor from a descriptor loop of an event loop (i.e., a for loop including event_id) corresponding to a selected broadcast program in the obtained EIT, extract an internet address from the obtained link descriptor, and receive a service linked to a selected broadcast program in access to an internet network according to the extracted internet address. Accordingly, a broadcast service provider may provide a service linked with a specific broadcast program through a real time broadcast. Moreover, the receiver 300 may access an internet network by using internet address information, and may receive a service linked with a corresponding broadcast program through an internet network.

Figure 63:
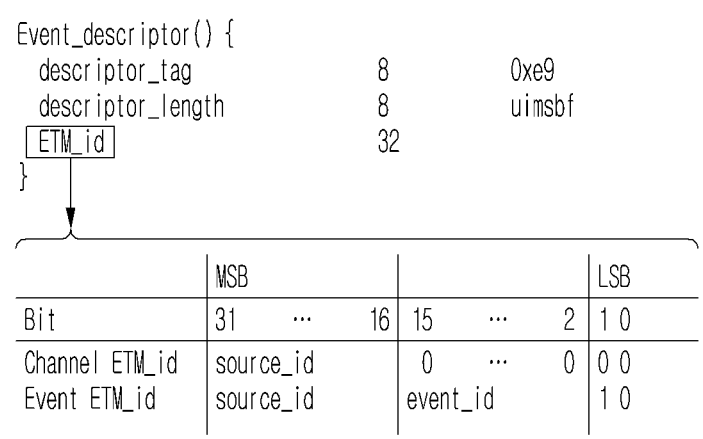
FIG. 63 is a view illustrating a syntax of an event descriptor (Event_descriptor) and contents of fields in the event descriptor according to an embodiment of the present invention.

FIG. 63 is a view illustrating a syntax of an event descriptor (Event_descriptor) and contents of fields in the event descriptor according to an embodiment of the present invention.

As shown in FIG. 63, the event descriptor includes a descriptor_tag field, a descriptor_length field, and an ETM_id field.

Figure 64:
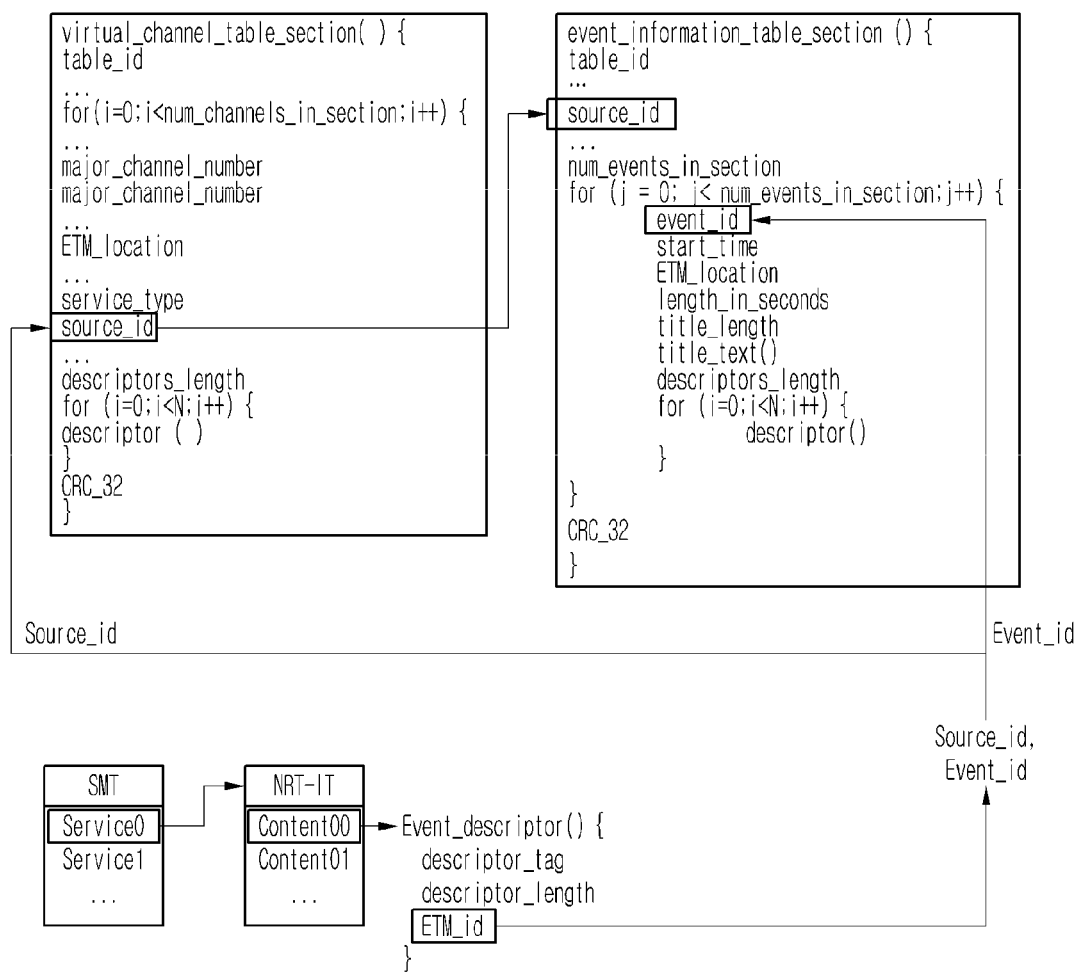
FIG. 64 is a view illustrating a method of identifying a linkage program through an event descriptor according to an embodiment of the present invention.

FIG. 64 is a view illustrating a method of identifying a linkage program through the event descriptor according to an embodiment of the present invention.

For example, as shown in FIG. 64, the service manager 350 of the receiver 300 identifies service_id through an SMT and receives and parses a content item of an NRT service corresponding to service_id identified by an NRT-IT.

Then, the service manager 350 of the receiver 300 may identify a virtual channel matching source_id from a VCT, and may identify an event loop of a broadcast program matching event_id from an EIT of a corresponding virtual channel. The service manager 350 of the receiver 300 receives NRT server related broadcast program information from the identified event loop and then, provides the information to a user. The broadcast program information may include at least one of a start time of a corresponding broadcast program, an ETT position, a broadcasting time, title information, and description information in the event loop of an EIT. Accordingly, the service manager 350 of the receiver 300 provides to a user the information on the received NRT service related broadcast program on the basis of the received broadcast program information.

Figure 65:
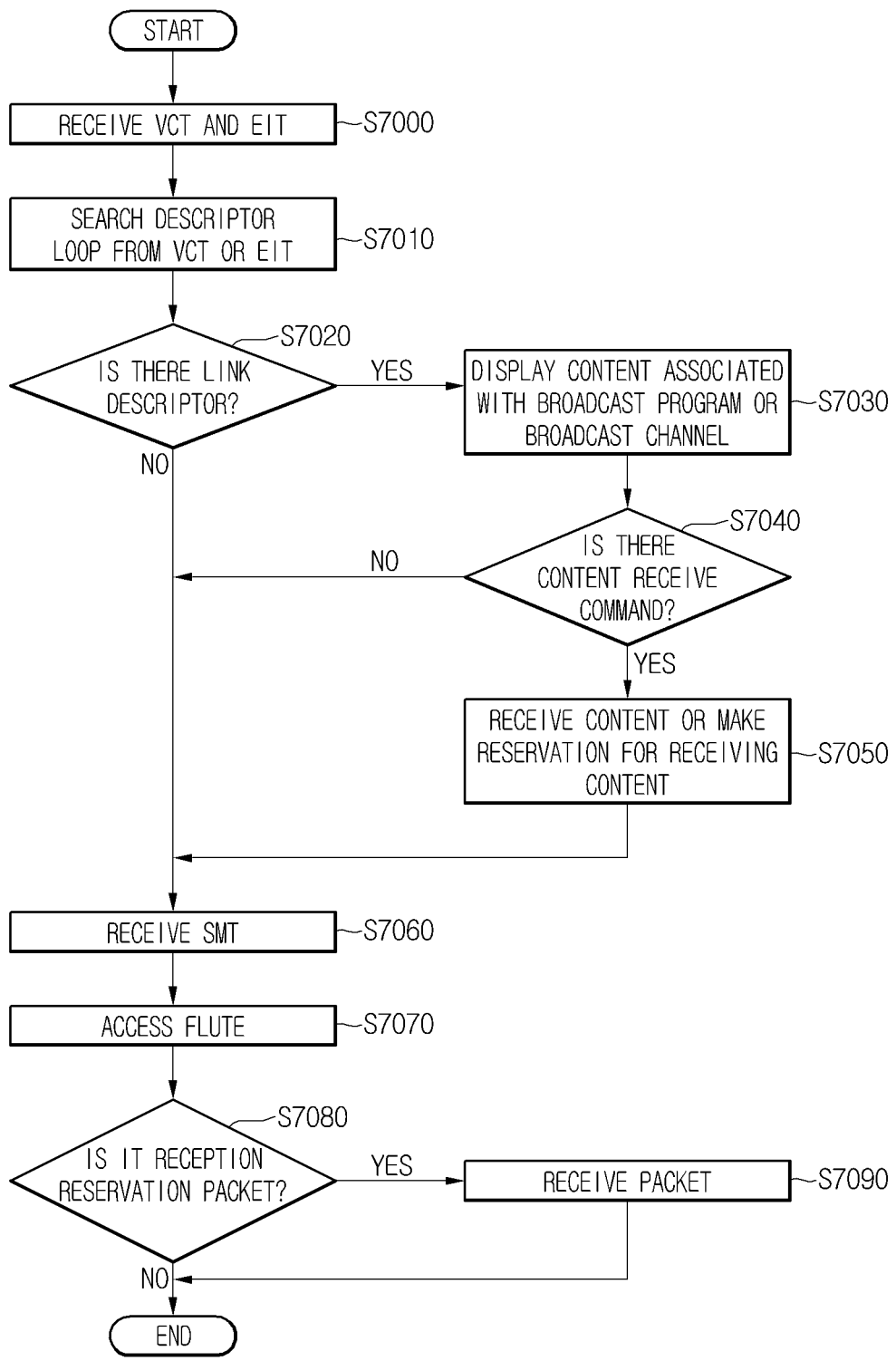
FIG. 65 is a flowchart illustrating an operation of receiving by the receiver 300 broadcast program or broadcast channel related contents by using a link descriptor according to an embodiment of the present invention.

FIG. 65 is a flowchart illustrating an operation of receiving by the receiver 300 broadcast program or broadcast channel related contents by using the link descriptor according to an embodiment of the present invention.

Referring to FIG. 65, when the receiver 300 is turned on, it receives a VCT or an EIT by receiving a PSIP table through a PSIP/PSI handler or service manager in operation S7000. The PSIP/PSI handler or service manager 350 of the receiver 300 parses each table of the PSIP table and obtains VCT or EIT from the parsed tables.

Also, the service manager 350 of the receiver 300 searches for a descriptor loop from the received VCT or EIT in operation S7010. Then, the service manager 350 of the receiver 300 determines whether there is a link descriptor through searching in operation S7020.

Also, when it is determined that there is a link descriptor, the service manager 350 of the receiver 300 extracts link information from the link descriptor, and based on the extracted link information, displays a broadcast program including the link descriptor or a broadcast channel related content list in operation S7030.

Then, the service manager 350 of the receiver 300 determines whether content is selected and there is a receive instruction in operation S7040. The content may be selected by a user or a predetermined process. The selected content may be content displayed on the above-mentioned displayed broadcast channel or broadcast program related content list. Moreover, a user may input a receive instruction on the selected content, and also a receive instruction on the selected content may be performed by a predetermined process.

Then, when a receive instruction on the selected content is executed, the service manager 350 of the receiver 300 receives corresponding content immediately or perform reception reservation in operation S7050.

Then, when contents reserved for reception is NRT service, the service manager 350 of the receiver 300 receives an SMT to identify corresponding NRT service in operation S7060. Then, the service manager 350 of the receiver 300 accesses a FLUTE session through the above-mentioned method in operation S7070 and identifies a packet for the content reserved for reception among packets of a content item file configuring NRT service in operation S7080. Then, the service manager 350 of the receiver 300 receives the identified packets for the content reserved for reception through FLUTE or an internet network in operation S7090.

Figure 66:
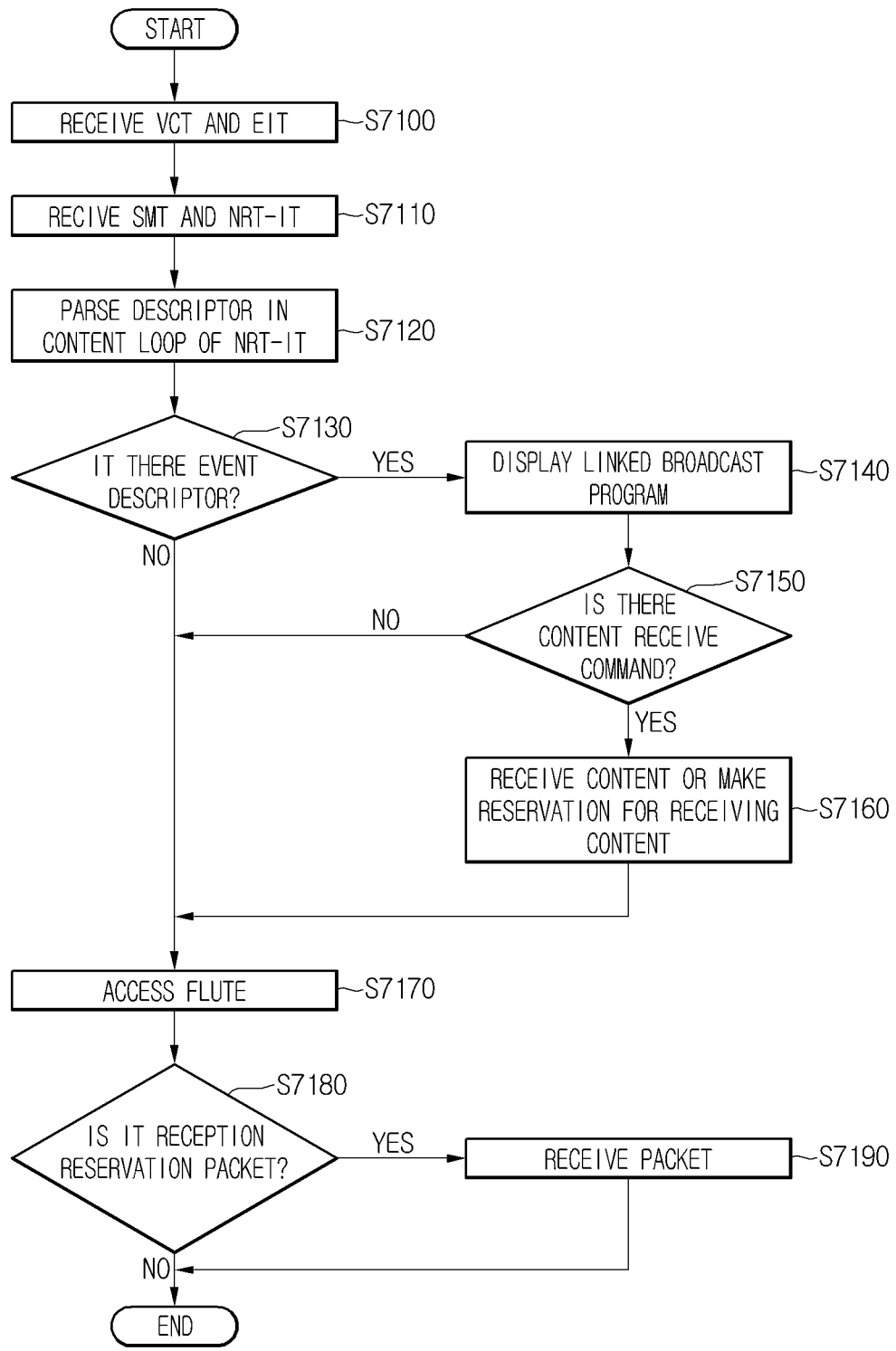
FIG. 66 is a flowchart illustrating an operation of providing by the receiver 300 broadcast program related content by using an event descriptor according to an embodiment of the present invention.

FIG. 66 is a flowchart illustrating an operation of providing by the receiver 300 broadcast program related content by using an event descriptor according to an embodiment of the present invention.

According to an embodiment of the present invention, as shown in FIG. 66, the transmitter 200 inserts broadcast program information linked with NRT service into the event descriptor and inserts the event descriptor into a content loop of NRT-IT to be transmitted to the receiver 300 through a broadcast channel or NRT service signaling channel.

When NRT-IT including the event descriptor is transmitted in such a way, a PSIP/PSI handler or service manager 350 of the receiver 300 parses a PSIP table to obtain a VCT and an EIT in operation S7100. The receiver 300 may provide information on a broadcast channel and broadcast program selected through a VCT and an EIT to a user.

Also, the service manager 350 of the receiver 300 determines whether NRT service is transmitted through an NRT service signaling channel or an internet network, and receives an SMT and an NRT-IT when NRT service is transmitted in operation S7120.

Then, the service manager 350 of the receiver 300 searches for a content loop of an NRT-IT and parses descriptor_tag of each descriptor to identify descriptors in the content loop in operation S7120. Then, the service manager 350 of the receiver 300 determines whether there is an event descriptor in the parsed descriptor in operation S7130.

If there is an event descriptor, the service manager 350 of the receiver 300 displays broadcast channel information or broadcast program information in the event descriptor (for example, a broadcast channel number based on source_id or broadcast program EPG information based on event_id) in operation S7140, and represents that the information is linked with receivable NRT service.

Then, the service manager 350 of the receiver 300 determines whether the content of NRT service linked with a broadcast program is selected and there is a receive instruction in operation S7150.

Then, when a receive instruction on the selected content is executed, the service manager 350 of the receiver 300 receives corresponding content immediately or perform reception reservation in operation S7160. According to an embodiment of the present invention, the selected content may be NRT service. Accordingly, the service manager 350 of the receiver 300 accesses a FLUTE session or internet network on the basis of the pre-received SMT and NRT-IT to receive the selected content such as NRT service in operation S7170.

Then, as shown in FIG. 65, the service manager 350 of the receiver 300 identifies a packet for content reserved for reception among packets of a content item file configuring NRT service in operation S7180. Then, the service manager 350 of the receiver 300 receives the identified packets for the content reserved for reception through FLUTE or an internet network in operation S7190.

FIG. 67 is a view illustrating a syntax of NRT_service_descriptor, that is, a service level descriptor.

As shown in FIG. 67, NRT_service_descriptor in service level descriptors may include information on NRT service transmitted. The information on NRT service may include auto update, the length of content, save reservation information, or consumption_model information.

Especially, a consumption_model field in a box may include information on a service providing method of NRT service transmitted. Accordingly, the service manager 350 of the receiver 300 determines a proper processing method according to each NRT service on the basis of the consumption_model field, and provides NRT service according to the determined method.

According to an embodiment of the present invention, the transmitter 200 presets an NRT service providing method applicable to an TDO and allocates a specific value to the consumption_model field to correspond to the TDO. Accordingly, the transmitter 200 may allocate a value corresponding to a TDO to the consumption_model field and then transmit it.

Then, the service manager 350 of the receiver 300 receives the consumption_model field and determines that an TDO is transmitted and then, receives the TDO according to a predetermined service providing method to provide it.

FIG. 68 is a view illustrating a meaning according to each value of a consumption_model field in NRT_service_descriptor according to an embodiment of the present invention.

The consumption_model field is included in NRT_service_descriptor and is a field indicating which method for consumption_model NRT service that NRT_service_descriptor indicates uses. NRT service may be provided according to a consumption model of one of Browse&Download service, portal service, and push. Additionally, NRT service may be provided depending on a TDO consumption model according to an embodiment of the present invention.

In more detail, when the consumption_model field is a TDO consumption model, the service manager 350 of the receiver 300 receives a corresponding NRT service (TDO), and by using at least one of the link descriptor or event descriptor, obtains NRT service related real-time broadcast channel or program information. Additionally, the service manager 350 of the receiver 300 may receive a trigger included in real-time broadcast to operate a TDO at a specific time or may download a content item in advance.

Moreover, in the case of a TDO consumption model, when each content item is displayed in a currently selected NRT service, it may be downloaded immediately. When an update version of each content item is displayed in a currently selected NRT service, it may be updated immediately. Also, each content item may be executed or terminated by a trigger.

Figure 69:
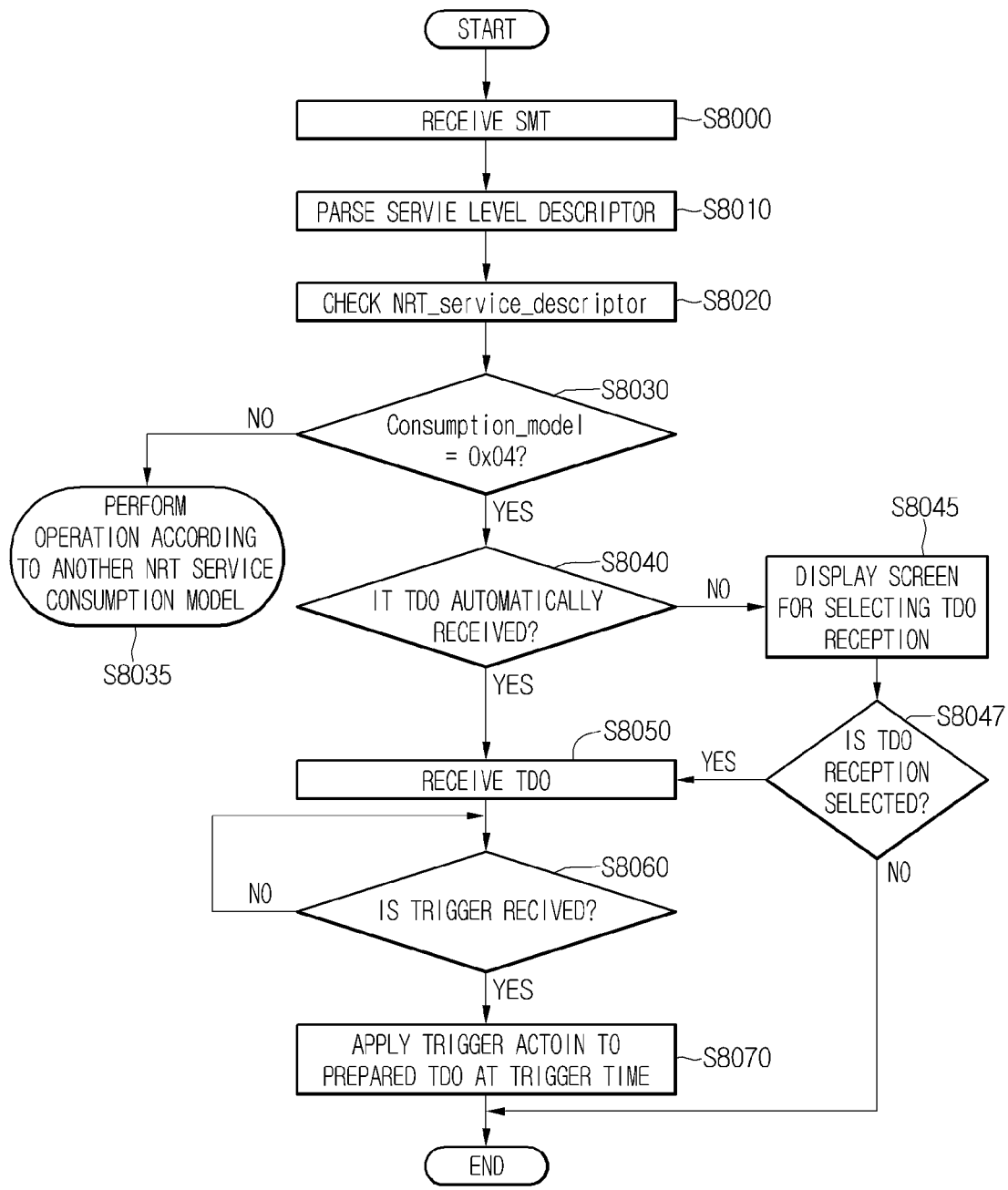
FIG. 69 is a flowchart illustrating an operation of the receiver 300 when a TDO is transmitted by a TDO consumption model according to an embodiment of the present invention.

FIG. 69 is a flowchart illustrating an operation of the receiver 300 when a TDO is transmitted by a TDO consumption model according to an embodiment of the present invention.

First, the receiver 300 receives an SMT in operation S8000, and parses a service level descriptor in operation S8010. The receiver 300 may receive an SMT through a service signaling channel by using the service manager 350, and may parse service level descriptors including an NRT descriptor in a service level descriptor loop in each NRT service loop.

Then, the receiver 300 confirms NRT_service_descriptor in the parsed each service level descriptor, and determines whether a value of the consumption_model field in NRT_service_descriptor is 0x04, i.e., a TDO consumption model, in operation S8030. If the value is not 0x04, the receiver 300 operates according to another NRT service consumption model.

However, if the value is 0x04, the receiver 300 determines that an NRT service designated as a TDO consumption model is transmitted. In this case, the receiver 300 determines whether a TDO automatic reception is set in operation S8040. If the automatic reception is not set, the receiver 300 displays TDO service and a list of contents in the TDO service, and displays a TDO reception selection screen in operation S8045. Then, the receiver 300 receives a TDO service selected by a user in operation S8047.

Moreover, when the automatic reception is set, the receiver 300 receives a TDO without a user's selection in operation S8050.

Then, the receiver 300 determines whether a trigger is received after receiving the TDO in operation S8060.

Additionally, the receiver 300 receives and manages an NRT service that a user selects through the service manager 350. However, in the case of TDO service, since it operates in linkage with real-time broadcast and is triggered by a trigger, storing and managing the TDO service may be accomplished according to the intentions of real-time broadcast service providers.

Therefore, according to an embodiment of the present invention, in the case of a TDO consumption model type in which TDO service is transmitted, the receiver 300 allocates a predetermined area of a storage unit as a TDO storage area, and then, receives TDO service, stores the received TDO service in the allocated area, and manages it. Furthermore, the TDO storage area is designated by the transmitter 200, and then, the TDO service is transmitted to the receiver 300. In this case, the receiver 300 may receive, store, and manage the TDO service in the allocated area.

Figure 70:
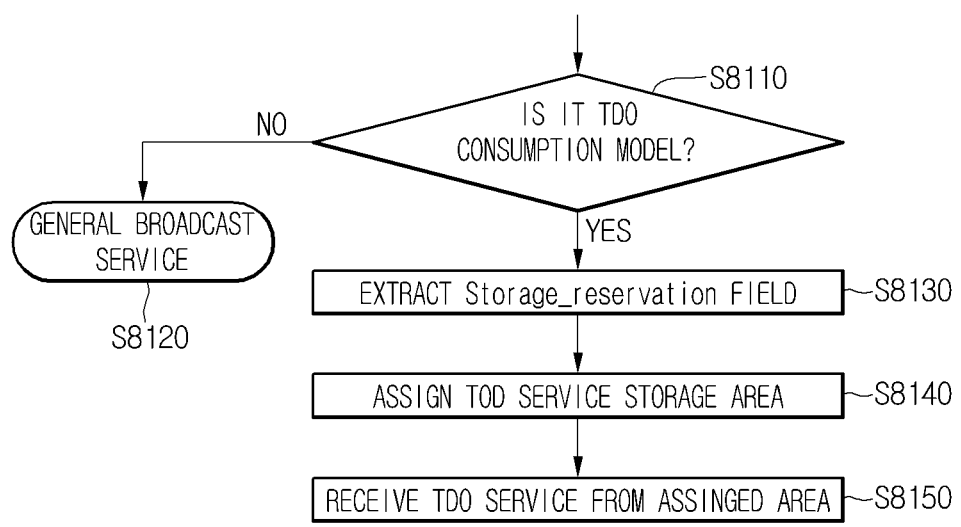
FIG. 70 is a flowchart illustrating a method of allocating and managing a TDO storage area according to a TDO consumption model according to an embodiment of the present invention.

FIG. 70 is a flowchart illustrating a method of allocating and managing by the receiver 300 a TDO storage area according to a TDO consumption model.

Referring to FIG. 70, first, the receiver 300 determines a consumption model of NRT service transmitted after operations S8000 to S8020 of FIG. 69 are performed. Then, the receiver 300 determines whether an NRT service of a TDO consumption model type, for example, TDO service, is transmitted based on a consumption model field in operation S8110.

When the consumption model field indicates a TDO consumption model, the receiver 300 extracts a storage_reservation field of NRT_service_descriptor in operation S8310. The storage_reservation field may be a value corresponding to a storage space essential for a corresponding TDO service. The transmitter 200 may designate a space value for TDO storage area in the storage_reservation field and transmits it.

Then, the receiver 300 allocates a storage area for TDO service reception and operation on the basis on the storage_reservation field value in operation S8140.

Then, the receiver 300 receives TDO service in an area allocated as a TDO service storage area in operation 8150 and stores and manages the received TDO service.

In such a way, the receiver 300 allocates a storage area for TDO service and manages it on the basis of the consumption model field and storage reservation field of NRT service. However, the above method is just one embodiment and is not limited to a storage method according to each value of a consumption model field and a storage reservation field.

Moreover, a TDO may mean an NRT service providing a TDO, or each of content items configuring TDO service. Moreover, each content item is signaled through an NRT-IT, and the receiver 300 receives data signaled through the NRT-IT and recognizes information on a TDO. However, NRT-IT does not include information for TDO, for example, a trigger time, an execution termination time, an execution priority, and an additional data receiving path, besides information provided for general NRT service. Accordingly, it is difficult for the receiver 300 to understand the attribute of a TDO in detail and operates smoothly. Especially, when the receiver 300 manages a storage space, TDO services of a plurality of TDOs provided, or additional data of TDO service, information on TDO is insufficient.

Therefore, according to an embodiment of the present invention, a method of including specific property information of a TDO in TDO metadata and an operation of the receiver 300 according thereto are suggested.

FIG. 71 is a view illustrating a TDO metadata descriptor according to an embodiment of the present invention.

Referring to FIG. 71, TDO metadata includes a descriptor_tag field, a descriptor_length field, a scheduled_activation_start_time field, a scheduled_activation_end_time field, a priority field, an activation_repeat_flag field, and a repeat_interval field.

The scheduled_activation_start_time field and the scheduled_activation_start_time field may be used to allow the receiver 300 to synchronize a TDO with real-time broadcast and operate it. Additionally, the receiver 300 may selectively download a TDO on the basis of the scheduled_activation_start_time field and the scheduled_activation_start_time field and may determine the download order of TDOs.

Additionally, the receiver 300 may determine the deletion order of TDOs on the basis of the scheduled_activation_start_time field and the scheduled_activation_start_time field. Especially, the receiver 300 identifies a TDO having a scheduled_activation_start_time field value closest to the current time (i.e., a TDO to be activated first), and downloads and stores the identified TDO first. Additionally, the receiver 300 may delete a TDO having a scheduled_activation_start_time field value that is the latest from the current time if a storage space is insufficient.

The receiver 300 may sequentially receive or store a plurality of TDOs on the basis of a priority field allocated to each TDO. Moreover, the receiver 300 may execute at least one of a plurality of TDOs on the basis of a priority field allocated to each TDO.

Moreover, the receiver 300 may automatically execute a TDO on the basis of such a priority field. For example, if there are a plurality of TDOs to be executed within a specific time range, the receiver 300 selects a TDO having a high or low priority field and automatically executes it on the basis of a priority field corresponding to each TDO.

The repeat_interval field may mean the execution period of a TDO according to each value as shown in Table 4.

TABLE 4

| | |
|---|---|
| 2 | Every week 4-6 times |
| 3 | Every week 2-3 times |
| 4 | Every week |
| 5 | Biweekly |
| 6 | Every month |
| 7 | Once in two months |
| 8 | Once a quarter |
| 9 | Once in six months |
| 10 | Every year |
| 11-255 | Reserved |

In such a way, the transmitter 200 may transmit a TDO metadata descriptor through an NRT service signaling channel or an internet network. Additionally, the transmitter 200 inserts a TDO metadata descriptor into a content_level_descriptor loop of NRT-IT to transmit additional information on a corresponding TDO.

Moreover, the receiver 300 may receive TDO metadata through an NRT service signaling channel or an internet network to obtain information on a TDO.

Figure 72:
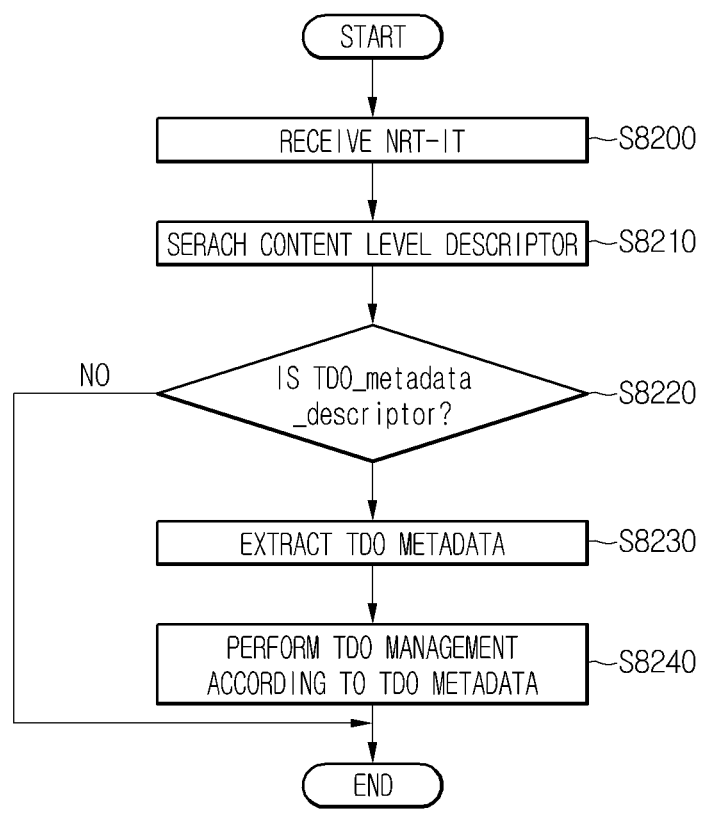
FIG. 72 is a flowchart illustrating an operation of receiving by the receiver 300 TDO metadata according to an embodiment of the present invention.

FIG. 72 is a flowchart illustrating an operation of receiving by the receiver 300 TDO metadata according to an embodiment of the present invention.

Referring to FIG. 72, the receiver 300 receives an SMT and an NRT-IT transmitted through a service signaling channel in operation S8200.

According to an embodiment, the transmitter 200 includes a TDO metadata descriptor in a content level descriptor loop and then, transmits it. Accordingly, the receiver 300 searches for the content level descriptor loop of the received NRT-IT in operation S8220.

Then, if there is a TDO metadata descriptor, the receiver 300 extracts TDO metadata from a TDO metadata descriptor in operation S8230.

Then, the receiver 300 obtains necessary information from the extracted TDO metadata and manages a TDO on the basis of the obtained information in operation S8240.

Figure 73:
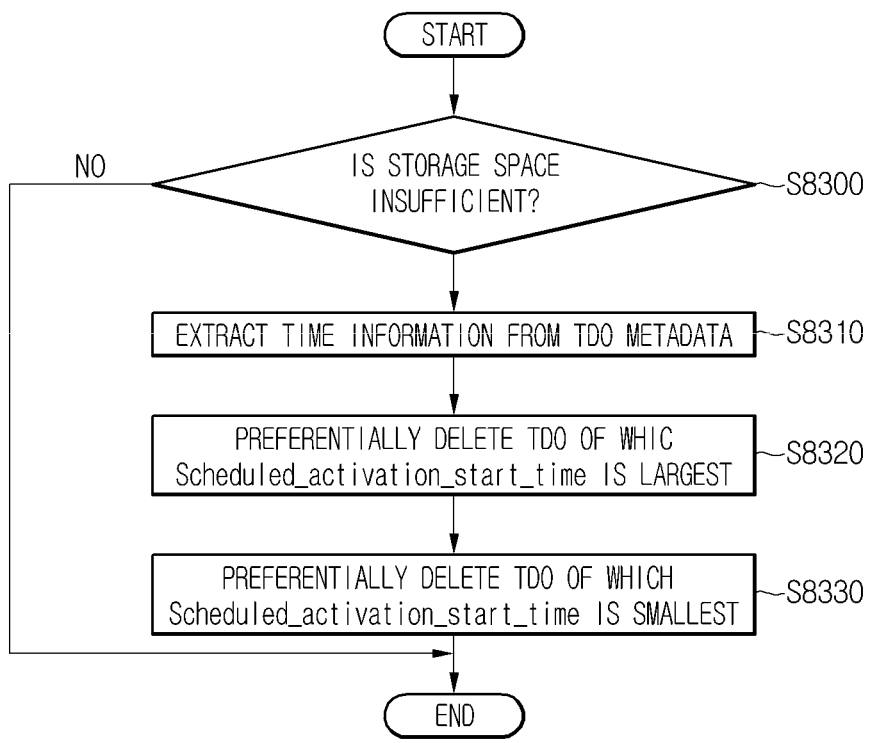
FIG. 73 is a flowchart illustrating a method of the receiver 300 to manage a TDO depending on time information in TDO metadata according to an embodiment of the present invention.

FIG. 73 is a flowchart illustrating a method of the receiver 300 to manage a TDO depending on time information in TDO metadata according to an embodiment of the present invention.

Referring to FIG. 73, the receiver 300 determines whether a storage space for TDO is insufficient in a storage unit in operation S8300.

Then, if it is determined that a storage space is insufficient, the receiver 300 extracts time information from the TDO metadata on each TDO in operation S8310.

Then, the receiver 300 first deletes a TDO having the largest value of a scheduled activation start time field on the basis of a scheduled activation start time for each TDO in operation S8320.

Then, the receiver 300 first receives a TDO having the smallest value of a scheduled activation start time field on the basis of a scheduled activation start time for each TDO in operation S8330.

In addition, time information in TDO metadata may include a time slot descriptor for providing activation time information of a TDO in addition to scheduled activation start and end time fields. The time slot descriptor may include a slot start time, a slot length, and repeat information, by using a time at which a TDO is performed as one slot. Accordingly, the receiver 300 extracts a time slot at which a TDO is activated, so as to predict a repeated execution and end time of the TDO.

Figure 74:
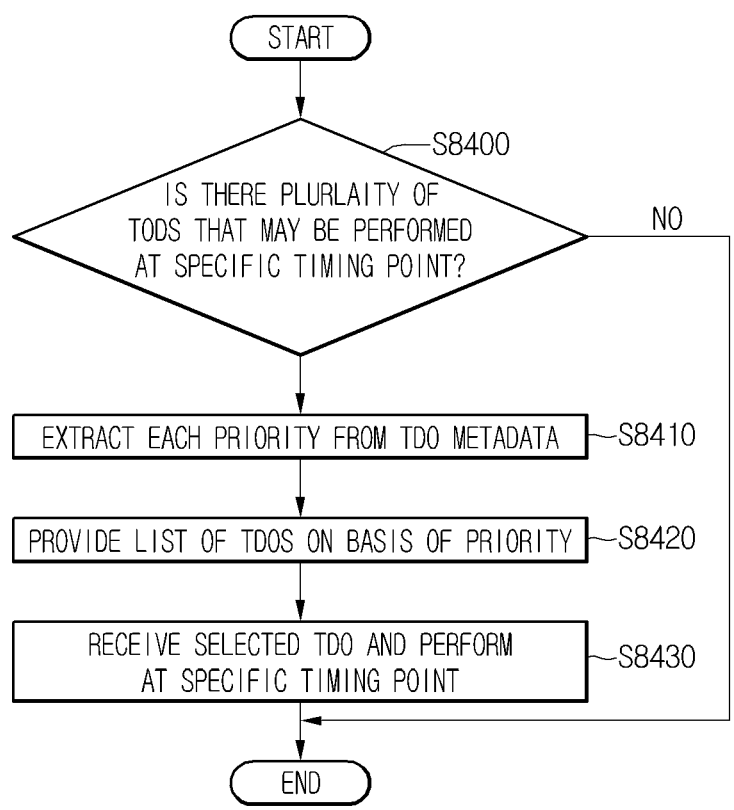
FIG. 74 is a flowchart illustrating a method of the receiver 300 to manage a TDO depending on time information and priority information in TDO metadata according to another embodiment of the present invention.

FIG. 74 is a flowchart illustrating a method of the receiver 300 to manage a TDO depending on time information and priority information in TDO metadata according to another embodiment of the present invention.

Referring to FIG. 74, first, the receiver 300 receives TDO metadata, and determines whether there are a plurality of TDOs executable at a specific time in operation S8400.

Also, when it is determined that there are a plurality of TDOs, the receiver 300 extracts a priority value for each TDO from the TDO metadata in operation S8410.

Then, the receiver 300 provides a list of a plurality of TDO executable at a specific time to a user on the basis of the extracted priority in operation S8420.

Then, when a TDO is selected by a user, the receiver 300 receives the selected TDO, and performs a trigger action on the selected TDO at a specific time, for example, a trigger time.

According to an embodiment of the present invention, the transmitter 200 may designate the URL of content item files transmitted through a broadcast network and an IP network by using an internet location descriptor. This internet location descriptor may be included in a content level descriptor loop of an NRT-IT. Accordingly, the transmitter 200 includes URL information on internet where each file placed in an internet location descriptor and transmits it.

One example of such an internet location descriptor is described with reference to FIG. 75.

FIG. 75 is a view illustrating a syntax of an internet location descriptor according to another embodiment of the present invention.

When the URLs of files configuring a content item are transmitted by using an internet location descriptor shown in FIG. 75, a URL corresponding to each file is designated and needs to be included in an internet location descriptor. However, when the number of files is increased, the number of URLs to be designated is increased, so that transmission efficiency may be reduced. Moreover, the number of URLs is increased, their management becomes complex and difficult.

Accordingly, the transmitter 200 according to an embodiment of the present invention includes list information of URLs corresponding to each file in a FLUTE file description table (FDT), and transmits the FDT through an internet network instead of a FLUTE session. The transmitter 200 may transmit list information of URLs or an FDT by using the internet location descriptor, and also may transmit list information of URLs or an FDT by using the link descriptor.

The receiver 300 receives URL information of the FDT located through a link descriptor or an internet location descriptor, and receives the FDT on the basis of the received URL information through an internet network. Then, the receiver 300 receives files configuring a content item on the basis of URL information of each file in the FDT. In such a way, by transmitting the URL of FDT, it is not necessary to designate a URL to each of a plurality of files. As a result, transmission efficiency may be increased.

Figure 76:
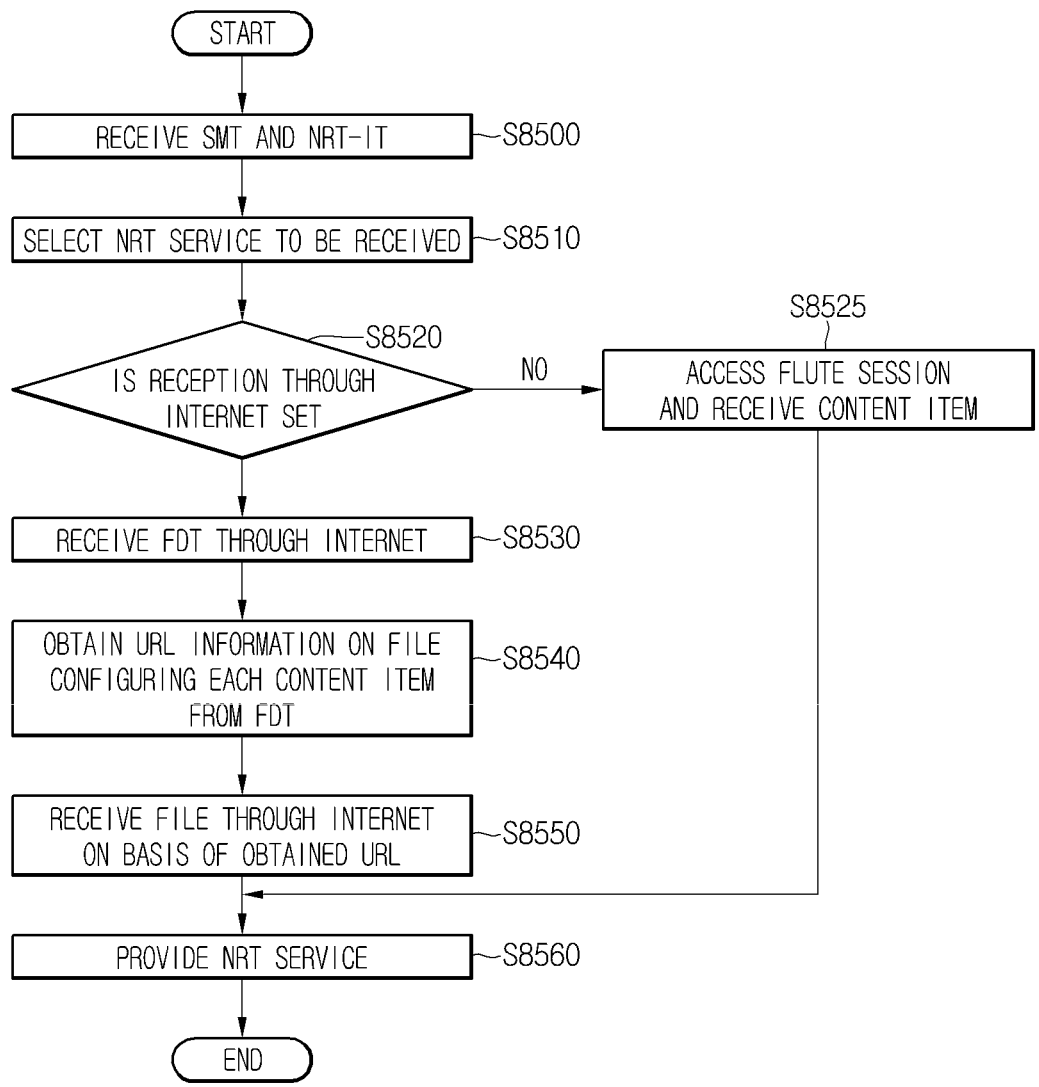
FIG. 76 is a flowchart illustrating an operation of the receiver 300 when an FDT is transmitted through an internet network according to an embodiment of the present invention.

FIG. 76 is a flowchart illustrating an operation of the receiver 300 when FDT is transmitted through an internet network according to an embodiment of the present invention.

Referring to FIG. 76, the receiver 300 first receives an SMT and an NRT-IT through the service manager 350 in operation S8500.

Then, the service manager 350 of the receiver 300 selects NRT service or a content item to be received in operation S8510. The service manager 350 of the receiver 300 selects NRT service to be received according to a predetermined condition. Additionally, the service manager 350 of the receiver 300 selects NRT service to be received according to a user's input.

Then, the service manager 350 of the receiver 300 determines whether to receive each file configuring a content item of the selected NRT service through internet in operation S8520. The service manager 350 of the receiver 300 determines whether to receive each file through internet on the basis of a connection state of the internet network. Additionally, the service manager 350 of the receiver 300 determines whether to receive each file through internet according to a user's setting.

Then, when it is determined that each file is not received through internet, the service manager 350 of the receiver 300 accesses a FLUTE session through an NRT service signaling channel, and receives each file configuring a content item of the selected NRT service in operation S8525. An operation of receiving NRT service through a FLUTE session is described above.

However, when it is determined that each file is received through internet, the service manager 350 of the receiver 300 receives FDT through internet in operation S8530. The service manager of the receiver 300 receives URL information of FDT through a link descriptor or an internet location descriptor, and receives the FDT located on an internet network on the basis of the received URL information of the FDT.

Here, the FDT may include a list index of each file configuring a content item in a FLUTE session. A MIME type designation is necessary in order to additionally transmit the FDT through an internet network. The MIME type means a specific format to indicate the type of a content transmitted through an internet network. Various file formats are registered as MIME types and are used in internet protocols such as HTTP and SIP. The MIME type registration is managed by IANA. MIME may define a message format of a tree structure. According to an embodiment of the present invention, an MIME type corresponding to FDT may be defined as a format such as application/nrt-flute-fdt+xml. Additionally, the receiver 300 parses a URL having the MIME type and, based on this, receives FDT.

When receiving an FDT, the service manager 350 of the receiver 300 obtains URL information of files configuring each content item from the FDT in operation S8540. Then, the service manager 350 of the receiver 300 receives each file on the basis of the obtained URL information through internet in operation S8550. The service manager 350 of the receiver 300 connects the received files on the basis of a content linkage field of the FDT, so that it obtains a content item.

Then, the service manager 350 of the receiver 300 provides NRT service through the received content item in operation S8560.

As mentioned above, since the receiver 300 receives the FDT through internet, it is not necessary to receive URL information of each file and it is possible to efficiently receive NRT service through an internet network. Moreover, according to an embodiment of the present invention, an arbitrary file including a file list (index) may be transmitted instead of FDT.

Figure 77:
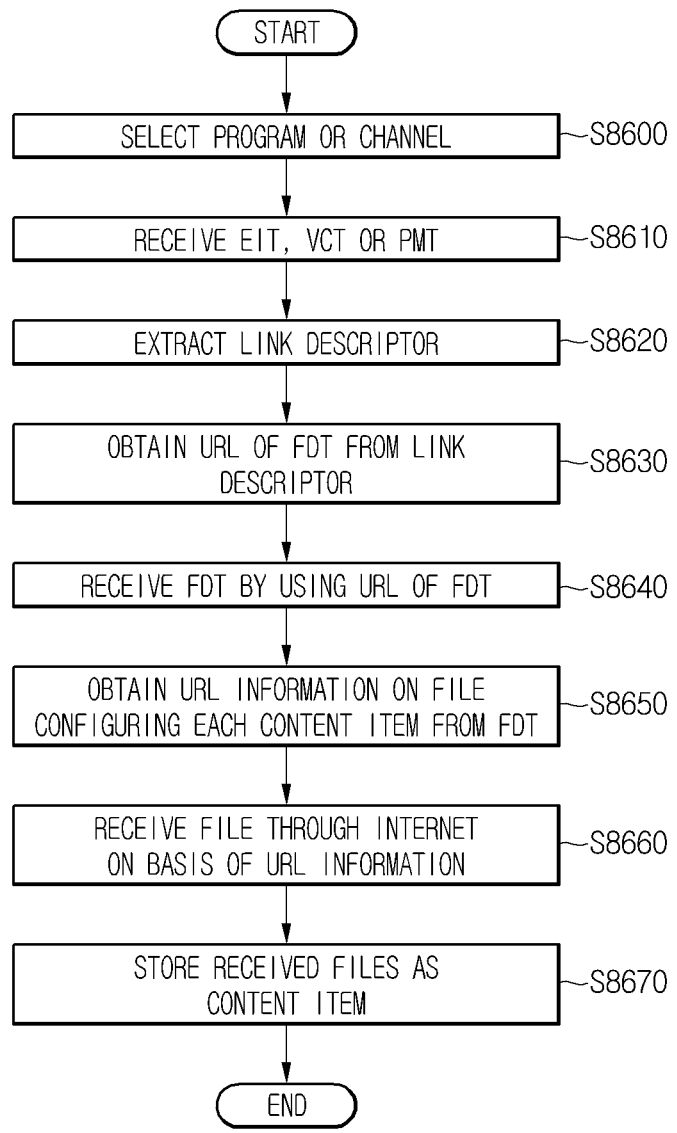
FIG. 77 is a flowchart illustrating an operation of the receiver 300 when the URL of an FDT is transmitted through a link descriptor according to an embodiment of the present invention.

FIG. 77 is a flowchart illustrating an operation of the receiver 300 when the URL of an FDT is transmitted through a link descriptor according to an embodiment of the present invention.

According to an embodiment of the present invention, the transmitter 200 includes the link descriptor in one of EIT, VCT, or PMT and transmits it, and the link descriptor includes URL information for obtaining FDT.

First, when the receiver 300 is turned on, a broadcast channel or a broadcast program is selected in operation S8600.

Then, the receiver 300 receives at least one of an EIT, a VCT, or a PMT through the service manager 350 or a PSIP/PSI handler in operation S8610, extracts a link descriptor in operation S8620, and obtains the URL information of an FDT from the link descriptor in operation S8630.

Then, the service manager 350 of the receiver 300 receives an FDT file by using the obtained URL information of the FDT through internet in operation S8640.

Then, the service manager 350 of the receiver 300 obtains URL information of each file included in the FDT in operation S8650. The URL information of each file included in the FDT may include position information on internet of files configuring a content item of NRT service.

Then, the service manager 350 of the receiver 300 receives designated files according to the obtained URL information through internet in operation S8660 and stores the received files as a content item in operation S8670.

Through such a process, the receiver 300 may receive FDT including a file list configuring a content item of NRT service through an internet network. Moreover, since each file is received based on an FDT through internet, efficient transmission is possible.

Figure 78:
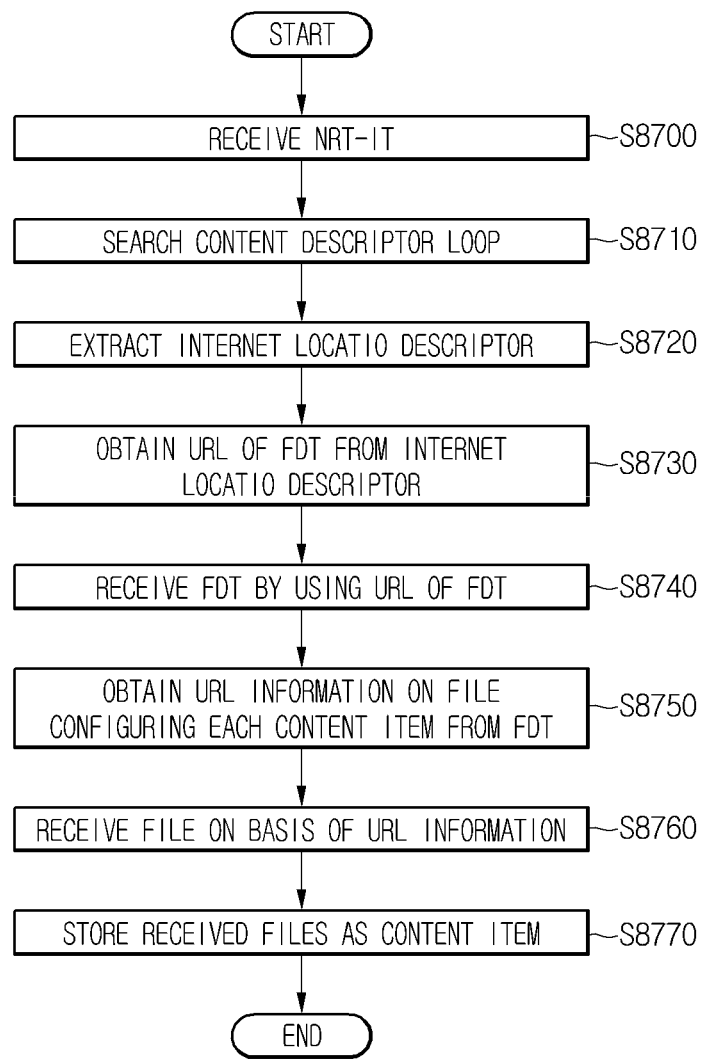
FIG. 78 is a flowchart illustrating an operation of the receiver 300 when the URL of an FDT is transmitted through an NRT-IT according to an embodiment of the present invention.

FIG. 78 is a flowchart illustrating an operation of the receiver 300 when the URL of FDT is transmitted through NRT-IT according to an embodiment of the present invention.

According to an embodiment of the present invention, the transmitter 200 includes the internet location descriptor in a content descriptor loop of an NRT-IT and transmits it, and the internet location descriptor includes URL information for obtaining FDT.

First, the receiver 300 receives the NRT-IT through the service manager 350 in operation S8700.

Then, the receiver 300 extracts an internet location descriptor from a content descriptor loop content_descriptor( ) of the NRT-IT through the service manager 350 in operation S8610, obtains URL information of an FDT from the internet location descriptor in operation S8630, receives the FDT by using the URL information of the FDT through an internet network in operation S8740, and obtains URL information of a file configuring each content item from the FDT in operation S8750.

Here, the receiver 300 receives URL information of FDT through an internet location descriptor, and also receives FDT in access to a FLUTE session through an SMT and an NRT-IT. Additionally, the URL of each file in an FDT may indicate the address of an internet network, and may also indicate a file position in a FLUTE session. Accordingly, the receiver 300 determines the URL format of each file from the FDT, and selectively receives each file through one of a FLUTE session and an internet network according to the determined format.

Additionally, the receiver 300 receives an FDT through an internet network, and receives files configuring a content item in access to a FLUTE session on the basis of the received FDT.

Moreover, the transmitter 200 designates a transmission preferred path when each file is transmittable through both a FLUTE session and an internet network. The transmission priority path may be designated as an attribute of File type: complex type by using xml schema. For example, it may be designated as <xs:attribute name="Internet_preferred" type="s:boolean" use="optional" default="false"/>. Here, internet_preferred means preferred transmission through an internet network, and when a type value is true, it means that preferred transmission through an internet network is performed. Additionally default is defined as false and this indicates that preferred transmission through a FLUTE session is performed by default. Accordingly, the receiver 300 confirms the attribute of each file type to selectively receive each file through one of a FLUTE session and an internet network.

Then, the service manager 350 of the receiver 300 receives designated files according to the obtained URL information of the files through a FLUTE session or an internet network in operation S8760 and stores the received files as a content item in operation S8670.

Additionally, a service provider determines a consumption model corresponding to NRT service and then, allocates a consumption model field value corresponding thereto to NRT service and transmits it. In the case of the above consumption models, the receiver 300 provides NRT service on the basis of one content item. However, with one content item, it is difficult to generate a user interface linked with real-time broadcast or provide a complex and diverse NRT service.

Accordingly, according to an embodiment of the present invention, an NRT service provider may provide a plurality of content items through the transmitter 300 but an NRT service provider may set one content item to control an operation of another content item. The receiver 300 receives this, and identifies a consumption model providing a plurality of content items to provide complex and various NRT services to a user. By using such a consumption model, an NRT service provider may generate a user interface that is interactive with NRT service (NDO or TDO) and transmit it. The receiver 300 generates a look and feel user interface interactive with a user on the basis of a plurality of content items in NRT service and provides it to a user. For this, a content item may be referred to as an entry content item and for this, a scripted consumption model may be used as a consumption model.

Figure 79:
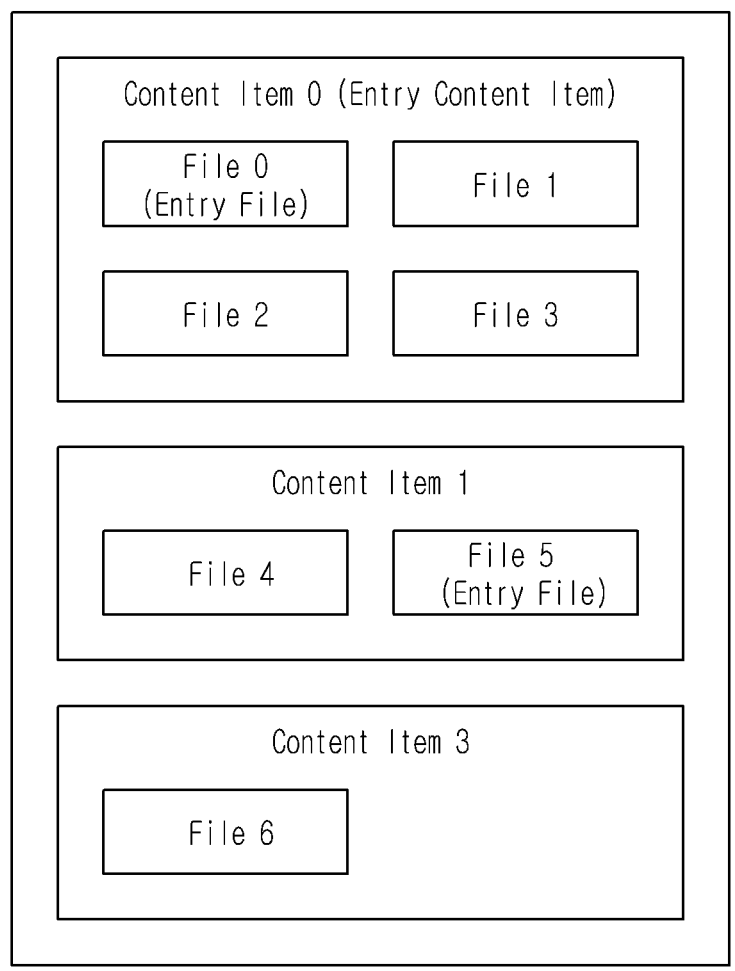
FIG. 79 is a conceptual view illustrating an NRT service including an entry content item.

FIG. 79 is a conceptual view illustrating an NRT service including an entry content item.

Referring to FIG. 79, the NRT service may include a plurality of content items such as a content item 0, a content item 1, and a content item 3. Also, a service provider may designate each entry content item or entry file through the transmitter 200. As shown in FIG. 79, an entry content item is designated as the content item 0, and the entry file is designated as a file 0 and a file 5.

When an NRT service of FIG. 79 is received and a user selects it, the receiver 300 executes the content item 0, i.e., an entry content item first of all. When launching the content item 0, the receiver 300 may execute the file 0, i.e., an entry file, first of all. Here, the entry content item may include a function for managing other content items. Accordingly, the receiver 300 may display the content item 1 and the content item 3 by an operation of the content item 0, and the content item 0 may execute or terminates at least one of the content item 1 and the content item 3 according to a user's selection. Moreover, when the content item 1 is executed, the file 5, i.e., an entry file, may be launched first.

FIGS. 80 and 81 are views illustrating an NRT-IT to transmit information on an entry content item.

The NRT-IT or NCT shown in FIGS. 80 and 81 is included in service signaling data, and the transmitter 200 includes information on an entry content item in service signaling data and transmits it.

As mentioned above, the NRT-IT may include individual information on a plurality of content items. Information of each of the plurality of content items may be included in a content item loop starting as for (j=0; j<num_content_items_in_section; j++). Then, each content item may correspond to each content item loop identified by a content linkage field. Accordingly, the receiver 200 parses a content item loop to obtain a no_entry_flag field corresponding to each content item. Since descriptions for other fields in FIGS. 80 and 81 are identical or similar to those of FIG. 16, their repeated descriptions are omitted.

A no_entry_flag field may be a 1-bit number indicating an entry content item. If this field is 0, a content item corresponding to a content item loop that this field belongs may be an entry content item of a service identified by service_id. If this field is 1, a content item corresponding to a content item loop that this field belongs may not be an entry content item of the above-mentioned service.

Figure 82:
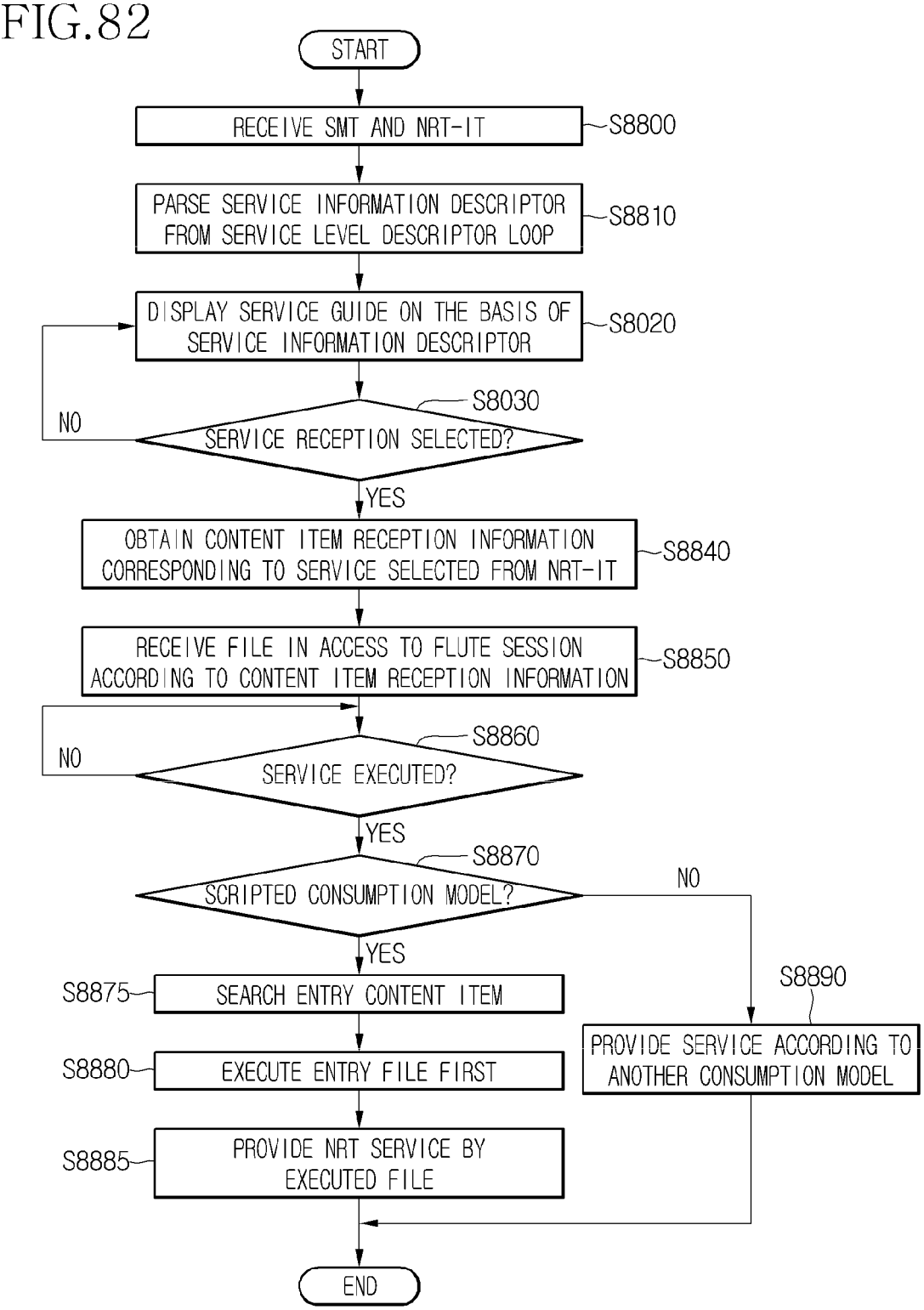
FIG. 82 is a view illustrating an operation method of a receiver when an entry content item is transmitted according to an embodiment of the present invention.

FIG. 82 is a view illustrating an operation method of the receiver 300 when an entry content item is transmitted according to an embodiment of the present invention.

Referring to FIG. 82, the receiver 300 first receives an SMT and an NRT-IT from service signaling data in operation S8800, parses a service level descriptor loop from the SMT, and parses NRT_service_info_descriptor in the service level descriptor loop in operation S8810.

Also, the receiver 300 obtains information on an NRT service transmitted based on the parsed NRT service information descriptor, for example, at least one of an application type, a service category, service capacity, and video or audio codec information, to generate service guide and displays it in operation S8820.

Then, the receiver 300 determines whether service reception on NRT service is selected in operation S8830.

Moreover, when service reception on NRT service is selected, the receiver 300 obtains reception information of content items that a service to be received includes from an NRT-IT in operation S8840.

Then, the receiver 300 receives content items of an NRT service transmitted from the transmitter 200 on the basis of the obtained content item reception information in operation S8850. The service manager 350 of the receiver 300 may receive files configuring content items in access to a FLUTE session on the basis of the obtained service_id field and content_linkage field, as mentioned above.

Then, the receiver 300 determines whether there is a execute command on the received NRT service in operation S8860. The service manager 350 of the receiver 300 determines whether there is a user's execute command when the content item of NRT service is received completely. Additionally, the service manager 350 may automatically execute the received NRT service without a user's execute command.

When the NRT service is executed, the receiver 300 first determines whether a consumption model is scripted in operation S8870. When its value is not a scripted consumption model, the receiver 300 operates in a different way according to another consumption model to provide service in operation S8890.

However, when the consumption model field corresponds to a value designated as a scripted consumption model, the receiver searches for an entry content item among the received content items in operation S8875.

Then, when the entry content item is searched, the receiver 300 executes an entry file first among files in the entry content item in operation S8880. When there is no entry file, the receiver 300 may execute a file according to a file order or predetermined order.

Then, the receiver 300 operates by the executed file, and accordingly, provides NRT service to a user in operation S8885. The receiver 300 provides NRT service by sing an interactive interface in an entry content item. Additionally, the receiver 300 may execute or manage another content item according to a user input for an interactive interface in an entry content item.

In such a way, the receiver 300 executes an entry content item first to provide an interactive interface to a user. The interactive interface may include a management menu such as execution, termination, storage, or deletion of NRT service. For this, the interactive interface may include an icon image or video corresponding to each management menu. A user may conveniently manage another NRT service or other content items through an interface in an entry content item.

According to an embodiment of the present invention, the transmitter 200 generates a plurality of NRT service objects in correspondence to the same NRT service, and allocates different consumption model field values to the generated NRT service objects. The transmitter 200 may include allocation information of the consumption model field values in the above-mentioned NRT service table and then, may transmit it.

Figure 83:
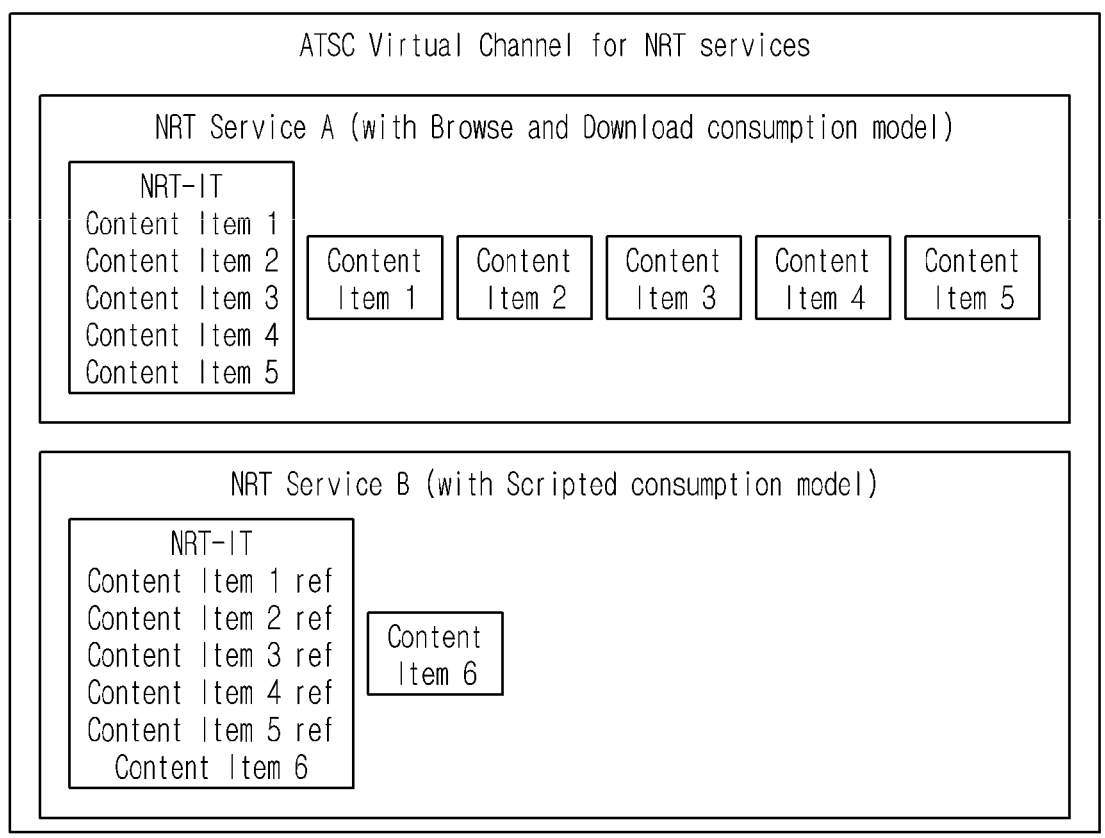
FIG. 83 is a conceptual view of a plurality of NRT service objects transmitted according to an embodiment of the present invention.

FIG. 83 is a conceptual view of a plurality of NRT service objects transmitted according to an embodiment of the present invention.

As shown in FIG. 83, an NRT service transmitted one virtual channel may include an NRT service object A and an NRT service object B. Also, A and B may provide the same NRT service. However, the NRT service object A may be designated as a browser and download consumption model and the NRT service object B may be designated as a scripted consumption model.

Here, the entry content item may refer to an NRT-IT or an SMT in order to execute content items included in another NRT service. The NRT-IT or SMT may include relationship information between NRT services and information on content items according thereto. For example, the NRT-IT may include relationship information or reference information that the NRT service A and the NRT service B provide services by using the same content item.

According to an embodiment, the NRT service A and the NRT service B provide service by using the same content item, but the NRT service A and the NRT service B may include different NRT service objects or content items.

FIG. 84 is a view illustrating a syntax of an NRT service descriptor included in the SMT according to an embodiment of the present invention.

The above-mentioned relationship information may be included in an NRT service descriptor in a service descriptor loop of the SMT. According to an embodiment of the present invention, service is provided using the same content item but NRT services having different consumption model field values may be referred to as the same service or equivalent service. The relationship information on the equivalent services, as shown in FIG. 84, may include an equivalent_service_not_present field, a num_equivalent_services field, and an equivalent_service_id field.

FIGS. 85 and 86 are views illustrating a syntax of another NRT-IT according to another embodiment of the present invention. Since descriptions for other fields of the NRT-IT of FIGS. 70 and 71 are identical to the above, repeated descriptions are omitted.

As shown in FIGS. 80 and 86, the NRT-IT may further include an available_on_current_service field. When equivalent service is transmitted, this field indicates whether there is a content item transmitted in another NRT service. Additionally, even when there is no equivalent service, this field indicates whether a content item linked with a currently executed NRT service is transmitted through another NRT service in order for the receiver 300 to receive or execute a content item of another NRT service through an entry content item.

The available_on_current_service field may be used for the receiver 300 to determine whether there is a content item transmitted in another NRT service linked with the currently transmitted NRT service.

FIG. 87 is a view illustrating a syntax of Other_NRT_location_descriptor according to another embodiment of the present invention.

Referring to FIG. 87, an other NRT location descriptor includes a descriptor_tag field, a descriptor_length field, a num_other_NRT_locations field, and an other_service_id field.

The receiver 300 determines whether a content item is transmitted through another NRT services on the basis of the NRT-IT, and obtains the identifier of another NRT services in which a content item is transmitted on the basis of an NRT service location descriptor.

Figure 88:
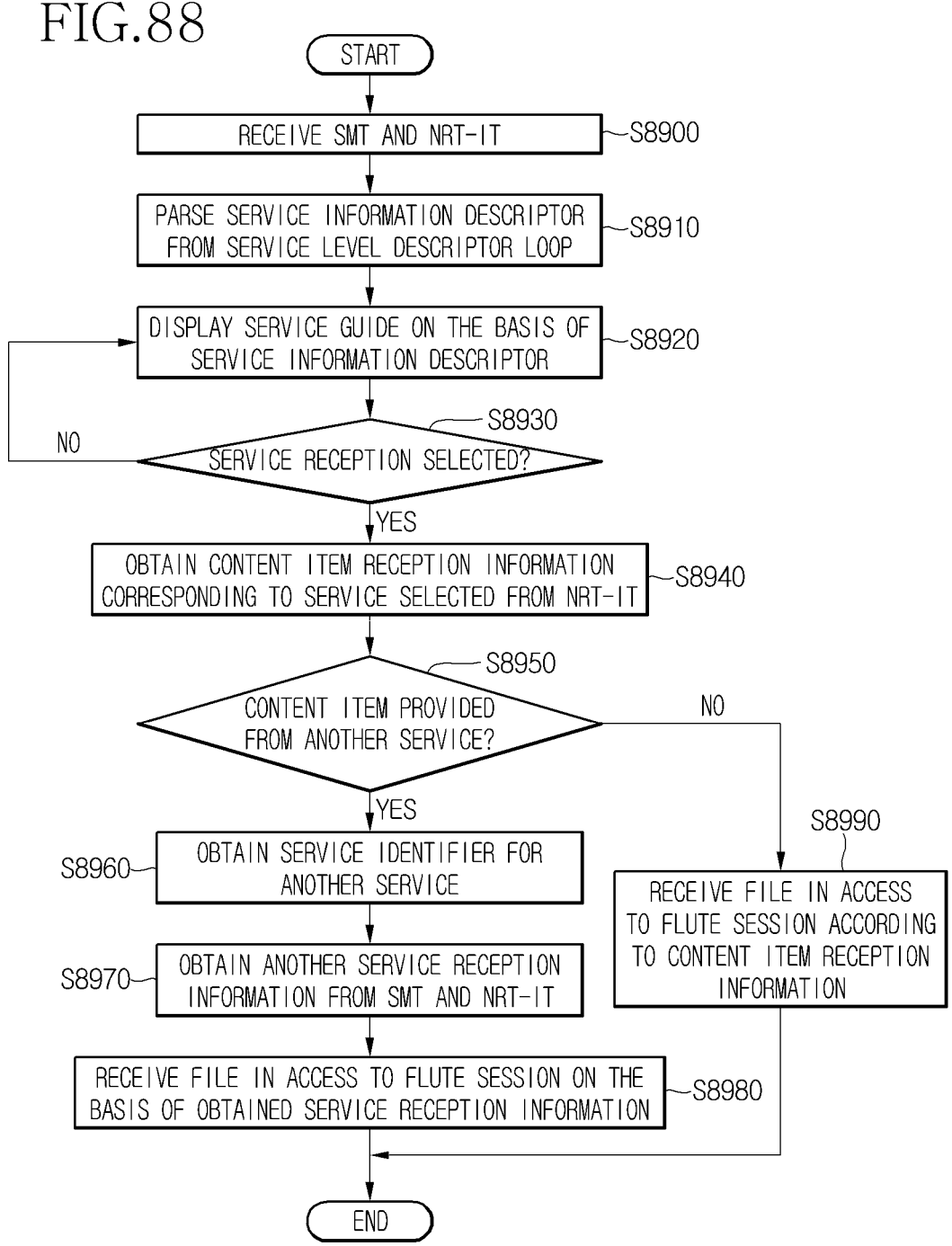
FIG. 88 is a flowchart illustrating a method of receiving broadcast service according to an embodiment of the present invention.

FIG. 88 is a flowchart illustrating a method of receiving broadcast service according to an embodiment of the present invention.

Referring to FIG. 88, the receiver 300 receives an SMT and an NRT-IT from the service signaling data in operation S8900, parses a service level descriptor loop from the SMT and parses NRT_service_info_descriptor in the service level descriptor loop in operation S8910, generates service guide on the basis of the parsed NRT service info descriptor and displays it in operation S8920, and determines whether service reception for NRT service is selected in operation S8930. The above operations may be performed by the service manager 350 of the receiver 300.

Moreover, when service reception on NRT service is selected, the receiver 300 obtains reception information of content items that a service to be received includes from the NRT-IT in operation S8940. The reception information on content items may include content_linkage of a content item and service_id of NRT service that each content item belongs.

Then, the receiver 300 first determines whether a content item is provided through NRT service by using the reception information in operation S8950. Here, the reception information of a content item may include relationship information indicating whether a content item is transmitted through a currently selected service or whether a content item is transmitted through another NRT services. For example, the reception information may include the available_on_current_service field. Additionally, when a content item is transmitted through another NRT service, the reception information of the content item may include the identifier of the other NRT service and the identifier of the content item in order to receive the content item. Accordingly, the receiver 300 determines whether a content item is provided through another NRT service by using the relationship information.

Additionally, the relationship information may include other_NRT_location_descriptor, and the service manager 350 of the receiver 300 determines whether a content item of NRT service that a current user selects to receive is transmitted through a selected service or another NRT service by using the relationship information, and identifies an object corresponding to the other NRT service to receive a content item therein.

If it is determined that the content item is not transmitted through another NRT service, the service manager 350 of the receiver 300 accesses a FLUTE session according to the obtained content item reception information, and receives files configuring each content item through the above method.

Moreover, if it is determined that the content item is transmitted, the service manager 350 of the receiver 300 obtains the service identifier for another NRT service from the reception information in operation S8960 and, by receiving SMT and NRT-IT corresponding thereto, obtains content item reception information in another NRT service in operation S8970. Then, the service manager 350 may receive files configuring a content item in access to a FLUTE session on the basis of the content item reception information.

Hereinafter, an adjunct service receiving method according to another embodiment of the present invention will be described.

The adjunct service may include service information, metadata, enhanced data, a compiled execution file, web application, Hypertext Markup Language (HTML) document, XML document, cascading style sheet (CSS) document, an audio file, a video file, and an address such as Uniform Resource Locator (URL). Additionally, the adjunct service may include signaling data, real time data, a trigger, an SMT, an NRT-IT, an EIT, a VCT, and a PMT.

As digital broadcasting is vitalized, a broadcasting station transmits main AV content together with adjunct service data that are used in linkage with the main AV content or separated from the main AV content.

However, under the current broadcasting environment, an image display device in each home may less likely receive broadcast signals directly through airwaves. Rather, since an image display device in each home is connected to a broadcast receiving device such as a settop box, it may play an uncompressed AV content that the broadcast receiving device provides.

Furthermore, the broadcast receiving device receives content from a server called a multichannel video programming distributor (MVPD). After receiving a broadcast signal from a broadcasting station and extracting content from the received broadcast signal, the MVPD converts the extracted content into a signal of a format fit for transmission and provides the converted signal to the broadcast receiving device. In this process, since the MVPD excludes the extracted adjunct service data or adds another adjunct service data, a broadcasting station may only serve as a role providing AV content and thus, may not provide an adjunct service led by a broadcasting station.

Since only uncompressed AV data are provided to an image display device by extracting main AV data from signals that are received from a broadcast receiving device or an MVPD, adjunct service is available only under a control of a broadcast receiving device and no adjunct service is available under a control of an image display device. This may prevent a broadcasting station from providing a self-led adjunct service further more.

Furthermore, even when a broadcasting station provides an adjunct service through a wireless channel, no adjunct service may be provided sufficiently due to the limitations of a bandwidth.

Hereinafter, an image display device providing an adjunct service led by a broadcasting station and a control method thereof will be described.

Then, a network topology according to an embodiment of the present invention will be described with reference to FIGS. 89 to 97.

Figure 89:
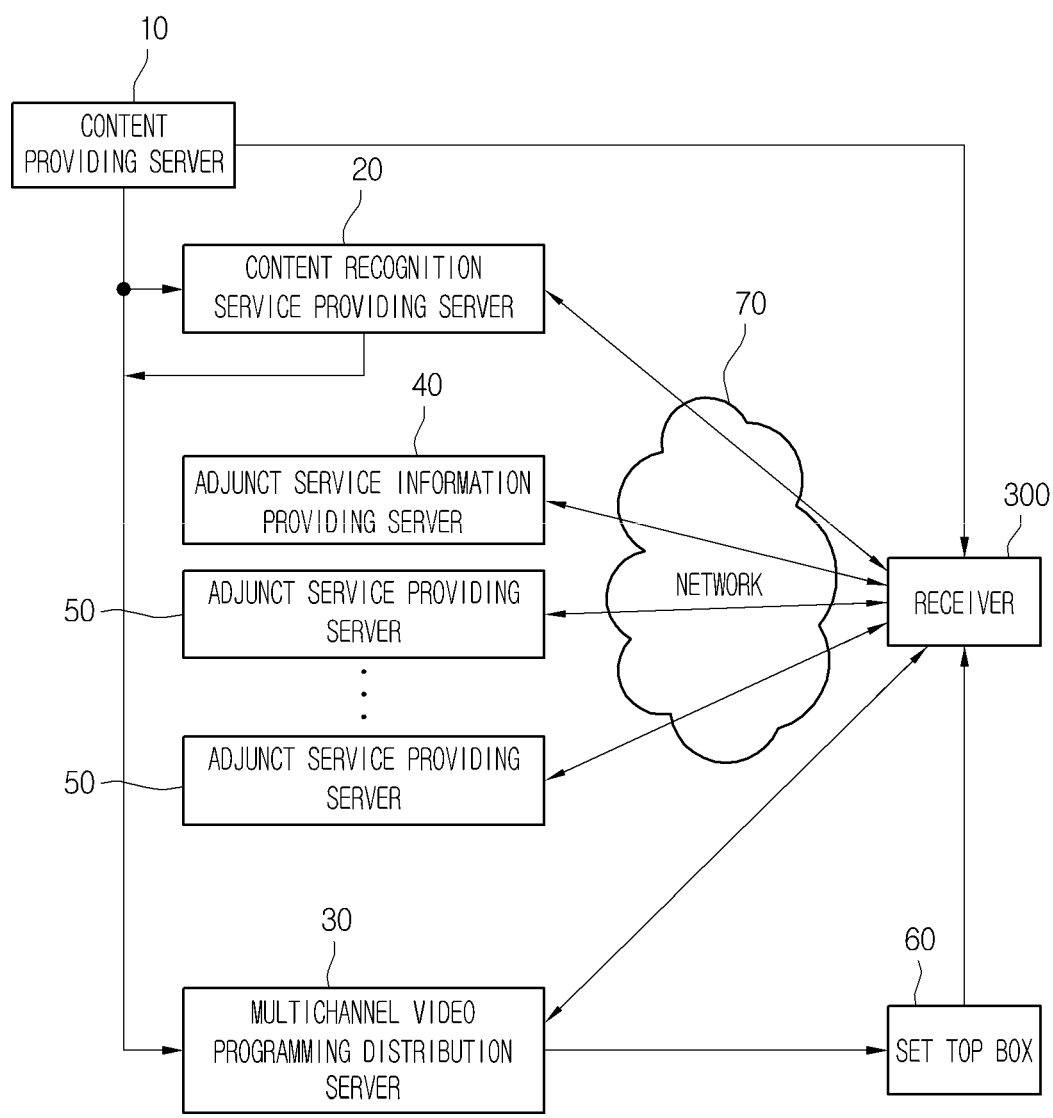
FIGS. 89 to 97 are views illustrating a network topology according to an embodiment of the present invention.

FIG. 89 is a block diagram of a network topology according to an embodiment of the present invention.

As shown in FIG. 89, the network topology according to an embodiment of the present invention includes a content providing server 10, a content recognition service providing server 20, a multichannel video distribution server 30, an adjunct service information providing server 40, a plurality of adjunct service providing servers 50, a settop box 60, a network 70, and a receiver 300.

The content providing server 10 may correspond to a broadcasting station, and broadcasts a broadcast signal including main audio-visual content. The broadcast signal may further include an adjunct service. The adjunct service may or may not relate to a main audio-visual content. At least one content providing server may exist.

The content recognition service providing server 20 provides a content recognition service that allows the receiver 300 to recognize content on the basis of the main audio-visual content. The content recognition service providing server 20 may or may not modify the main audio-visual content. At least one content recognition service providing server may exist.

The content recognition service providing server 20 may be a watermark server inserting a visible watermark looking like a logo into the main AV content by applying a modification on the main audio-visual content. This watermark server may watermark the logo of a content provider at the top left or top right of each frame of the main AV content.

Moreover, the content recognition service providing server 20 may be a watermark server inserting content information as invisible watermark into the main audio-visual content by applying a modification on the main AV content.

Moreover, the content recognition service providing server 20 may be a fingerprint server extracting and storing feature information from some frames of the main AV content or a section of audio samples of the main AV content. This feature information is called a signature.

The multichannel video distribution server 30 receives broadcast signals from a plurality of broadcasting stations and multiplexes them to provide the multiplexed signals to the settop box 60. Especially, the multichannel video distribution server 30 performs a demodulation and channel decoding operation on the received broadcast signals to extract a main AV content and an adjunct service, and then performs a channel encoding operation on the extracted main AV content and adjunct service to generate multiplexed signals. At this point, since the multichannel video distribution server 30 excludes the extracted adjunct service data or adds another adjunct service data, a broadcasting station may not provide a service led by the broadcasting station. At least one multichannel video distribution server may exits.

The settop box 60 tunes a channel selected by a user, receives a signal of the tuned channel, and performs a demodulation and channel decoding operation on the received signal to extract main audio-video content. Then, the settop box 60 decodes the extracted main AV content by using H.264/Moving Picture Experts Group-4 advanced video coding (MPEG-4 AVC), Dolby AC-3, and a Moving Picture Experts Group-2 Advanced Audio Coding (MPEG-2 AAC) algorithm, so as to generate uncompressed main AV content. The settop box 60 provides the generated uncompressed main AV content to the receiver 300 through an external input port of the receiver 300.

The adjunct service information providing server 40 provides adjunct service information for at least one available adjunct service relating to main AV content in response to a request of the receiver 300. The adjunct service information providing server 40 and the receiver 300 may communicate with each other through the network 70. At least one adjunct service address providing server may exist. The adjunct service information providing server 40 may provide adjunct service information for an adjunct service having the highest priority among a plurality of available adjunct services.

The adjunct service providing server 50 provides at least one adjunct service used in relation to main AV content in response to a request of the receiver 300. At least one adjunct service providing server may exist. The adjunct service providing server 50 and the receiver 300 may communicate with each other through the network 70.

The network 70 may be an IP based network or an Advanced Television Systems Committee—Mobile/Handheld (ATSC M/H) channel.

The receiver 300 may be a device having a display unit such as a television, a notebook, a mobile phone, a smart phone, etc. The receiver 300 may receive uncompressed main AV content from the settop box 60 through an external input port, or may receive a broadcast signal including encoded main AV content from the content providing server 10 or the multichannel video distribution server 30 through a broadcast network. The receiver 300 may receive a content recognition service from the content recognition service providing server 20 through the network 70, may receive an address of at least one available adjunct service relating to main AV content from the adjunct service information providing server 40 through the network 70, or may receive at least one available adjunct service relating to main AV content from the adjunct service providing server 50 through the network 70.

At least two of the content providing server 10, the content recognition service providing server 20, the multichannel video distribution server 30, the adjunct service information providing server 40, and the plurality of adjunct service providing servers 50 may be combined as a form of one server or operated by one provider.

Figure 90:
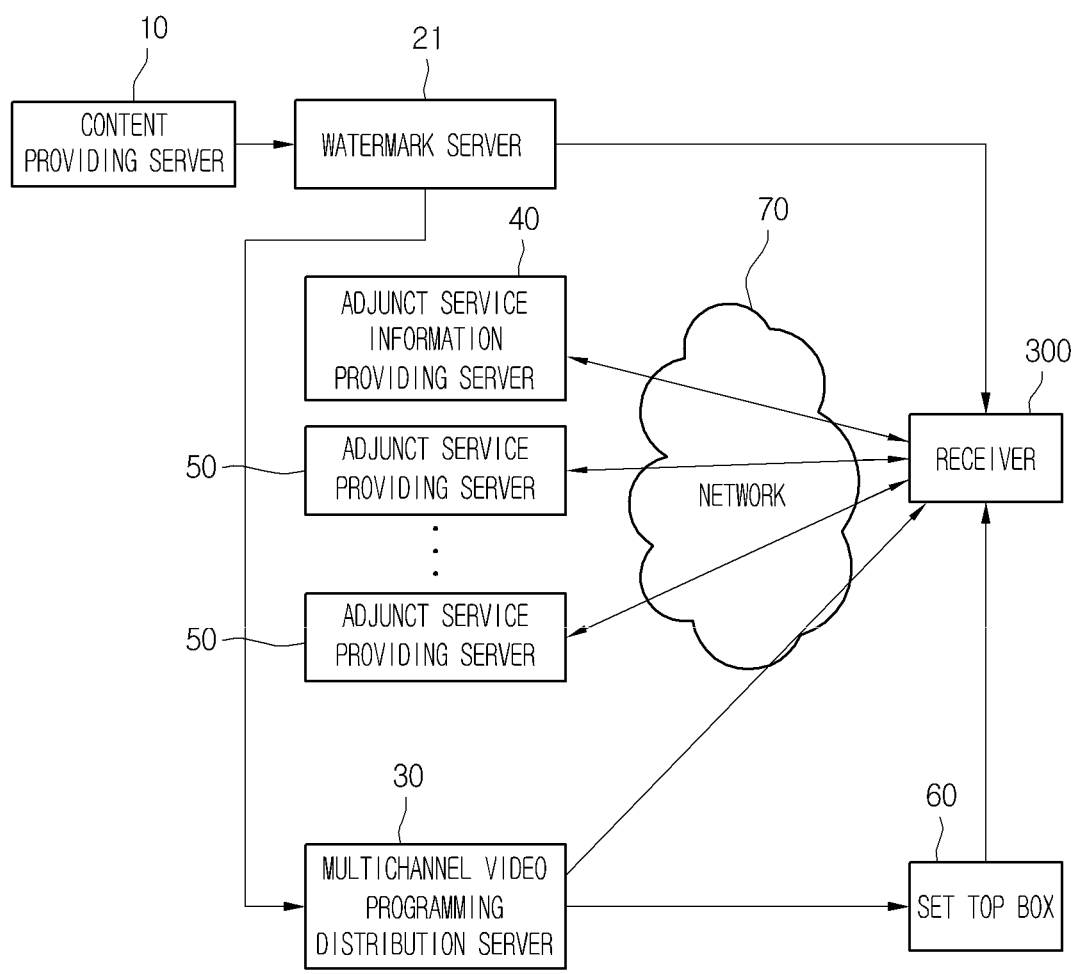

FIG. 90 is a block diagram of a watermark based network topology according to an embodiment of the present invention.

As shown in FIG. 90, the network topology according to an embodiment of the present invention further includes a watermark server 21.

The watermark server 21 shown in FIG. 90 applies a modification on main AV content to insert content information into the main AV content. The multichannel video distribution server 30 receives and distributes a broadcast signal including the modified main AV content. Especially, the watermark server may use a digital watermarking technology described below.

The digital watermark is a process for inserting information into a digital signal through a method of making deletion hard. For example, the digital signal may be audio, photo, or video. When this digital signal is copied, the inserted information is also contained in the copy. One digital signal may carry different several watermarks simultaneously.

In visible watermarking, the inserted information is distinguishable by the eye in photo or video. Typically, the inserted information is a text or logo identifying an owner of media. When a television broadcasting station adds its logo to the corner of a transmitted video, this is a visually identifiable watermark.

In invisible watermarking, although information is added as digital data in audio, photo, or video, the fact that a predetermined amount of information is hidden may be detected but such information may not be recognized. A secrete message may be delivered through the invisible watermarking.

One application of watermarking is a copyright protection system for preventing illegal copy of digital media. For example, a copy device obtains a watermark from digital media before copying the digital media, and determines whether to copy the digital media on the basis of the content of the watermark.

Another application of watermarking is a source trace of digital media. A watermark is embedded in digital media at each point on a distribution path. When such digital media are found later, a watermark may be extracted from the digital media, and the source of distribution may be recognized from the content of the watermark.

Description on digital media is another application of invisible watermarking.

A file format for digital media includes additional information called metadata, and a digital watermark is distinguished from metadata in that the digital water mark is delivered as a visual signal itself of digital media.

A watermarking method includes spread spectrum, quantization, and amplitude modulation.

When a marked signal is obtained by additional modification, the watermarking method corresponds to the spread spectrum. Although the spread spectrum watermark is known to be quite robust, since the watermark interferes with an embedded host signal, a large amount of information is not loaded.

When a marked signal is obtained by the quantization, the watermarking method corresponds to a quantization type. Although the quantization watermark is less robust, a large amount of information is loaded.

When a marked signal is obtained through an additional modification method similar to the spread spectrum in a space domain, the watermarking method corresponds to the amplitude modulation.

Figure 91:
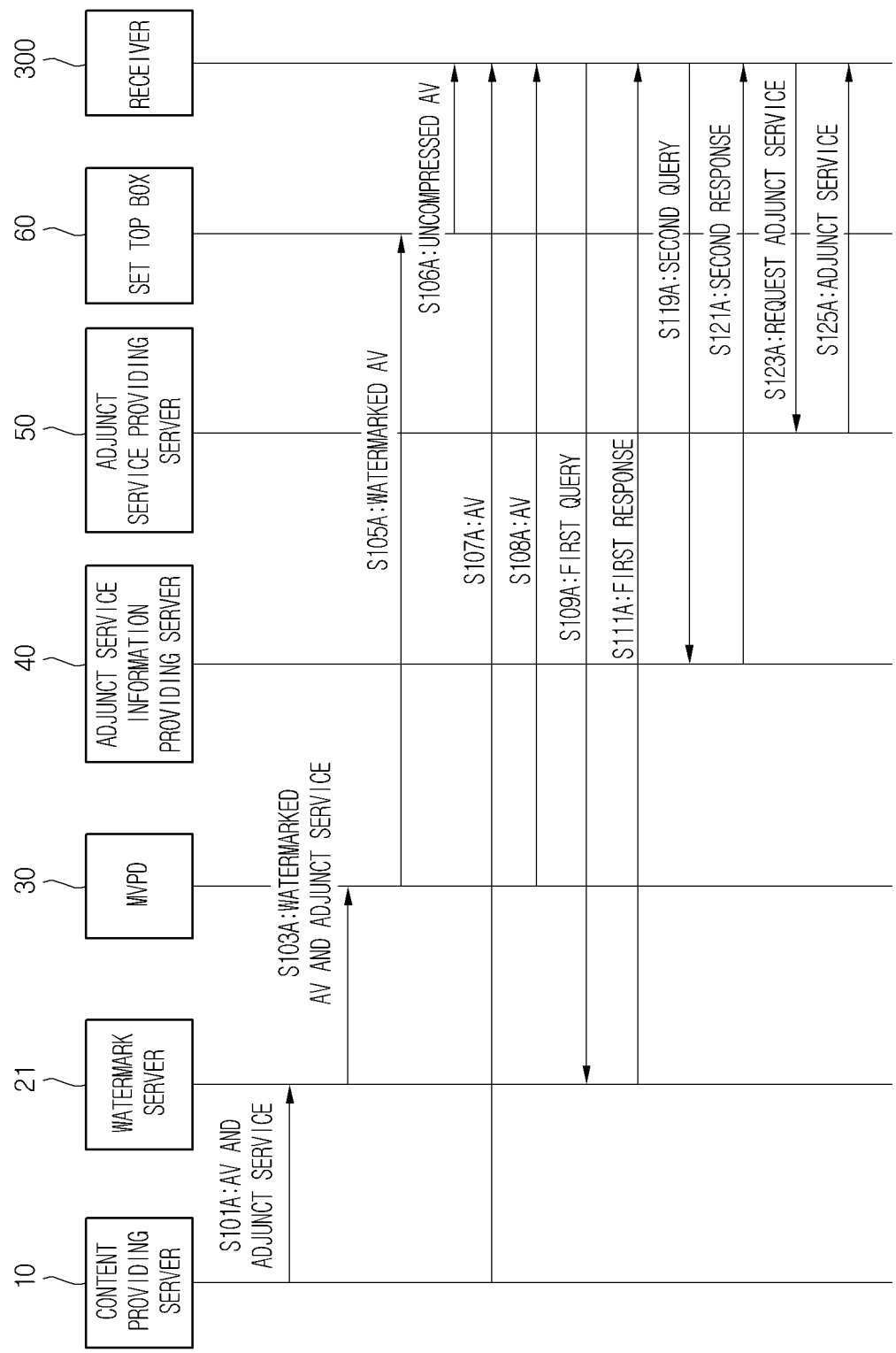

FIG. 91 is a ladder diagram illustrating a data flow in a watermark based network topology according to an embodiment of the present invention.

First, the content providing server 10 transmits a broadcast signal including main AV content and adjunct service in operation S101A.

The watermark server 21 receives a broadcast signal that the content providing server 10 provides, inserts a visible watermark looking like a logo into main AV content by applying a modification on the main AV content, inserts watermark information as invisible watermark into main AV content, and provides the watermarked main AV content and adjunct service to the MVPD 30 in operation S103A.

The watermark information inserted through an invisible watermark may include at least one of watermark purpose, content information, adjunct service information, and available enhance service. The watermark purpose may include one of illegal copy prevention, audience survey, and additional service acquisition.

The content information may include at least one of identification information of a content provider providing main AV content, main AV content identification information, main AV content rating information, time information of a content interval used for content information acquisition, the name of a channel broadcasting main AV content, the logo of a channel broadcasting main AV content, the name of a channel broadcasting main AV content, a usage information report address, a usage information report period, and a minimum usage time for usage information acquisition.

When the receiver 300 uses a watermark to obtain content information, time information of a content interval used for content information acquisition may be time information of a content interval where a watermark is embedded. When the receiver 300 uses a fingerprint to obtain content information, time information of a content interval used for content information acquisition may be time information of a content interval where feature information is extracted. The time information of a content interval used for content information acquisition may include at least one of a start time of a content interval used for content information acquisition, a duration of a content interval used for content information acquisition, and an end time of a content interval used for content information acquisition.

The usage information report address may include at least one of a main AV content viewing information report address and an adjunct service usage information report address. The usage information report period may include at least one of a main AV content viewing information report period and an adjunct service usage information report period. The minimum usage time for usage information acquisition may include at least one of a minimum viewing time for main AV content viewing information acquisition and a minimum usage time for adjunct service usage information extraction.

On the basis of the case that main AV content is watched more than a minimum viewing time, the receiver 300 may obtain the viewing information of the main AV content, and may report the extracted viewing information to the main AV content viewing information report address during the main AV content viewing information report period.

On the basis of the case that adjunct service is used more than a minimum usage time, the receiver 300 may obtains adjunct service usage information and may report the extracted usage information to the adjunct service usage information report address during the adjunct service usage information report period.

The adjunct service information may include at least one of information on whether adjunct service exits, an adjunct service address providing server address, an acquisition path of each available adjunct service, an address for each available adjunct service, a start time of each available adjunct service, an end time of each available adjunct service, a lifetime of each available adjunct service, an acquisition mode of each available adjunct service, a request period for each available adjunct service, priority information of each available adjunct service, description of each available adjunct service, a category of each available adjunct service, a usage information report address, and a minimum usage time for usage information acquisition.

An acquisition path of available adjunct service may indicate an IP based network or an Advanced Television Systems Committee—Mobile/Handheld (ATSC M/H) channel. In the case that the acquisition path of available adjunct service is the ATSC M/H, the adjunct service information may further include frequency information and channel information. The acquisition mode of each available adjunct service may indicate Push or Pull.

Moreover, the watermark server 21 may insert watermark information as an invisible watermark into the logo of main AV content.

For example, the watermark server 21 may insert a barcode into a predetermined position of a logo. At this point, the predetermined position of the logo may correspond to the first bottom line of an area where the logo is displayed. When receiving the main AV content including a logo with a bar code inserted, the receiver 300 may not display the bar code.

Moreover, the watermark server 21 may insert watermark information as a metadata form of the logo. At this point, the form of the logo may be maintained.

Moreover, the watermark server 21 may insert N bit watermark information into the logo of M frames. That is, the watermark server 21 may insert M*N watermark information through M frames.

The MVPD 30 receives a broadcast signal including the watermarked main AV content and adjunct service and generates a multiplexed signal to provide it to the settop box 60 in operation S105A. At this point, the multiplexed signal may exclude the received adjunct service or may include new adjunct service.

The settop box 60 tunes a channel that a user selects and receives a signal of the tuned channel, demodulates the received broadcast signal and performs channel decoding, performs AV decoding to generate uncompressed main AV content, and then, provides the generated uncompressed main AV content to the receiver 300 in operation S106A.

Moreover, the content providing server 10 also broadcasts a broadcast signal including main AV content through a wireless channel in operation S107A.

Additionally, the MVPD 30 may transmit a broadcast signal including main AV content to the receiver 300 directly without going through the settop box 60 in operation S108A.

The receiver 300 may receive uncompressed main AV content through the settop box 60. Or, the receiver 300 may receive a broadcast signal through a wireless channel, and may demodulates and decode the received broadcast signal to obtain main AV content. Or, the receiver 300 may receive a broadcast signal from the MVPD 30, and may demodulate and decode the received broadcast signal to receive main AV content. The receiver 300 extracts watermark information from some frames of the obtained main AV content or a section of audio samples of the obtained main AV content. When the watermark information corresponds to a logo, the receiver 300 confirms a watermark server address corresponding to the logo extracted from a corresponding relationship between a plurality of logos and a plurality of watermark server addresses. When the watermark information corresponds to the logo, the receiver 300 may not identify main AV content by only using the logo. Moreover, when the watermark information does not include content information, the receiver 300 may not identify main AV content but the watermark information may include content provider identification information or a watermark server address. When the watermark information includes content provider identification information, the receiver 300 may confirm a watermark server address corresponding to the content provider identification information extracted from a corresponding relationship between a plurality of content identification information and a plurality of watermark server addresses. In such a manner, when main AV content cannot be identified by using only the watermark information, the receiver 300 accesses the watermark server 21 corresponding to the obtained watermark server address to transmit a first query in operation S109A.

The watermark server 21 provides a first response to the first query in operation S111A. The first response may include at least one of content information, adjunct service information, and available enhance service.

If the watermark information and the first response do not include an adjunct service address, the receiver 300 may not obtain adjunct service. However, the watermark information and the first response may include an adjunct service address providing server address. In such a manner, if the receiver 300 does not obtain an adjunct service address or adjunct service through the watermark information and the first response but obtains an adjunct service address providing server address, it accesses the adjunct service information providing server 40 corresponding to the obtained adjunct service address providing server address to transmit a second query including content information in operation S119A.

The adjunct service information providing server 40 searches for at least one available adjunct service relating to the content information of the second query. Then, the adjunct service information providing server 40 provides adjunct service information for at least one available adjunct service to the receiver 300 through a second response to the second query in operation S121A.

If the receiver 300 obtains at least one available adjunct service address through the watermark information, the first response, or the second response, it accesses the at least one available adjunct service address to request adjunct service in operation S123A and obtains the adjunct service in operation S125A.

Figure 92:
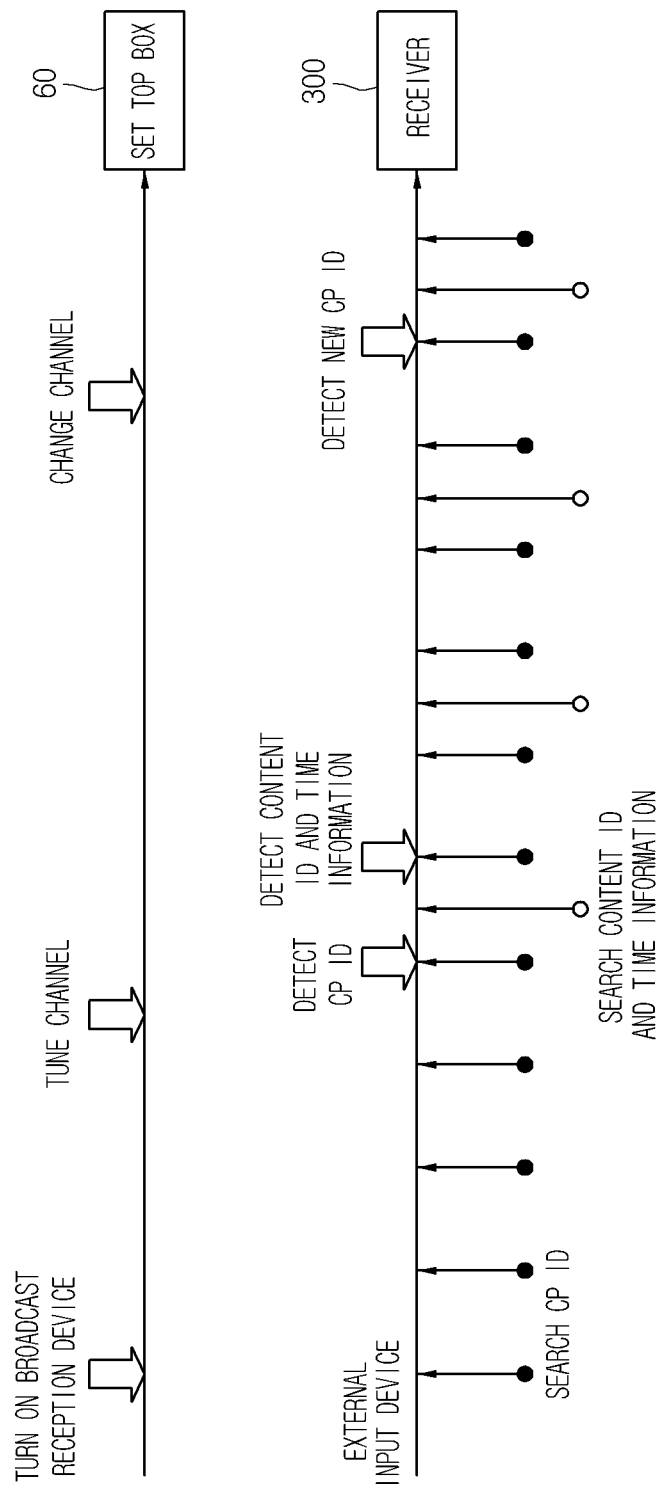

FIG. 92 is a view illustrating a watermark based content recognition timing according to an embodiment of the present invention.

As shown in FIG. 92, when the settop box 60 is turned on and tunes a channel and the receiver 300 receives a main AV content of the tuned channel from the settop box 60 through an external input port 311, the receiver 300 detects a content provider identifier (or a broadcasting station identifier) from the watermark of the main AV content. Then, the receiver 300 may detect content information from the watermark of the main AV content on the basis of the detected content provider identifier.

At this point, as shown in FIG. 92, the detection available period of the content provider identifier and the detection available period of the content information may be different from each other. Especially, the detection available period of the content provider identifier may be shorter than the detection available period of the content information. Through this, the receiver 300 may have an efficient configuration for detecting only necessary information.

Figure 93:
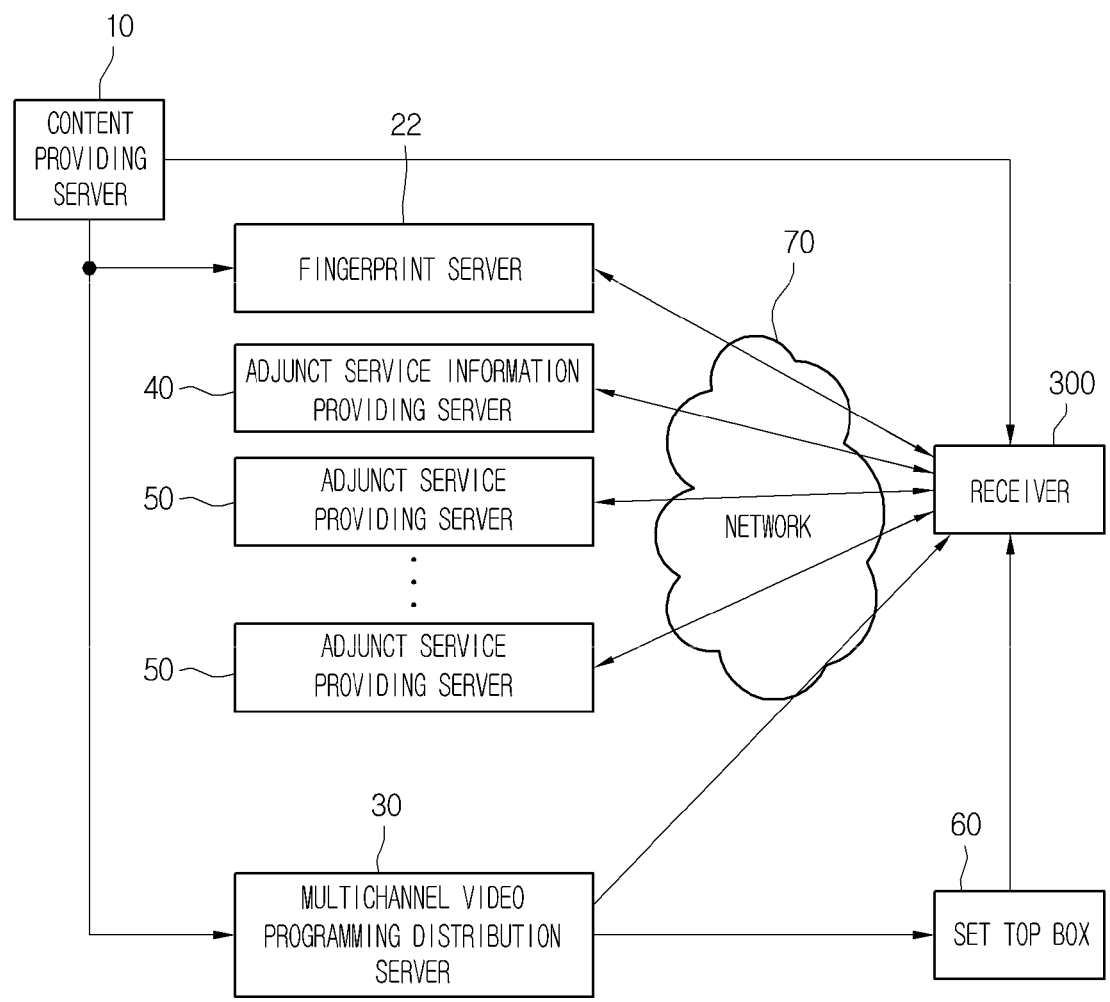

FIG. 93 is a block diagram of a fingerprint based network topology according to an embodiment of the present invention.

As shown in FIG. 93, a network topology according to an embodiment of the present invention further includes a fingerprint server 22.

The fingerprint server 22 shown in FIG. 93 does not apply a modification on main AV content, and extracts feature information from some frames of the main AV content or a section of audio samples of the main AV content and stores it. Then, on receiving the feature information from the receiver 300, the fingerprint server 22 provides the identifier and time information of the AV content corresponding to the received feature information.

Figure 94:
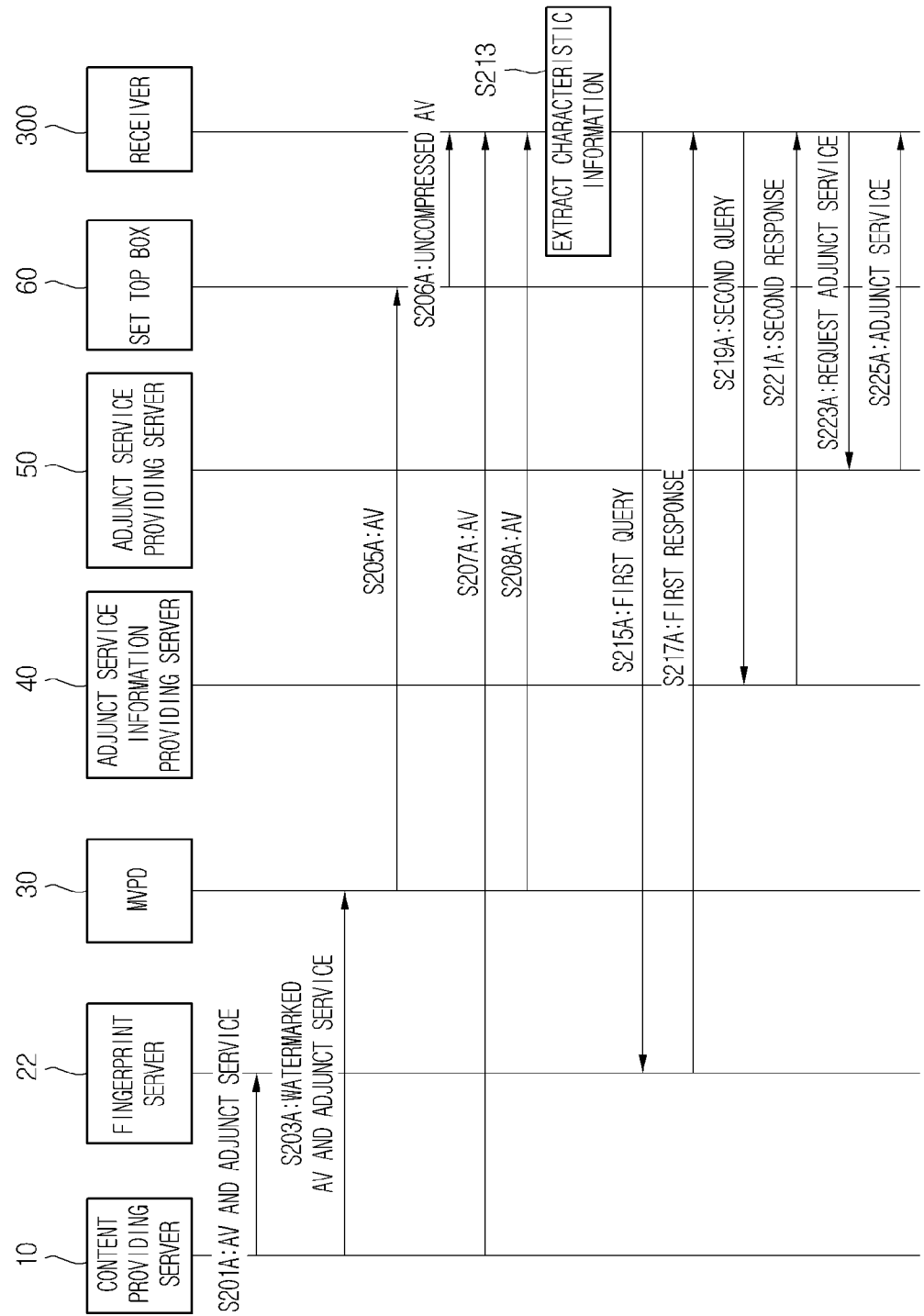

FIG. 94 is a ladder diagram illustrating data flow in a fingerprint based network topology according to an embodiment of the present invention.

First, the content providing server 10 transmits a broadcast signal including main AV content and adjunct service in operation S201A.

The fingerprint server 22 receives the broadcast signal that the content providing server 10 provides, extracts a plurality of feature information from a plurality of frames of the main AV content or a plurality of sections of audio samples of the main AV content, establishes a database for a plurality of query results corresponding to the plurality of feature information, respectively, in operation S203A. The query result may include at least one of content information, adjunct service information, and available enhance service.

The MVPD 30 receives a broadcast signal including main AV content and generates a multiplexed signal to provide it to the settop box 60 in operation S205A. At this point, the multiplexed signal may exclude the received adjunct service or may include new adjunct service.

The settop box 60 tunes a channel that a user selects and receives a signal of the tuned channel, demodulates the received broadcast signal and performs channel decoding, performs AV decoding to generate uncompressed main AV content, and then, provides the generated uncompressed main AV content to the receiver 300 in operation S206A.

Moreover, the content providing server 10 also broadcasts a broadcast signal including main AV content through a wireless channel in operation S207A.

Additionally, the MVPD 30 may transmit a broadcast signal including main AV content to the receiver 300 directly without going through the settop box 60 in operation S208A.

The receiver 300 may receive uncompressed main AV content through the settop box 60. Or, the receiver 300 may receive a broadcast signal through a wireless channel, and may demodulates and decode the received broadcast signal to obtain main AV content. Or, the receiver 300 may receive a broadcast signal from the MVPD 30, and may demodulate and decode the received broadcast signal to receive main AV content. The receiver 300 extracts feature information from some frames of the obtained main AV content or a section of audio samples of the obtained main AV content in operation S213A.

The receiver 300 accesses the fingerprint server 22 corresponding to a predetermined fingerprint server address to transmit a first query including the extracted feature information in operation S215A.

The fingerprint server 22 provides a query result as a first response to the first query in operation S217A. If the first response is failed, the receiver 300 accesses the fingerprint server 22 corresponding to another fingerprint server address to transmit the first query including the extracted feature information.

The fingerprint server 22 may provide Extensible Markup Language (XML) document as the query result. The XML document containing the query result will be described with FIG. 7 and Table 1.

Figure 95:
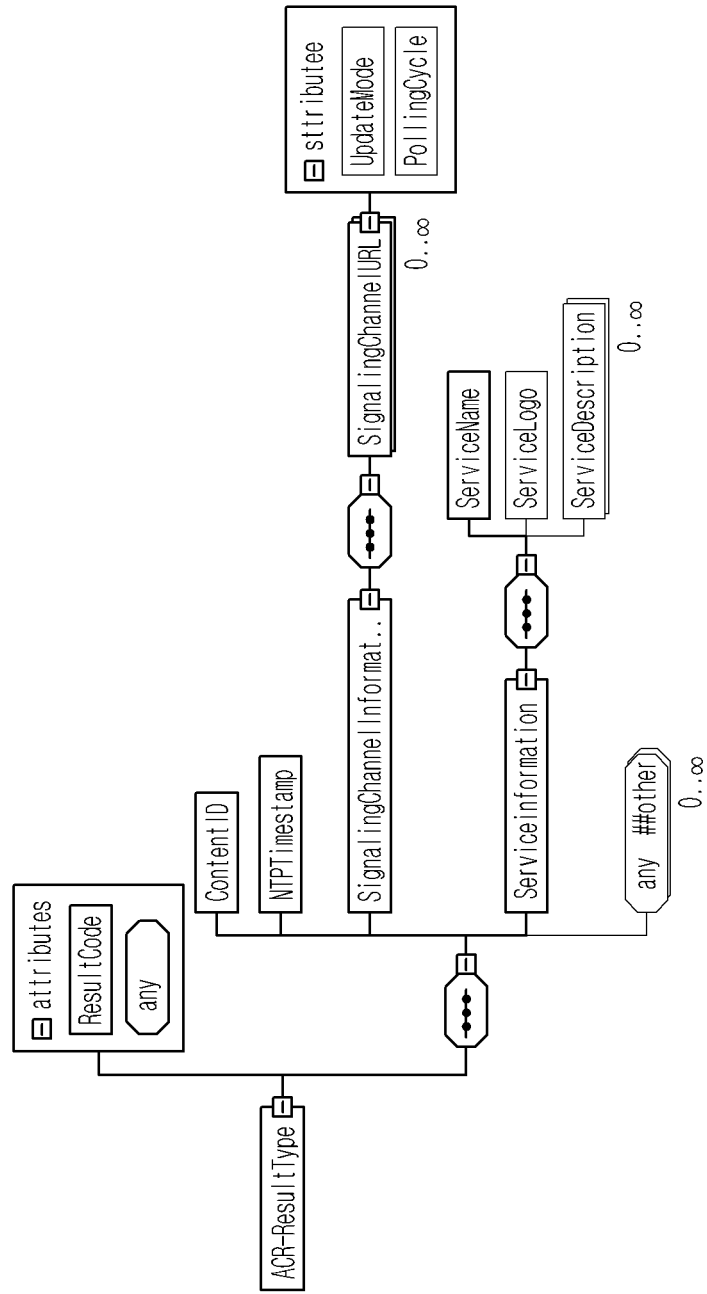

FIG. 95 is an XML schema diagram of ACR-Resulttype containing a query result according to an embodiment of the present invention.

As shown in FIG. 95, ACR-Resulttype containing a query result includes a ResultCode attribute and ContentID, NTP-Timestamp, SignalingChannelInformation, and ServiceInformation elements.

Table 5 shows an XML Schema of ACR-ResultType containing this query result.

TABLE 5

```
<xs:complexType name="ACR-ResultType">
    <xs:sequence>
        <xs:element name="ContentID" type="xs:anyURI"/>
        <xs:element name="NTPTimestamp" type="xs:unsignedLong"/>
        <xs:element name="SignalingChannelInformation">
            <xs:complexType>
                <xs:sequence>
                    <xs:element name="SignalingChannelURL" maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle" type="xs:unsignedInt"/>
                                </xs:extension>
                            </xs:simpleContent>
                        </xs:complexType>
                    </xs:element>
                </xs:sequence>
            </xs:complexType>
```

TABLE 5-continued

```
      </xs:element>
      <xs:element name="ServiceInformation">
        <xs:complexType>
          <xs:sequence>
            <xs:element name="ServiceName" type="xs:string"/>
            <xs:element name="ServiceLogo" type="xs:anyURI" minOccurs="0"/>
            <xs:element name="ServiceDescription" type="xs:string"
minOccurs="0" maxOccurs="unbounded"/>
          </xs:sequence>
        </xs:complexType>
      </xs:element>
      <xs:any namespace="##other" processContents="skip" minOccurs="0"
maxOccurs="unbounded"/>
    </xs:sequence>
    <xs:attribute name="ResultCode" type="xs:string" use="required"/>
    <xs:anyAttribute processContents="skip"/>
  </xs:complexType>
```

As the ContentID element, an ATSC content identifier shown in Table 6 below may be used.

TABLE 6

| Syntax | The Number of bits | format |
| --- | --- | --- |
| ATSC_content_identifier( ) { | | |
| TSID | 16 | uimsbf |
| reserved | 2 | bslbf |
| end_of_day | 5 | uimsbf |
| unique_for | 9 | uimsbf |
| content_id | var | |
| } | | |

As shown in Table 6, the ATSC content identifier has a structure including a TSID and a house number.

As the ContentID element, a Global Service Identifier for ATSC-M/H service described below may be used.

Moreover, as a ContentID element, an ATSC content identifier described below may be used.

Hereinafter, FIG. 94 will be described again.

If a query result does not include an adjunct service address or adjunct service but includes an adjunct service address providing server address, the receiver 300 accesses the adjunct service information providing server 40 corresponding to the obtained adjunct service address providing server address to transmit a second query including content information in operation S219A.

The adjunct service information providing server 40 searches for at least one available adjunct service relating to the content information of the second query. Then, the adjunct service information providing server 40 provides adjunct service information for at least one available adjunct service as a second response to the second query to the receiver 300 in operation S221A.

If the receiver 300 obtains at least one available adjunct service address through the first response or the second response, it accesses the at least one available adjunct service address to request adjunct service in operation S223A and obtains the adjunct service in operation S225A.

If the UpdateMode attribute has a Pull value, the receiver 300 transmits an HTTP request to the adjunct service providing server 50 through SignalingChannelURL, and in response to this, receives an HTTP response including PSIP binary stream from the adjunct service providing server 50. In this case, the receiver 300 may transmit an HTTP request according to a Polling period designated by a PollingCycle attribute. Additionally, the SignalingChannelURL element may have an update time attribute. In this case, the receiver 300 may transmit an HTTP request at an update time designated by an update time attribute.

If the UpdateMode attribute has a Push value, the receiver 300 may receive an update from a server asynchronously by utilizing an XMLHTTPRequest API. After the receives 300 transmits an asynchronous request to a server through an XMLHTTPRequest object, if there is a change in signaling information, the server provides signaling information through this channel in response to the request. If there is a restriction on a waiting time of a session, a session timeout response is generated, and a receiver recognizes the generated session timeout response immediately to transmit a request again, so that a signally channel between the receiver and the server may be maintained at all times.

Figure 96:
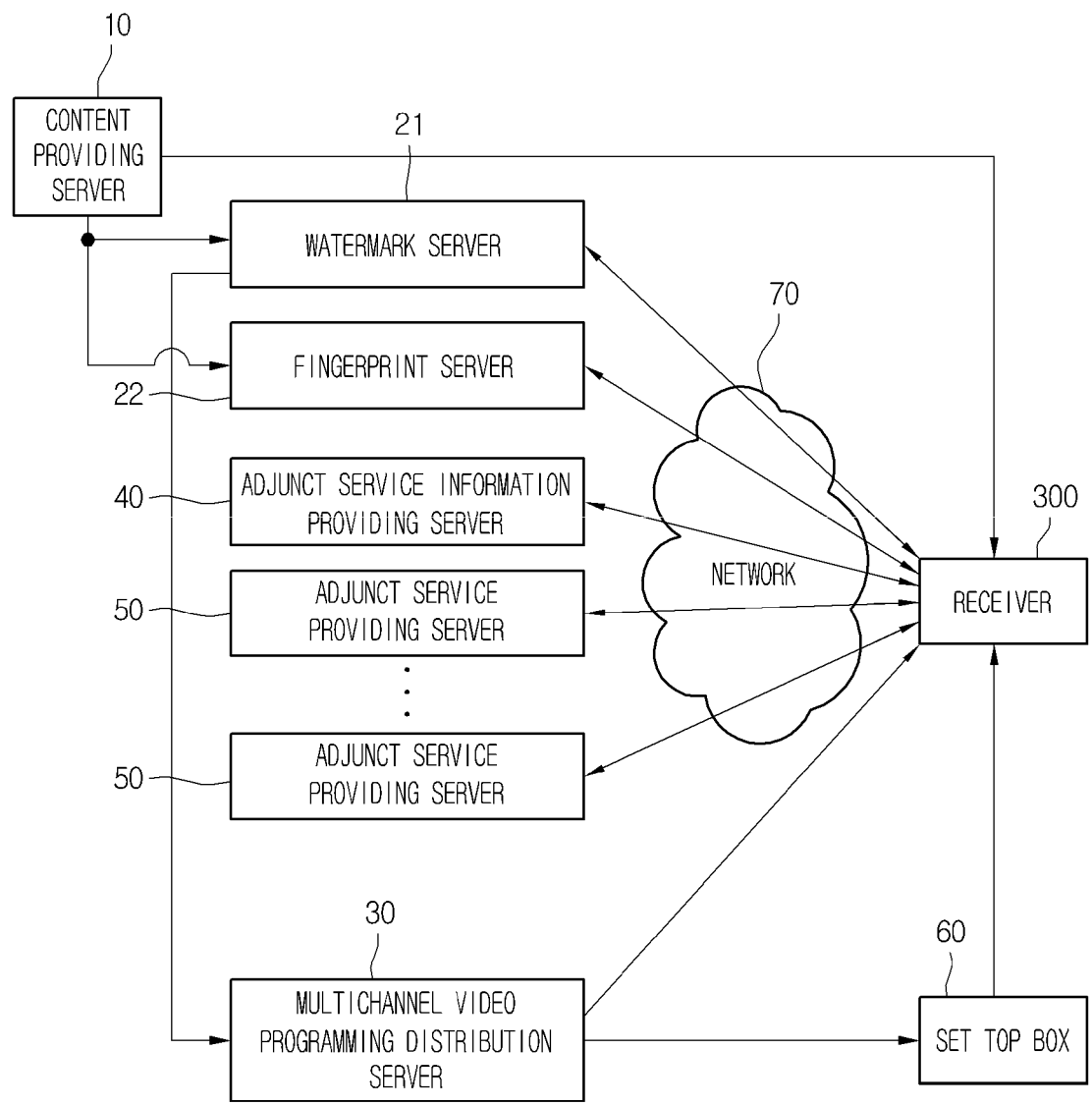

FIG. 96 is a block diagram of a fingerprint based network topology according to an embodiment of the present invention.

As shown in FIG. 96, a network topology according to an embodiment of the present invention further includes a watermark server 21 and a fingerprint server 22.

The watermark server 21 shown in FIG. 96 inserts content provider identification information into main AV content. The watermark server 21 may insert content provider identification information as a watermark looking like a logo into main AV content, or may insert content provider identification information as an invisible watermark into main AV content.

The fingerprint server 22 does not apply a modification on main AV content, and extracts feature information from some frames of the main AV content or a section of audio samples of the main AV content and stores it. Then, on receiving the feature information from the receiver 300, the fingerprint server 22 provides the identifier and time information of the AV content corresponding to the received feature information.

Figure 97:
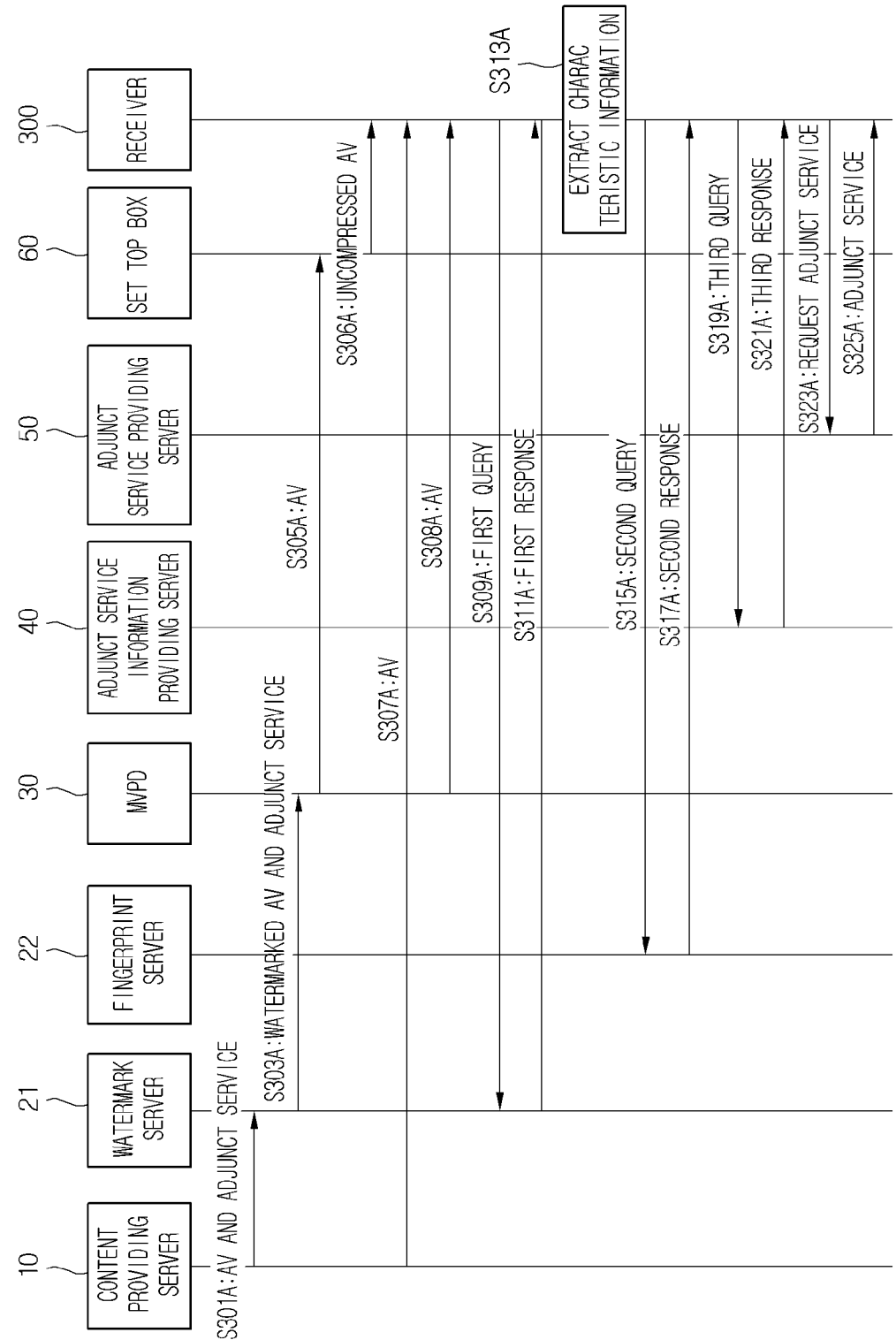

FIG. 97 is a ladder diagram illustrating data flow in a watermark and fingerprint based network topology according to an embodiment of the present invention.

First, the content providing server 10 transmits a broadcast signal including main AV content and adjunct service in operation S301A.

The watermark server 21 receives a broadcast signal that the content providing server 10 provides, inserts a visible watermark looking like a logo into main AV content by applying a modification on the main AV content, inserts watermark information as invisible watermark into main AV content, and provides the watermarked main AV content and adjunct service to the MVPD 30 in operation S303A. The watermark information inserted through an invisible watermark may include at least one of content information, adjunct service information, and available enhance service. The content information and the adjunct service information are the same as described above.

The MVPD 30 receives a broadcast signal including the watermarked main AV content and adjunct service and generates a multiplexed signal to provide it to the settop box 60 in operation S305A. At this point, the multiplexed signal may exclude the received adjunct service or may include new adjunct service.

The settop box 60 tunes a channel that a user selects and receives a signal of the turned channel, demodulates the received broadcast signal and performs channel decoding, performs AV decoding to generate uncompressed main AV content, and then, provides the generated uncompressed main AV content to the receiver 300 in operation S306A.

Moreover, the content providing server 10 also broadcasts a broadcast signal including main AV content through a wireless channel in operation S307A.

Additionally, the MVPD 30 may transmit a broadcast signal including main AV content to the receiver 300 directly without going through the settop box 60 in operation S308A.

The receiver 300 may receive uncompressed main AV content through the settop box 60. Or, the receiver 300 may receive a broadcast signal through a wireless channel, and may demodulates and decode the received broadcast signal to obtain main AV content. Or, the receiver 300 may receive a broadcast signal from the MVPD 30, and may demodulate and decode the received broadcast signal to receive main AV content. The receiver 300 extracts watermark information from some frames of the obtained main AV content or a section of audio samples of the obtained main AV content. When the watermark information corresponds to a logo, the receiver 300 confirms a watermark server address corresponding to the logo extracted from a corresponding relationship between a plurality of logos and a plurality of watermark server addresses. When the watermark information corresponds to the logo, the receiver 300 may not identify main AV content by only using the logo. Moreover, when the watermark information does not include content information, the receiver 300 may not identify main AV content but the watermark information may include content provider identification information or a watermark server address. When the watermark information includes content provider identification information, the receiver 300 may confirm a watermark server address corresponding to the content provider identification information extracted from a corresponding relationship between a plurality of content identification information and a plurality of watermark server addresses. In such a manner, when main AV content cannot be identified by using only the watermark information, the receiver 300 accesses the watermark server 21 corresponding to the obtained watermark server address to transmit a first query in operation S309A.

The watermark server 21 provides a first response to the first query in operation S311A. The first response may include at least one of a fingerprint server address, content information, adjunct service information, and available enhance service. The content information and the adjunct service information are the same as described above.

If the watermark information and the first response include a fingerprint server address, the receiver 300 extracts feature information from some frames of the main AV content or a section of audio samples of the main AV content in operation S313A.

The receiver 300 accesses the fingerprint server 22 corresponding to the fingerprint server address in the first response to transmit a second query including the extracted feature information in operation S315A.

The fingerprint server 22 provides a query result as a second response to the second query in operation S317A.

If a query result does not include an adjunct service address or adjunct service but includes an adjunct service address providing server address, the receiver 300 accesses the adjunct service information providing server 40 corresponding to the obtained adjunct service address providing server address to transmit a third query including content information in operation S319A.

The adjunct service information providing server 40 searches for at least one available adjunct service relating to the content information of the third query. Then, the adjunct service information providing server 40 provides adjunct service information for at least one available adjunct service to the receiver 300 through a third response to the third query in operation S321A.

If the receiver 300 obtains at least one available adjunct service address through the first response, the second response, or the third response, it accesses the at least one available adjunct service address to request adjunct service in operation S323A and obtains the adjunct service in operation S325A.

Then, a receiver 300 according to an embodiment of the present invention will be described with reference to FIG. 98.

Figure 98:
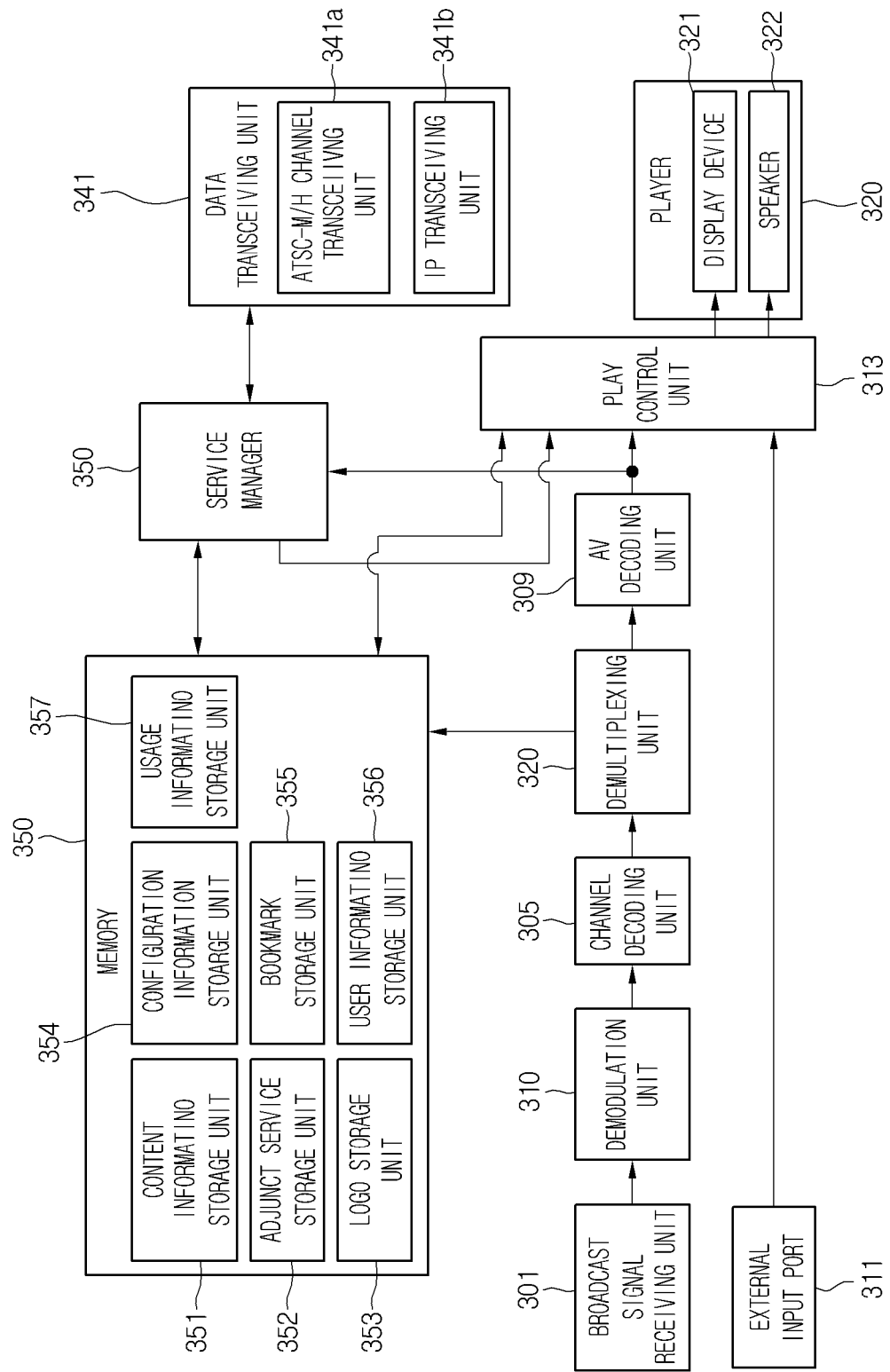
FIG. 98 is a view of a receiver 300 according to an embodiment of the present invention.

As shown in FIG. 98, the receiver 300 according to an embodiment of the present invention includes a broadcast signal receiving unit 301, a demodulation unit, 310, a channel decoding unit 305, a demultiplexing unit 320, an AV decoding unit 309, an external input port 311, a playback control unit 313, a playback device 320, a service manager 350, a data transceiving unit, and a memory 350.

The broadcast signal receiving unit 301 receives a broadcast signal from the content providing server 10 or the MVPD 30.

The demodulation unit 310 generates a demodulated signal by demodulating the received broadcast signal.

The channel decoding unit 305 generate channel-decoded data by channel-decoding the demodulated signal.

The demultiplexing unit 310 separates main AV content and adjunct service from the channel-decoded data. The separated adjunct service is stored in the adjunct service storage unit 352.

The AV decoding unit 309 AV decodes the separated main AV content to generate uncompressed main AV content.

Moreover, the external input port 311 receives uncompressed main AV content from the settop box 60, a digital versatile disk (DVD) player, and a Blu-ray disk player. The external input port 311 may include at least one of a DSUB port, a High Definition Multimedia Interface (HDMI) port, a Digital Visual Interface (DVI) port, a composite port, a component port, and an S-Video port.

The playback control unit 313 plays at least one of an uncompressed main AV content generated by the AV decoding unit 309 or an uncompressed main AV content received from the external input port 311, in the playback device 320 in response to a user selection.

The playback device 320 includes a display unit 321 and a speaker 323. The display unit 321 may include at least one of a liquid crystal display (LCD), a thin film transistor-liquid crystal display (a TFT LCD), an organic light-emitting diode (OLED), a flexible display, and a 3D display.

The service manager 350 obtains content information of main AV content, and obtains available adjunct service on the basis of the obtained content information. Especially, as described above, the service manager 350 may obtain identification information of main AV content on the basis of some frames of the uncompressed main AV content or a section of audio samples of the uncompressed main AV content, and this is called an automatic contents recognition (ACR) in the specification.

The service manager 350 corresponds to the service manager 350 of FIG. 34.

The data transceiving unit 341 may include an Advanced Television Systems Committee—Mobile/Handheld (ATSC-M/H) channel transceiving unit 341a and an IP transceiving unit 341b.

The ATSC-M/H channel transceiving unit 341a communicates with another device or server through an ATSC-M/H channel.

The IP transceiving unit 341b communicates with another device or server through an IP based network.

The memory 350 may include at least one type of storage medium among a flash memory type, a hard disk type, a multimedia card micro type, card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The receiver 300 may operate in relation to a web storage performing the storage function of the memory 350 on internet.

The memory 350 may include a content information storage unit 351, an adjunct service storage unit 352, a logo storage unit 353, a setting information storage unit 354, a bookmark storage unit 355, a user information storage unit 356, and a usage information storage unit 357.

The content information storage unit 351 stores a plurality of content information corresponding to a plurality of feature information.

The adjunct service storage unit 352 may store a plurality of adjunct services corresponding to a plurality of feature information or may store a plurality of adjunct services corresponding to a plurality of content information.

The logo storage unit 353 stores a plurality of logos. Also, the logo storage unit may further store a content provider identifier corresponding to a plurality of logos or a watermark server address corresponding to a plurality of logos.

The setting information storage unit 354 stores setting information for ACR.

The bookmark storage unit 355 stores a bookmark.

The user information storage unit 356 stores user information. The user information may include at least one of at least one account information for at least one service, local information, family member information, preferred genre information, image display device information, and a usage information providing range. The at least one account information may include account information for usage information measurement server and account information of social network service such as twitter and facebook. The local information may include address information and a zip code. The family member information may include the number of family members, each member age, each member sex, each member religion, and each member job. The preferred genre information may be set with at least one of sports, movies, drama, education, news, entertainment, and other genres. The image display device information may include information on an image display device type, a manufacturer, a firmware version, a resolution, a model name, OS, a browser, storage device existence, a capacity of a storage device, and network speed. Once the usage information providing range is set, the receiver 300 collects and reports main AV content viewing information and adjunct service usage information within a set range. The usage information providing range may be set with respect to each virtual channel. Additionally, a usage information measurement allowable range may be set with respect to an entire physical channel.

The usage information storage unit 357 stores main AV content viewing information and adjunct service usage information collected by the receiver 300. Moreover, the receiver 300 analyzes a service usage pattern on the basis of the collected main AV content viewing information and the collected adjunct service usage information, and stores the analyzed service usage pattern in the usage information storage unit 357.

The service manager 350 obtains the content information of main AV content from the fingerprint server 22 or the content information storage unit 351. If there is no content information corresponding to the extracted feature information or sufficient content information in the content information storage unit 351, the service manager 350 may receive additional content information through the data transceiving unit 341. Moreover, the service manager 350 may update content information continuously.

The service manager 350 obtains available adjunct service from the adjunct service providing server 50 or the adjunct service storage unit 353. If there is no adjunct service or sufficient adjunct service in the adjunct service storage unit 353, the service manager 350 may update adjunct service through the data transceiving unit 341. Moreover, the service manager 350 may update adjunct service continuously.

The service manager 350 extracts a logo from main AV content and queries the logo storage unit 355 to obtain a content provider identifier or watermark server address corresponding to the extracted logo. If there is no logo corresponding to the extracted logo or sufficient logo in the logo storage unit 355, the service manager 350 may receive an additional logo through the data transceiving unit 341. Moreover, the service manager 350 may update the logo continuously.

The service manager 350 may perform various methods to reduce the burden of calculation while a logo extracted from main AV content is compared to a plurality of logos in the logo storage unit 355.

For example, the service manager 350 may perform a comparison operation on the basis of color characteristics. That is, the service manager 350 compares the color characteristic of an extracted logo with the color characteristic of a logo in the logo storage unit 355, so that it is determined whether they are matched to each other.

Furthermore, the service manager 350 may perform a comparison operation on the basis of character recognition. That is, the service manager 350 compares the character of an extracted logo with the character of a logo in the logo storage unit 355, so that it is determined whether they are matched to each other.

Furthermore, the service manager 350 may perform a comparison operation on the basis of the outline form of a logo. That is, the service manager 350 compares the outline form of an extracted logo with the outline form of a logo in the logo storage unit 355, so that it is determined whether they are matched to each other.

The service manager 350 obtains content information of main AV content on the basis of some frames of the uncompressed main AV content and a section of audio samples of the uncompressed main AV content, obtains signaling data for adjunct service on the basis of the obtained content information, and then, obtains adjunct service on the basis of the signaling data.

Moreover, hereinafter, in providing the above-described trigger service, a method of transmitting a trigger through an internet protocol (IP) based network will be described.

When a trigger is transmitted through an IP based network, the transmitter 200 may include trigger in the above-described TDO trigger table and transmit it. Accordingly, the receiver 300 may obtain a trigger on the basis of the TDO trigger table.

In the case of using a TDO trigger table, in order to transmit a TDO trigger table through an IP based network, the transmitter 200 may store the TDO trigger table in a specific location on an IP based network first and may transmit the location information of the TDO trigger table on a network to the receiver 300. For example, the receiver 300 may receive the URL information of the TDO trigger table, access the position of the TDO trigger table on the network on the basis of the URL information of the received TDO trigger table, and receive the TDO trigger table through the IP based network. In this case, the TDO trigger table may have a syntax format of a private section structure identical to that of a table transmitted through a broadcast network, and accordingly, the receiver 300 may receive and process a trigger by using an existing module without additional technical implementation for obtaining a trigger and processing trigger information.

Moreover, when a trigger is transmitted through an IP based network, the transmitter 200 may generate the above-described trigger in XML format and then may transmit it to the receiver 300.

FIG. 99 is a view illustrating an XML format of a trigger according to an embodiment of the present invention. FIGS. 100 and 101 are views illustrating an XML format of a trigger according to an embodiment of the present invention.

Such a content-items element may indicate a content item, that is, a trigger target object, or other content items distinguished from it.

The above content items element may be used when a content item corresponding to a TDO is transmitted through an NRT service.

Additionally, the content items element may be used when a content item is transmitted through an IP network. As described above, the receiver 300 may identify content items corresponding to a TDO transmitted through an IP network on the basis of a combination of the Service-ID Ref attribute value and the content linkage attribute value.

Additionally, the above-mentioned content URL element may be used when a file configuring a content item is transmitted through an IP network.

Then, the content URL element may include a relative URL or an absolute tag URI. When a content URL element is designated as a relative URL or an absolute tag URI, the transmitter 200 may transmit a content item only through a FLUTE session used in an NRT service by using the designated URL or URI. For example, when a content URL element includes a relative URL or an absolute tag URI, the receiver 300 may receive a content item from a broadcast network connected through a FLUTE by using the URL or URI. Moreover, when a content URL element does not include a relative URL or an absolute tag URI, the receiver 300 may receive a content item from at least one of an IP network and a broadcast network on the basis of the content URL element.

In such a manner, according to a trigger structure defined in an XML format, a trigger may include essential and various information for providing a TDO service and may provide effective transmission through an IP network.

Moreover, when such a trigger is transmitted through an IP network, the transmitter 200 may transmit signaling information (trigger signaling information) so to allow the receiver 300 to obtain a trigger. The trigger signaling information may include location information on an IP network through which a trigger is transmitted, for example, trigger URL information. Additionally, the trigger signaling information may be transmitted in different formats according to a transmission network.

In some cases, the receiver 300 may be directly connected to only an IP network or may be directly connected to both a broadcast network and an IP network. Accordingly, the transmitter 200 may transmit signaling information for trigger acquisition through at least one of a broadcast network or an IP network. For this, at least one transmission and reception method may be used.

First, when the receiver 300 directly receives a broadcast signal through a broadcast network, trigger signaling information may be transmitted through a broadcast network. In this case, the trigger signaling information may be included in a trigger URL descriptor or a TDO trigger table and transmitted through a broadcast network.

FIG. 102 is a view illustrating a syntax of a trigger URL descriptor according to an embodiment of the present invention.

Such a trigger descriptor may be included in at least one of a PSIP table, an SMT, and an NRT-IT and transmitted through an IP network or a broadcast network. For example, the receiver 300 may extract the trigger descriptor from at least one of a PSIP table, an SMT, and an NRT-IT, and based on this, may obtain location information of a trigger on an IP network, and may receive the trigger transmitted through the IP network.

FIG. 103 is a view illustrating a syntax of a TDO trigger table according to an embodiment of the present invention.

Accordingly, on receiving a TDO trigger table, the receiver 300 may parse each field and obtain location information of a trigger on an IP network on the basis of the parsed trigger URL information, and may receive the trigger transmitted through the IP network.

Moreover, the receiver 300 may not be directly connected to broadcast network but may be connected to an IP network. In this case, the receiver 300 may obtain a trigger or trigger signaling information included in an adjunct service by using the above-described adjunct service receiving method.

Even when the receiver 300 is not directly connected to a broadcast network and is connected to a broadcast receiver such as a settop box, it may receive adjunct service data used in linkage with main AV content transmitted from a broadcasting station, that is, the transmitter 200, or independent of the main AV content. Also, the receiver 300 may obtain a trigger included in the adjunct service data or may receiving a trigger through an IP network by using the adjunct service data.

Figure 104:
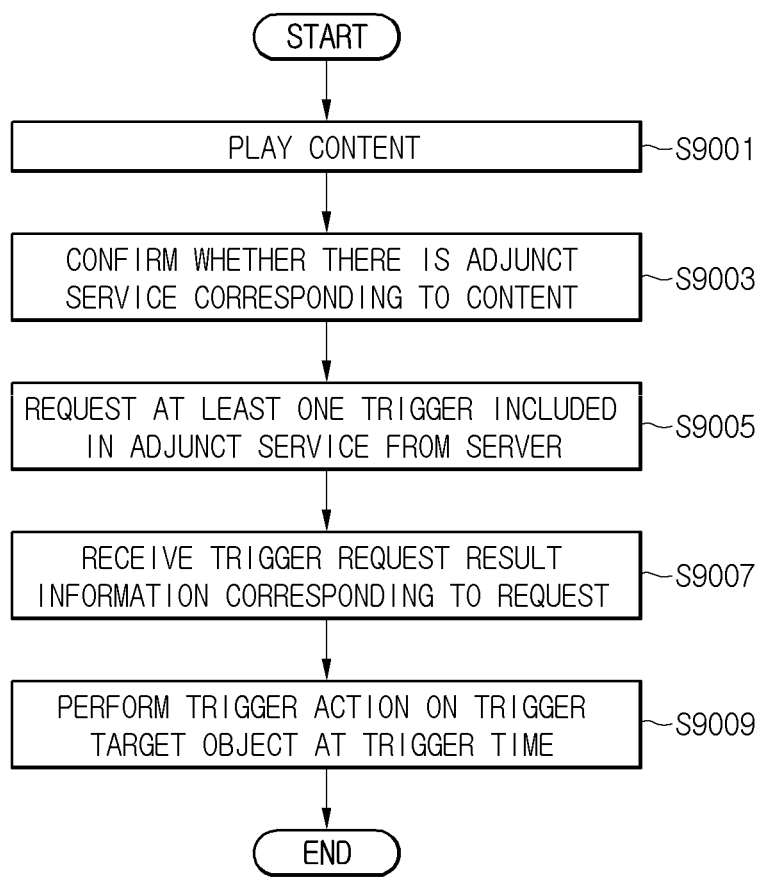
FIG. 104 is a view illustrating an operating method of the receiver 300 according to an embodiment of the present invention.

FIG. 104 is a view illustrating an operating method of the receiver 300 according to an embodiment of the present invention.

Referring to FIG. 104, the receiver 300 plays content in operation S9001. Referring to FIG. 104, the receiver 300 may not be directly connected to a broadcast network and may receive and play an uncompressed AV content provided from a broadcast receiver. In this case, the receiver 300 may play AV content but may not directly receive trigger information transmitted from the transmitter 200 through a broadcast network. Accordingly, the receiver 300 may use the above-described adjunct service receiving method.

The receiver 300 confirms whether there is an adjunct service for the played content in operation S9003. The service manager 350 of the receiver 300 may identify the content by using a portion of the content being played through a method of using a watermark described with reference to FIG. 91 or a method of using the fingerprint server 22 described with reference to FIG. 94, and may confirm that there is an adjunct service for the content. Additionally, the service manager 350 of the receiver 300 determines whether a trigger is included in the confirmed adjunct service.

For example, the receiver 300 may determine whether there is a trigger on the basis of a query result for AV content received from the fingerprint server 22. Additionally, the receiver 300 may determine whether there is a trigger through the method of using a watermark described with reference to FIG. 91.

For example, the receiver 300 may obtain trigger URL information from the data of ACR-Resulttype containing a query result received from the fingerprint server 22. The trigger URL information may include URL information for receiving a trigger. For example, the trigger URL information may include specific position information in a trigger server located on an IP network.

Figure 105:
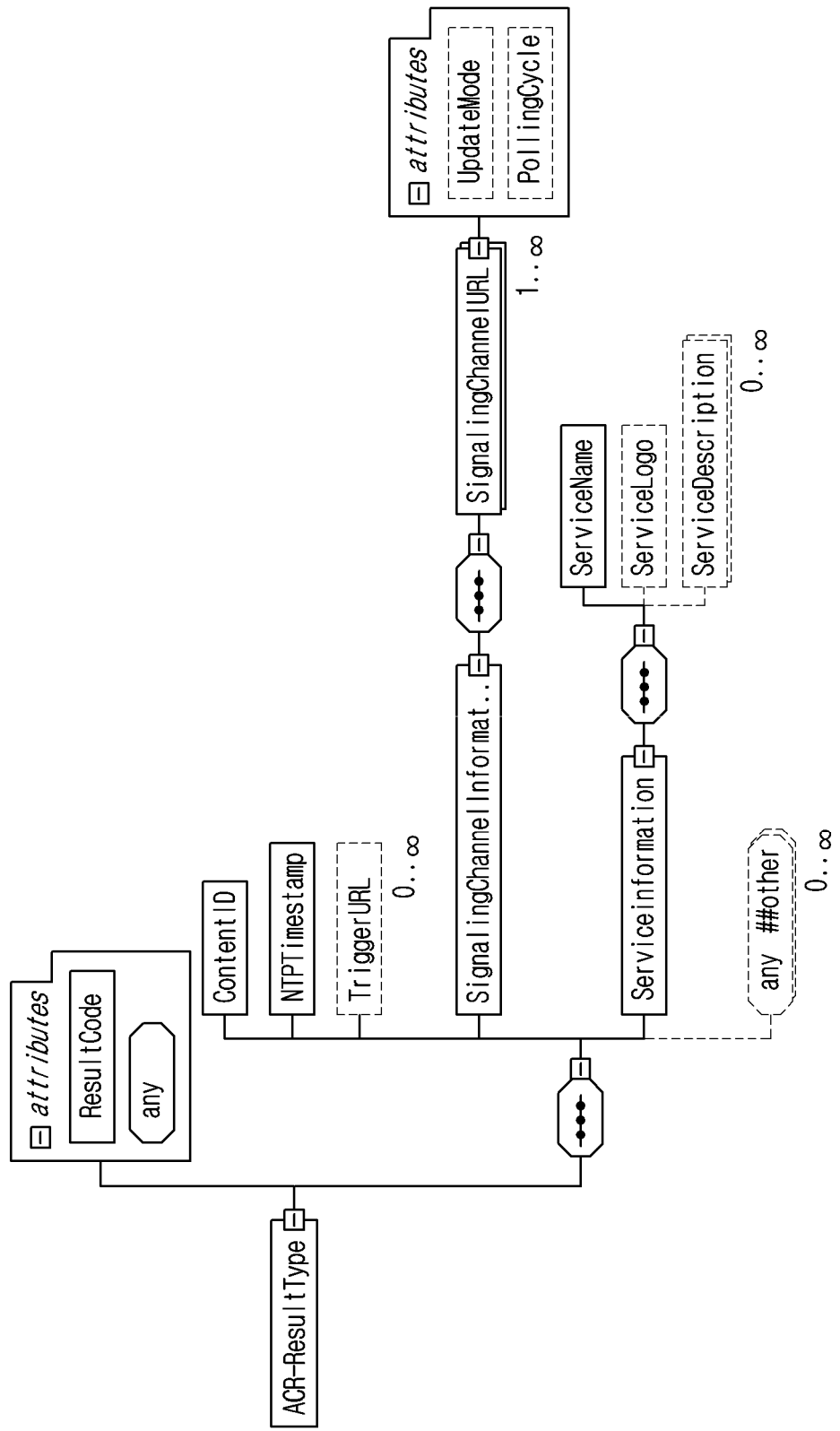
FIG. 105 is a view illustrating an XML schema diagram of ACR-Resulttype containing a query result according to another embodiment of the present invention.

FIG. 105 is a view illustrating an XML schema diagram of ACR-Resulttype containing a query result according to another embodiment of the present invention.

The trigger URL element may include URL information for receiving a trigger linked with a content identified by the query result. The receiver 300 may request a plurality of triggers after a specific time of the identified content from a trigger server on the basis of the trigger URL element and NTPTimestamp and its detailed operation is described later.

When a trigger is included in an adjunct service, the receiver requests at least one trigger included in the adjunct service from a server in operation S9005. The request target server may be called a trigger server and a trigger may be transmitted to the receiver 300 through an IP network. Additionally, the trigger server may include a server directly accessible through an IP network among the above-described adjunct service providing server 50, adjunct service information providing server 40, contents providing server 10, fingerprint server 22 and watermark server 21.

The service manager 350 of the receiver 300 may designate a time range as requesting a trigger from a trigger server.

The time range may include a specific time segment. The specific time segment or time range may be designated by time information of a content interval used for content information acquisition. The time information of a content interval may be time information of a content interval where a watermark is embedded or time information of a content interval where feature information is extracted. Additionally, a specific time segment or time range designated at the trigger request may be designated on the basis of query result information obtained through an operation of using a watermark or a fingerprint. For example, the receiver 300 may designate a time segment of a trigger to be requested based on NTP Timestamp included in the above-mentioned ACR-Resulttype.

Then, the receiver 300 receives trigger request result information corresponding to the request in operation S9007.

As described above, the receiver 300 may receive trigger request result information from a trigger server in response to a trigger request transmitted to the trigger server. The trigger request result information may include at least one trigger. Accordingly, the receiver 300 may obtain a trigger from the trigger request result information received from the trigger server.

Then, the receiver 300 performs a trigger action on a trigger target object at a trigger time in operation S9009. The receiver 300 may perform a trigger action on a trigger target object at a trigger time on the basis of a trigger time, a trigger action, and trigger target object information included in the obtained trigger.

Figure 106:
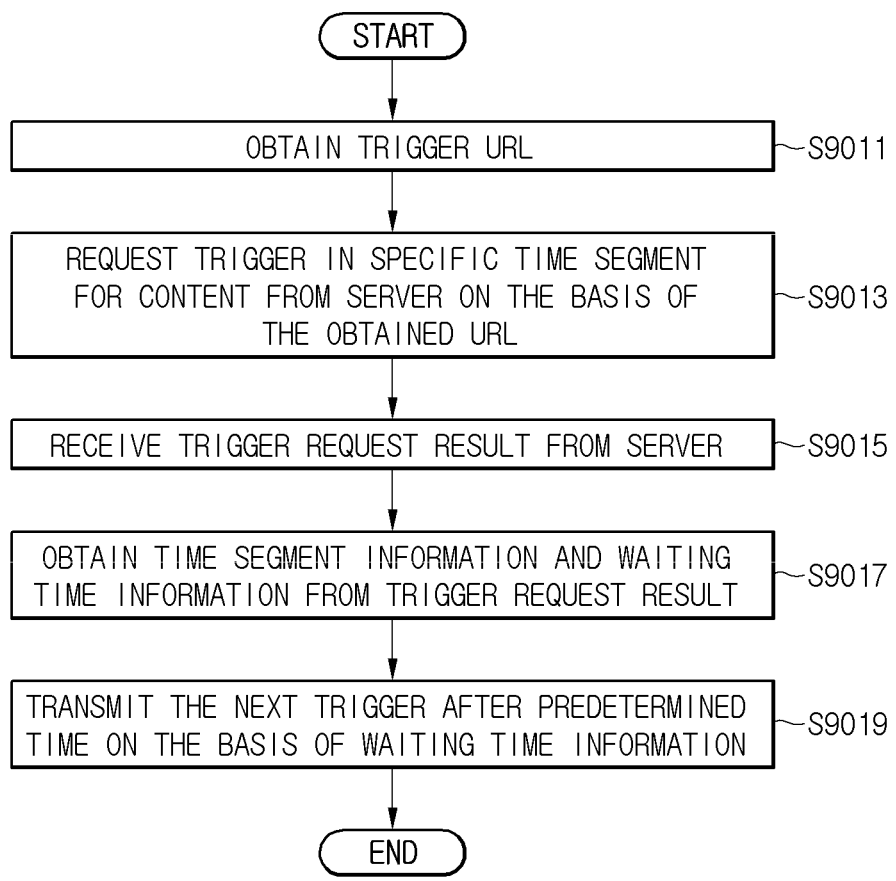
FIG. 106 is a flowchart illustrating a trigger requesting and receiving method of the receiver 300 according to an embodiment of the present invention.

FIG. 106 is a flowchart illustrating a trigger requesting and receiving method of the receiver 300 according to an embodiment of the present invention.

Referring to FIG. 106, the receiver 300 according to an embodiment of the present invention obtains a trigger URL in operation S9011, requests a trigger in a specific time segment linked with a content on the basis of the obtained URL in operation S9013, and receives a trigger request result corresponding to the trigger request from the server in operation S9015.

As described above, the receiver 300 may obtain the URL of a trigger linked with the content on the basis of some intervals of a content being played. Additionally, the receiver 300 may obtain time information on the some segments, for example, a timestamp, on the basis of some segments of a content being played. Then, the receiver 300 may request a trigger in a specific time segment linked with a content from a trigger server on the basis of the obtained trigger URL and timestamp.

When requesting a trigger on the basis of the trigger URL, the receiver 300 may generate a request message by using a hyper Text Transfer Protocol (HTTP) and may transmit the generated request message to the trigger server through an IP network. The trigger server may receive the HTTP based request message and generate a trigger request result in an HTTP Response format in response thereto to transmit it to the receiver 300.

For example, when time information or a timestamp is not included in a query result received from the fingerprint server 22 or it is determined that a time segment of a trigger is not necessarily specified, the receiver 300 may generate a trigger request message including a trigger URL by using a GET command format used in HTTP and then may transmit it to the trigger server. In this case, the trigger server may include all currently transmittable triggers or a list of all triggers in the HTTP response and may transmit them to the receiver 300.

Additionally, if a time segment needs to be specified, the receiver 300 may request a trigger in a specific time segment by using an HTTP GET command format or an HTTP POST command format. The trigger URL and the specific time segment may be determined based on the trigger URL and the timestamp included in ACR Resulttype, for example.

In relation to the trigger URL and the Timestamp included in ACR Resulttype, the trigger URL may be obtained in the format of http://www.atsc2.com/content1/trigger and the Timestamp may be obtained in the time format of 2011/06/28T18:00:00. Such a trigger URL and Timestamp may correspond to a content segment (for example, some segments of a content being played) used for content information acquisition through the above-described fingerprint or watermark.

Here, the receiver 300 may generate a trigger request message by using the HTTP GET command format.

FIG. 107 is a view illustrating an HTTP GET command format based trigger request message according to an embodiment of the present invention.

The GET command format used in HTTP may include a URL segment in the message header thereof. The trigger request message may include the trigger URL in such a URL segment.

Additionally, the GET command format used in HTTP includes a timestamp field and a duration field following the URL segment. In the HTTP GET command format, the timestamp field may indicate the start time of a specific segment and the duration field may include time length information of the specific segment. The time length may be expressed in a second unit. For example, the receiver 300 may generate a message requesting a trigger in a time segment within 30 min (600 sec) after the timestamp on the basis of the trigger URL and the timestamp included in the obtained ACR Resulttype. As shown in FIG. 107, the trigger URL and the time segment included in such a request message may be expressed as http://www.atsc2com/content1/trigger?timestamp=2011%2F06%2F28 T18%3A00%3A00&duration=600. Accordingly, in the trigger request message of the HTTP GET format according to an embodiment of the present invention, the time segment may be designated as timestamp=2011/06/28T18:00:00 according to the format of name=value.

FIG. 108 is a view illustrating an HTTP POST command format based trigger request message according to an embodiment of the present invention.

Like the HTTP GET command format, the POST command format used in HTTP may include a URL segment in the message header and the trigger request message may include the trigger URL in such a URL segment and may include an additional timestamp field in a message body. In the HTTP POST command format according to an embodiment of the present invention, like HTTP GET, the timestamp field may indicate the start time of a specific segment and the duration field may include time length information of the specific segment. The time length may be expressed in a second unit.

For example, the receiver 300 may generate a message requesting a trigger in a time segment within 30 min (600 sec) after the timestamp on the basis of the trigger URL and the timestamp included in the obtained ACR Resulttype. The trigger URL and the time segment included in such a request message may be expressed as shown in FIG. 108. In the case of HTTP POST, the time segment may be designated as timestamp=2011/06/28T18:00:00 according to the format of name=value.

In such a manner, the receiver 300 may generate a trigger request message including the trigger URL and time segment information according to the HTTP GET or POST command format and may transmit it to the trigger server. The HTTP command format may be an efficient information request method used on an IP network. Accordingly, the receiver 300 may transmit the trigger request message through an IP network by using the HTTP GET or POST command format.

Moreover, the trigger server may generate a trigger request result message according to the trigger request message received from the receiver 300 and may transmit it to the receiver 300.

Here, the trigger request result message may include a trigger and may include list information of triggers that a trigger server is capable of providing.

Additionally, a trigger may be provided in plurality and if the number of triggers is equal to or greater than a predetermined value, the trigger server may divide and transmit a plurality of triggers by dividing a time segment. Accordingly, the trigger request result message may include trigger time segment information of triggers currently transmitted from a trigger server. Then, a difference between a time segment of triggers that the trigger server is capable of providing and a time segment that the receiver 300 requests may occur. Accordingly, trigger time segment information included in a trigger request result message may be identical to or different from a time segment included in a trigger request message.

FIGS. 109 and 110 are views illustrating an XML schema diagram of a trigger request result message according to an embodiment of the present invention.

As shown in FIGS. 109 and 110, the trigger request result message may have an XML format and may include a trigger in the above-described XML format.

According to an embodiment, a TDO-triggers element included in the trigger request result message may include at least one of a from attribute, a to attribute, and a TimeOffset attribute and the TDO-trigger element may include at least one of a from attribute and a to attribute.

The from attribute and to attribute fields included in the TDO-triggers element may indicate a time segment of triggers included in the trigger request result. For example, if a trigger time of triggers included in a trigger request result is an segment between A to B, the from attribute value may be A and the to attribute value may be B.

Then, the from attribute and to attribute fields included in the TDO-triggers element may indicate a specific time segment according to a trigger time of triggers corresponding to a specific service among triggers included in the trigger request result. If a trigger time of triggers corresponding to a specific service is a segment between A to B, the from attribute value may be A and the to attribute value may be B. Here, if the TDO-triggers element indicate different from and to attribute values, the from attribute and to attribute values of the TDO-trigger element may override the from attribute and to attribute values of the TDO-triggers element.

Moreover, as shown in FIG. 109, the TDO-triggers element may include a TimeOffset attribute field. The TimeOffset attribute field may indicate a waiting time for waiting for the next trigger request. The trigger server may receive a trigger request message from a plurality of receivers 300 and overload due to the increase of a trigger request message may occur. Accordingly, the trigger server may perform distribution at a predetermined time segment by limiting a trigger request message transmission time of each receiver 300 by using the TimeOffset attribute field. For example, the receiver 300 may obtain a time range of currently received triggers by extracting the from attribute and to attribute fields from the trigger request result message, obtain waiting time information by extracting the TimeOffset attribute field, and wait for a predetermined time until the next trigger request message transmission. Such a waiting time may be designated by a trigger server. The trigger server may designate an additional TimeOffset value to each receiver 300. Additionally, the trigger server may instruct the receiver 300 to wait for a random time within a TimeOffset time segment by using the trigger request result message. When a random time waiting is instructed in the trigger request result message, the receiver 300 determines a random time within a time segment of 0 to TimeOffset, and may wait for the next trigger request message transmission Moreover, the flowchart of FIG. 106 is described with reference to FIGS. 109 to 110.

Then, the receiver 300 obtains time segment information and waiting time information from the received trigger request result in operation S9017

As described above, the receiver 300 may receive a trigger request result message in an HTTP response format from a trigger server. Such a trigger request result message may have the XML format shown in FIGS. 109 to 110, and may include a plurality of triggers in an XML format.

Then, the trigger request result message, as described above, may include information on a time segment at which the plurality of triggers are to be executed and may include waiting time information on the next trigger request message transmission.

Then, the receiver 300 transmits the next trigger request message to the trigger server after a predetermined time on the basis of waiting time information in operation S9019.

As described above, the trigger request result message may include waiting time information.

Accordingly, the receiver 300 may wait for a predetermined time on the basis of the waiting time information that the trigger request result message instructs and may generates the next trigger request message after a predetermined time to transmit it to the trigger server. Accordingly, if there are a plurality of receivers 300, the network traffic may be reduced as the transmission of a trigger request message is distributed.

Moreover, the receiver 300 may generate the next trigger request message for a time segment not currently received on the basis of the from attribute and the to attribute included in the trigger request result message and then may transmit it to the trigger server.

In such a way, since the receiver 300 continuously receives a trigger whose time segment is designated through a communication with a trigger server, more efficient trigger transmission may be provided and an adjunct service for broadcast service according thereto may be efficiently provided.

Moreover, when a content item is a declarative object (DO) such as an NDO or a TDO, information on the DO including various parameters for allowing the receiver 300 to control the DO may be represented using content_descriptor of an NRT-IT. Especially, content_descriptor may include additional metadata for such a DO and content_descriptor including metadata for a DO may be referred to as a DO descriptor.

FIG. 111 is a view illustrating a DO descriptor according to an embodiment of the present invention.

As shown in FIG. 111, the DO descriptor may include a descriptor tag, a descriptor length, a DO identifier, a DO version, a test DO, a visible UI, a handles configuration changed, a handles externally controlled video, a persistent storage field.

The receiver 300 may obtain additional metadata for DO signaled through an NRT-IT through each field of such a DO descriptor and may manage and control a DO on the basis of this.

The receiver 300 may uniquely identify each DO by using DO_identifier. Then, the receiver 300 may load a previously stored DO for specific channel into another channel by using DO_identifier. If a broadcasting station owns a plurality of channels or virtual channels, especially, it may use the DO identifier usefully. Additionally, even if a DO is used only in one channel, in the case that the DO is used for long periods of time, the DO is identifiable regardless of a transmission session.

test_do may be a flag indicating that a corresponding DO is used for test purpose.

visible_UI may be a 1-bit unsigned integer indicating whether a DO has a visible UI.

persistent_storage may represent a storage space required for a DO. If the space is insufficient, the receiver 300 may not execute a corresponding DO or may execute a corresponding DO in a state limiting some functions and may notify space insufficiency to a user.

Moreover, the transmitter 200 may transmit an acquisition type of time slot descriptor corresponding to a content item or file configuring an NRT service.

Hereinafter, a time slot descriptor configured according to an embodiment of the present invention will be described with reference to FIG. 112.

FIG. 112 is a view illustrating a bit stream syntax of a time slot descriptor configured according to an embodiment of the present invention. FIG. 113 is a view illustrating contents of sub fields of a time slot descriptor.

Referring to FIGS. 112 and 113, the transmitter 200 may generate an acquisition type time slot descriptor to insert it into a content level descriptor loop of an NRT-IT. At this point, at least one acquisition type time slot descriptor may exist in a content level descriptor loop. Each time interval encoded by the acquisition type time slot descriptor represents a time for acquiring a corresponding content item.

Referring to FIG. 113, the time slot parameter field time_slot_params of the acquisition type time slot descriptor may include an acquisition time parameter acquisition_time. The acquisition time parameter represents a minimum time interval length necessary for guaranteeing that at least one complete content item instance is transmitted during a corresponding time interval.

According to another embodiment of the present invention, the transmitter 200 may generate a presentation type time slot descriptor to insert it in a content level descriptor loop of an NRT-IT. At this point, at least one presentation type time slot descriptor may exist in a content level descriptor loop. The presentation type time slot descriptor may signal that a corresponding time slot represents a time interval at which a corresponding content item is presented.

Hereinafter, a time slot descriptor of a TDO enable type configured according to another embodiment of the present invention will be described with reference to FIG. 113.

According to another embodiment of the present invention, the transmitter 200 may generate a TDO enable type time slot descriptor to insert it in a content level descriptor loop of an NRT-IT.

In such a manner, the receiver 300 may obtain the file of a corresponding content item through a FLUTE session at a time of when an acquisition slot of a corresponding content item exists, on the basis of the time slot parameter information. The receiver 300 recognizes when the file of a corresponding content item is obtained by recognizing an acquisition interval of a corresponding content item through an acquisition slot. For example, the receiver 300 may obtain the file of a corresponding content item during a time based on the obtained time parameter information, from an arbitrary time in an acquisition interval of the corresponding content item recognized. At this point, as described with reference to FIG. 24, the receiver 300 reads an FDT in a corresponding FLUTE session and receives a corresponding file or object if a Content-ID attribute field on a corresponding file is identical to a corresponding content item identifier content_id.

Moreover, all TDOs and NDOs may belong to at least one application domain. An application domain may be represented by at least one fully qualified domain name (FQDN). The FQDN may be configured in a prefix form of all files or pages configuring a TDO or an NDO.

For example, a basic application domain that a TDO or an NDO belongs may be designated as a FQDN for an entry file of an NRT content item configuring the TDO or the NDO. When the entry file does have an FQDN (for example, content-location in a FLUTE FDT corresponding to an entry file has a relative URI value instead of an absolute URI), the receiver 300 may obtain an application boundary descriptor application_boundary_descriptor from a descriptor loop of an NRT-IT for an NRT content item corresponding to the entry file.

The application boundary descriptor may be included in an NRT-IT and may have a form defined in DAB standard TS 102 809. For example, the application boundary descriptor may include at least one URI set including a fully qualified domain name of an application domain for a TDO or an NDO.

Accordingly, the receiver 300 may determine that any documents loaded from the outside of an application domain designated for a TDO or an NDO are unreliable. For example, the receiver 300 may prevent any HTML or ECMA script files received from the outside of an application domain from being loaded on the basis of the application boundary descriptor.

FIG. 114 is a view illustrating an application boundary descriptor according to an embodiment of the present invention.

Referring to FIG. 114, an application boundary descriptor according to an embodiment of the present invention may include a descriptor tag, a boundary extension count, a boundary extension length, and a boundary extension byte.

The boundary extension byte boundary_extension_byte) may include at least one URL in a URL prefix form. The receiver 300 may determine that all URLs matching the prefix are included in an application boundary that the application boundary descriptor represents. For example, the URI prefix may include a strict prefix. Accordingly, the URI prefix may include 'http://www.example.com' instead of 'www.example.com' and may include a path of a component such as 'http://www.example.com/epg/'. The receiver 300 may obtain a platform specification on the basis of a minimum level of granularity given by this prefix.

In such a way, the transmitter 200 may signal at least one application domain through an application boundary descriptor according to an embodiment of the present invention. In this case, the receiver 300 may set an application domain obtained first as a basic application domain.

Moreover, the transmitter 200 may signal an application domain to the receiver 300 by using a DO descriptor suggested in an embodiment of the present invention, besides such an application boundary descriptor.

FIG. 115 is a view illustrating a DO descriptor extended according to another embodiment of the present invention.

Referring to FIG. 115, a DO descriptor extended according to another embodiment of the present invention may further include an application domain count, an application domain length, and application domain byte fields, besides the above-described fields.

An application domain byte application_domain_byte may be a field including at least one URL in a URL prefix form indicating an application domain. The receiver 300 may determine that all URLs matching the prefix are included in an application boundary that the DO descriptor represents. For example, the URI prefix may include a strict prefix. Accordingly, the URI prefix may include 'http://www.example.com' instead of 'www.example.com' and may include a path of a component such as 'http://www.ex-ample.com/epg/'. The receiver 300 may obtain a platform specification on the basis of a minimum level of granularity given by this prefix.

In such a way, the transmitter 200 may signal at least one application domain through a DO descriptor according to another embodiment of the present invention. In this case, the receiver 300 may set an application domain obtained first as a basic application domain.

The receiver 300 may obtain application domain information on the basis of such a DO descriptor. The receiver 300 may perform an authority management on DO execution according to the application domain information. Accordingly, the receiver 300 may deny access according to the application domain information when a resource that a DO attempts to access is located out of a range of an application domain designated by the application domain information. Additionally, when a resource that a DO attempts to access is located out of a range of a designated application domain, the receiver 300 may allow access and may process the access as entering into an untrusted domain, thereby preventing the access to a resource in an application domain Moreover, as described above, the receiver 300 may receive an adjunct service on a channel during current viewing through an IP by using an automatic contents recognition (ACR). The adjunct service may include ATSC 2.0 content to be serviced in the further, for example.

Accordingly, the adjunct service may include a URL of a content server such as a start point for obtaining ATSC content and a trigger, include a virtual channel identifier that the content server recognizes, and include a time stamp for at least one broadcast frame of a last watched channel.

Then, the adjunct service may include a signaling table. The signaling table may include an SMT, an NRT-IT, a Text fragment table (TFT), a Purchase Item table (PIT) indicating purchase available content items, and a Purchase Terms and Channels table (PTCT) indicating purchase and channel terms, and also may include an internet locations table (ILT) described later.

Such signaling tables may correspond to a service signaling channel of each virtual channel. For example, each of other tables other than an NRT-IT and a TFT may correspond to one service signaling channel. Additionally, each one NRT-IT may exist in correspondence to each NRT service included in each virtual channel. The NRT-IT may be configured with various lengths of continuous NRT-IT instances and may cover a plurality of time intervals starting from a current time interval. Additionally, a TFT may selectively appear in correspondence to each NRT service. The TFT may be configured with continuous TFT instances to one-to-one correspond to an NRT-IT instance for the service.

Then, after obtaining the above-described URL and channel identifier, the receiver 300 may receive an adjunct service through an IP in the following way.

First, the receiver 300 may receive a signaling table from a content server on the basis of the obtained URL. For example, the receiver 300 may receive an NRT-IT instance and a TFT instance covering a current time interval. Additionally, the receiver 300 may receive an NRT-IT instance and a TFT instance covering the next time interval. The receiver 300 may access a TDO relating to a currently playing program by using the received instance.

Then, the receiver 300 may receive a necessary content item on the basis of URLs in the received NRT-IT.

Additionally, the receiver 300 may receive a trigger stream on the basis of URLs in an internet location table (ILT).

FIG. 116 is a view illustrating an ILT according to an embodiment of the present invention.

Referring to FIG. 116, the ILT may be transmitted from a content server and may include a locations defined field, a URL function code field, and a URL field.

The URL function code field may represent functions of a URL. For example, when the URL function code is 000, the function of a URL may be data collection or may represent a parameter used for another website or delivered for activating a TDO. Additionally, when the URL function code is 001, this may represent a URL providing a trigger stream.

Accordingly, the receiver 300 may perform audience reporting or trigger stream reception on the basis of the URL of such as a locations defined field. Such an ILT may be transmitted through a service signaling channel or an IP. By transmitting a URL through a newly defined table such as an ILT, the URL may be transmitted at a relatively less cycle frequency as compared to when the URL is included in the descriptor of an SMT and transmitted and a bandwidth used in a very low level may be saved.

Then, a service designated by the URL may be a usage reporting server for audience survey. Such a usage reporting server may be a server address for performing usage reporting on Linear TV service/NRT service/NRT Content item (including a TDO) included in a virtual channel in a service signaling channel corresponding to a currently viewing channel. In this case, an ILT may be configured with a table where only URLs designated to have the same URL_Function_code are bound or a table where all URLs are provided to have a plurality of URL_Function_code values. For example, the receiver 300 may classify an ILT including trigger stream URLs as Internet Location Table Triggers (ILT-Trig) and may classify a table including the URL of a usage reporting server as Internet Location Table Usage reporting (ILT-Usage).

Moreover, in order to transmit such an adjunct service through internet, a transmission method using HTTP may be used. As defined in IETF standard RFC 6062, an HTTP transmission method may include HTTP Short Polling, HTTP Long Polling, and HTTP Streaming.

Among them, in order to transmit a trigger among adjunct services through internet, HTTP Short Polling or HTTP Streaming may be used.

In the case of HTTP Short Polling, the receiver 300 may transmit an HTTP request to a server during a predetermined interval. The server may return update in response to each request until the last request before HTTP connection termination. When a time interval becomes longer, a delay time that a receiver obtains update may become very longer. If the time interval is short, the unnecessary overhead of a message transmitted between a client and a server may be increased when HTTP/TCP connection starts and ends.

Such HTTP Short Polling may be useful when it is possible to know a trigger activation time in advance, like a previously recorded broadcast.

Moreover, in the case of HTTP Streaming, when the receiver 300 transmits an initial request to a server, the server opens HTTP/TCP connection persistent at each update and transmits a response configured with a data stream. In this case, a delay time for obtaining update may become shorter and overhead may be reduced, but HTTP/TCP connection needs to be opened all the time.

Then, HTTP Streaming may be useful when it is impossible to know a trigger activation time in advance, like a live broadcast.

Accordingly, when a trigger is transmitted through HTTP Short Polling or HTTP Streaming, the URL of a transfer server may be included in the above-described adjunct service, a trigger, or the above-described ILT in the form of a URL. When the receiver 300 obtains the URL of a server in any way, signaling tables corresponding to an image being played based on the URL may be received through internet by using HTTP Short Polling or HTTP Streaming.

According to an embodiment of the present invention, the receiver 300 may transmit a signaling table request to a server continuously on the basis of an HTTP polling method and may obtain the updated signaling table from the server.

FIG. 117 is a view illustrating a query table (Query terms for Signaling Table Requests) of a signaling table according to an embodiment of the present invention.

As shown in FIG. 117, the receiver 300 may request at least one signaling table of an SMT, current or next NRT-IT and TFT instances, ILT/Usage, ILT/Trig, PIT, and PTCT.

When a query method is described with reference to FIG. 117, a first query may start with ?<chan_id>. Here, chan_id may represent the channel number of a virtual channel. chan_id may include a decimal notation form of a major channel number for a specific virtual channel and the period may follow the notation. A decimal notation form of a minor channel number for the virtual channel may follow the period.

Then, the query may include <svc_id>. Svc_id may represent the service identifier of a specific NRT service. The service identifier may be represented by a decimal notation of a high order byte, the period, and a decimal notation of a low order byte in order.

Moreover, in order to reduce the overhead according to a repeated signaling table request, a table set may be included in a table request. Such a table set may be expressed as a BASIC SET as shown in FIG. 117, for example.

For example, the receiver 300 may request a basic set from a signaling table request message. When receiving the request, a server may transmit the latest version of all basic tables. For example, the basic table may include at least one of an SMT, a current NRT-IT, a current TFT, an ILT/Usage, an ILT/Trig, a PIT, and a PICT and may allocate various sets according to service provider's convenience.

Moreover, the receiver 300 may obtain the address of a server transmitting such a signaling table through various methods and that is, an ACR method according to an embodiment of the present invention may be used but the present invention is not limited thereto.

Then, the receiver 300 may request a signaling table for a virtual channel or an NRT service to be received on the basis of such a query table.

Upon receipt of a signaling table request according to a query table from the receiver 300, the server may return a corresponding table or table instance in response to the request. Here, the returned table or table instance may be identical to those transmitted through a broadcast stream.

Then, when the table or table instance includes a plurality of sections, a table or table instance returned as one response from a server may have a form in which the plurality of sections are connected.

Then, upon receipt of a requested table, the receiver 300 may obtain signaling information relating to all data from the table, which is identical to that received from a broadcast through an antenna. Accordingly, the receiver 300 may obtain metadata for all NRT service, content items, and triggers relating to broadcast. Additionally, the receiver 300 may obtain location information on files configuring all content times on the basis of the obtained metadata and may receive all files through internet connection. Then, the receiver may obtain location information that a trigger stream is transmitted on the basis of the obtained metadata and may receive a trigger stream through internet connection on the basis of the obtained trigger stream location information.

Moreover, when only such an HTTP Polling method is used, a large number of HTTP requests may cause heavy loads on the server. For this, according to an embodiment of the present invention, an improvement method using HTTP streaming may be suggested.

First, the receiver 300 may receive whether to update or an updated signaling table through HTTP streaming while receiving the latest version of a signaling table through HTTP Polling.

For example, the receiver 300 may determine whether to update by separately accessing a URL notifying whether to update through an HTTP streaming method while receiving a signaling table through an HTTP polling method. Such a Service Signaling Channel Update streaming URL may be separately transmitted from a server, for example, through an Internet Location Table. In this case, URL_Function_Code may be assigned to 002.

Additionally, for example, the receiver 300 may use an HTTP Polling method in the case of the first access and after that, an updated table may be received through HTTP streaming. A URL for receiving an updated table may be separately transmitted and for example, may be transmitted through an ILT.

Second, the receiver 300 may receive an event each time there is an updated table with a session opened continuously through HTTP streaming. When the receiver 300 accesses the server first, the server may transmit all the latest version of signaling tables and then may transmit only updated signaling tables.

Then, a server for delivering a signaling table or whether to update a table through HTTP Streaming, the server may transmit the following event form of a message.

An Updated_table_info event may represent a list of updated tables. This event data may have the following form.

table_name>[;<table_version>] [, . . . ]: table_name may represent the name of an updated table. The table name may be identical to the query term shown in FIG. 117 for HTTP Polling. Additionally, the version of an updated table may be selectively shown through a semicolon and several number of updated tables may be shown by commas.

An updated_table event may represent an updated table itself and a table updated together with this event may be immediately delivered to the receiver 300. In this case, the event data may include updated tables in a binary form as they are and in the case of a plurality of tables, sequentially attached tables may be delivered to the receiver 300. Moreover, in order to include this event in an HTTP response, tables may be encoded in a URL encoding form by a server and then may be transmitted.

A table_name event may represent the name of an updated table by a table unit. In this case, the receiver 300 determines that the received event data is an updated table for a table having the same name as an event name. The event data may be encoded in a URL encoding form by a server and then may be transmitted.

Additionally, as described above, the receiver 300 may request a table and also a trigger through an HTTP polling method or may request them through HTTP GET or HTTP POST. Since detailed descriptions for this are identical to those of FIGS. 106 to 110, overlapping descriptions are omitted.

Moreover, the activation time stamp of a trigger transmitted through internet may be determined relative to a server side time.

For example, a time that the receiver 300 starts to capture an AV segment may be tn msec relative from a system time reference specific timing of the receiver 300. Then, when a start time from a specific timing on the basis of a broadcast time of an AV segment received from a server is tb msec relatively, the time of the receiver 300 and the broadcast time may have a difference of tn−tb. Then, when the activation time stamp of a trigger received from internet is tx (measured based on a broadcast time), the trigger activation time determined by the receiver 300 may be tx+(tn−tb) or tn+(tx−tb).

Accordingly, the receiver 300 may be required to request a time stamp relating to the server side time periodically while a trigger is requested through internet. Accordingly, the receiver 300 according to an embodiment of the present invention may synchronize a local time with the server side time and may activate a trigger at an appropriate time.

A request/response relationship of a trigger or signaling table through internet between the receiver 300 and a server according to an embodiment of the present invention is as follows.

First, at the HTTP request, upon receipt of an HTTP GET request including a base URL through a virtual channel, a server (for example, a content server) may transmit a trigger to the receiver 300 through internet correspondingly.

Such an HTTP GET request may include virtual channel identification information, start time information, and duration information and may have the following format.

?chan=<chan_id>&start=<start_time>
[&duration=<duration>]

chan_id may represent the channel number of a virtual channel and may include a decimal notation of a major channel number and a minor channel number divided by a period.

start_time may represent milliseconds in decimal form. The start time may be relative to a server side time and may represent a start time of a requested time interval.

Duration may represent a time interval of seconds in decimal form. Duration may represent a length of a time interval requested to the receiver 300 when a content server uses a Short Polling method as a transmission method for a requested channel.

For example, the receiver 300 may designate a current time to start_time during request message transmission. When a content server in a Short polling mode receives the request message and responds to the receiver 300, the receiver 300 transmits the next request before a time interval end covered by the response so that it may receive the next response before the time interval end. At this point, the receiver 300 may designate a time interval end time of a previous response to start_time and then may transmit it. Accordingly, request and response transmission may be provided with a seamless interval.

Additionally, a server may transmit a response message to the receiver 300 through HTTP Streaming in addition to HTTP Short Polling. The server may operate in two modes and according to the two modes, a transmitted response may include trigger length data represented by an 8-bit unsigned integer and trigger activation time data represented by a 32-bit unsigned integer. The trigger activation time, as described above, may be designated based on a server side time. A plurality of triggers cannot be duplicated in one response message. Additionally, when an asynchronous trigger is included in a response message, the receiver 300 may determine a time at which a trigger appears first in a broadcast stream received after start_time of a request message as an activation time.

Moreover, according to an embodiment of the present invention, the receiver 300 may add text/stream-event to an Accept header in an HTTP request header so that it notifies the server that it may receive an event in an HTTP streaming form.

Additionally, the receiver 300 may request a trigger or a table from the server by using MIME type. For example, the receiver 300 inserts MIME type into an Accept header of an HTTP request to specify trigger or table request information. The server may represent information on a table or a trigger to be transmitted to the server by using a content-type header of an HTTP response. For example, the header may include the following message.

application/atsc2.0-ssc: information on a signaling channel (for example, a signaling table)

application/atsc2.0-trigger: trigger information

Figure 118:
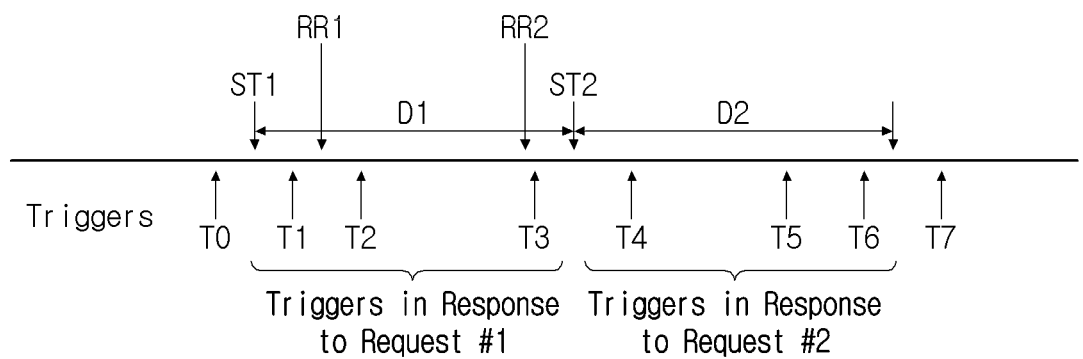
FIG. 118 is a view illustrating a timeline between a request and a reply during Short Polling when a trigger is transmitted through internet.

Moreover, FIG. 118 is a view illustrating a timeline between a request and a response during Short Polling when a trigger is transmitted through internet.

Referring to FIG. 118, when the content server operates in an HTTP Short Polling mode, the receiver 300 may perform a trigger or table request periodically and may transmit a response message periodically.

When the content server operates in an HTTP Short Polling mode, the response message for the trigger or table request may start with Polling: Duration=<duration>. Here, <duration> may be in seconds in decimal form indicating a duration covered by a response message and may be followed by a line feed character. The duration may be identical to that requested to the receiver 300 and if there is no duration in the request of the receiver 300, a default duration may be set by a content server and may be transmitted as a response.

Then, the response message may include a trigger or tables identified by <chan_id>. This trigger or tables may be scheduled to be transmitted during a <duration> time interval from <start_time> through a broadcast stream. Then, triggers transmitted through internet may be arranged according to the order in which the triggers are transmitted through a broadcast stream.

Then, after transmitting a response message, the server may terminate HTTP connection.

Moreover, when an event in HTTP response starts with Polling: Duration=<duration>, even if the HTTP connection is terminated by the server, the receiver 300 does not attempt reconnection immediately and attempts connection again after a predetermined time in correspondence to a time designated to the duration.

Figure 119:
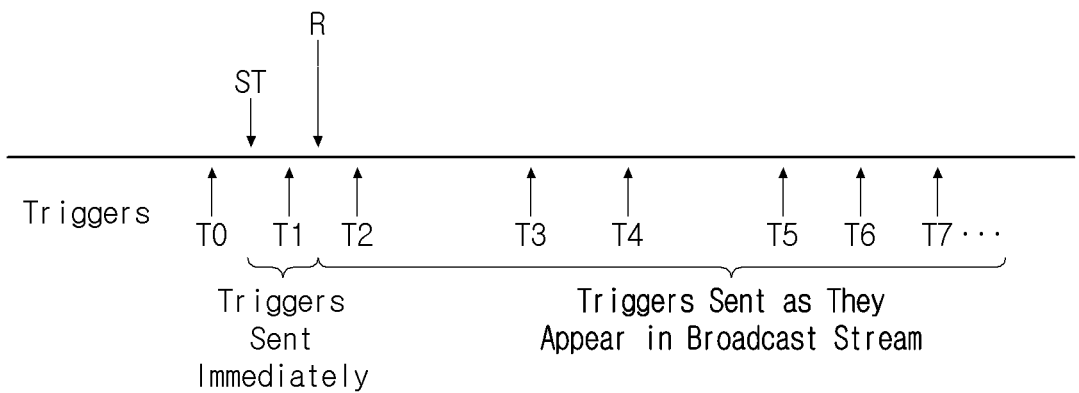
FIG. 119 is a view illustrating a timeline between a request and a response during HTTP Streaming when a trigger is transmitted through internet.

FIG. 119 is a view illustrating a timeline between a request and a response during HTTP Streaming when a trigger is transmitted through internet.

Referring to FIG. 119, when the receiver 300 requests an initial trigger stream, the server may transmit a trigger that is already transmitted at that time and needs to be processed by the receiver 300 first through an HTTP streaming session. Then, the server may deliver newly generated triggers at the same time as a broadcast network through the HTTP streaming session.

When the content server operates in an HTTP streaming mode, the response message for the trigger or table request of the receiver 300 may start with Streaming and may be followed by a line feed character.

If <start_time> requested to the content server is prior to a current time (a time at which the content server receives the request) of the content server, an initial response message may include a continuous trigger set. This continuous trigger set may include all triggers transmitted through a broadcast stream during a time interval from <start_time> to the current time of the content server among triggers for a virtual channel identified by <chan_id>. Additionally, the response message may further include triggers transmitted through a broadcast stream according to the same request of the receiver 300.

Then, when the content server operates in a Streaming mode, it may maintain HTTP connection to be opened while a new trigger is transmitted. The receiver 300 determines that connection is terminated when a channel is selected and released.

Moreover, if <start_time> requested to the content server is equal to or later than a current time (a time at which the content server receives the request) of the content server, an initial response message may include triggers transmitted through a broadcast stream according to the request of the receiver 300. Then, when the content server operates in a Streaming mode, it may maintain HTTP connection to be opened while a new trigger is transmitted. The receiver 300 determines that connection is terminated when a channel is selected and released.

Moreover, when the server uses HTTP streaming for transmission, a trigger may be delivered in the following event format.

trigger event: this event may represent a trigger identical to a trigger transmitted through a broadcast channel. A data field of the event may have the following structure.

The data field may have the same value as the payload of packet corresponding to a trigger transmitted through a broadcast channel and may be encoded in a URL method.

The data field may be configured with a pair of key:value and may be configured with an unaligned combination separated by a comma. The key may correspond to Timestamp and may represent a trigger time. The value may correspond to Trigger_data and may include a trigger parameter having the same format as a trigger transmitted through a broadcast stream. The data field may be transmitted in order with its values separated by commas and no key designation.

pre-recorded-trigger event: this event may include a plurality of triggers for content pre-recorded as one file. The receiver 300 may ignore or may not check another trigger event until the pre-recorded content is terminated. The data field structure may be configured with a pair of key:value like the above-mentioned event and may be configured with an unaligned combination separated by a comma. The key may correspond to Trigger_file_URL for locating pre-recorded content and the value may correspond to a Reconnect-time that the receiver 300 receives a new trigger.

Moreover, the content server may perform switching at any time between HTTP streaming and HTTP short polling. Accordingly, the following method for signaling for the receiver 300 may be used.

When the content server switches from Short Polling to Streaming, the content server may switch a mode by transmitting a Streaming response message in correspondence to a continuous request of the receiver 300.

Then, when the content server switches from Streaming to Short Polling, the content server may terminate the HTTP connection with the receiver 300 and then, may switch a mode by transmitting a Short Polling response message in correspondence to a request starting from the receiver 300.

Moreover, FIG. 120 is a view illustrating a trigger structure according to another embodiment of the present invention.

Referring to FIG. 120, a trigger may include a version, a trigger identifier, a trigger protocol version, a trigger target, a trigger action, trigger data, and a trigger action time. Additionally, the trigger may include a safe area flag and a plurality of coordinate information.

Additionally, as shown in FIG. 120, the trigger may include a safe area flag and a plurality of coordinate information.

The safe area is an override area as compared to another area and the receiver 300 displays a TDO, which is executed by a trigger having a safe area set, with the first priority so that the TDO is not covered by another display area.

A safe area flag safe_area_flag may be a 1-bit field indicating whether an override safe area is designated by the trigger.

A left x coordinate left_x_coord may be an 8-bit field indicating a horizontal coordinate of the left lower corner in the override safe area.

A right x coordinate right_x_coord may be an 8-bit field indicating a horizontal coordinate of the right upper corner in the override safe area and may have a right horizontal direction percentage value (an integer between 0 and 100) on the basis of the left of a screen.

A left y coordinate left_y_coord may be an 8-bit field indicating a vertical coordinate of the left lower corner in the override safe area and may have an upper end vertical direction percentage value (an integer between 0 and 100) on the basis of the lower end of a screen.

A right y coordinate right_y_coord may be an 8-bit field indicating a vertical coordinate of the right upper corner in the override safe area and may have an upper end vertical direction percentage value (an integer between 0 and 100) on the basis of the lower end of a screen.

Moreover, FIG. 121 is a view illustrating a trigger stream descriptor according to an embodiment of the present invention.

The transmitter 200 or the server may transmit a trigger stream to the receiver 300 and the trigger stream may be obtained from an elementary stream (ES) level descriptor loop of a program element and may be transmitted through internet. The transmitter 200 or the server transmits a descriptor indicating information on such a trigger stream to the receiver 300, so that it may provide information through a signaling channel to allow the receiver 300 to receive a trigger stream easily.

As shown in FIG. 121, a trigger stream descriptor may include a descriptor tag, a descriptor length, a trigger stream identifier, a trigger stream profile, a target service count, and a target service identifier.

The trigger stream identifier may include identification information for identifying a trigger stream. For example, the receiver 300 may uniquely identify a trigger stream from a virtual channel of a PMT section corresponding to the descriptor on the basis of a trigger stream identifier.

The target service count may be an 8-bit unsigned integer indicating the number of NRT services including target content items of triggers transmitted through a trigger stream in correspondence to a corresponding virtual channel.

The target service identifier may be an 8-bit unsigned integer for identifying NRT services including target content items of triggers transmitted through a trigger stream.

Additionally, the service manager 350 of the receiver 300 receives a trigger and delivers it to a TDO.

As described above, a state of a TDO may be shifted by a trigger and a synchronized service may be provided by a trigger at a time that a broadcasting company wants. In order for a TDO to provide such a service, the TDO may be able to receive a delivered trigger. As described above, the service manager 350 of the receiver 300 may deliver trigger information to a target TDO according to the received trigger. Trigger information may be delivered to a TDO through an application programming interface (API).

An API delivering such trigger information to a TDO is described below.

For example, the service manager 350 of the receiver 300 may deliver a TDO to a trigger through an API designated by a TDO. Accordingly, the TDO may declare a trigger object for receiving a trigger in advance and may receive a trigger through the declared trigger.

According to an embodiment of the present invention, the MIME type of a trigger object may be an application/atsc-trigger and in this case, the TDO may receive a trigger normally from the outside only when a trigger object is declared in a specific page where the TDO is executed.

Moreover, according to an embodiment of the present invention, the trigger object declared by the TDO may include a function interface for registering the following event.

Event: function onTriggerReceived(Trigger trigger)

Then, the trigger class shown in the above event may include trigger information to be delivered to a TDO. The trigger information may include properties below.

The properties may include at least one of readonly TriggerProtocolVersion protocol_version, readonly Number trigger_id, readonly Number trigger_version, readonly TriggerTarget trigger_target, readonly Number trigger_action, readonly Number trigger_version, and readonly Object data.

Moreover, each of TriggerProtocolVersion class and TriggerTarget class declared in the trigger class may have the following properties.

The TriggerProtocolVersion class may include readonly Number major_version and readonly Number minor_version as its properties and the TriggerTarget class may include readonly Number service_id and readonly Number content_linkage as its properties.

The properties defined by such a trigger class may have the same information as trigger data delivered through a broadcast network or an internet network.

FIG. 122 is a view illustrating a usage example of a trigger and a TDO API according to an embodiment of the present invention.

As shown in FIG. 122, a trigger API used in a TDO may be implemented with java script using HTML language.

As described above, a TDO may declare a trigger for receiving a trigger as a triggerObject and when a trigger is received, each of the above-mentioned properties may be set and updated by performing a function called on TriggerRecv.

FIG. 123 is a view illustrating a Trigger stream association descriptor according to another embodiment of the present invention.

As described above, according to an embodiment of the present invention, the receiver 300 may identify a trigger scream by receiving a trigger stream descriptor and may obtain metadata for a trigger stream from the trigger stream descriptor. Additionally, the trigger stream descriptor may selectively include identification information on NRT service relating to a trigger stream.

Then, the NRT service relating to a trigger stream may mean NRT services corresponding to a trigger target TDO of triggers included in the trigger stream. In order for the receiver 300 to easily recognize an association between a trigger stream and an NRT service, the transmitter 200 may need to transmit such an association between a trigger stream and an NRT service to the receiver 300.

Accordingly, as shown in FIG. 123, the transmitter 200 may transmit a trigger stream association descriptor indicating an association to the receiver 300.

For example, the transmitter 200 may include a trigger stream association descriptor in a descriptor loop of an SMT and then may transmit it. The receiver 300 may determine that a trigger stream and an NRT service are associated on the basis of the NRT service corresponding to a descriptor loop where a trigger stream association descriptor is located and trigger stream identification information included in the trigger stream association descriptor.

As shown in FIG. 123, the trigger stream association descriptor may include a descriptor tag field, a descriptor length field, a trigger stream count field, and a trigger stream identification field.

The trigger stream count field may be an 8-bit unsigned integer indicating the number of trigger streams determining TDOs in a specific NRT service of an SMT including the descriptor as trigger targets.

The trigger stream identification field may be an 8-bit unsigned integer indicating identification information on a trigger stream determining TDOs in a specific NRT service of an SMT including the descriptor as trigger targets.

Accordingly, the receiver 300 may receive a trigger stream on the basis of the trigger stream identifier and may receive triggers from a trigger stream. Then, the receiver 300 may operate a TDO by processing received triggers by using the above-mentioned API.

Besides that, the receiver 300 may identify a trigger stream through various methods. For example, the receiver 300 may receive a trigger through an IP network. The receiver 300 may identify a stream for receiving a trigger by obtaining a trigger URL from the above-mentioned Internet Location Table (ILT). Then, the receiver 300 may receive a trigger directly transmitted from a content server through an IP network.

FIG. 124 is a view illustrating an ILT according to another embodiment of the present invention. FIG. 125 is a view illustrating a URL function code value table used in an ILT according to another embodiment of the present invention.

The ILT according to another embodiment of the present invention may include address information through which the receiver 300 receives a trigger stream through internet.

For example, as shown in FIG. 124, the ILT according to another embodiment of the present invention may further include a trigger stream identifier trigger_stream_id field in addition to the ILT shown in FIG. 116. Then, URL_fuction_code corresponding to a trigger stream identifier may be additionally allocated.

The fields described with reference to FIG. 124 are not described again and only additional fields are described as follows.

A URL function code URL_function_code field may represent the function or purpose of a URL provided from the ILT and its detailed meaning is described as follows with reference to FIG. 125.

When the URL function code value is 0, it may represent a URL for usage reporting and may be used for audience survey as described above.

When the URL function code value is 1, it may represent the URL of a trigger stream transmitted through internet according to another embodiment of the present invention.

The trigger stream identification trigger_stream_id field may be an 8-bit field for identifying a trigger stream transmitted through a URL corresponding to an internet location loop including this field.

In such a manner, the receiver 300 may receive an ILT according to another embodiment of the present invention shown in FIG. 124 and may obtain trigger stream identification information and address information (i.e., URL information) corresponding thereto from the received ILT. Then, the receiver 300 may access a server transmitting a trigger stream on the basis of the obtained trigger stream identification information and address information and may obtain triggers from the received trigger stream.

Moreover, according to another embodiment of the present invention, the receiver 300 may receive signaling tables for an adjunct service of a broadcast stream in addition to a trigger through an IP network.

The signaling table for an adjunct service of a broadcast stream may include at least one of an NRT-IT, an SMT, a TFT, an ILT, a PIT, and a PTCT, as described above. The receiver 300 may need to receive such signaling tables through internet. For example, if it is impossible for the receiver 300 to receive a broadcast stream through a broadcast network, signaling tables for an adjunct service for a currently viewing image may need to be received through internet. Accordingly, the receiver 300 may obtain broadcast information on a currently viewing image through the above-mentioned various methods and, on the basis of this, may request signaling tables of an adjunct service from a server and may receive them.

A request/response relationship of a signaling table through internet between the receiver 300 and a server according to an embodiment of the present invention is as follows.

A server signaling an adjunct service may transmit signaling tables for a specific virtual channel through HTTP. Accordingly, the receiver 300 may transmit a signaling table request message in a full URL format including a basic URL to a server. Especially, the signaling table request message may include the basic URL of a server and extended query information.

Accordingly, the receiver 300 may transmit a signaling table request message of an adjunct service for a specific virtual channel by using the basic URL of a server and query information. For example, a request message that the receiver 300 transmits may include virtual channel identification information, start time information, duration information, update information, and signaling table information, and a query for this may have the following format. Additionally, the query may be located at the end of a full URL format of a request message transmitted to a server.

That is, the receiver 300 may transmit a signaling table request message in a full URL format to a server through an internet network. The signaling table request message may include at least one query information and the query information may be located at the end part of a full URL format message. The query information may include first query information and second query information. The first query information is as follows.

?chan=<chan_id>&start=<start_time>
[&duration=<duration>][&update]

chan_id may represent the channel number of a virtual channel and may include a decimal notation of a major channel number and a minor channel number divided by a period.

start_time may represent a start time. The start time may be a server side time reference relative time and may represent a start time of a time interval that the receiver 300 requests. For example, start_time may be a millisecond unit time but the present invention is not limited thereto.

The duration may represent a time interval. The duration may represent the length of a time interval requested from the receiver 300.

The update may be a boolean flag indicating whether a request of the receiver 300 is for update. If there is no update information in the request that the receiver 300 transmits, the request is an initial request transmitted from the receiver 300. If there is update information in the request that the receiver 300 transmits, the request may be for update of a signaling table.

For example, the receiver 300 may designate first query information during request message transmission. The receiver 300 may designate a current time of a currently viewing image in start_time and may designate a time interval of tables to be received in the duration and may mark whether to update in the update.

Especially, the receiver 300 may obtain a time of a broadcasting station side transmitting a video frame of a currently viewing image and may designate the time as start_time.

Then, when a signaling server receives the request message and transmits a response to the receiver 300 (i.e., transmitting signaling tables), the receiver 300 transmits the next request before a time interval end covered by the response so that it may receive the next response before the time interval end. At this point, the receiver 300 may designate a time interval end time of a previous response to start_time and then may transmit it. Accordingly, request and reply transmission may be provided with a seamless interval.

FIGS. 126 and 127 are views illustrating a second query information and response relationship of a signaling table request message according to an embodiment of the present invention.

The signaling table request message that the receiver 300 transmits through an internet network may be further extend by using additional second query information.

The receiver 300 may include table information to be received in second query information as shown in FIG. 126 or 127. Such second query information may be located at the end part after the first query information of a signaling table request message transmitted to a server in a full URL format.

For example, like &table=SMT, the receiver 300 may insert table information to be received into a request message by designating a specific table at the end part of a request message.

svc_id may represent the service identifier of an NRT service transmitted through a virtual channel in first query information and may be expressed in a high order byte and low order byte of decimal notation separated by a period.

Then, the second query information may selectively include square brackets ([ . . . ]). If there is no &svc list in the square brackets, the second query information may represent that the receiver 300 requests signaling tables for all NRT services transmitted in a corresponding virtual channel. Only when requesting signaling tables for a specific NRT service, the receiver 300 may designate an NRT service by inserting a &svc list and svc_id in the square brackets.

Moreover, a Current NRT-IT and a Current TFT may represent a table instance existing within a time interval designated by the start time in the first query information. Then, a Next NRT-IT and a Next TFT may represent table instances of the next time interval after a time interval covered by the Current NRT-IT and the Current TFT. A Future NRT-IT and a Future TFT may represent table instances to be transmitted through a broadcast stream after the next time interval.

Here, if the second query information includes an NRT-IT or a TFT, a server receiving a request selectively transmits at least one of the NRT-IT or the TFT capable of covering a time interval designated to <start_time> and <duration> in the first query information so that efficient table transmission may be performed.

Moreover, since overhead due to transmitting a table request one by one repeatedly occurs, the receiver 300 may classify a plurality of signaling tables as a set and may request them at a time. Then, signaling tables for a plurality of adjunct services may be classified as a basic set, an extension set, and a full set.

The basic set may include at least one of an SMT, an NRT-IT, a TFT, and an ILT corresponding to NRT service transmitted to a specific virtual channel by the first query information.

The extension set may include at least one of a PIT and a PTCT corresponding to NRT service transmitted to a specific virtual channel by the first query information, besides the basic set.

The full set may further include a Future NRT-IT and a Future TFT besides the extension set.

Each set classified in such a manner may be designated differently according to a broadcast server provider or an adjunct service provider and the present invention is not limited thereto. For example, a PSIT set may represent TVCT, EIT, and ETT instances and a Basic NRT set may include SMT, NRT-IT, and TFT instances corresponding to the service identifier svc id of the virtual channel and an Extended NRT set may represent PIT and PTCT instances besides the Basic set.

With a combination of such first query information and second query information, the receiver 300 may request various conditions of signaling tables from a server. Additionally, the signaling tables may include signaling tables for broadcast service itself in addition to an adjunct service of a broadcast service. For example, the signaling table may include a PSIP table for broadcast service.

Moreover, the server may transmit signaling tables in a response message in response to the request of the receiver 300e. Such a response message may be transmitting through a polling method and is not limited to a transmission method.

For example, the server may generate a response message of an HTTP method starting with Duration=<duration> and then may transmit it to the receiver 300.

<duration> of a response message may be in minutes in decimal form indicating a time interval covered by a server response message and may be followed by a newline character. The duration of the response message may be identical to that requested from the receiver 300 and if there is no duration designated in the request of the receiver 300, a default duration may be set by a signaling server.

Then, the response message may include signaling tables corresponding to a virtual channel identified by <chan_id>.

When receiving an initial request from the receiver 300, the server may transmit signaling tables scheduled to take effect for a <duration> time interval from <start_time> and updated tables (e.g., a concatenated set) to the receiver 300. Then, the server may align signaling tables transmitted through internet according to effective time order and transmit them.

When receiving an update request from the receiver 300, the server may transmit signaling tables scheduled to take effect for a <duration> time interval from <start_time> and updated tables (e.g., a concatenated set) to the receiver 300. In the same manner, the server may align signaling tables transmitted through internet according to effective time order and transmit them.

Then, after transmitting a replay message, the server may terminate HTTP connection.

Moreover, when an HTTP response starts with Duration=<duration>, even if the HTTP connection is terminated by the server, the receiver 300 does not attempt reconnection immediately and attempts connection again after a predetermined time in correspondence to a time designated to the duration.

Table or table instances included in the response table may have the same format as those transmitted through a broadcast stream. When table or table instances include a plurality of sections, the sections may be included in a response message in a sequentially connected form.

A 32-bit unsigned integer indicating an update time of a signaling table section may be added to the front of each signaling table section included in the response message. For example, the 32-bit integer may represent a service side reference time that the signaling table section is valid for the channel. The signaling table section cannot be duplicated and it is determined that a new version of a signaling table is not duplicated.

Moreover, the receiver 300 that cannot receive broadcast stream directly may obtain a signaling table through an ACR method. At this point, the receiver 300 may receive virtual channel identification information on currently viewing content and a signaling server URL from a watermark server or a fingerprint server on the basis of part of a currently viewing AV content. The receiver 300 may receive various signaling tables relating to a virtual channel of the currently viewing content by accessing a signaling server and may receive an adjunct service of the currently viewing content.

Then, the receiver 300 may receive a URL for receiving adjunct service through various methods by accessing a signaling server. For example, the receiver 300 may obtain URLs for receiving adjunct service by receiving the above-mentioned ILT.

For example, the receiver 300 may receive signaling tables including the ILT by accessing a specific server URL obtained using ACR.

Then, the receiver 300 may obtain the URL address of an adjunct service signaling server corresponding to a currently viewing virtual channel by using the ILT.

Then, the receiver 300 may receive adjunct service signaling tablets corresponding to a currently viewing virtual channel by accessing the adjunct service signaling server.

Then, the receiver 300 obtains an SMT from an adjunct service signaling table and may identify NRT services on the basis of the SMT.

Then, the receiver 300 may receive the identified NRT service on the basis of the adjunct service signaling tables. Here, the receiver 300 may receive adjunct service without tuning to another channel but a broadcasting station may not discover the receiver 300. Accordingly, information for allowing a broadcasting station to discover the receiver 300 may need to be transmitted.

FIG. 128 is a view illustrating an ILT according to another embodiment of the present invention. FIG. 129 is a view illustrating a URL_fuction_code value table used in FIG. 128.

Referring to FIG. 128, the ILT according to another embodiment of the present invention may include a plurality of major channel number fields major_channel_number and minor channel number fields minor_channel_number corresponding to each URL_fuction_code besides the above-mentioned embodiment of the ILT.

The meaning of URL_fuction_code used herein may be identical to that shown in FIG. 129.

In more detail, when URL_fuction_code is 0, the URL of a loop including URL_fuction_code field in the ILT may represent a URL for usage reporting for a virtual channel identified as the major channel number and minor channel number fields.

Then, when URL_fuction_code is 2, the URL of a loop including URL_fuction_code field in the ILT may represent a URL for receiving a signaling table for a virtual channel identified as the major channel number and minor channel number fields.

According to a configuration of the ILT depending on URL_fuction_code, the receiver 300 may perform usage reporting for a major channel number and a minor channel number of a currently viewing channel. Accordingly, the above-mentioned issue that a broadcasting station does not discover the receiver 300 may be resolved.

Additionally, the receiver 300 may use various methods for a broadcasting station to discover the receiver 300 that does not receive broadcast stream besides the above-mentioned ILT.

For example, a fingerprint server or a watermark server for ACR may operate as an NRT discovery server. Additionally, the fingerprint server or the watermark server may signal access information on the NRT discovery server to the receiver 300. Additionally, the NRT discovery server may be operated by a provider of the receiver 300. The receiver 300 may obtain access information on the NRT discovery server from a receiver provider server or may obtain access information on the NRT discovery server from a memory built in the receiver 300 itself.

Moreover, the receiver 300 may provide a TDO service according to an operation of a TDO by a trigger. The transmitter 200 may transmit real time data necessary for an operation of such a TDO. Accordingly, the receiver 300 may provide a real time linked TDO service by receiving real time data. For example, a TDO may provide real time stock information by using real time data. In such a manner, real time data for a TDO may be transmitted to the receiver 300 via various paths.

The real time data for a TDO may be transmitted based on MPEG-2 elementary stream (ES).

Additionally, the real time data may be included in a trigger and then transmitted. A trigger including real time data in such a manner may be referred to as a data type trigger.

The real time data for TDO may be transmitted through an IP based broadcast network or internet network, as mentioned above.

First, the real time data may be transmitted through FLUTE. The transmitter 200 may transmit real time data for a TDO by using an NRT service transmitted through FLUTE. For this, the transmitter 200 may allocate a specific consumption model with respect to the real time data for a TDO. The consumption model, as described with reference to FIG. 68, may be designated by a value of a consumption model field included in an NRT service descriptor in a service level descriptor loop of an SMT. The receiver 300 may receive an NRT service corresponding to a data stream consumption model by a consumption model. The NRT service corresponding to a data stream consumption model may include real time data for a TDO and also may include other data for an NRT service object other than a TDO.

FIG. 130 is a view illustrating a consumption model field including a data stream consumption model according to an embodiment of the present invention. Descriptions of other fields are identical to those described with reference to FIG. 68.

Referring to FIG. 130, an NRT service where a value of a consumption model field is designated to a data stream 0x05 may include at least one file stream for a downloadable object or a declarative object (DO). Here, the meaning of the downloadable object or the declarative object (DO) may be used as including a Triggered Declarative Object (TDO) or a general NRT service object. A TDO may be one of objects operating in a DO execution environment. An NRT service where a consumption model is designated to data stream may be received only when a DO operating in the receiver 300 requests download and delivery through an API provided as part of an execution environment and a file stream included in the received data stream service may be delivered to only the DO.

Figure 131:
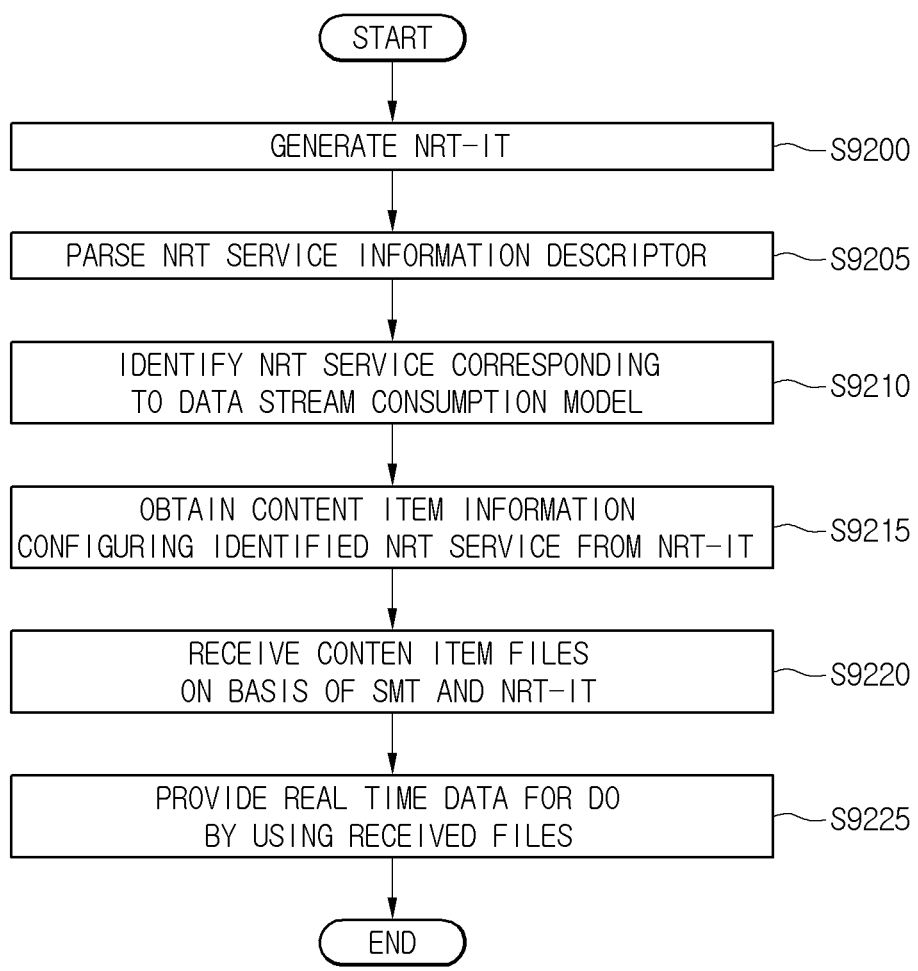
FIG. 131 is a flowchart illustrating a method of a receiver providing data for a DO to receive broadcast service by receiving an NRT service allocated to a data stream consumption model.

FIG. 131 is a flowchart illustrating a method of a receiver providing data for a DO to receive broadcast service by receiving an NRT service allocated to a data stream consumption model.

Referring to FIG. 131, first, the receiver 300 obtains an SMT from service signaling data in operation S9200. The receiver 300 may receive service signaling data by accessing a broadcast service channel and may obtain an SMT from the service signaling data.

Then, the receiver 300 parses an NRT service information descriptor from the SMT in operation S9205.

Here, the receiver 300 identifies an NRT service corresponding to the data stream consumption model among the identified NRT services in operation S9210.

When the reception of the data stream consumption model is selected, the receiver 300 obtains content item information configuring the NRT service identified as a data stream consumption model from an NRT-IT in operation S9215.

Then, the receiver 300 receives files configuring a content item on the basis of an SMT and an NRT-IT in operation S9220.

Then, the service manager 350 of the receiver 300 provides real time data for DO to a DO by using the received files in operation S9225.

Then, once the download is completed, the service manager 350 of the receiver 300 may deliver a file to a DO.

Hereinafter, a method of transmitting files configuring adjunct service through an internet network is described.

The adjunct service, for example, files configuring ATSC 2.0 content, may be transmitted through an internet link by using an HTTP or HTTPS protocol. Which one of HTTP or HTTPS protocol the transmitter 200 uses is determined based on whether a content item transmitted through internet is updated (signaled by an update_available field of an entry content item in an NRT-IT) or how large the file is. In the description below, HTTP/S may mean HTTP or HTTPS.

When a content item is not to be updated (when an update_available field is 0), the transmitter 200 and the receiver 300 may transmit a request and response through a general HTTP/S protocol.

When a content item is to be updated (when an update_available field is 1), the transmitter 200 and the receiver 300 may transmit files of less than a specific size through an HTTP/S streaming method and may transmit a request and response through a general HTTP/S protocol in the case of files of more than a specific size. Then, the transmitter 200 may notify the receiver 300 that update is transmitted as HTTP/S streaming through a typical HTTP/S.

Here, in order to minimize simultaneous HTTP accesses to one server of a plurality of receivers 300, a multi-file HTTP streaming protocol method may be used. According to an embodiment of the present invention, a plurality of file HTTP streaming requests and responses are described FIG. 132 is a view illustrating an XML format of a multi-file HTTP streaming request message according to an embodiment of the present invention.

Referring to FIG. 132, the multi-file HTTP streaming request may include URL list information o initial files that the receiver 300 is to receive. Additionally, the multi-file HTTP streaming request may further include update URL information on each file.

Additionally, although not shown in FIG. 132, the multi-file HTTP streaming request that the receiver 300 transmits may include identification information specifying a content item or NRT service. Additionally, like XML shown in FIG. 132, the multi-file HTTP streaming request may further include a list of content items to be received initially, a list of content items to be updated, or various ATSC 2.0 service list information.

Then, the receiver 300 may designate a content item in the multi-file HTTP streaming request and may designate only specific files in the content item as sub elements and then, may transmit them to a server. In this case, the content item may have a Base URL attribute and may represent the base URL of the URLs of files included as sub elements. Accordingly, when a URL corresponding to each file included in a request message has a relative path format, a server may determine that each URL is a relative path URL on the basis of the basic URL of the content item. However, another file may have an absolute path and in this case, a server may determine the URL as an absolute path without applying the basic URL.

Moreover, when transmitting a new file, the transmitter 200 or the server may immediately transmit a file to be updated or files newly added to a content item to the receiver 300 opening a multi-file HTTP streaming session without an operation of notifying the receiver 300 whether to update the file or add a new file.

For example, when a newly added file appears in the multi-file HTTP streaming session, the receiver 300 may determine which content item of which NRT service a file relates to through a header added to this file. Then, the receiver 300 may perform a processing operation of delivering a newly added file to NRT service or a DO.

Moreover, the multi-file HTTP streaming response message may have a multi part MIME message format. Each part may include a message indicating whether a file corresponding to a response message is a file of less than a specific size, a file of greater than a specific size, or updatable.

Additionally, an initial part of a response message may include files of less than a specific size in an initial file list and a notification message on whether files of greater than a specific size in an initial file list are updated. (The initial parts of the message shall contain all the small files in the InitialFiles list, and notifications of updates available for all the large files in the InitialFiles list.)

Then, each of parts following the initial part may include updates of files of less than a specific size occurring after receiving a request message and an update notification message of files of larger than a specific size occurring after receiving a request message.

Additionally, the header of each part in an MIME message may include a Content-Location header field and the Content-Location header field may include URL information on a file corresponding to the part.

Moreover, the MIME message including a file update notification message may include only a part header and may include an empty body. The part header may include a Content-Location header field.

Then, when receiving an HTTP/S request including the URL for a file to be updated and not including a multi-file request XML message in the body from the receiver 300, the server may return a file identified by the URL to the receiver 300.

First, the receiver 300 may receive a file from a specific server through HTTP/S streaming and then may identify files to be updated.

Then, the receiver 300 may perform a multi-file HTTP/S streaming request including an InitialFiles element including the URL of files to be received. The multi-file HTTP/S streaming request may exclude a FileUpdates element.

Then, the receiver 300 may obtain MIME message parts from a response message. The receiver 300 may extract files of less than a specific size from a response message and may perform a typical HTTP/S request for obtaining files identified by notifications.

After a predetermined time or when deletion of a file list is necessary, the receiver 300 may perform a new multi-file http/s streaming request. The new multi-file http/s stream request may include an InitialFiles list or the URLs of new files in a FileUpdates list. In order to prevent missing when a file is changed by update, the receiver 300 may terminate a connection for an existing request while transmitting a new request.

When HTTP/S streaming is disconnected, the receiver 300 may transmit a new HTTP/S streaming request. If there are important files set not to miss update (for example, when the receiver 300 should contain the latest version of a file), the receiver 300 may include the URLs of the files in an InitialFile list of a new HTTP/S streaming request. The receiver 300 may include the URLs of other files in a FileUpdates list of a new HTTP/S streaming request.

Moreover, real time data for the above-described TDO may be transmitted through such HTTP/S streaming. The transmitter 200 may transmit real time data as continuously updated content item.

Accordingly, the transmitter 300 may set an updates_available field value of an NRT-IT corresponding to a real time data content item for a TDO to 1 and may transmit files configuring the real time data content item for a TDO through the above-described multi-file HTTP/S streaming method.

FIG. 133 is a view illustrating an ILT syntax according to another embodiment of the present invention. FIG. 134 is a table illustrating a URL function code used in the ILT shown in FIG. 133.

Referring to FIG. 133, the URL of a server transmitting a file through multi-file HTTP/S streaming may be included in an internet location table and then transmitted from a signaling server to the receiver 300.

For this, as shown in FIG. 134, 3 may be newly defined as a value of URL_function_code. First, since descriptions that a value of a URL function code is 0, 1, or 2 are identical to those relating to FIG. 129, overlapping descriptions are omitted.

Then, when a value of the URL function code is 3, a URL_byte field corresponding to the URL function code value may represent the URL of a server receiving files transmitted through a virtual channel identified by a major channel number and a minor channel number and update notification of the files.

Accordingly, when receiving an ILT from a signaling server, the receiver 300 may parse URL function code and URL_byte from the ILT. Then, the receiver 300 may determine the purpose of URL information obtained from URL_byte according to a URL function code. For example, when a value of the URL function code is 3 according to an embodiment of the present invention, the receiver 300 may identify a virtual channel by using a major channel number and a minor channel number corresponding to the URL function code and may access a server receiving files transmitted through a virtual channel identified by using URL information obtained from URL_byte and update notification of the files.

Moreover, a TDO operated by the receiver 300, as described above, may receive real time data additionally. For example, in the case of a TDO providing stock quotes, the TDO may obtain real time stock information received by the receiver 300 and then may display it to a user.

According to an embodiment of the present invention, the receiver 300 may receive real time data that a TDO is to obtain through a Document Object Model (DOM) API.

FIG. 135 is a view illustrating an XML format of a trigger API receiving real time data for a TDO according to an embodiment of the present invention.

For example, a TDO may generate a RealTimeData Object for receiving real time data. The service manager 350 of the receiver 300 may generate an object by declaring a real time data object for a TDO. Then, the service manager 350 may control a TDO so that the TDO receives real time data by using the generated real time data object.

Then, according to an embodiment of the present invention, the MIME type of a real time data object may be designated as application/atsc-realtimedata. The service manager 350 may generate a real time data object to correspond to a page where a TDO is executed and may deliver real time data received from the outside to the real time data object.

Additionally, according to an embodiment of the present invention, the receiver 300 may control the generated real time data object by using an event and a method below.

Event: function onRealTimeFileReceived(RealTimeFile rtdata)

Method: function registerRealTimeData(String service_id, Boolean url_flag), function registerRealTimeFile (String content_location, url_flag)

As mentioned above, the method may include a registerRealTimeData function and a registerRalTimeFile function.

The registerRealTimeData function may be a function for registering real time data in an NRT service identified by service id and receiving them.

The registerRalTimeFile function may be a function for registering each file of real time data and receiving them.

url_flag may represent a data format that the receiver 300 delivers to a TDO when real time files are received. For example, the URL flag may represent whether a data format to be delivered is a url format or a content itself format.

Then, an on RealTimeFileReceived event may perform a function for notifying a TDO each time real time data files registered by the above-mentioned registration functions are received.

Then, a RealTimeFile class defined as a real time file in a TDO may include information on individual files for real time data delivered to the TDO. Then, each of the classes may include a property below.

The property may include at least one of readonly String content_location, readonly String content_type, readonly String content_encoding, and readonly String file_content.

Here, when url_flag of the above-described real time file registration functions is set to true, the registered real time file may include content_location, content_type, and content_encoding properties. Then, when url_flag is set to false, the registered real time file may include content_encoding and file_content properties.

Moreover, another embodiment of a signaling table transmitted through internet is described below.

Signaling tables transmitted through internet may include a broadcast service signaling table and an NRT service signaling table. The signaling tables may be PISP tables including a TVCT, an EIT, and an ETT, for example, and may be NRT tables including an SMT, an NRT-IT, a TFT, an ILT, a PIT, and a PTCT.

When the receiver 300 receives only an uncompressed audio and video, the signaling tables may not be received from a broadcast signal and may be received through an internet network. Additionally, in the case that the receiver 300 receives a full broadcast signal, when signaling tables are received through an internet network, without adjusting a tuner or waiting for table reception, since a program and a service guide are displayed on a screen area for a user, an efficient program and service guide may be provided.

Such a signaling table transmission through an internet network may be performed between the receiver 300 and a signaling server through a request/response method of an HTTP protocol.

Then, the request message, as mentioned above, may be transmitted in a full URL format including first query information and second query information and according to another embodiment of the present invention, the first query information may have the following format.

start=<start_time>[&timebase=<timebase>]
[&duration=<duration>][&update]

The base URL included in a request message may correspond to a specific broadcast stream. For example, when the receiver 300 cannot access a full broadcast stream and receives only some uncompressed AV images, the base URL may be received through an internet network by using the above-described ACR method.

Then, the receiver 300 may transmit a signaling table request message including the base URL to a signaling server and may obtain a signaling table from a response of a server. Moreover, the receiver 300 accessible to a broadcast stream may obtain the base URL from an ILT in the broadcast stream.

Then, the transmitter 200 may include a URL for obtaining PSIP and NRT signaling tables of a specific physical channel in addition to a specific virtual channel in an ILT and then may transmit it. In this case, a physical channel may be identified through a major channel number. Additionally, the receiver 300 may identify a virtual channel list from a VCT and may receive signaling tables for a specific adjunct service additionally through an internet network. Then, the receiver 300 may receive all signaling tables in a specific physical channel through an internet network.

According to an embodiment of the present invention, the first query information may include <start_time> and start_time may represent a start point of a time interval requesting a signaling table. Here, start_time may be the UTC time and may be a time stamp received from an ACR server. For example, start_time may determined whether there is <timebase> in the first query information. If there is no Timebase, start_time may represent a UTC time and if there is a timebase, start_time may represent a time stamp obtained from an ACR server or a relative time with respect to a reference time.

FIG. 136 is a view illustrating a second query information table according to another embodiment of the present invention.

Referring to FIG. 136, the query information according to another embodiment of the present invention may further include information for specifying a Basic PSIP, a VCT, an EIT, and an ETT in addition to the same portions in the table described with reference to FIGS. 126 and 127.

Here, the Basic PSIP set may represent VCT, EITs, and ETTs and may mean a signaling table for virtual channels in a physical channel.

Then, if there is chan_id in the second query information, chan_id may represent a specific virtual channel corresponding to a table request and may include a major channel number and a minor channel number. If there is no Chan_id, the second query information may represent a request for tables for all virtual channels transmitted through broadcast stream.

Moreover, if there is ETM_id in the second query information, ETM_id may represent a specific ETT instance that the receiver 300 is to request. The ETT instance may be the same as that defined in the ATSC PSIP standard. If there is no ETM_id, it may represent that the request message is not for the purpose of all ETT instances.

Moreover, if there is svc_id in the second query information, as described above, svc_id may represent a service identifier of a specific NRT service in a broadcast stream that the receiver 300 is to request. If there is no svc_id, it may represent that the request message is not for the purpose of NRT service.

Moreover, as a response to a request message, a signalling server may transmit a response message including signalling tables to the receiver 300.

According to an embodiment of the present invention, the response message may include a diffusion parameter. The receiver 300 may request a signalling table again just before a time interval designated by Duration ends. At this point, if a plurality of receivers request simultaneously, it may cause the load of a server.

According to an embodiment of the present invention, the server may include a diffusion parameter in a response message and then may transmit it.

The receiver 300 may determine the next signalling table request time on the basis of the diffusion parameter.

Such a diffusion parameter may be included in the header of an HTTP response. Additionally, the diffusion parameter may be included in the body of an HTTP response. If the diffusion parameter is found in the response message, the receiver 300 may transmit the next signalling table request at a random time in a time interval based on the parameter value.

Moreover, the receiver 300 may provide Electronic Program Guide (EPG) including guide information on broadcast service by using NRT service. Moreover, the receiver 300 may provide EPG on the basis of an Event information table (EIT) of a PSIP table like an existing receiver, and may additionally provide EPG provided through NRT service, if necessary. When EPG is provided using NRT service, the receiver 300 receives images, videos, or executable contents in advance through a service signaling channel or an internet network, and provides the received EPG service according to a user's request.

Moreover, according to an embodiment, the transmitter 200 may further include information for providing NRT service guide in a VCT or an EIT and then, may transmit it. Such information may be included in a specific descriptor, and may express a descriptor for providing NRT service guide as an adjunct EPG descriptor. The receiver 300 parses the EPG descriptor from a descriptor loop of a VCT or an EIT and displays EPG on NRT service.

Such an adjunct EPG descriptor may include various information to provide NRT service guide. For example, the adjunct EPG descriptor may include information on whether there is an adjunct NRT service added to a specific virtual channel or event A/V stream and transmitted and whether an existing adjunct NRT service is accessed according to a control. Moreover, the adjunct EPG descriptor may include information on whether a list of NRT service included in an NRT virtual channel and each NRT service are accessed according to a control.

Moreover, the adjunct EPG descriptor, as mentioned above, may be included in a channel level descriptor loop of a VCT (a TVCT or a CVCT), and may be included in an event level descriptor loop of an EIT. Accordingly, the receiver 300 may display EPG on data service or NRT service by using a PSIP table transmitted through a broadcast channel or an internet network, without extracting complex data or other tables through each virtual channel or signaling channel.

The adjunct EPG descriptor may include capability information on NRT service. The capability information may include information on the capability of the receiver 300 with which an NRT service included in a corresponding virtual channel or event is successfully played. Therefore, the receiver 300 may not display the existence of a corresponding NRT service in the EPG of the NRT service if a required capability is not provided on the basis of the capability information. Then, the capability information may be included in an NRT Capabilities descriptor, and also is included in a VCT or an EIT in addition to the adjunct EPG descriptor, and then transmitted.

FIG. 137 is a view illustrating a syntax of an adjunct EPG descriptor according to an embodiment of the present invention.

Referring to FIG. 137, the adjunct EPG descriptor may include a descriptor tag field, a descriptor length field, a num_of_NRT_services field, and at least one NRT service loop divided by a for loop. The at least one NRT service loop may include a service_id_ref field, a consumption model field, an access_controlled field, a short_service_name_length field, and a short_service_name field.

FIG. 138 is a view illustrating a syntax of an adjunct EPG descriptor according to another embodiment of the present invention.

Referring to FIG. 138, the adjunct EPG descriptor according to another embodiment of the present invention may be referred to as service_enhancements_descriptor. A service enhancements descriptor may include capability information of the receiver 300 to use each NRT service. Accordingly, the service enhancements descriptor further includes capability code information necessary for using each NRT service, and unlike FIG. 85, may further include at least one of capability string and capability set to represent capability information that is required by the receiver 300 to launch or play NRT service.

Moreover, the receiver 300 may provide Electronic Program Guide (EPG) including guide information on broadcast service by using NRT service. Moreover, the receiver 300 may provide EPG on the basis of an Event information table (EIT) of a PSIP table like an existing receiver, and may additionally provide EPG provided through NRT service, if necessary. When EPG is provided using NRT service, the receiver 300 receives images, videos, or executable contents in advance through a service signaling channel or an internet network, and provides the received EPG service according to a user's request.

According to an embodiment of the present invention, the transmitter 200 allocates an additional consumption model corresponding to EPG in order to transmit such an extended EPG through NRT service, and the receiver 300 provides EPG service by performing a predetermined operation when it is determined as EPG according to a consumption model.

FIG. 139 is a view illustrating a meaning according to each value of a consumption_model field in an NRT service descriptor when an EPG consumption model is allocated according to an embodiment of the present invention.

As described with reference to FIG. 53, the consumption_model field is included in NRT_service_descriptor and is a field indicating which method for consumption_model NRT service that NRT_service_descriptor represents uses. According to an embodiment, the consumption_model field may represent an EPG consumption model. A field value for EPG consumption model may be 0x05.

NRT service allocated as an EPG consumption model may include at least one content item. Such content items may include information on a broadcasting service that is currently in service. For example, each content item may include virtual channel service information according to a broadcast channel, TV event information, NRT service information, or information on content items of NRT service. Also, each information is collected in an html page format and is provided in an EPG format through the receiver 300.

Also, the receiver 300 connects broadcast information provided in EPG with other NRT service objects or various multimedia contents. For this, the transmitter 200 inserts a link descriptor or an event descriptor for receiving contents connected to broadcast information into SMT or NRT-IT and transmits it. Additionally, the transmitter 200 inserts a link descriptor or an event descriptor including the above broadcast information into a VCT or an EIT and transmits it.

Also, the transmitter 200 generates a linkage descriptor corresponding to an NRT service allocated as an EPG consumption model, and inserts it into at least one of a VCT, an EIT, an SMT, and an NRT-IT to correspond to each service or channel, and transmits it. A transmission method of the transmitter 200 by using a linkage descriptor or a reception and service providing method of the receiver 300 will be described later.

An NRT service designated as an EPG consumption model may include extended EPG information for EPG on a program or service that the receiver 300 provides. Since the extended EPG information may include rich and diverse multimedia data, the receiver 300 provides to a user a guide to a program or service through rich and various methods.

At least one content item included in an NRT service designated as an EPG consumption model may corresponding to one virtual channel, one event, or one NRT service, and may include related information on each corresponding virtual channel, event, or NRT service. The receiver 300 may obtain such related information on the basis of a linkage descriptor.

For example, when a user's additional information request on a specific virtual channel, event, or NRT service displayed on a program or service guide is provided, its service may be provided by using a content item of an EPG consumption model NRT service linked with the additional information requested specific virtual channel, event, or NRT service. A content item of an NRT service of an EPG consumption model may include at least one of preview, related HTML page collection, a movie poster image.

Accordingly, when there is a user's additional request on a specific event in the displayed service guide, the receiver 300 launches a preview content item of an NRT service of an EPG consumption model corresponding to an additional request target, and displays it to a user, so that extended EPG service is provided.

Moreover, an NRT service (or, an EPG NRT service) designated as an EPG consumption model may be downloaded in the background so that a user may not recognize it. Also, content items of an EPG NRT service downloaded through the background may be presented in the receiver 300 when there is a user's request on the displayed broadcast service guide.

Furthermore, when content items of EPG NRT service are downloaded and stored through the background, the service manager 350 of the receiver 300 updates the received and stored EPG NRT service when it is determined that there is an updated version after periodically confirming and monitoring the content items.

Then, among the downloaded and stored content items of EPG NRT service, a content item linked with a specific virtual channel, specific event, or NRT service whose additional information is requested by a user may be launched or presented in a broadcast program or service guide that the receiver 300 provides. For this, the receiver 300 may display that a content item of an EPG NRT service including additional information corresponding to each virtual channel, event, or NRT service is received or stored. The receiver 300 may display an indicator displaying the above in a service guide.

Also, the receiver 300 or the service manager 350 of the receiver 300 may close or exit the launched or presented content items of EPG NRT service when a user selects a virtual channel, an event, or NRT service different from the above-mentioned specific virtual channel, event, or NRT service from a broadcast program or service guide. Also, even when a user selects a close command from a broadcast program or service guide, the receiver 300 may close or exit the launched or presented content item of EPG NRT service.

FIG. 140 is a flowchart illustrating a method of providing EPG on the basis of an NRT service of an EPG consumption model, as a method of receiving broadcasting service according to an embodiment of the present invention.

Referring to FIG. 140, the receiver 300 first receives a VCT, an EIT, an SMT, and an NRT-IT in operation S9001 and parses a service level descriptor of SMT in operation S9003.

The receiver 300 may receive an SMT through a service signaling channel by using the service manager 350, and may parse a plurality of loops corresponding to each NRT service from the received SMT. The parsed each loop may be referred to as a service level descriptor. Then, the receiver 300 may parse service level descriptors including an NRT service descriptor from each service level descriptor loop.

An NRT service descriptor may include detail information on an NRT service corresponding thereto. Also, the detail information may include requirement information of a receiver to provide a corresponding NRT service. Accordingly, the receiver 300 determines whether the receiver 300 is capable of providing NRT service on the basis of an NRT service descriptor.

Accordingly, the service manager 350 of the receiver 300 parses a PSIP table from a broadcast signal transmitted through a broadcast channel and parses a VCT and an EIT from the parsed PSIP table. The receiver may parse a VCT and an EIT by using a PSIP handler.

Then, the receiver 300 analyzes the parsed service level descriptor in operation S9005, confirms NRT_service_descriptor, and determines whether a value of the consumption_model field in NRT_service_descriptor represents an EPG consumption model. The receiver 300 determines this by referring to the table of FIG. 74. Then, if the value does not represent an EPG consumption model, the receiver 300 performs an operation according to the above-mentioned another NRT service consumption model.

However, if the value represents an EPG consumption model, the receiver 300 determines that an NRT service designated as the EPG consumption model is transmitted. In this case, the receiver 300 obtains reception information of an NRT service of the EPG consumption model in operation S9007.

The reception information of an NRT service of an EPG consumption model may include the service id of the NRT service and the content linkage of content items. As mentioned above, the service id may be included in an SMT and the linkage information between content items may be included in an NRT-IT. Accordingly, the receiver 300 obtains NRT service reception information of an EPG consumption model on the basis of the SMT and the NRT-IT.

Then, the receiver 300 accesses a FLUTE session on the basis of the obtained reception information and receives and stores the content items configuring the obtained NRT service of the EPG consumption model in operation S9009. The reception of an NRT service of an EPG consumption model may be made in the background without a user's recognition. Accordingly, the NRT service of an EPG consumption model may be continuously received regardless of a user's selection. However, the reception method may be changed according to a user's setting. For example, the receiver 300 may not receive the NRT service of an EPG consumption model according to a user's setting, receives it in the foreground, or receives it according to a user's set period. Accordingly, the receiver 300 receives an EPG service extended according to a user's preference, and provides it.

Additionally, the receiver 300 receives and manages an NRT service of an EPG consumption model in a storage unit through the service manager 350. However, as mentioned above, in order to receive and manage an NRT service of an EPG consumption model in a storage unit, a constant predetermined size of storage space may be required. Additionally, the allocated amount of such a storage space may be transmitted through the transmitter 200 according to a service provider's intention. Therefore, according to an embodiment of the present invention, the receiver 300 allocates a predetermined area of a storage unit of the receiver 300 as a storage area of an NRT service of an EPG consumption model, receives EPG service in an allocated area, and then stores and manages it. Accordingly, the transmitter 200 includes information on the storage area in an NRT service descriptor and then, transmits it to the receiver 300. In this case, the receiver 300 may receive, store, and manage EPG service in a designated area.

Moreover, a content item of an NRT service designated as an EPG consumption model may be transmitted through IP in addition to a broadcast service channel. The transmission through IP may be performed through the NRT service transmitting method through an internet network. For example, the receiver 300 obtains URL information to receive a content item of an NRT service designated as an EPG consumption model on the basis of an NRT-IT, and receives files configuring a content item through an internet network on the basis of the obtained URL information. Accordingly, the receiver 300 receives content item files in an NRT service of an EPG consumption model, which are transmitted through an internet network, through IP, and stores it.

Then, the receiver 300 provides a service guide on the basis of the parsed VCT and EIT in operation S9011.

Once the guide is provided, a user may select a desired content, for example, a specific virtual channel, a specific program (event) or a specific NRT service, from the displayed EPG. Accordingly, the receiver 300 selects a corresponding content (a virtual channel, event, or NRT service object) according to a user's selection in operation S0913. A user may display a list of desired information contents in highlight, position an interface point on a content list, or select a content by using a gesture.

Then, the receiver 300 first provides a service guide on the basis of the parsed VCT and EIT. Then, the receiver 300 determines whether there is an additional information request on the selected content in operation S9015. If there is no additional information request, operation S9011 is continuously performed.

Here, a receiver may display an indicator indicating the request around an additional information available content list by using the service manager 350. Additionally, the receiver 300 may lead a user to request additional information on a content having an indicator displayed thereon. The indicator may be displayed when an NRT service of the EPG consumption model is received completely. The additionally information, for example, may include preview information (image information or image information) included in a content item of an NRT service of an EPG consumption model or related home page information.

Moreover, when there is an additional information request on the selected content, the receiver 300 identifies a content item of an NRT service of an EPG consumption model corresponding to the selected content in operation S9017.

The receiver 300 identifies content items corresponding to the selected content from the received and stored NRT service of the EPG consumption model by using the service manager 350. For example, when the selected content is a specific virtual channel, the receiver 300 obtains content item identification information of an NRT service designated as an EPG consumption model from the linkage information corresponding to a specific virtual channel included in VCT and then, based on this, identifies a content item corresponding to a specific virtual channel from the content items of the received EPG consumption model NRT service.

Moreover, when the selected content is a specific program (event), the receiver 300 obtains content item identification information of an NRT service designated as an EPG consumption model from the linkage information corresponding to a specific event or program included in EIT and then, based on this, identifies a content item corresponding to a specific program (event) from the content items of the received EPG consumption model NRT service.

Then, when the selected content is a specific NRT object, the receiver 300 obtains content item identification information of an NRT service designated as an EPG consumption model from the linkage information corresponding to a specific event or program included in SMT or NRT-IT and then, based on this, identifies a content item corresponding to a specific service object from the content items of the received EPG consumption model NRT service.

Then, the receiver 300 provides additional information on the selected content on the basis of the identified content item in operation S9019.

The receiver 300 may provide additional information on the selected content by launching or presenting the identified content item. The additional information, as mentioned above, may include various and rich multimedia information to provide extended EPG. Accordingly, a user may request additional information while watching a service guide, and may obtain various and rich EPG information on the selected content at the request.

Figure 141:
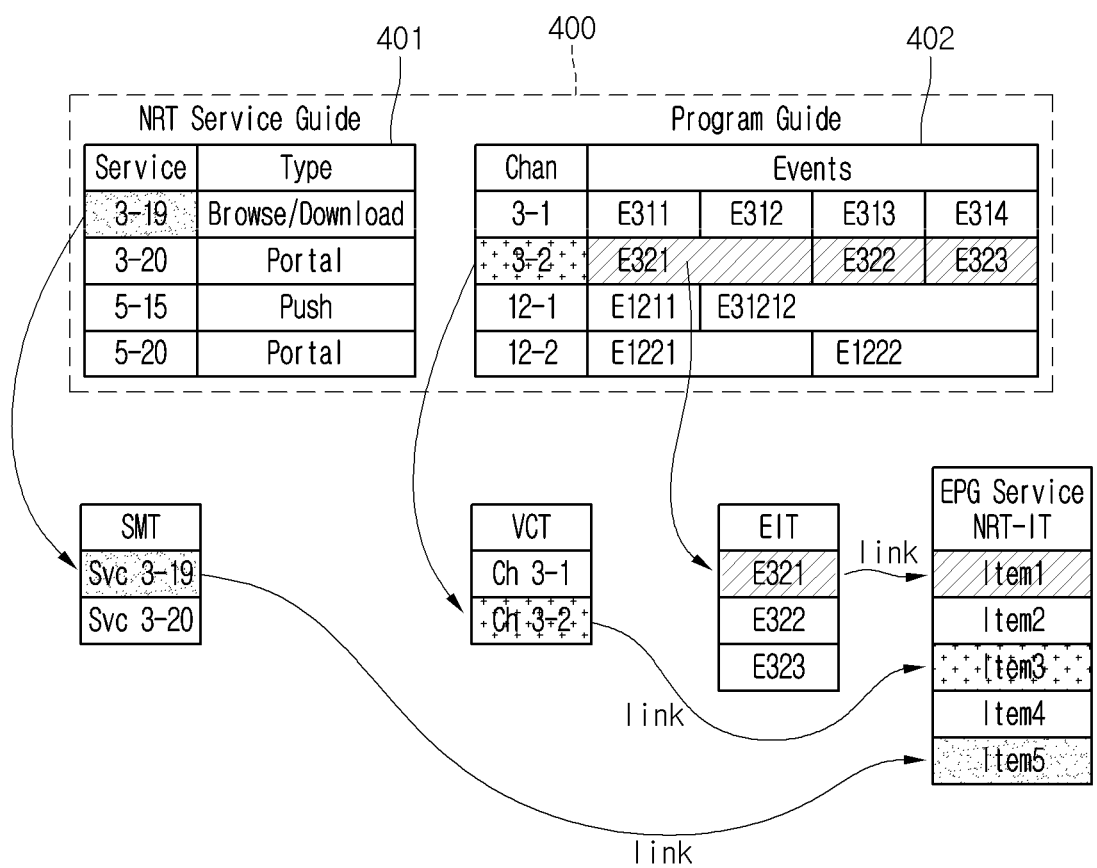

FIG. 141 is a view illustrating a linkage between EPG and each table according to an embodiment of the present invention.

Referring to FIG. 141, the EPG 400 may include an NRT service guide 401 and a broadcast program guide 402. The receiver 300 may analyze a VCT and an EIT to generate the NRT service guide 401 or the broadcast program guide 402 and display it.

Moreover, the receiver 300 may obtain information on a content item of an NRT service of an EPG consumption model corresponding to each NRT service, virtual channel, or event on the basis of an SMT, a VCT, or an EIT, and may provide additional information by using a content item of an EPG service corresponding to the NRT service, virtual channel, or event that a user selects.

Furthermore, when there is an additional information request on a virtual channel 3-2, the receiver 300 may obtain EPG content item identification information on the virtual channel CH 302 corresponding thereto through linkage information in a VCT. Then, the receiver 300 may identify a corresponding content item item3 from NRT-IT corresponding to an NRT service of an EPG consumption model to launch or present it so that additional information on EPG using NRT service may be provided.

In the same manner, when there is an additional information request on an event E321, the receiver 300 may obtain EPG content item identification information on a virtual channel CH 302 corresponding thereto through linkage information in an EIT. Then, the receiver 300 may identify a corresponding content item item1 from an NRT-IT corresponding to an NRT service of an EPG consumption model to launch or present it so that additional information on EPG using NRT service may be provided.

Figure 142:
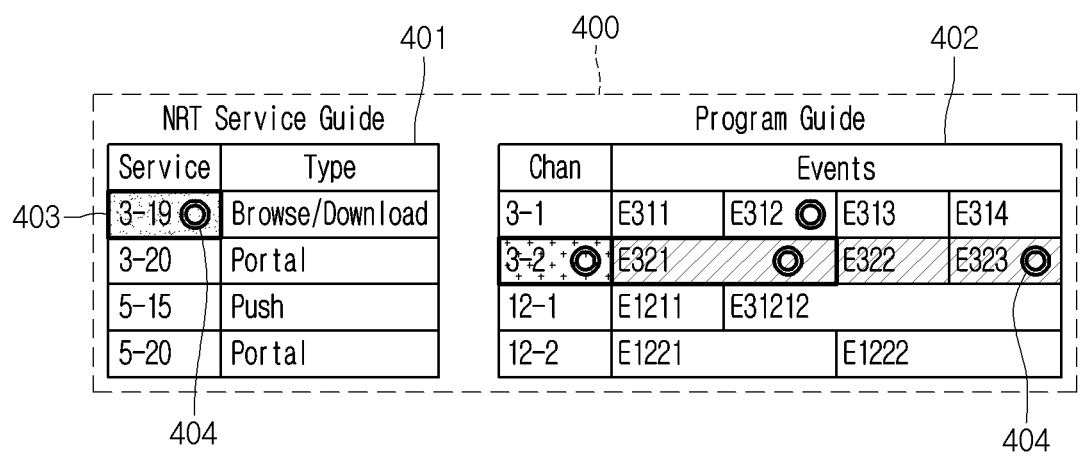

FIG. 142 is a view illustrating an EPG provided according to an embodiment of the present invention.

As shown in FIG. 142, the EPG 400 may include a highlighter 403 for indicating a content that a user selects and an indicator 404 for indicating available additional information in addition to the NRT service guide 401 and the broadcast program guide 402.

A user may select a specific content, for example, a specific NRT service, a specific virtual channel, or a specific broadcast program (event) through the highlighter 403.

Then, the receiver 300 may determine whether an NRT service of an EPG consumption model is received in correspondence to each NRT service, virtual channel, or event, and may display the indicator 404 indicating that additional information is available. Here, the indicator 404 may be displayed around a corresponding content list. Additionally, the receiver 300 may display the indicator 404 on a content that a user selects according to a setting, and also may display the indicator 404 on a content that a user does not select. In FIG. 142, although the indicator 404 is displayed in a circular form, it is not limited thereto, and thus may be displayed in at least one form of characters, symbols, or figures, which represent that additional information on content is available.

Figure 143:
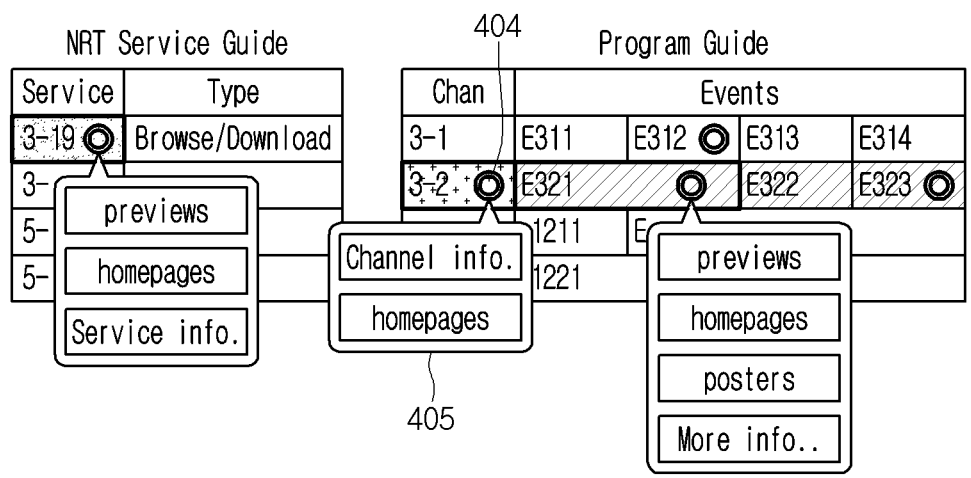
Figure 144:
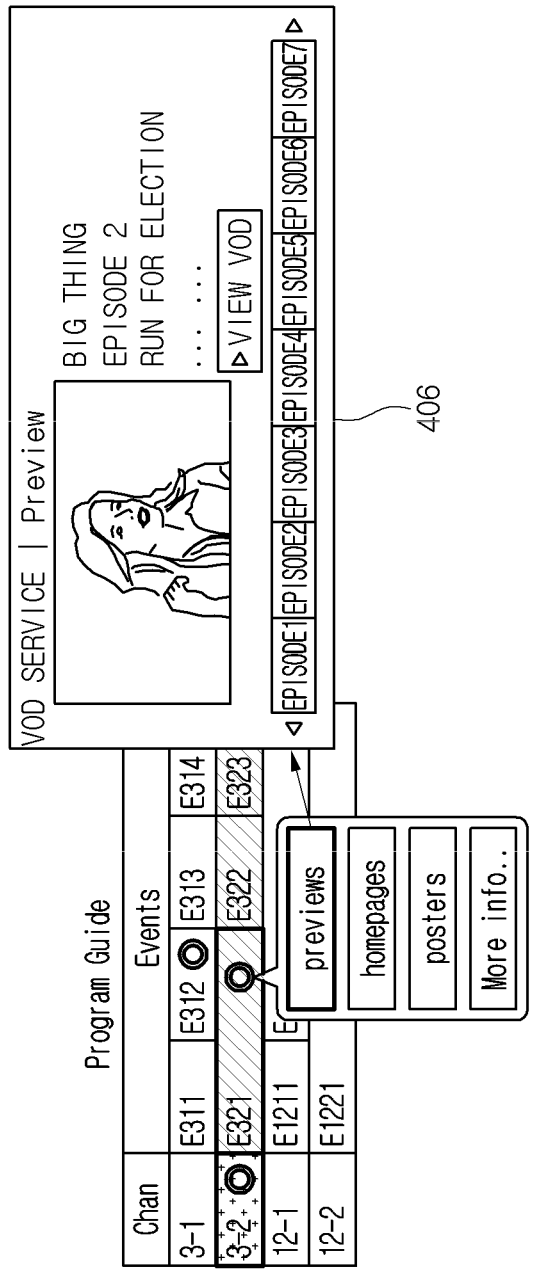

FIGS. 143 and 144 are views illustrating an EPG screen when a user requests additional information according to an embodiment of the present invention.

As shown in FIG. 143, according to an embodiment, when a user selects the indicator 404 to request additional information on a specific content, an extended EPG is displayed by the launched or presented content item of an EPG consumption model NRT service. For example, as shown in FIG. 143, the receiver 300 may further display an extended guide 405 corresponding to a content that a user selects. The extended guide 405 may include a menu for selecting at least one of preview information, related home page information, detailed information on a corresponding content, and poster information.

Then, when a user selects a specific menu, for example, preview information, as shown in FIG. 79, a preview information screen 406 on a corresponding content may be additionally displayed on the EPG. The preview information screen 406 may represent preview information included in a content item of an EPG consumption model NRT service as shown in FIG. 144. The preview information, as shown in FIG. 79, may include detail content, video, or VOD information on the corresponding content E321, and may be played according to a user's selection.

Figure 145:
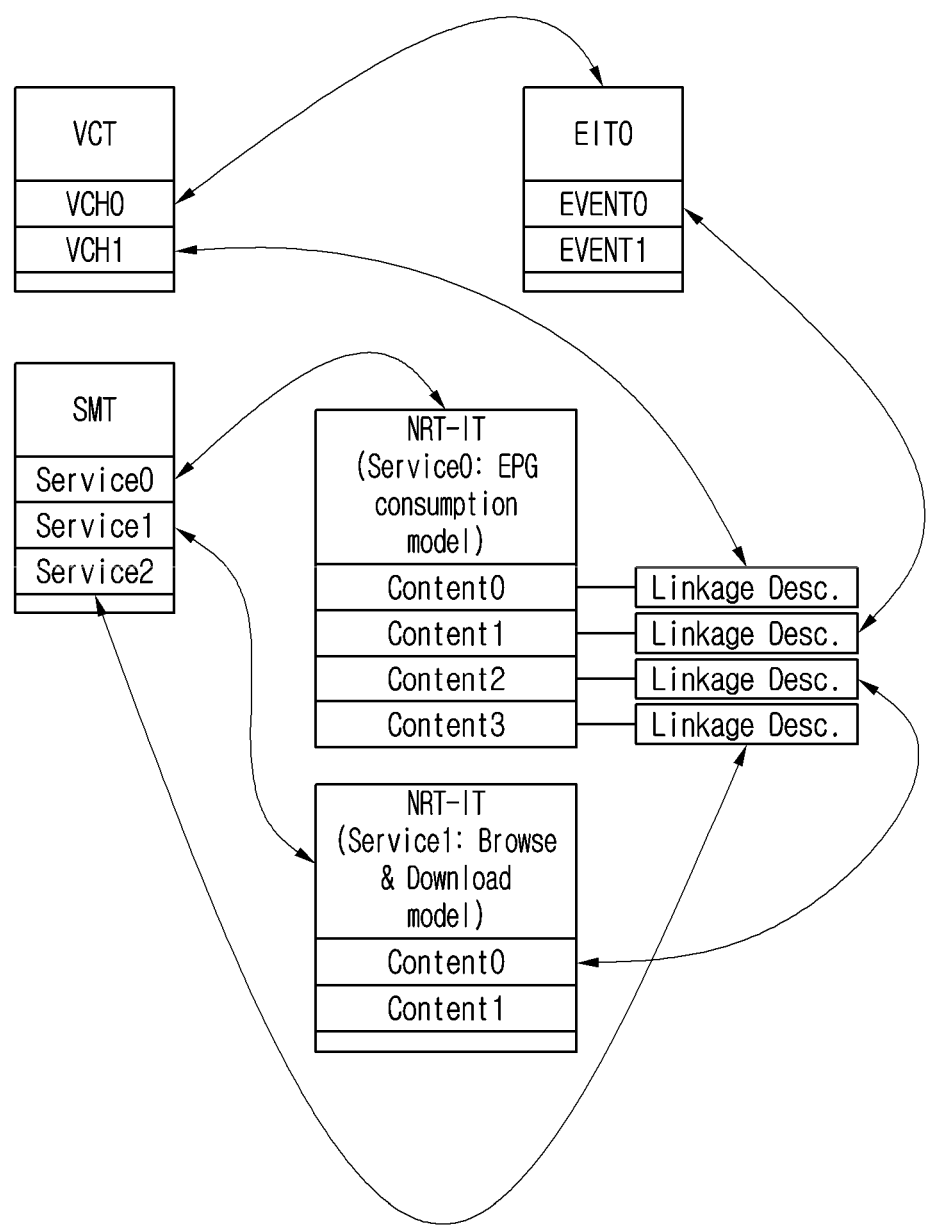

FIG. 145 is a view illustrating linkage information linked with other tables according to another embodiment of the present invention.

As shown in FIG. 145, linkage information may be included in a linkage descriptor, and also may be included in a descriptor loop corresponding to a content item of a specific channel, specific event, specific NRT service, or a content item of a specific NRT service of each table of a VCT, an EIT, an SMT, or an NRT-IT, and then transmitted by the transmitter 200. The receiver 300 parses each descriptor loop to obtain a linkage descriptor and obtains identification information of a content item of an EPG NRT service linked with each content on the basis of the linkage descriptor. Also, the receiver 300 may provide additional extended EPG information by launching or playing a specific content item among content items corresponding to an NRT service designated as an EPG consumption model in an NRT-IT on the basis of the obtained identification information.

FIG. 146 is a view illustrating a syntax of a linkage descriptor according to an embodiment of the present invention.

Referring to FIG. 146, the linkage descriptor may further include an event_id field or a service_id field or may further include a service_id field and a content_linkage field.

The target_type field may represent the type of a target content. For example, as shown in FIG. 147, a target type field may be displayed to correspond to the type of a target content linked with a linkage descriptor to a field value. The target content may be a TV service (virtual channel), TV event, NRT service or a content item of an NRT service, and a value corresponding thereto may be one of 0x00 to 0x07. Accordingly, the receiver 300 may determine which type of service the target content relates to on the basis of the target type field.

FIG. 147 is a view illustrating a target type field of a linkage descriptor according to an embodiment of the present invention. As shown in FIG. 147, when the target type field represents a TV event (0x02), the linkage descriptor may include an event_id field according to the target type field. When the target type field represents an NRT service (0x03), the linkage descriptor may include a service_id field. When the target type field represents a content item of NRT service (0x04), the linkage descriptor may include a service_id field and a content_linkage field. Accordingly, the receiver 300 first parses the target type field, and determines the type of a target content on the basis of the value of the target type field, and also obtains each identifier field according to the determined content type so that it may identify the target content.

In addition, according to another embodiment of the present invention, the receiver 300 may include descriptive information of contents (for example, a virtual channel, an event, or NRT service) to display service guide. For this, the receiver 300 may obtain a linkage descriptor from tables transmitted through a broadcast channel or NRT service signaling channel.

The linkage descriptor may be included in a channel level descriptor loop corresponding to a specific virtual channel in a VCT. Additionally, the linkage descriptor may be included in an event level descriptor loop corresponding to a specific event in an EIT instance. Then, the linkage descriptor may be included in a service level descriptor loop in an SMT corresponding to a specific NRT service.

The receiver 300 may determine what descriptive information of a virtual channel, event, or NRT service is included based on the position in a VCT, an EIT, or an SMT including such a linkage descriptor.

Moreover, the receiver 300 may identify at least one content item of an EPG consumption model NRT service linked with the above-mentioned virtual channel, event, or NRT service on the basis of the linkage information in the linkage descriptor. The receiver 300 may provide additional information on the above-mentioned specific virtual channel, event, or NRT service by launching or playing at least one content item, and the additional information may be displayed on a service guide that a user views.

FIG. 148 is a view illustrating a linkage descriptor according to another embodiment of the present invention.

The num_of_linked_content_items field may be an 8-bit unsigned integer indicating the number of content items identified in loops starting from a field immediately following this field.

The Service_id_ref field may be a 16-bit unsigned integer matching the service identifier field of NRT service. The NRT service matched by this field is to provide descriptive information for a program or service guide, and may be an NRT service designated as an EPG consumption model. The NRT service designated as an EPG consumption model may be included in a broadcast stream including the linkage descriptor and then transmitted, or may be transmitted through another broadcast stream in the same broadcast area.

The content_linkage_ref field may be a 32-bit unsigned integer matching the content_linkage field corresponding to a content item of an NRT service designated as an EPG consumption model that the service identifier reference field in an NRT-IT instance represents. Accordingly, by parsing this field, the receiver 300 may identify a content item of an EPG consumption model NRT service as a content item linked by the linkage descriptor.

The role field may be a 4-bit unsigned integer indicating the role of the identified content item. According to the meaning of a value allocated to the role field, for example, when a value of the role field is 0, it represents that the identified content item serves as a preview role. Additionally, when a value of the role field is 1, it represents that the identified content item serves a general description role.

Moreover, an EPG provided according to an embodiment of the present invention may be provided according to an operation of a DO. However, in the case of an EPG displaying a portion of a screen, since an application needs to be programmed in accordance with the resolution of a receiver, it may not move in a fixed area. That is, when an EPG service is played in a receiver or a media player and displayed on a screen, an operation for bidirectional objects may be required. For example, when a caption is additionally displayed on a screen, the position of an EPG may need to be moved.

Accordingly, according to an embodiment of the present invention, an EPG may be provided by designating some areas of a screen. Additionally, if an overlapping area resulting from a contact with another service occurs, the EPG may be moved to a designated another position.

As described above, the EPG may be transmitted through NRT service and may be executed by an operation of a Declarative Object (DO) corresponding to NRT service. As mentioned above, the DO may be transmitted through a broadcast network or an internet network and the DO may be provided from the receiver 300 at a specific time as adjunct service for broadcast service. The receiver 300 may need to notify a user that a current content includes adjunct service and also the receiver 300 may notify a user that providing adjunct service is available. A user may recognize that providing adjunct service is available and may receive the adjunct service or may maintain current content viewing as it is according to a selection.

Then, according to an embodiment of the present invention, the receiver 300 may display an EPG included in such an adjunct service. An EPG DO may determine the position of a partial area of a screen displaying an EPG on the basis of pre-designated specific position information and the resolution information on the receiver 300. The receiver 300 may display a position other than a partial area determined in a full screen transparently (as an originally playing screen is).

Then, it may be effective for EPG or adjunct service DO makers to design only a necessary area. Therefore, according to an embodiment of the present invention, adjunct service or EPG makers do not need to create DO in consideration of a full area of a screen but may create a DO only for a specific partial area. Since DO makers do not need to consider an unnecessary area, production time may be reduced and design and programming may become easy.

Moreover, a DO operating in a partial screen area may need to move if necessary. For example, when a user executes an adjunct service such as a media caption, an EPG may move without interfering with such a basic caption service.

Figure 149:
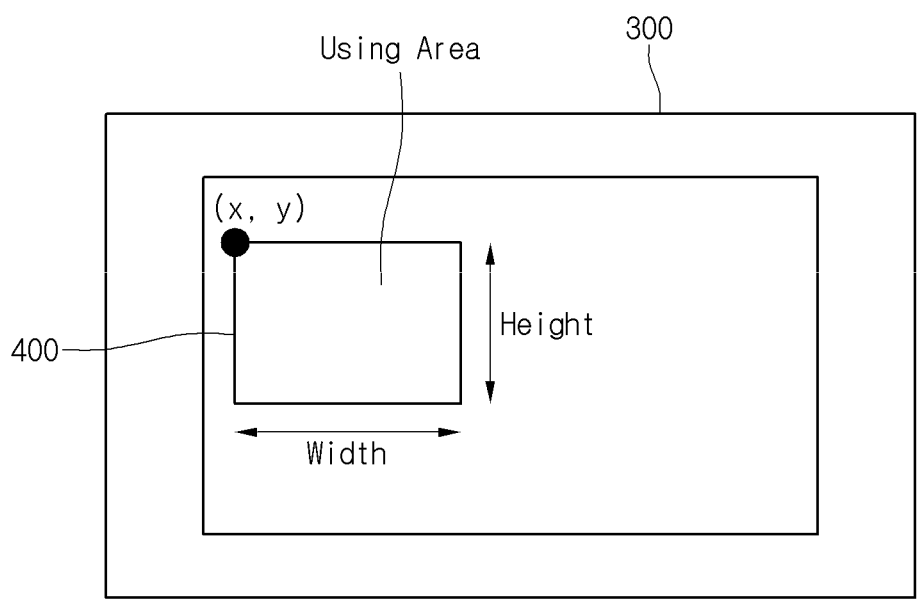

FIG. 149 is a view illustrating a DO operating in a partial area of a screen according to an embodiment of the present invention.

As a currently and generally used method, provided is a method of providing service in full screen or processing an unnecessary area transparently in providing an EPG.

However, as shown in FIG. 149, according to an embodiment of the present invention, the receiver 300 may provide an adjunct service including an EPG by allocating a designated partial area 400 in an entire screen area designated as a Using Area. Additionally, the designated partial area 400 may change its position while service is provided.

The receiver 300 may determine the partial area 400 on the basis of signalling information on the above-described adjunct service. Additionally, the receiver 300 may allocate the partial area 400 on the basis of signalling information on the above-described adjunct service. Information on such a partial area, for example, may be included in a trigger and transmitted or may be included in a signalling table and transmitted.

Accordingly, the receiver 300 may determine when and which area an adjunct service is executed. The adjunct service may include an EPG or a caption service as described above and an area for each execution may be pre-designated as a Safe Area by a service provider. Information on such a safe area may be included in signalling information or a trigger and transmitted. The receiver 300 may determine safe areas and partial areas where adjunct services are to be displayed on the basis of a relationship between adjunct services operating in the current receiver 300.

Then, the receiver 300 may change a partial area in advance where an EPG is to be displayed in correspondence to the execution of another object. Accordingly, the receiver 300 may manage a display area movement schedule between objects by using a table.

Figure 150:
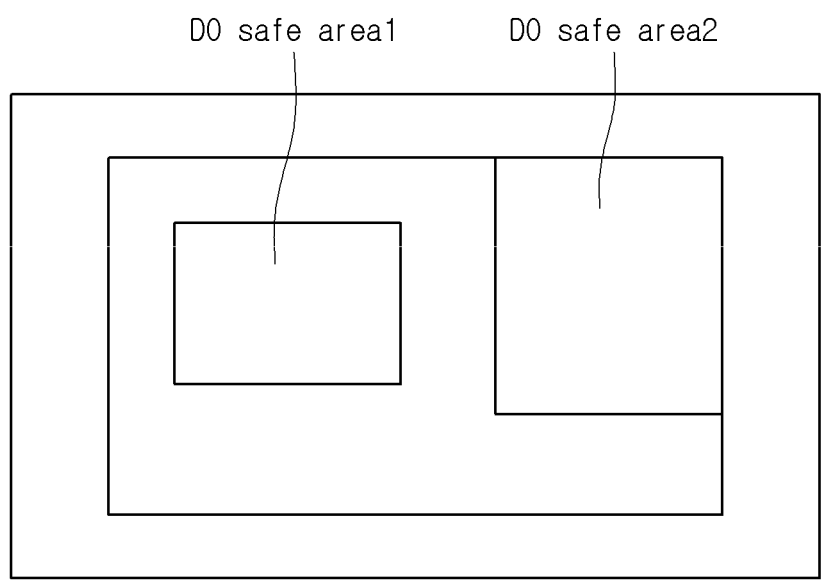

Moreover, FIG. 150 is a view illustrating partial areas where an EPG is to be displayed according to an embodiment of the present invention.

As shown in FIG. 150, an area where an EPT is to be displayed according to an embodiment of the present invention may be designated as more than two areas. For example, more than two safe areas may be designated as an area of an NRT object corresponding to an EPG. The receiver 300 may display an EPG by selecting one of more than two areas.

Additionally, if a currently displayed EPG is to cover another object DO, the receiver 300 may move the EPG to another area other than a current area among more than two pre-designated areas shown in FIG. 150. For this, the receiver 300 may calculate information on which area in a screen an NRT service object different from an EPG is to be outputted, in advance, and then may manage it as a table. Accordingly, the receiver 300 may make preparation for preventing an EPG and another object from being covered by each other.

In such a way, in order for the receiver 300 to change the position of an object, a broadcast service provider may provide position information to the receiver 300 so that areas for displaying adjunct services of content do not overlap each other.

Additionally, the receiver 300 may display objects without overlapping by moving the objects to arbitrary screen positions without obtaining position information.

Then, the receiver 300 may change the size of an object according to broadcast contents being currently played. For example, the receiver 300 may change the size of an EPG according to broadcast contents being viewed by a user currently. This allows viewers to focus more on an image of a screen and provides service again after an important part of content passes. The receiver 300 may display only simple information to be small on one side of a screen according to a state of a broadcast image and display it to be large on a screen by moving more information after a predetermined time.

For example, when a broadcasting company broadcasts a drama, if a home shopping object covers a large portion of a screen, this annoys viewers. Accordingly, in this case, the home shopping object may be displayed to be small during a time interval in which the drama is broadcasted and after the drama is ended, the home shopping object may be displayed to be large.

Figure 151:
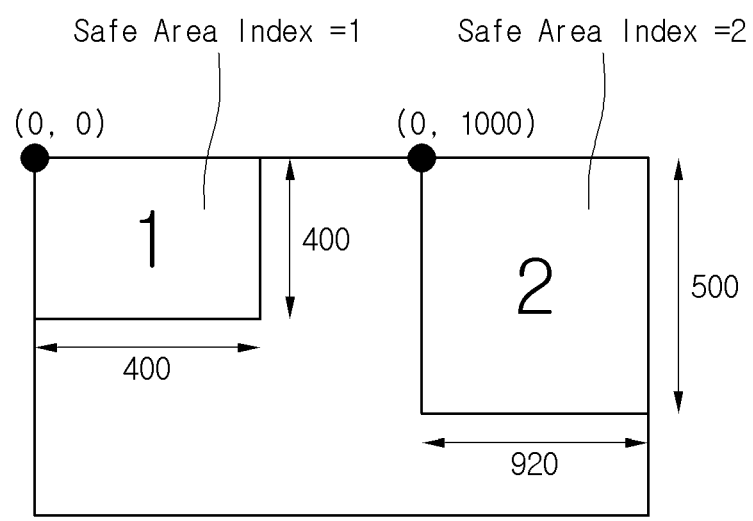

FIG. 151 is a view when an index is allocated according to the area and size of an adjunct service object to be displayed.

As shown in FIG. 151, the receiver 300 may set a plurality of positions and sizes where an adjunct service object such as an EPG and may allocate an index. The receiver 300 may determine the position and size of an object to be displayed by selecting one of preset indices according to a display state.

Figure 152:
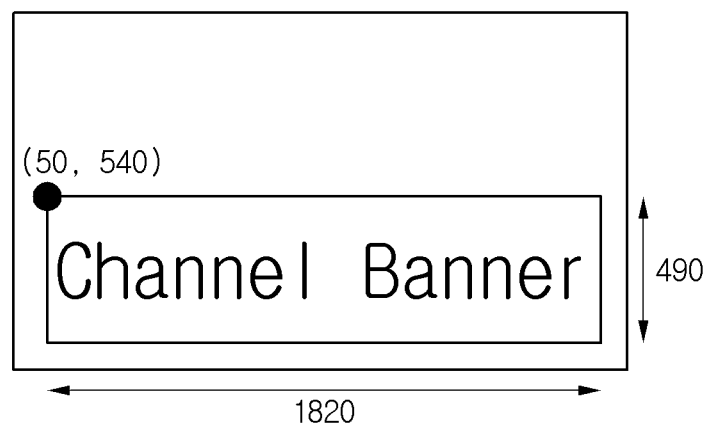

Moreover, FIG. 152 is a view when an unavailable area of an object is designated.

As shown in FIG. 152, the receiver 300 may preset an area where a channel banner is not supposed to be used.

In this case, the receiver 300 may move an object to an area other than a preset usage unavailable area and may display it when an adjunct service object such as the EPG is executed.

For example, when a caption service is provided from 10:00:00 to 10:50:00 and is turned on and operates for 50 min, the receiver 300 may designate a caption service area as a usage unavailable area. Additionally, a broadcast service provider may signal usage unavailable area information to the receiver 300. The receiver 300 may display an adjunct service object such as an EPG on another area in a display area other than a usage unavailable area.

Additionally, as shown in FIG. 152, when a Channel Banner is displayed on a screen, since another object cannot be displayed on this area, the receiver 300 may designate the area as a usage unavailable area. Then, before the Channel Banner is displayed, the receiver 300 may move other objects displayed on an overlapping position to another position other than a usage unavailable area in advance.

A broadcast service transmitting and receiving method according to the above-mentioned embodiments of the present invention may be implemented by a program executed in a computer and stored in a computer readable recoding medium. Examples of the computer readable recording medium include read-only memory (ROM), random-access memory (RAM), CD-ROM, magnetic tape, floppy disk, and optical data storage device, and carrier wave (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. An operating method for a broadcast receiving device, comprising:

receiving an audio or video, wherein the audio or video is uncompressed and is included in a broadcast stream which is not transmitted through an internet protocol (IP) network;

receiving address information based on the audio or video, for obtaining a signaling table via the broadcast stream, wherein the receiving the address information based on the audio or video comprises extracting a signature from frames of the audio and video and receiving the address information based on the signature; and transmitting a request message for the signaling table based on the address information, to a server providing the signaling table;

receiving a response including the signaling table based on the request message through the IP network from the server, wherein the request message includes a first query information which includes time information of the request message, and a second query information which designates the signaling table, wherein the first query information further includes a duration term representing a time interval for which the signaling table is being requested by the broadcast receiving device, and a start time term representing a start of the time interval for which the signaling table is being requested by the broadcast receiving device, wherein the second query information further includes a table term representing that the signaling table is being requested by the broadcast receiving device, wherein the signaling table included in the response corresponds to the table term included in the request message, wherein the server transmits the requested signaling table, that is scheduled to take effect during the time interval represented by the duration term, and updates of the requested signaling table, when the request message does not include an update term, and the server transmits only updates of the requested signaling table that are scheduled to take effect during the time interval, when the request message includes the update term, wherein the update term represents an update flag which indicates whether the request message is for an update.

2. The method of claim 1, wherein the second query information includes at least one of a channel identifier, and a service identifier, wherein the channel identifier represents a channel number of a virtual channel for which the signaling table is requested, wherein the service identifier represents a service identifier of a Non-Real Time (NRT) service for which the signaling table is requested.

3. The method of claim 1, wherein the table term represents at least one of Program and System Information Protocol (PSIP) set, basic NRT set, extended NRT set, Virtual Channel Table (VCT), Event Information Table (EIT), Extended Text Table (ETT), Service Map Table (SMT), Non-Real Time-Information Table (NRT-IT), Text Fragment Table (TFT), Purchase Item Table (PIT) and Purchase Term and Channel (PTCT).

4. The method of claim 3, wherein the PSIP set includes Terrestrial Virtual Channel Table (TVCT), EIT, and ETT for a virtual channel in the broadcast stream, wherein the basic NRT set includes SMT, NRT-IT and TFT for a NRT service in the broadcast stream, wherein the extended NRT set includes basic NRT set, PIT and PTCT for a NRT services in the broadcast stream.

5. A broadcast receiving device, comprising:

a receiver for receiving an audio or video, wherein the audio or video is uncompressed and is included in a broadcast stream which is not transmitted through an internet protocol (IP) network; and a service manager for receiving address information based on the audio or video, for obtaining a signaling table via the broadcast stream, transmitting a request message for the signaling table to a server providing the signaling table, and receiving a response including the signaling table based on the request message through the IP network from the server, wherein the receiving the address information based on the audio or video comprises extracting a signature from frames of the audio and video and receiving the address information based on the signature, wherein the request message includes a first query information which includes time information of the request message, and a second query information which designates the signaling table, wherein the first query information further includes a duration term representing a time interval for which the signaling table is being requested by the broadcast receiving device, and a start time term representing a start of the time interval for which the signaling table is being requested by the broadcast receiving device, wherein the second query information further includes a table term representing that the signaling table is being requested by the broadcast receiving device, wherein the signaling table included in the response corresponds to the table term included in the request message, wherein the server transmits the requested signaling table, that is scheduled to take effect during the time interval represented by the duration term, and updates of the requested signaling table, when the request message does not include an update term, and the server transmits only updates of the requested signaling table that are scheduled to take effect during the time interval, when the request message includes the update term, wherein the update term represents an update flag which indicates whether the request message is for an update.

6. The device of claim 5, wherein the second query information includes at least one of a channel identifier, and a service identifier, wherein the channel identifier represents a channel number of a virtual channel for which the signaling table is request, wherein the service identifier represents a service identifier of a Non-Real Time (NRT) service for which the signaling table is request.

7. The device of claim 5, wherein the table term represents at least one of Program and System Information Protocol (PSIP) set, basic NRT set, extended NRT set, Virtual Channel Table (VCT), Event Information Table (EIT), Extended Text Table (ETT), Service Map Table (SMT), Non-Real Time-Information Table (NRT-IT), Text Fragment Table (TFT), Purchase Item Table (PIT) and Purchase Term and Channel Table (PTCT).

8. The device of claim 7, wherein the PSIP set includes Terrestrial Virtual Channel Table (TVCT), EIT, and ETT for a virtual channel in the broadcast stream, wherein the basic NRT set includes SMT, NRT-IT and TFT for a NRT service in the broadcast stream, wherein the extended NRT set includes the basic NRT set, PIT and PTCT for a NRT services in the broadcast stream.

* * * * *